Figure 4D:
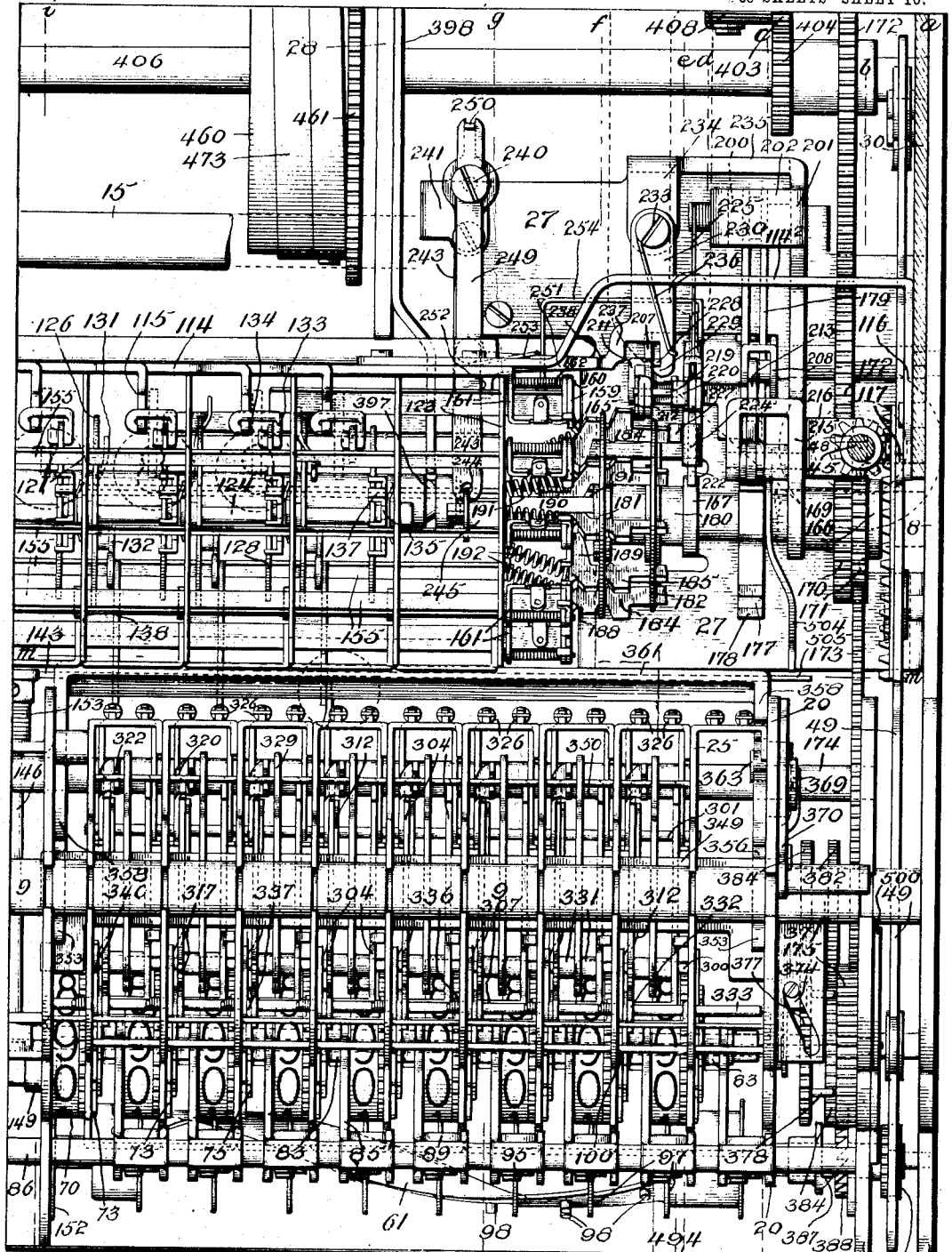

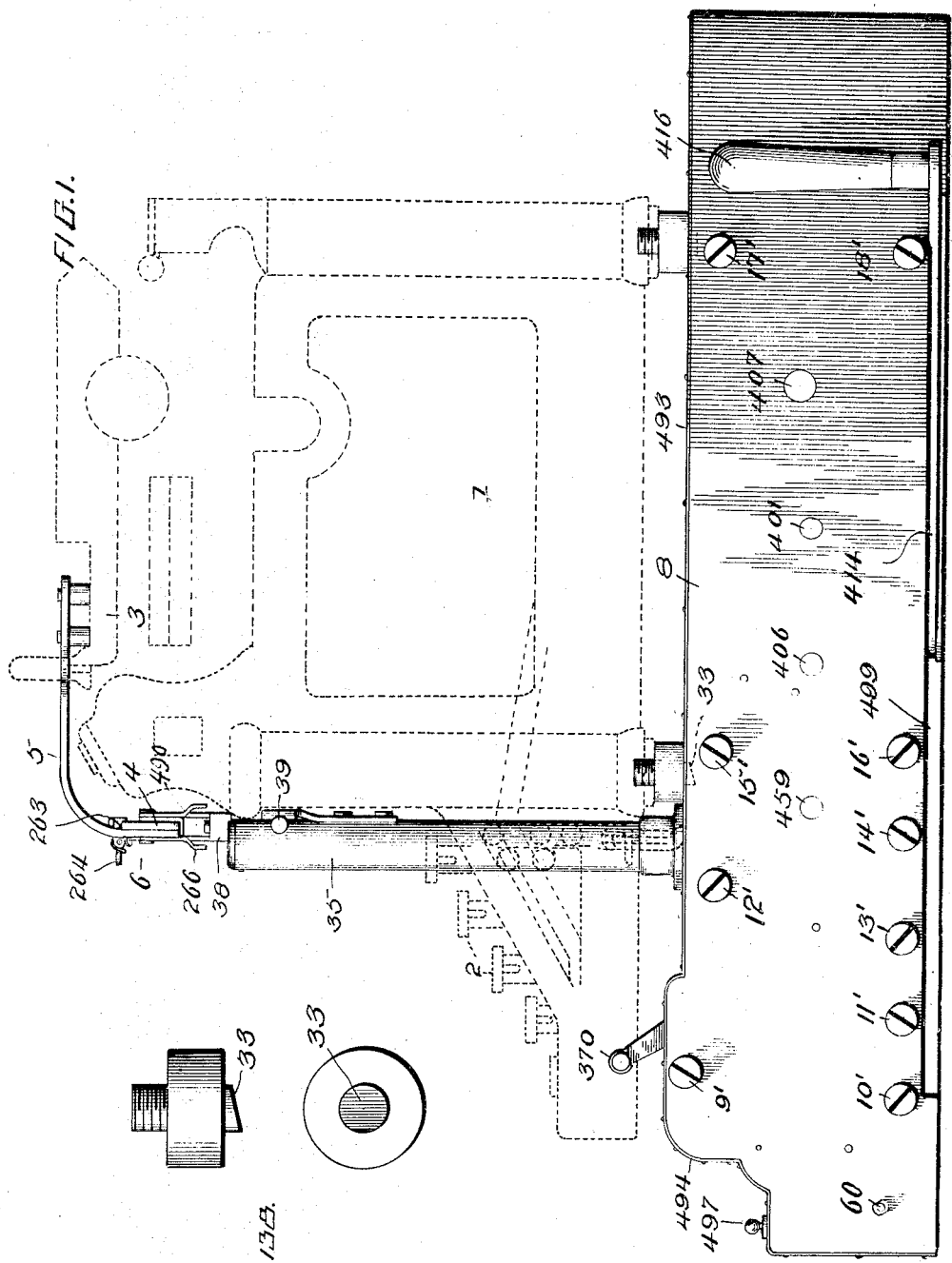

J. T. HOWIESON.
CALCULATING MACHINE.
APPLICATION FILED JUNE 17, 1909.
946,366.
Patented Jan. 11, 1910.
35 SHEETS—SHEET 2.
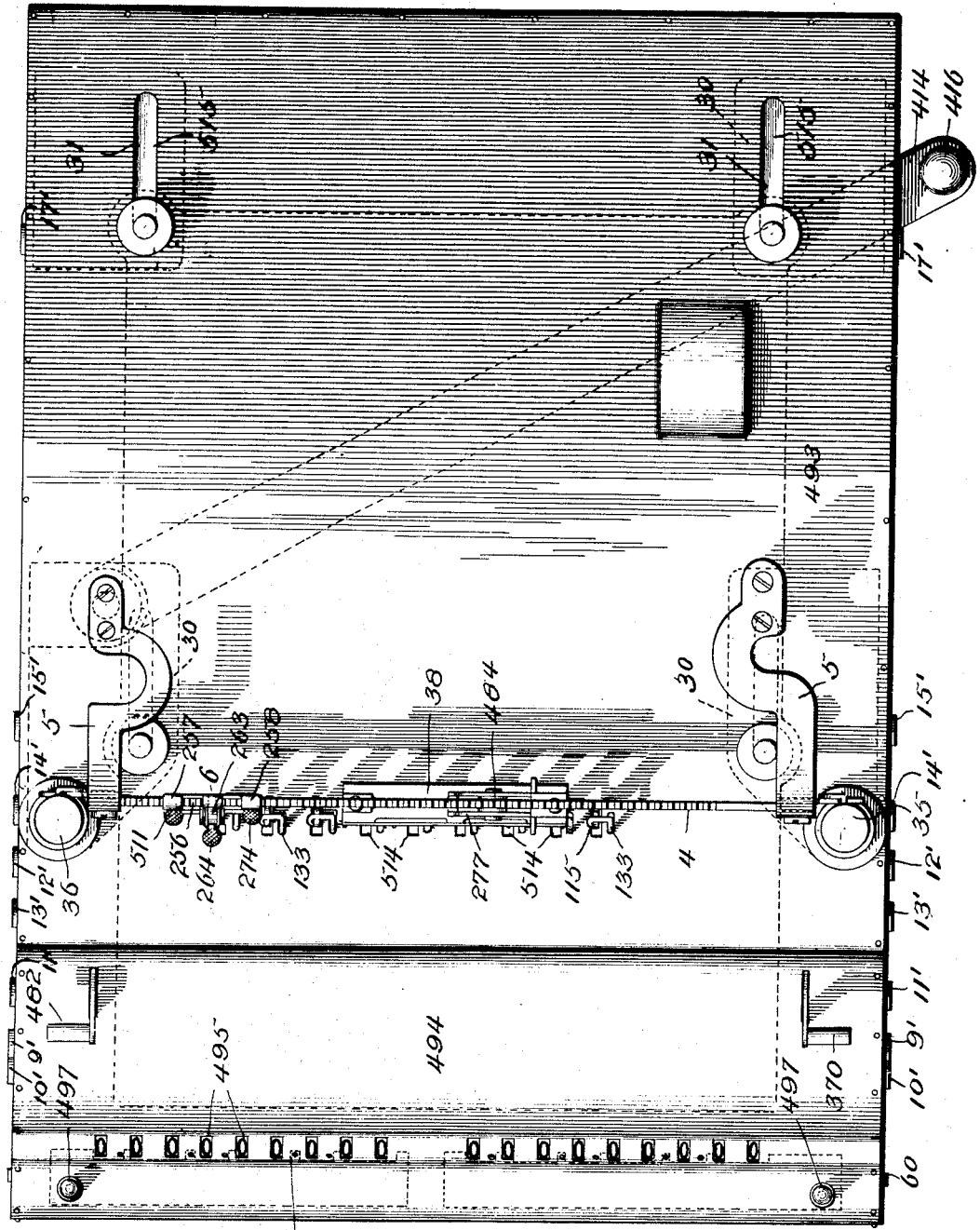
INVENTOR
John T. Howieson
BY
Attorney

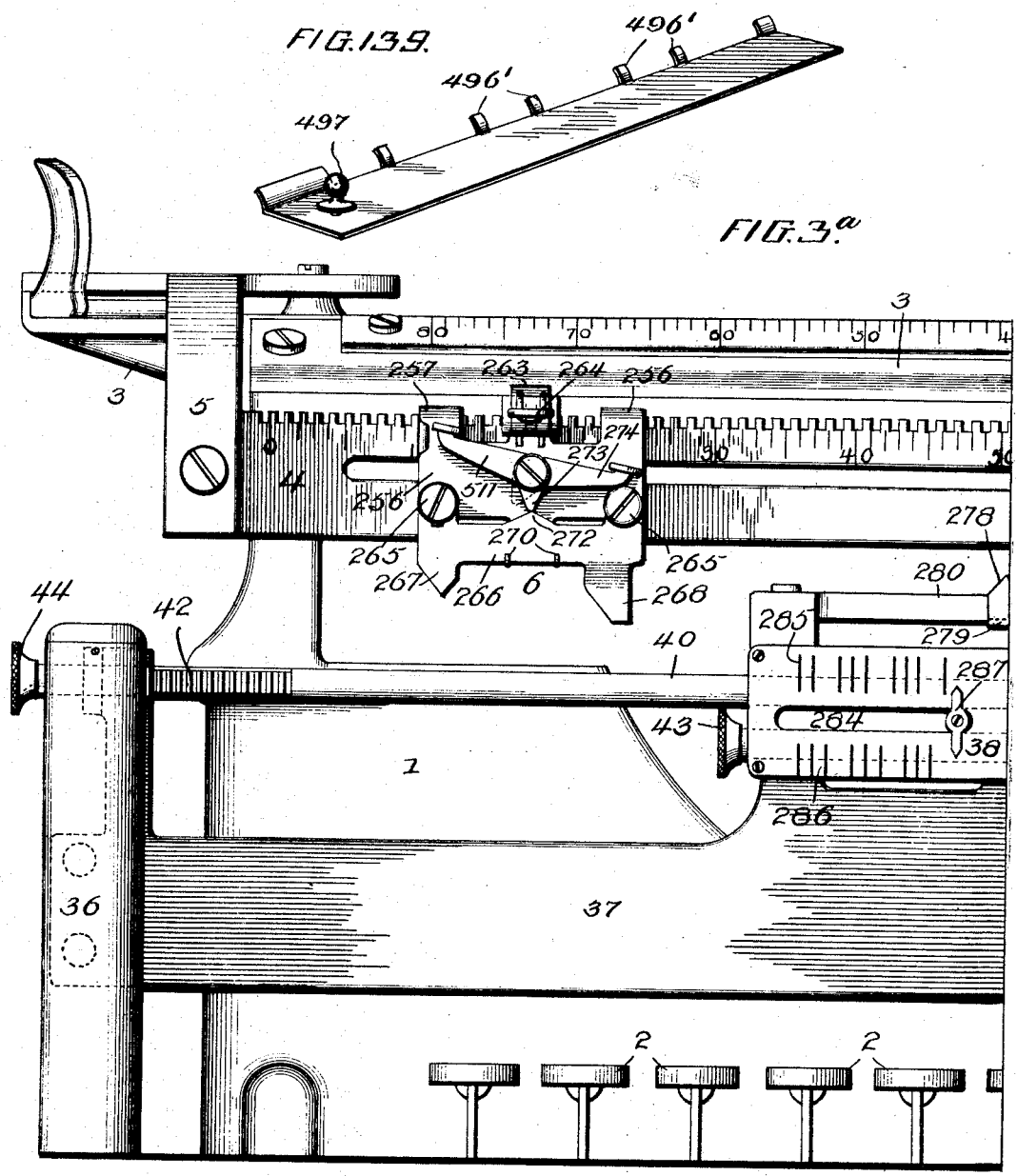

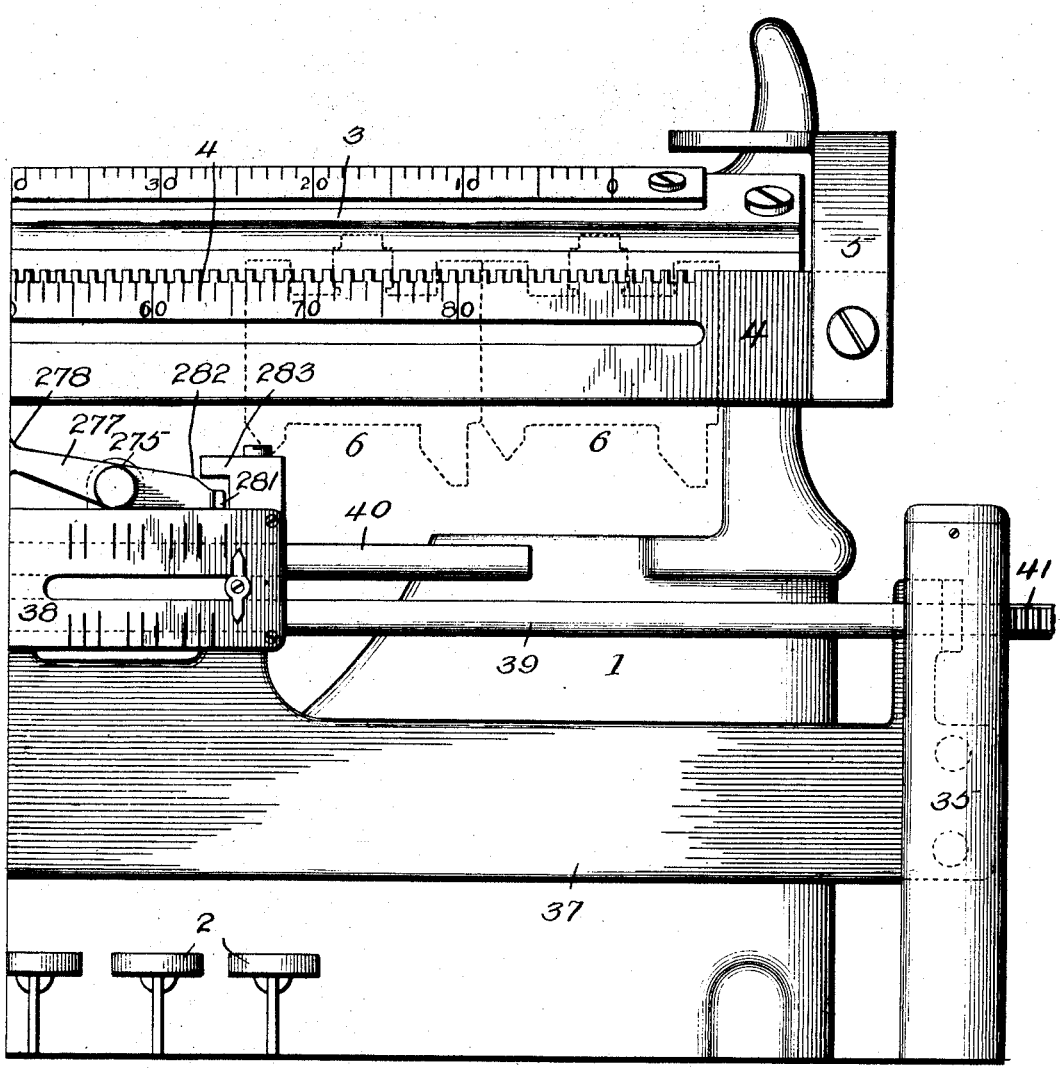

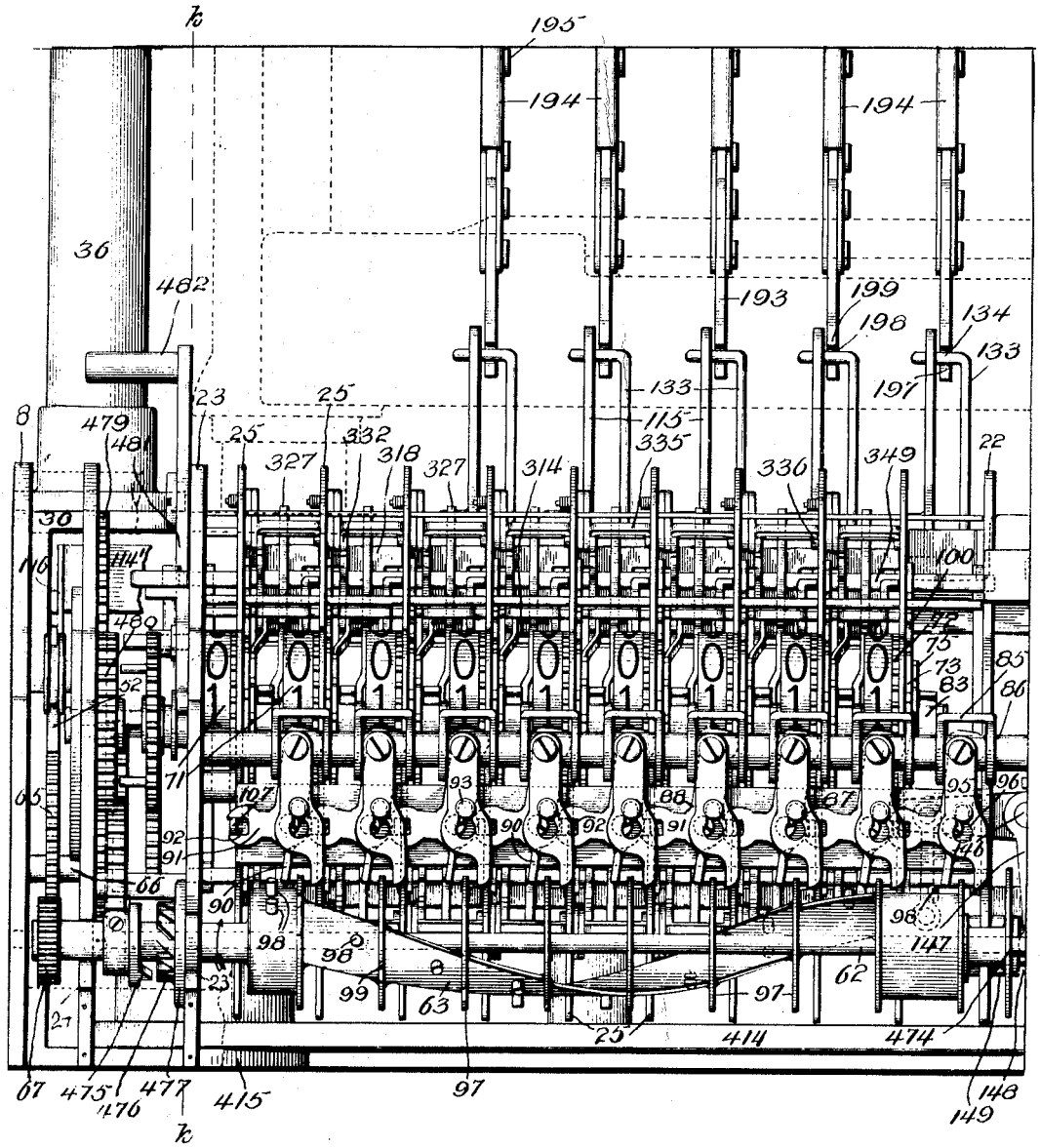
FIG.3.c

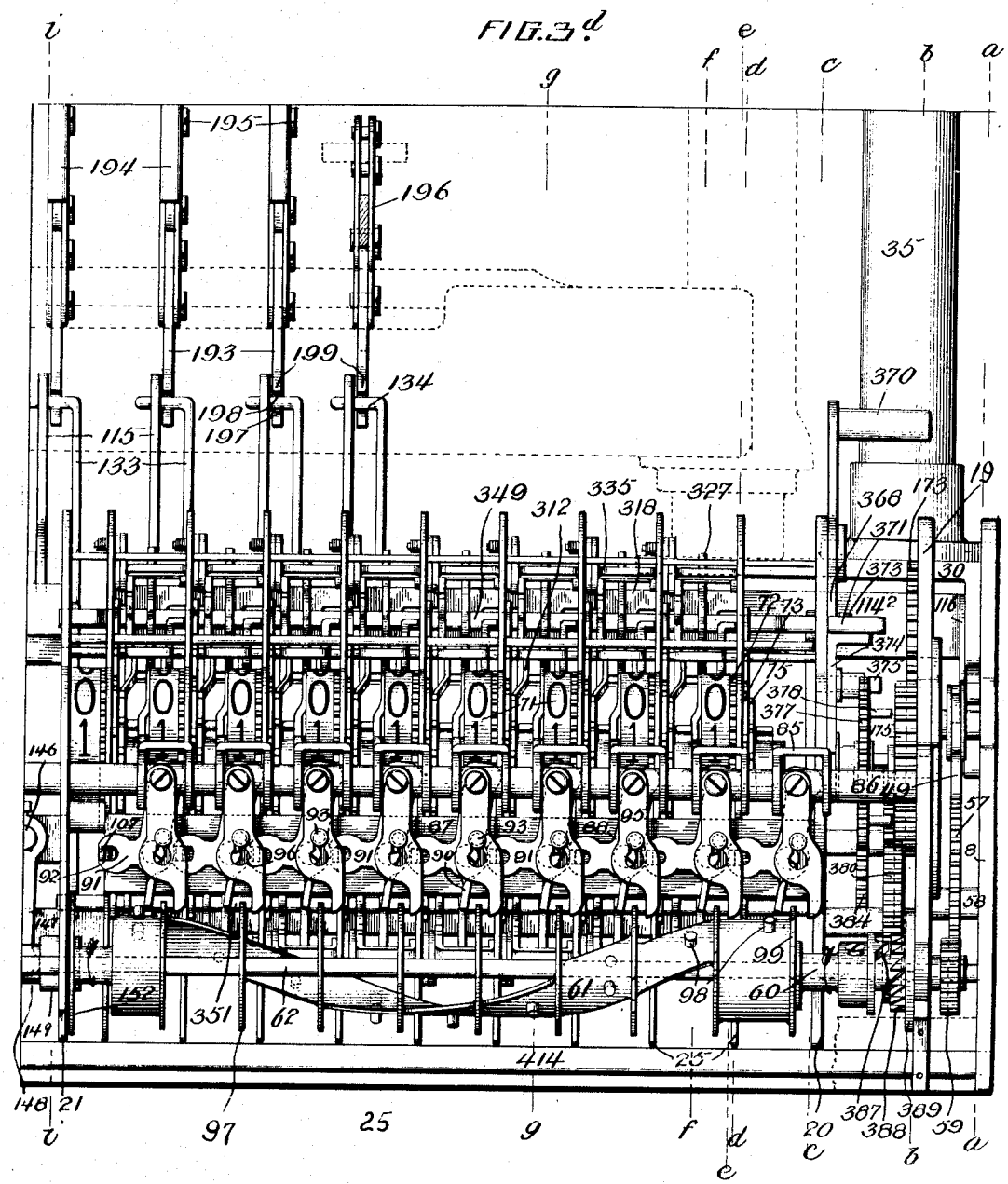

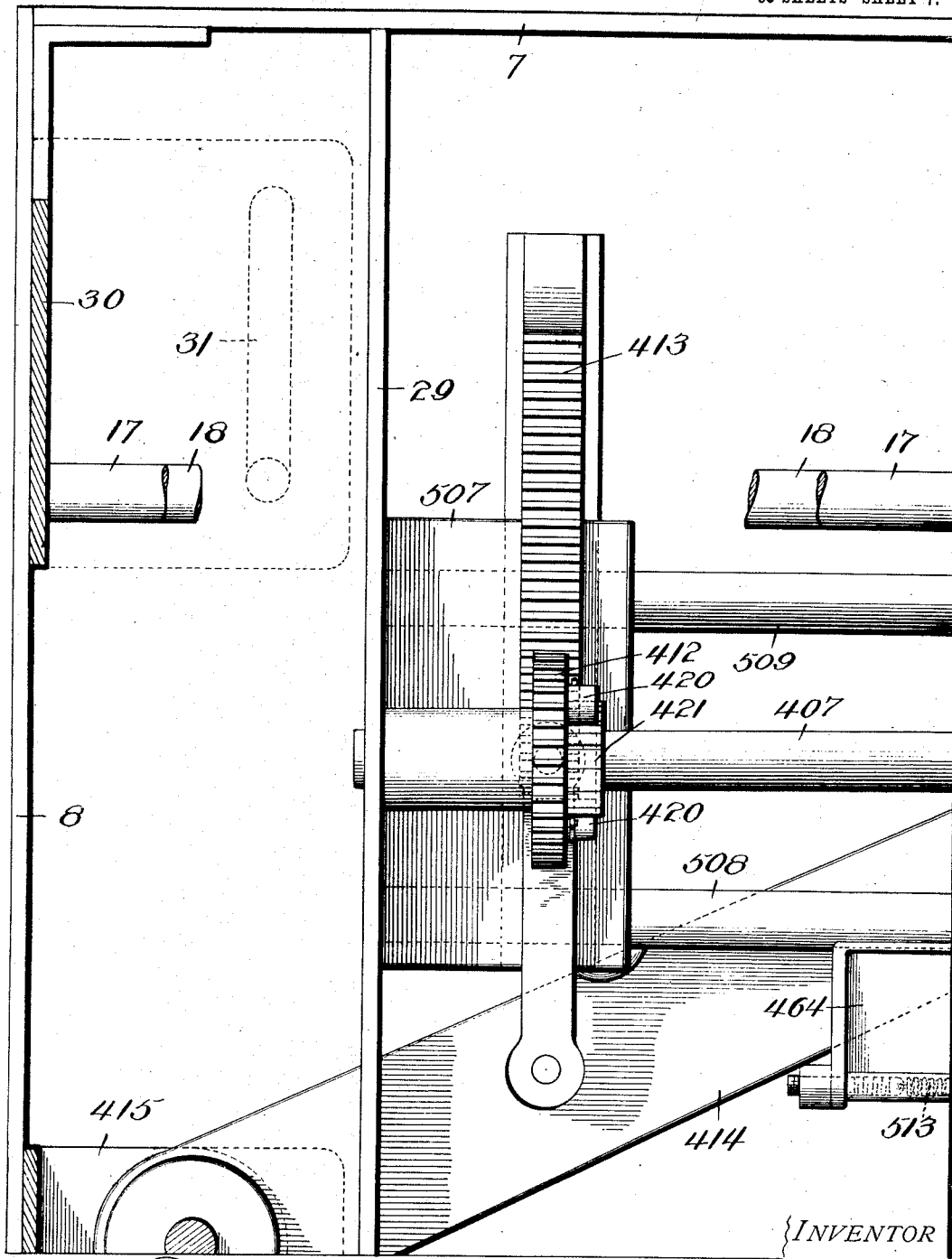

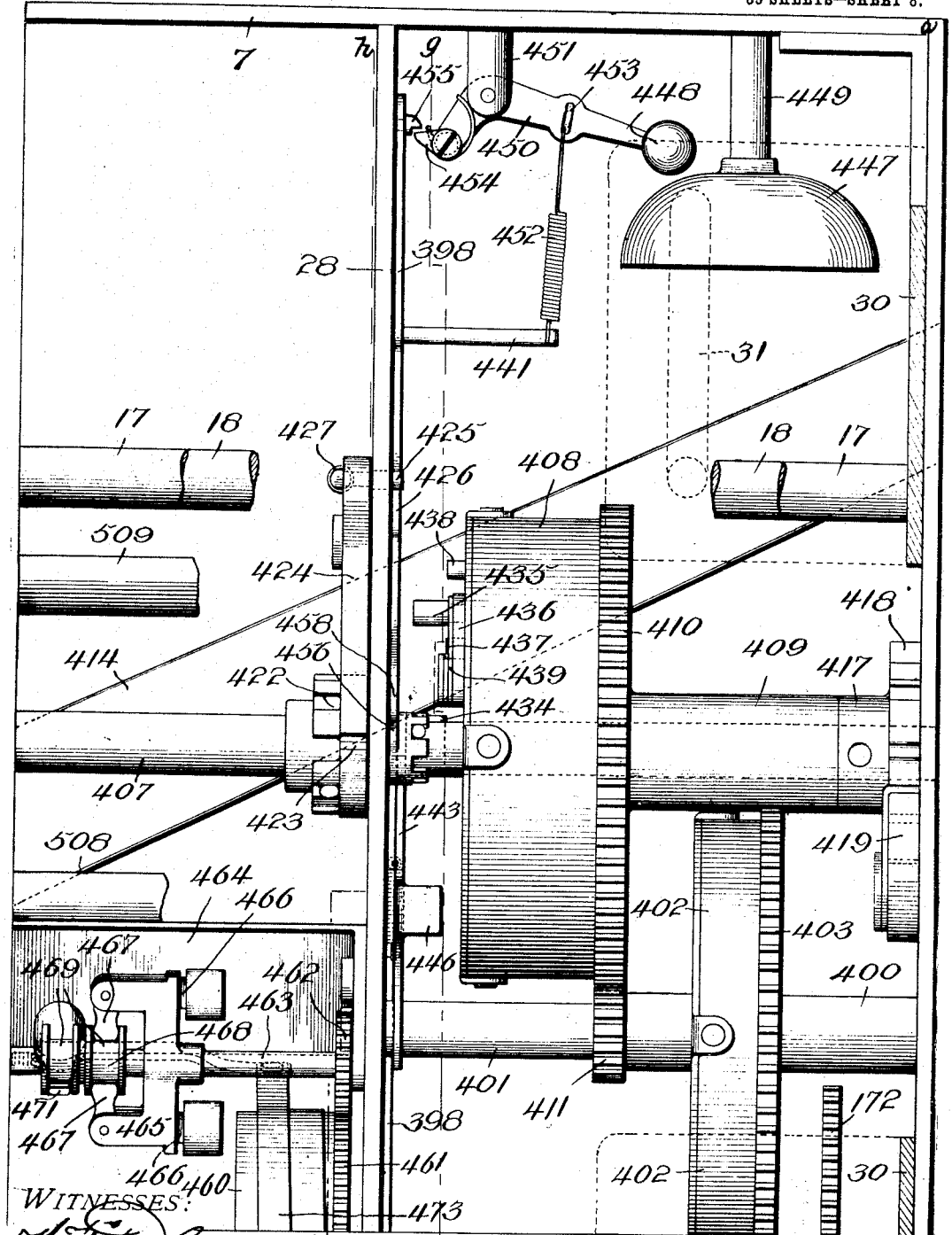

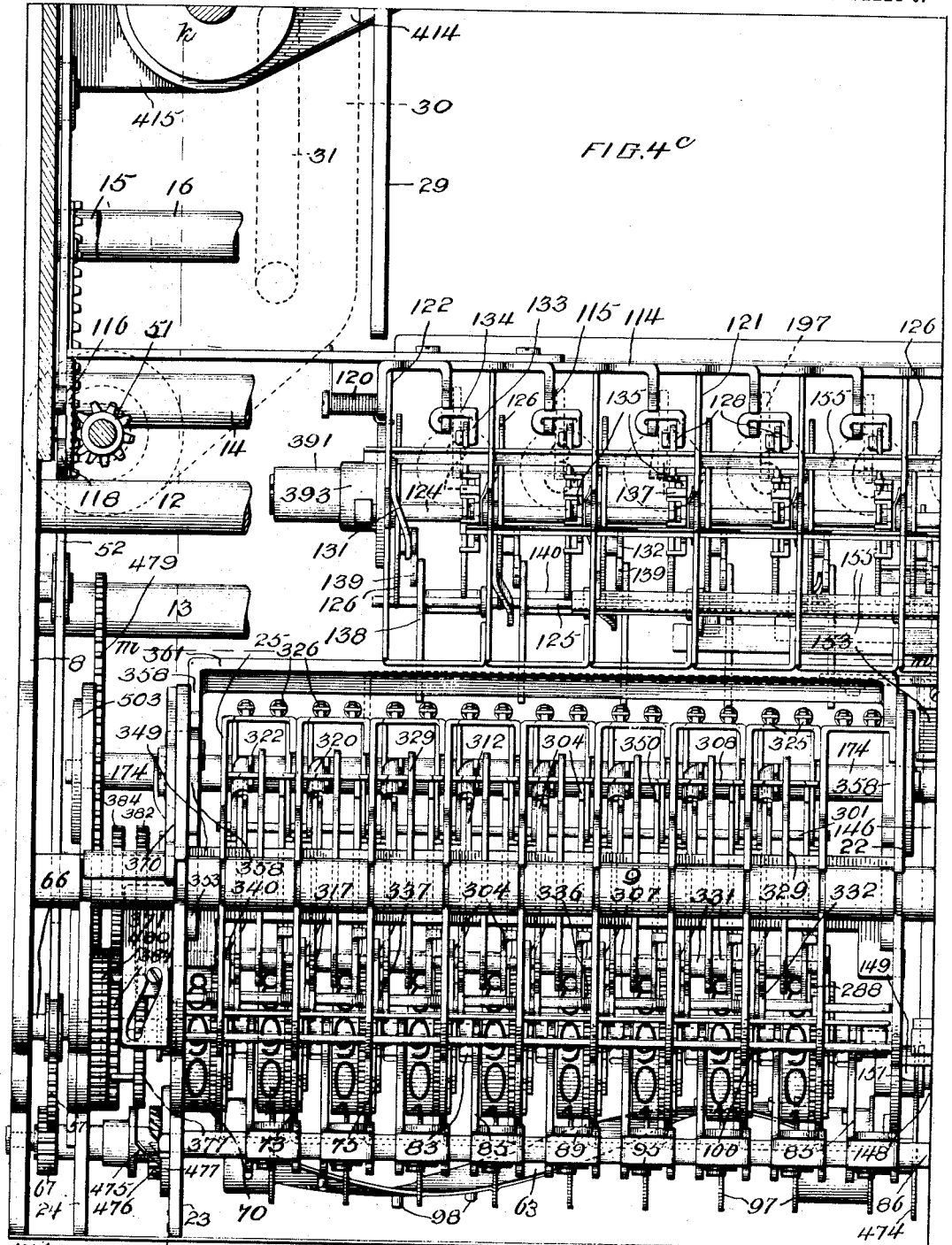

J. T. HOWIESON.
CALCULATING MACHINE.
APPLICATION FILED JUNE 17, 1909.

946,366.

Patented Jan. 11, 1910.
35 SHEETS—SHEET 10.

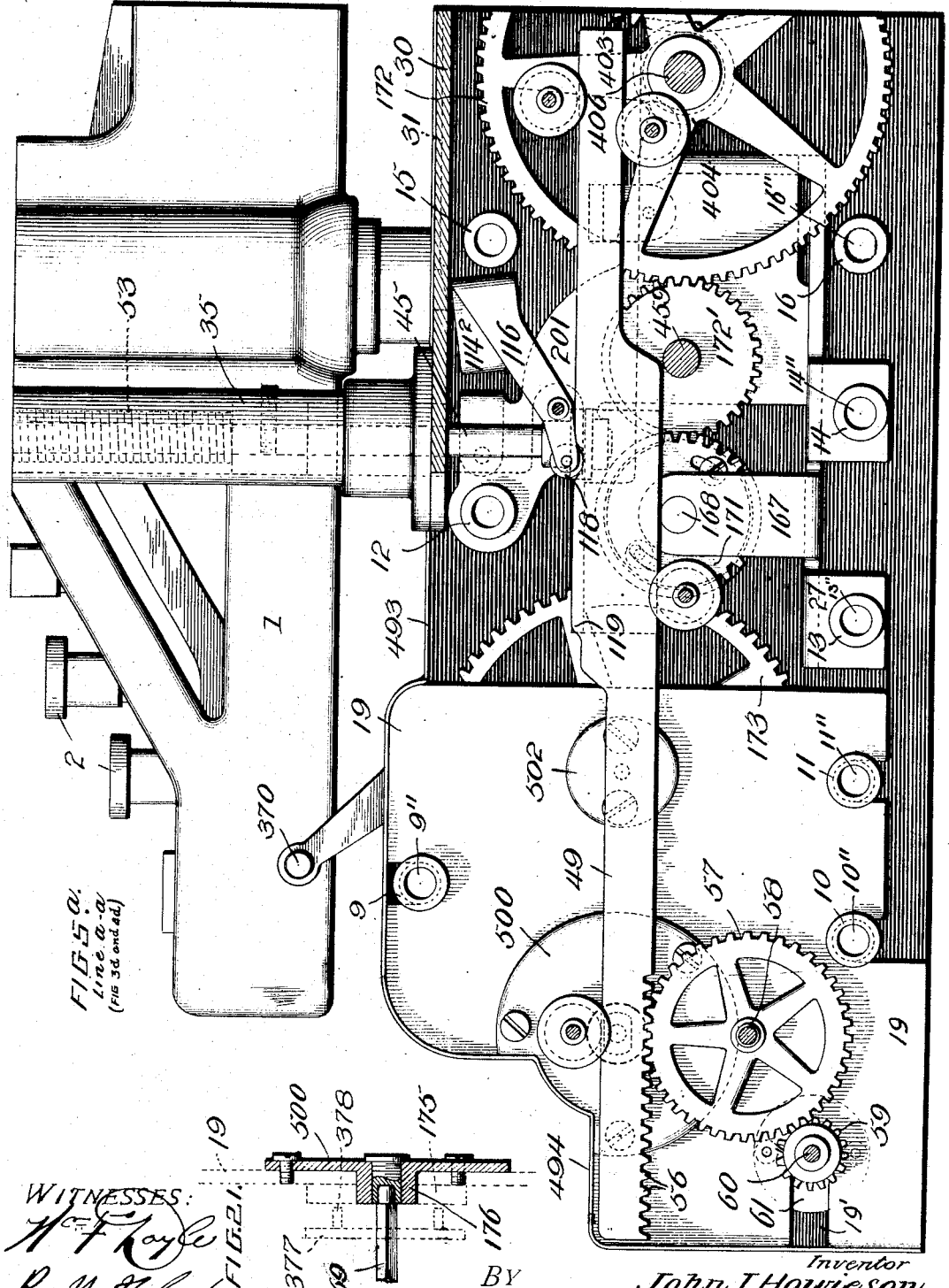

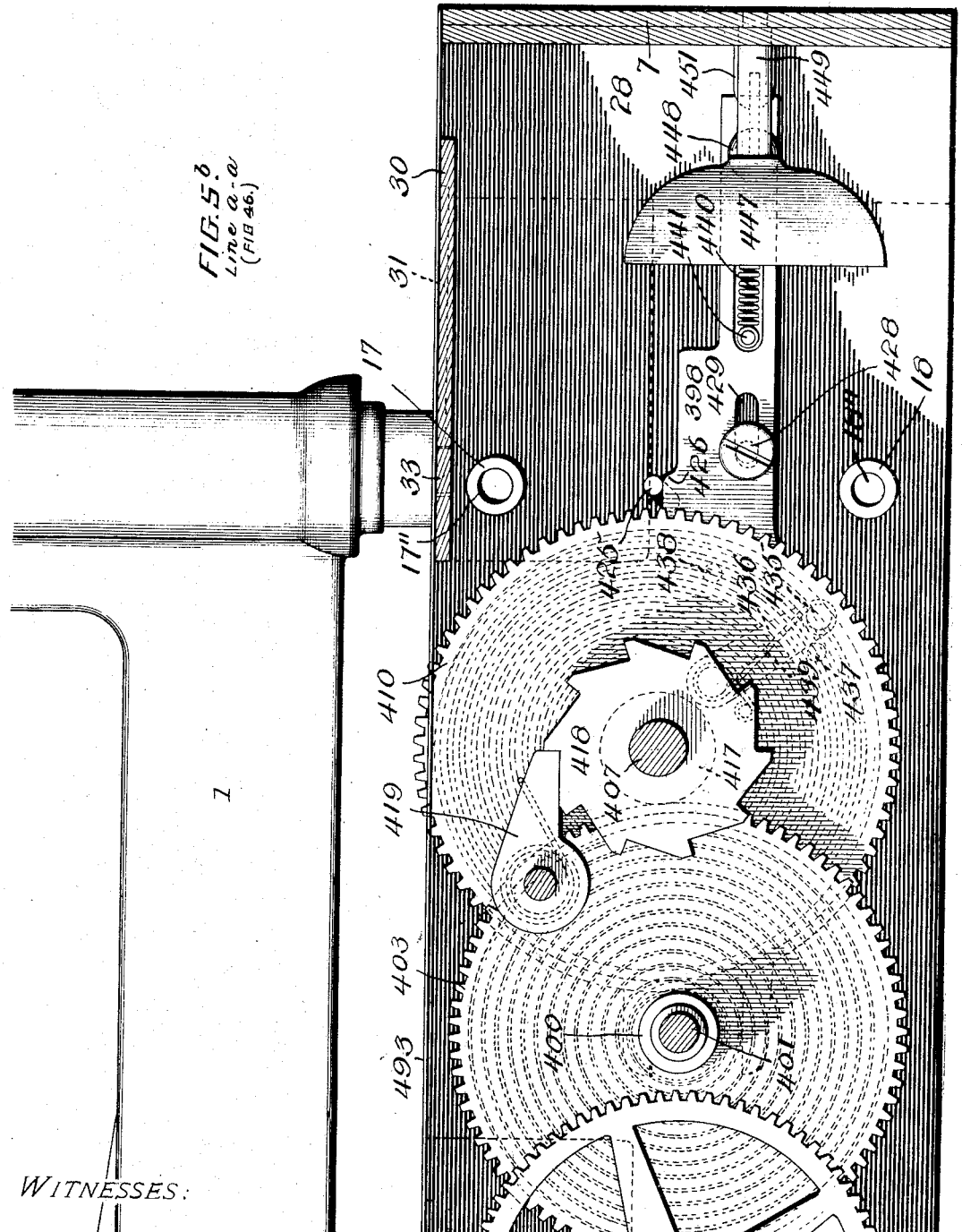

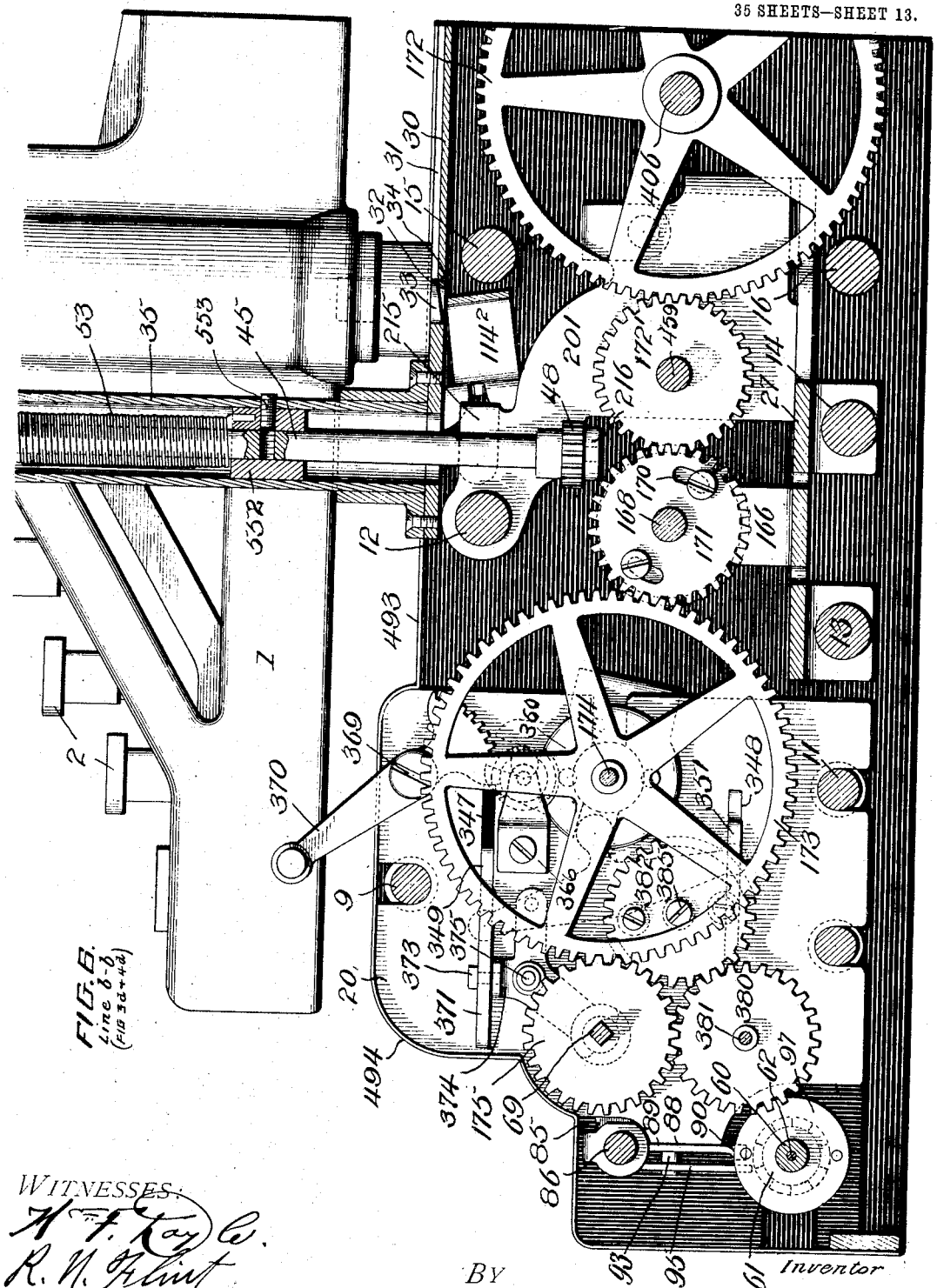

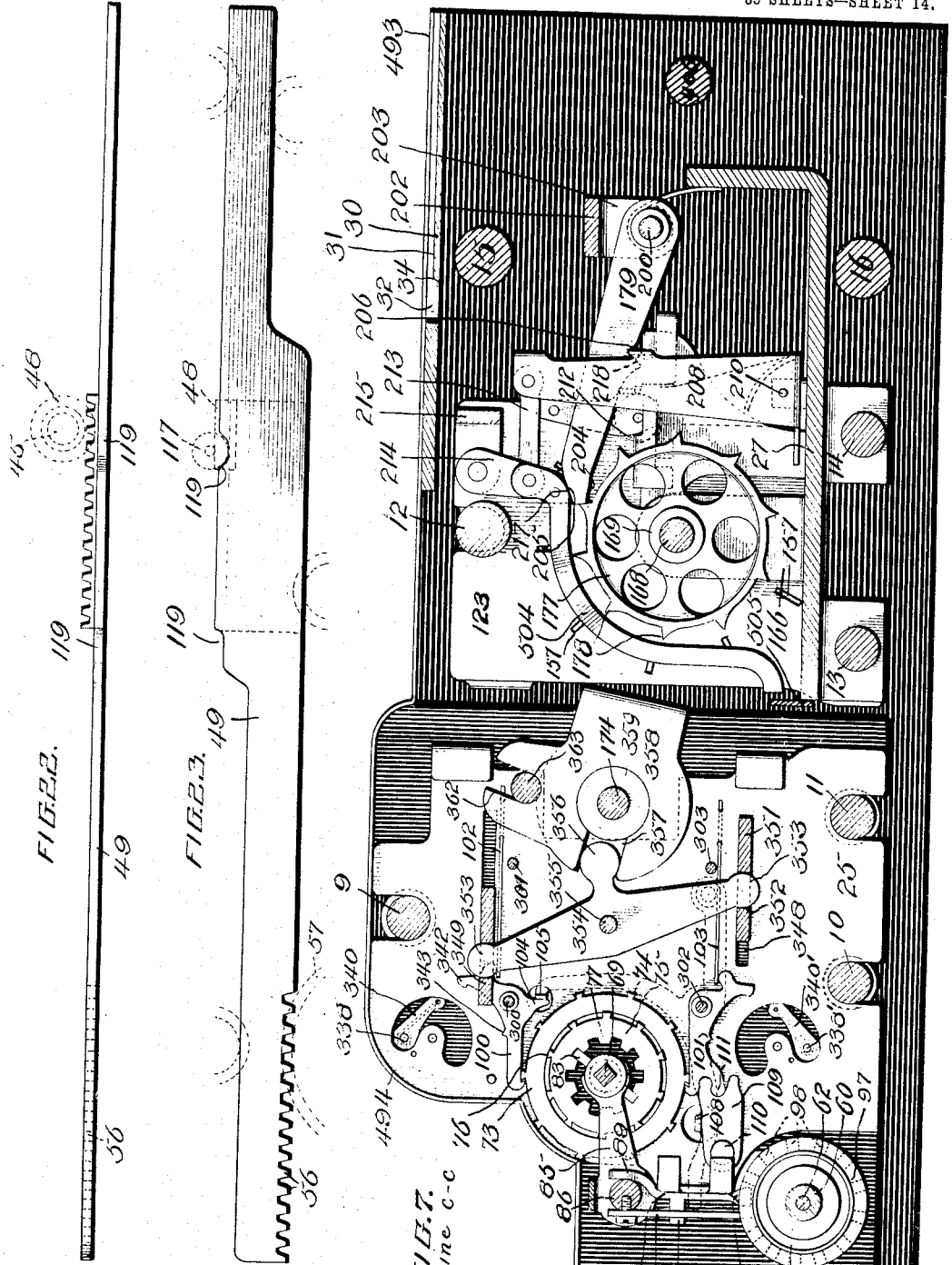

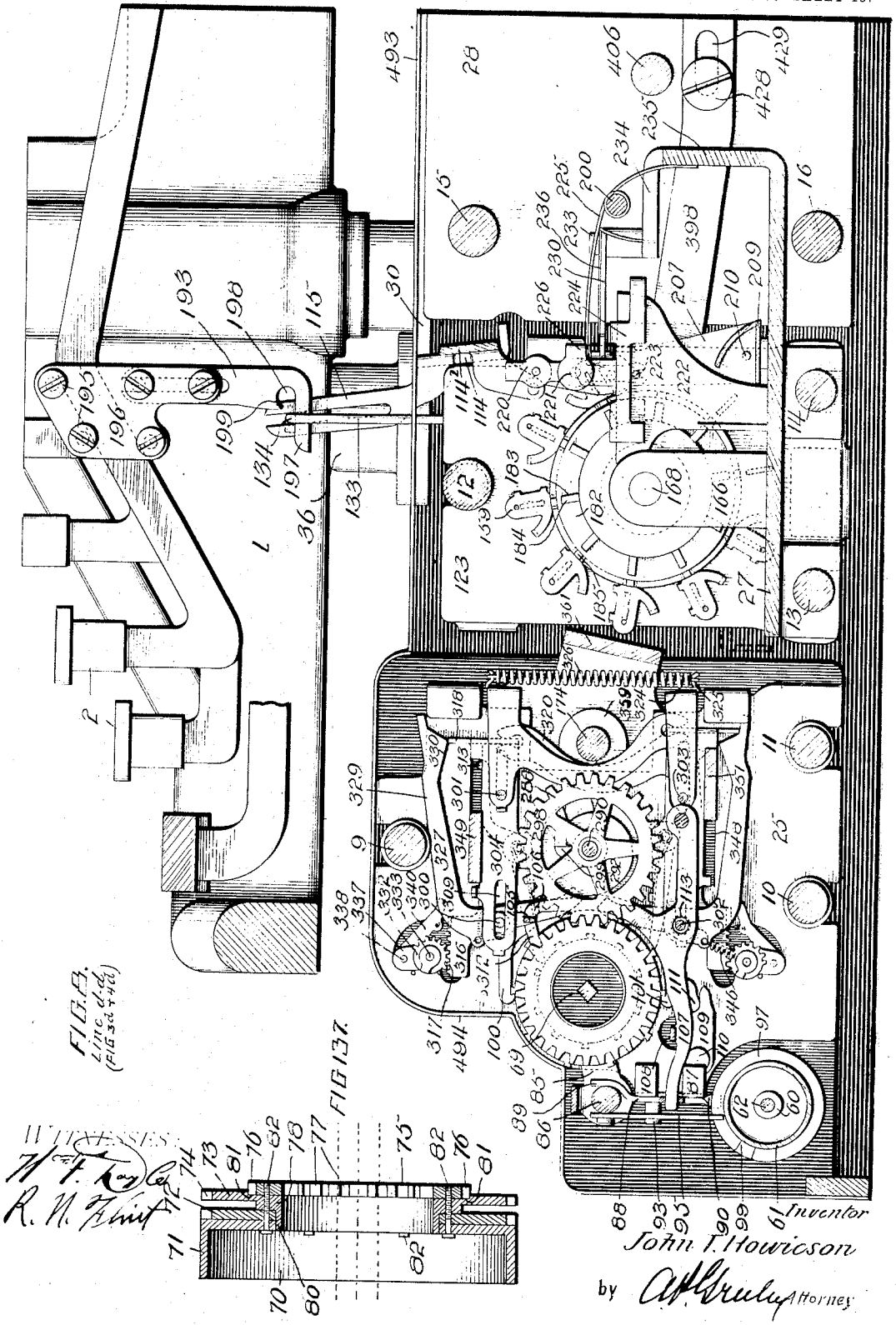

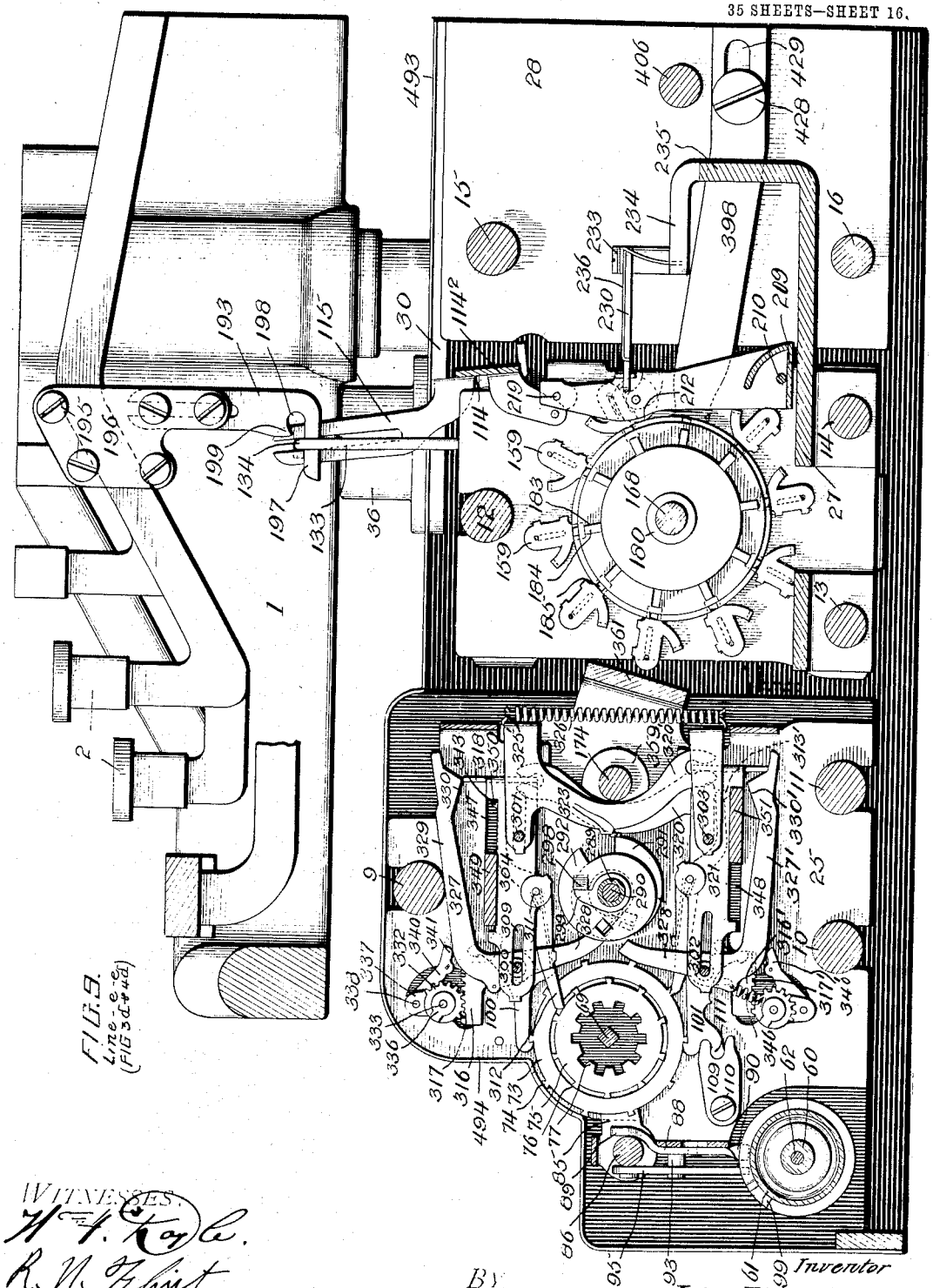

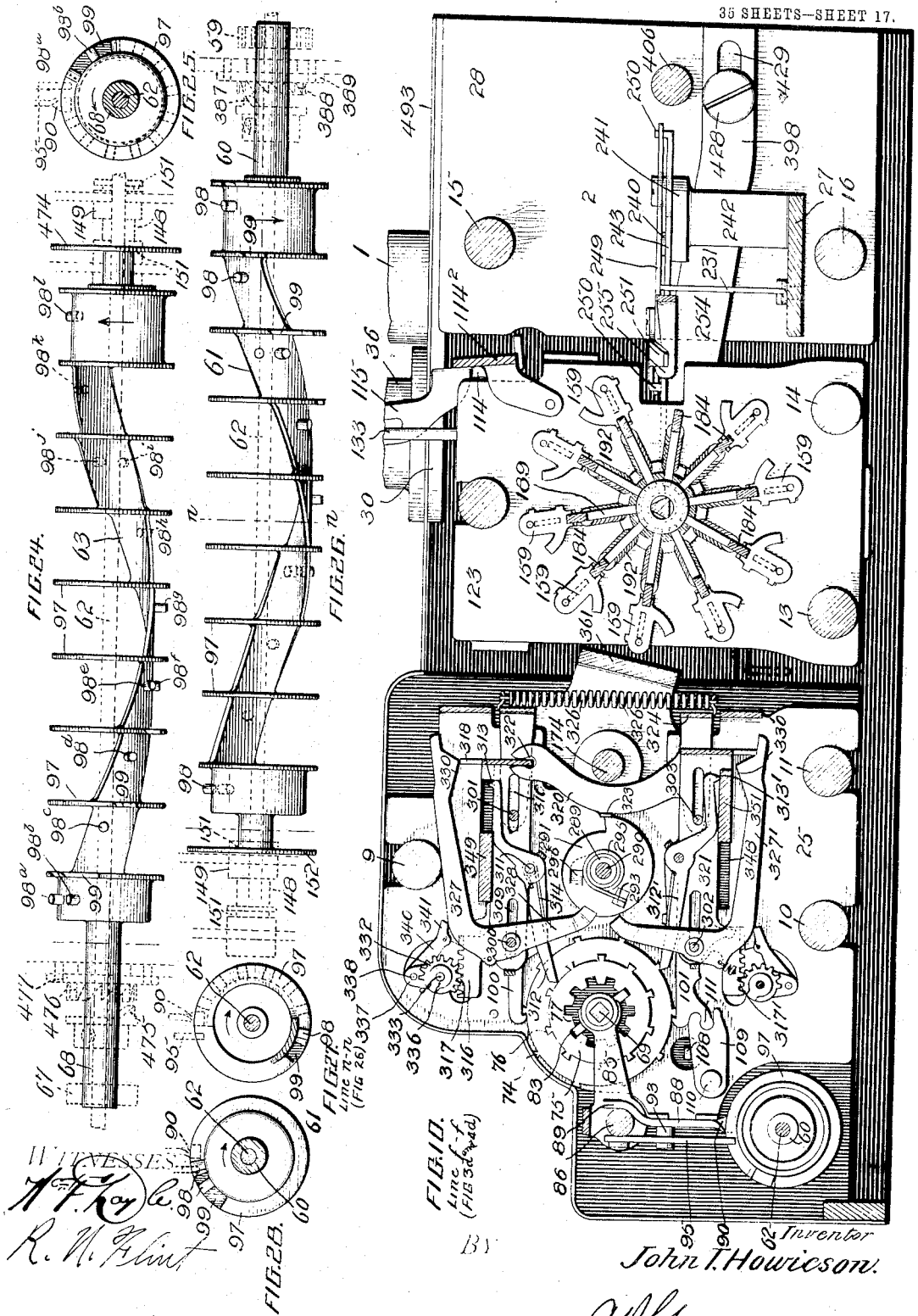

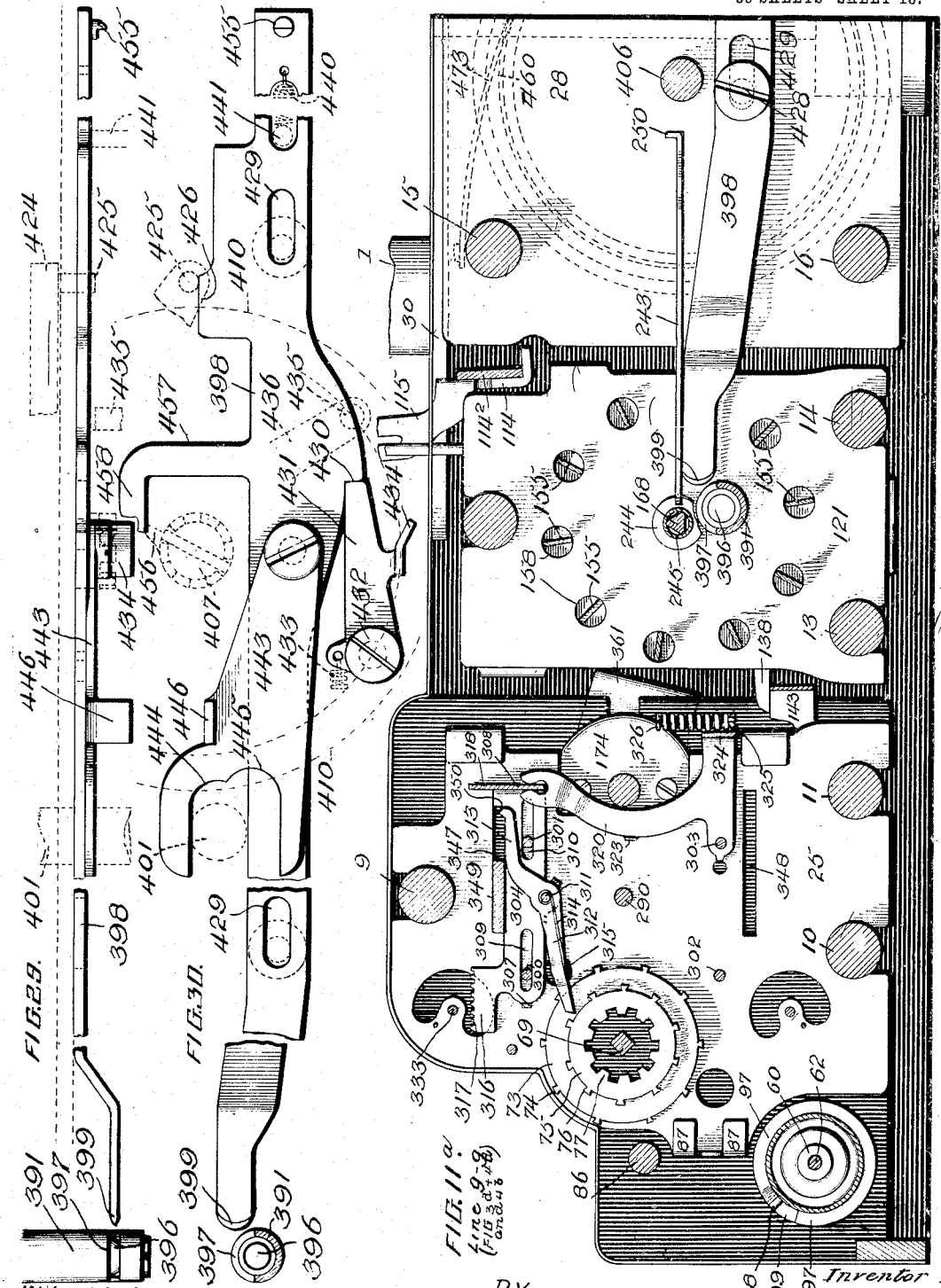

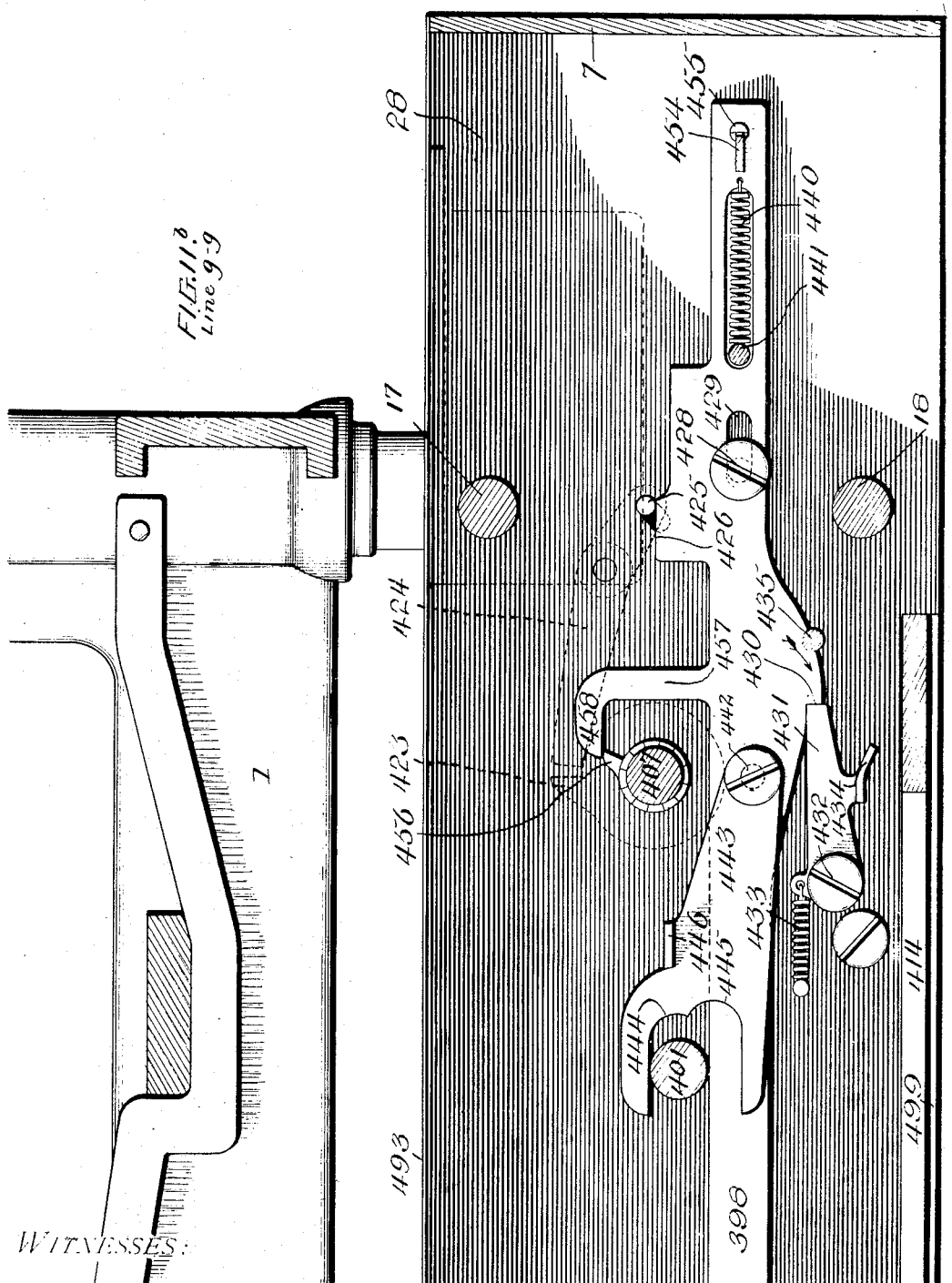

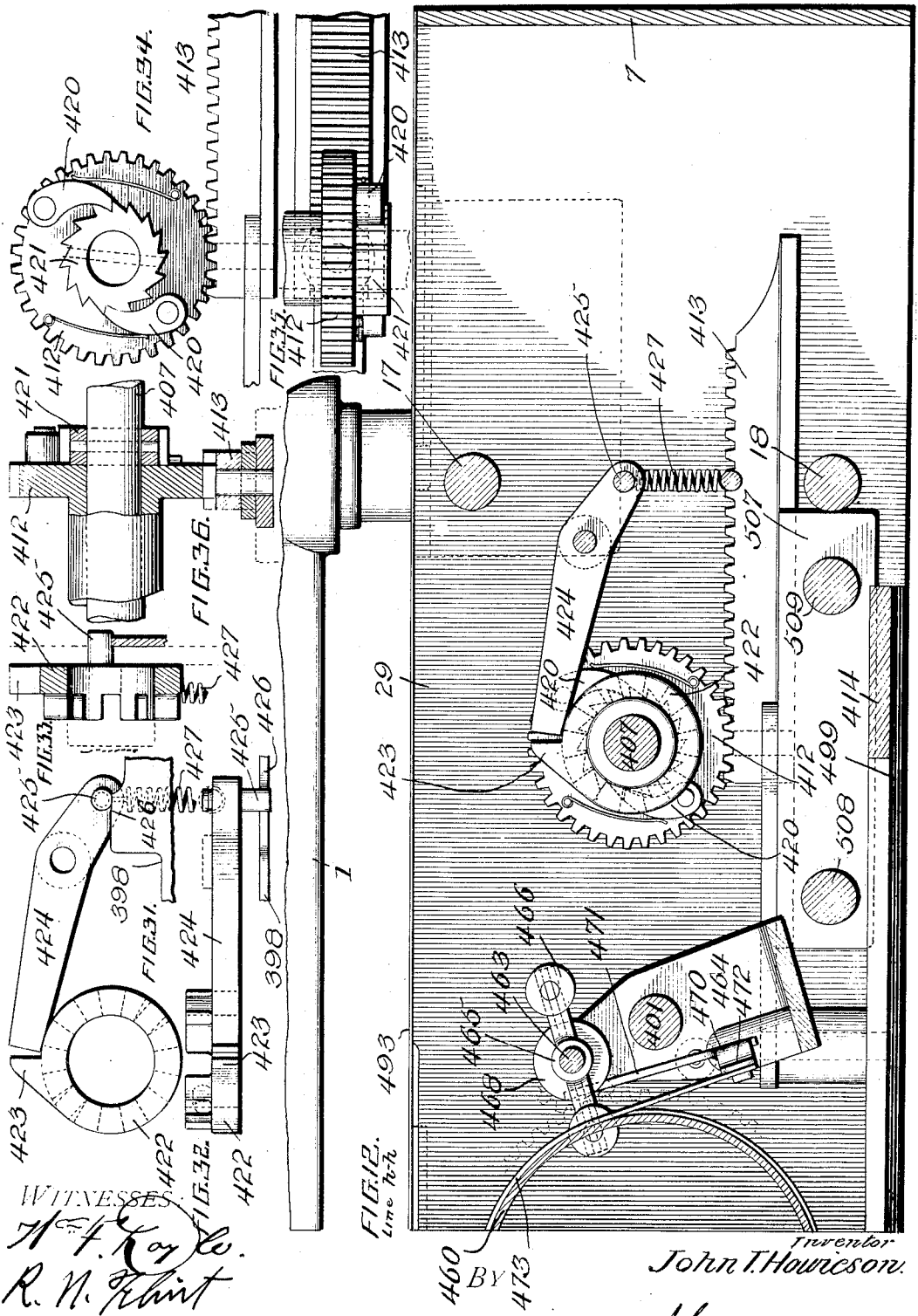

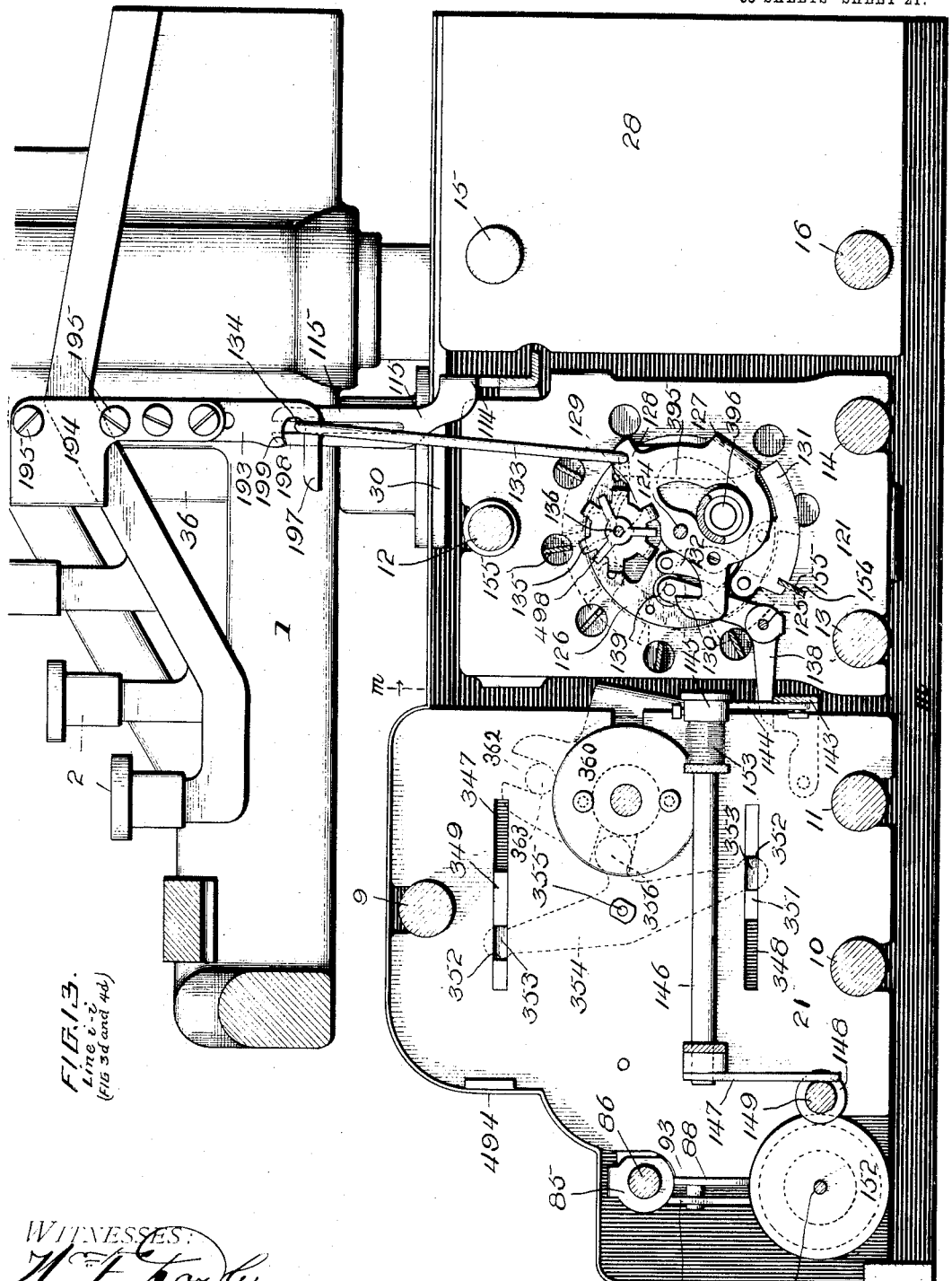

J. T. HOWIESON.
CALCULATING MACHINE.
APPLICATION FILED JUNE 17, 1909.
946,366.
Patented Jan. 11, 1910.
35 SHEETS—SHEET 22.
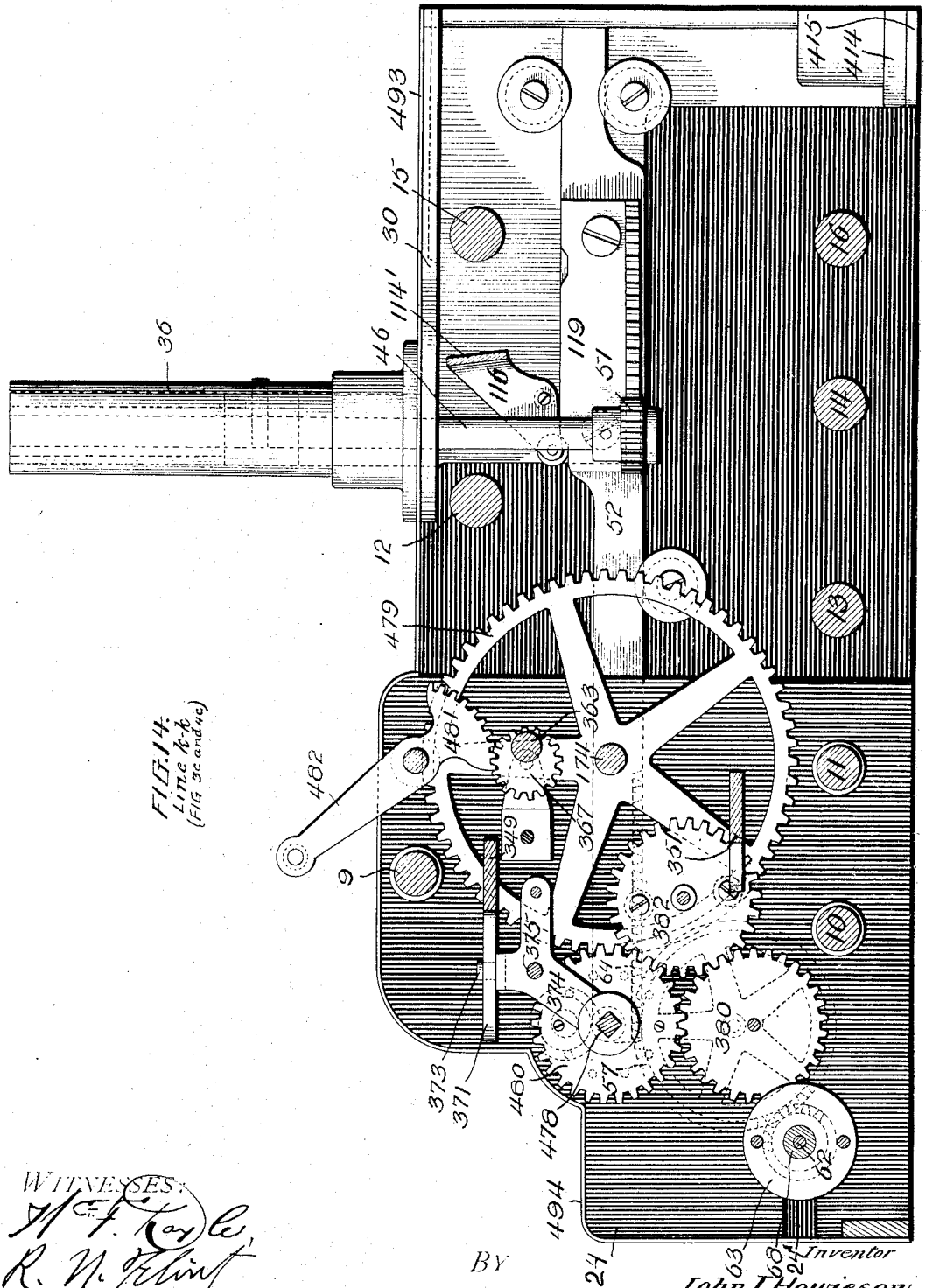

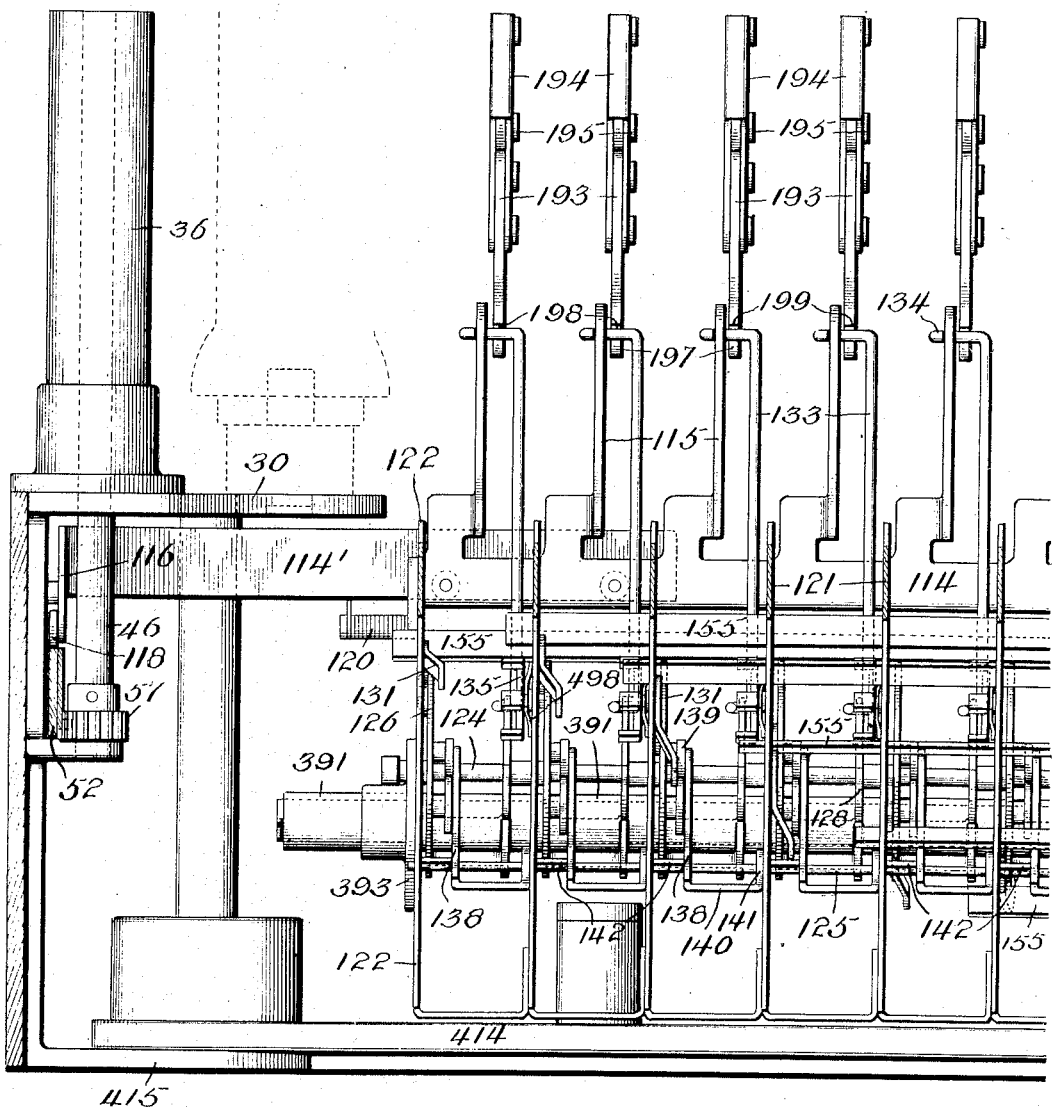

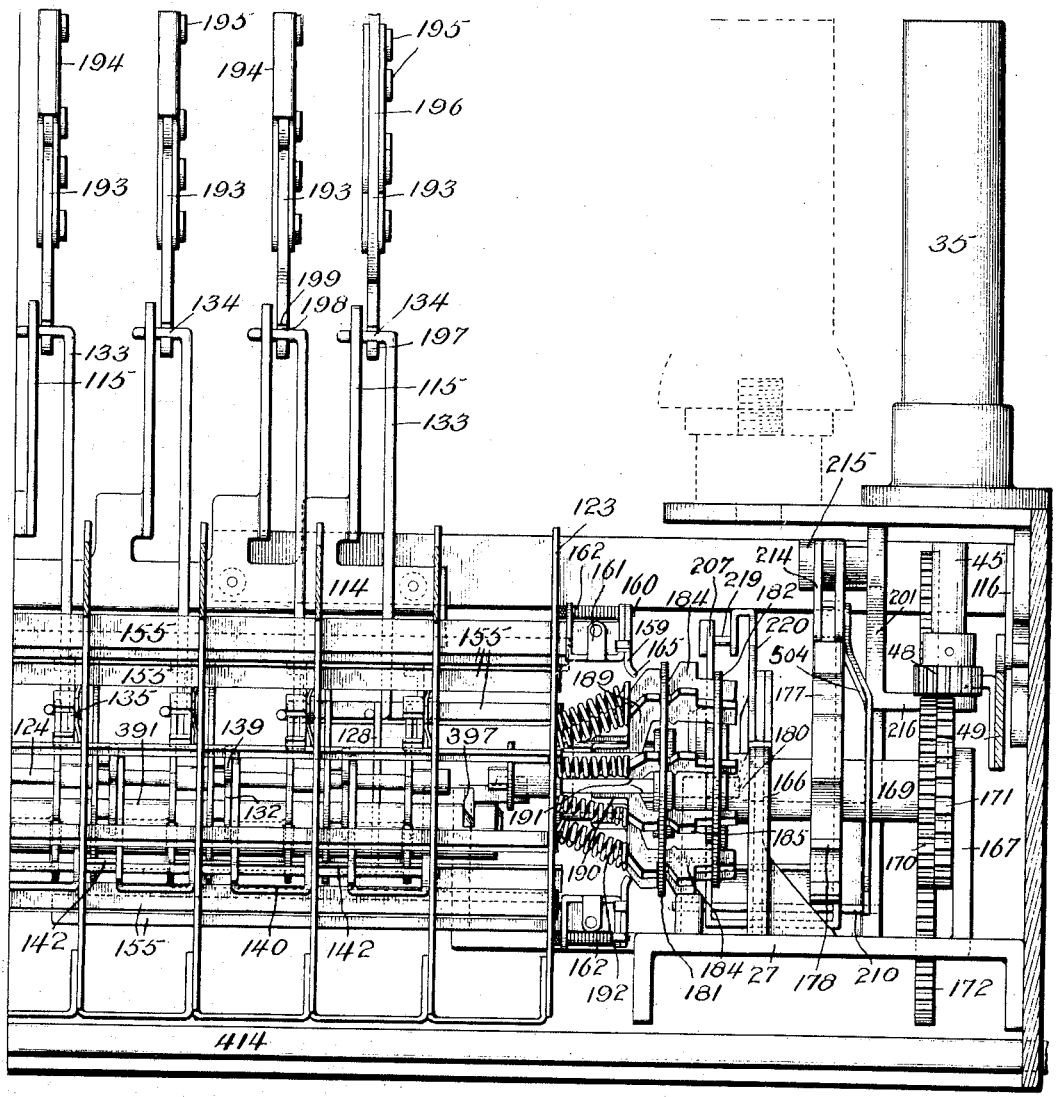

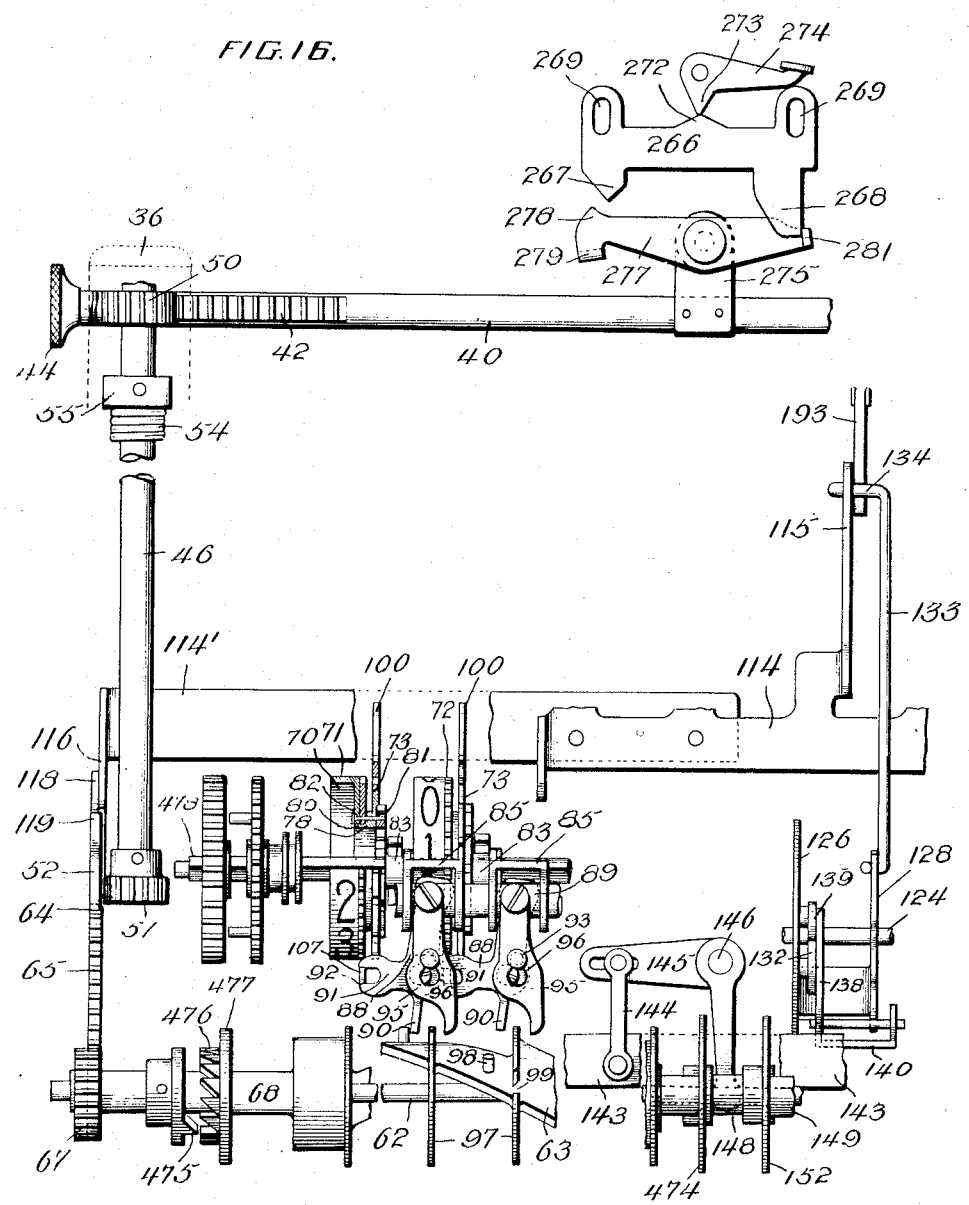

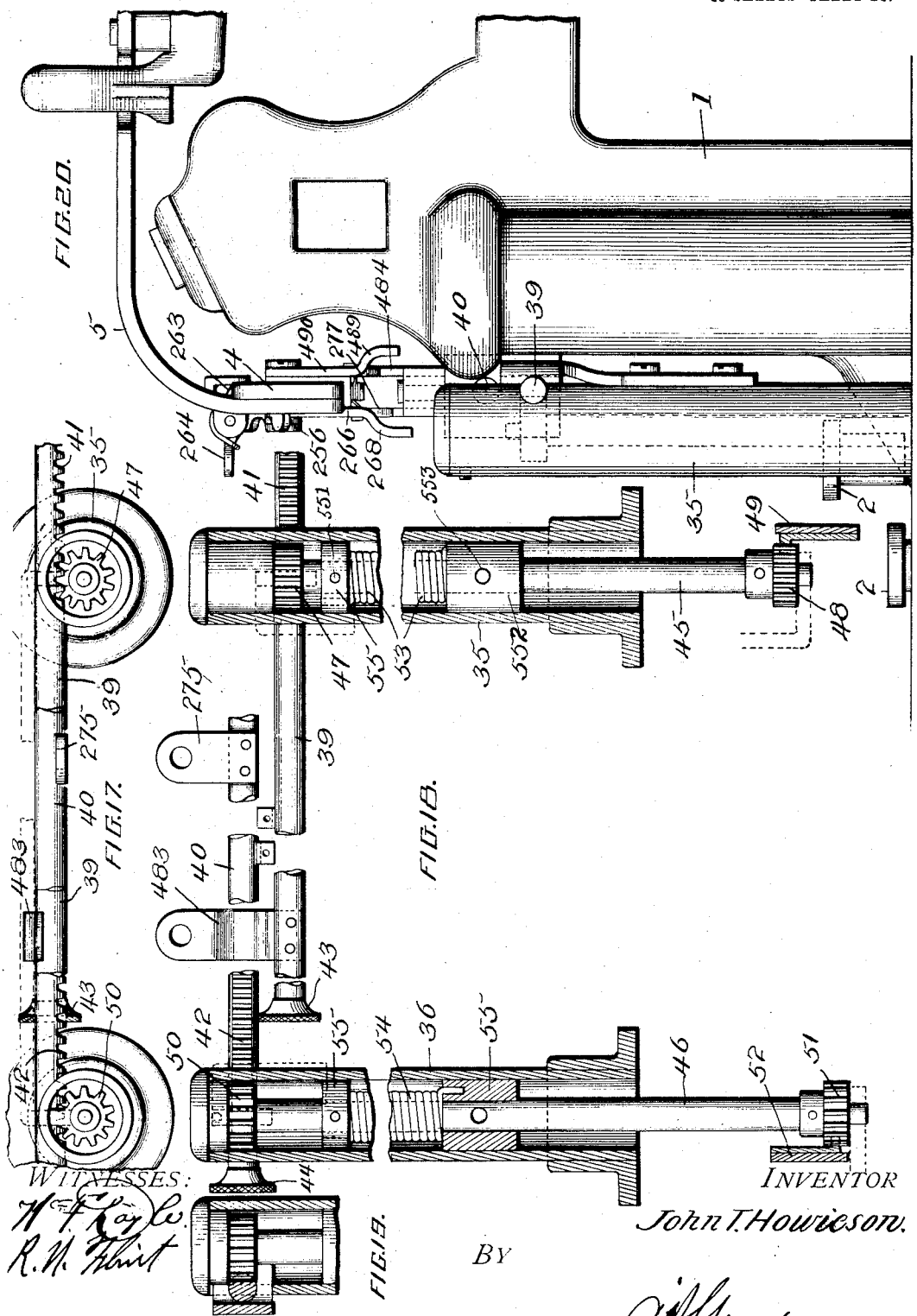

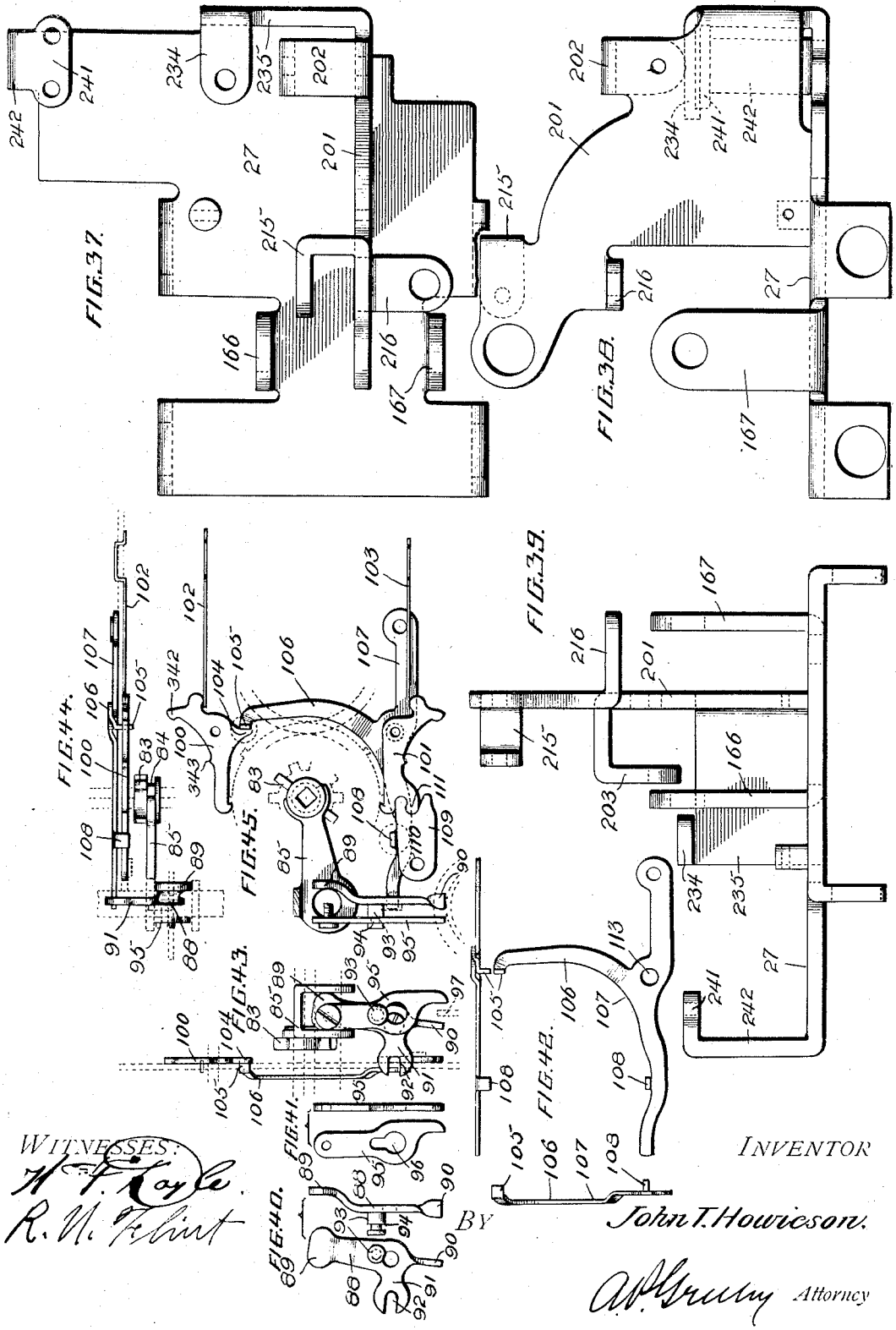

J. T. HOWIESON.
CALCULATING MACHINE.
APPLICATION FILED JUNE 17, 1909.
946,366.
Patented Jan. 11, 1910.
35 SHEETS—SHEET 28.
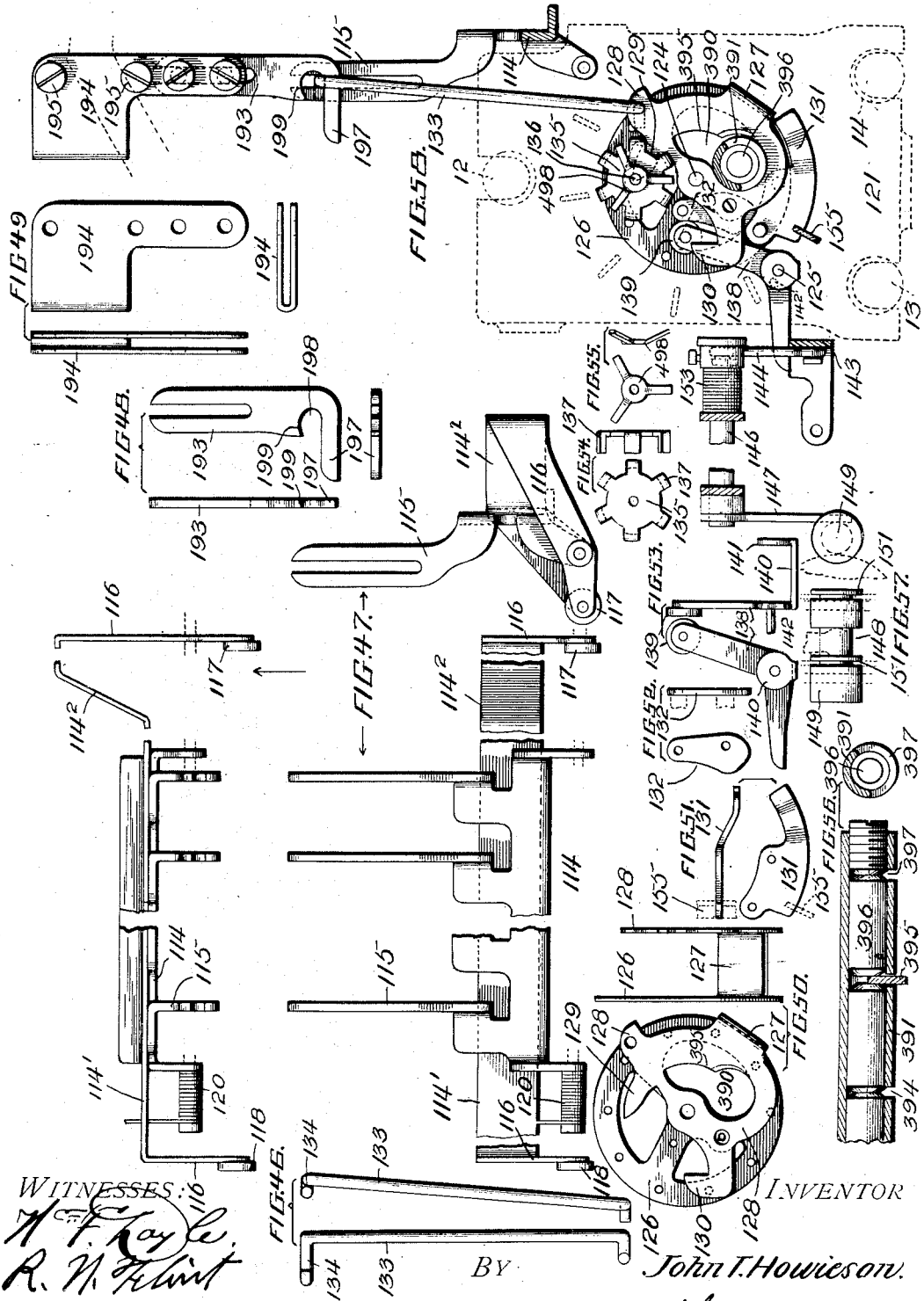

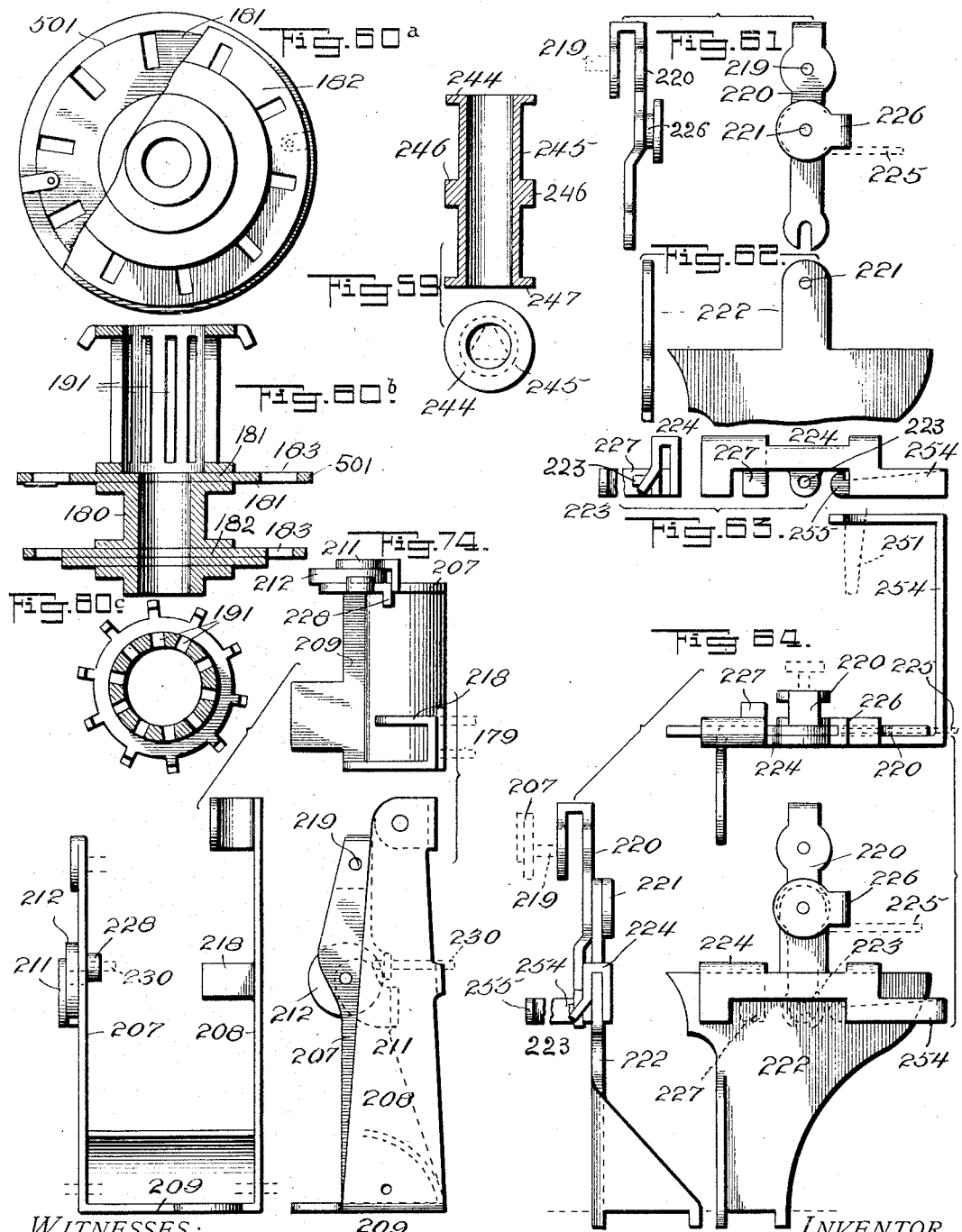

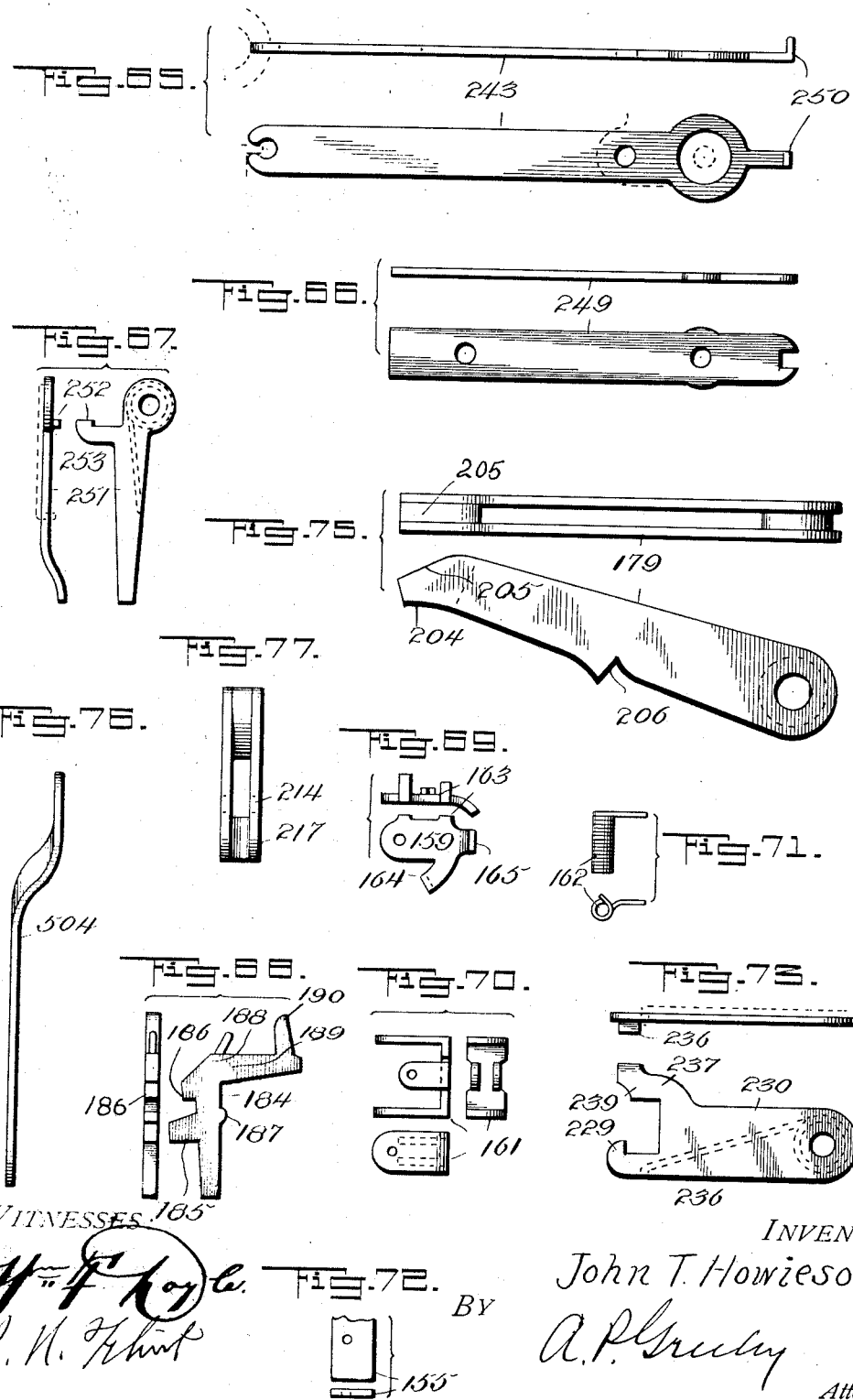

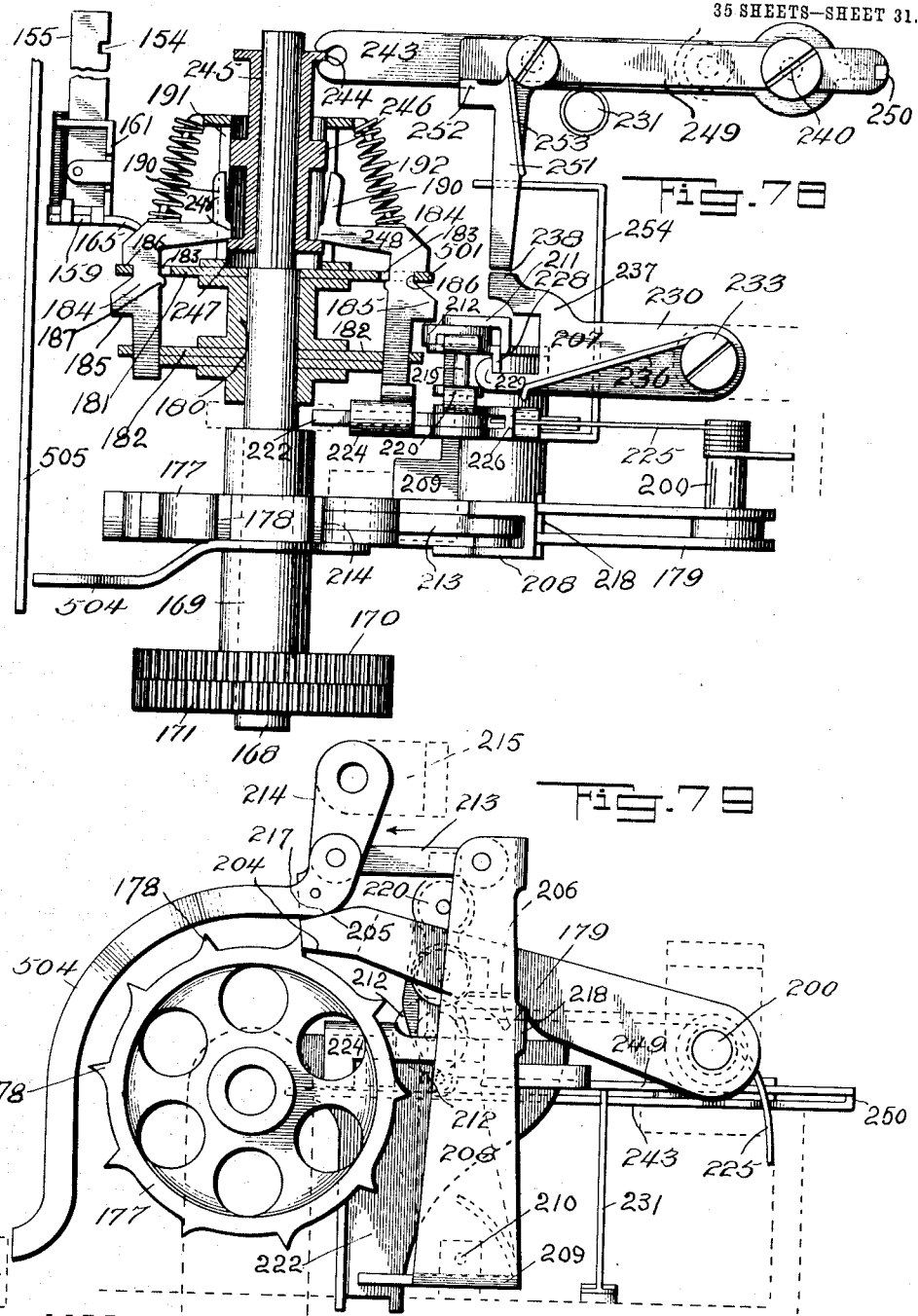

J. T. HOWIESON.
CALCULATING MACHINE.
APPLICATION FILED JUNE 17, 1909.
946,366.
Patented Jan. 11, 1910.
35 SHEETS—SHEET 32.
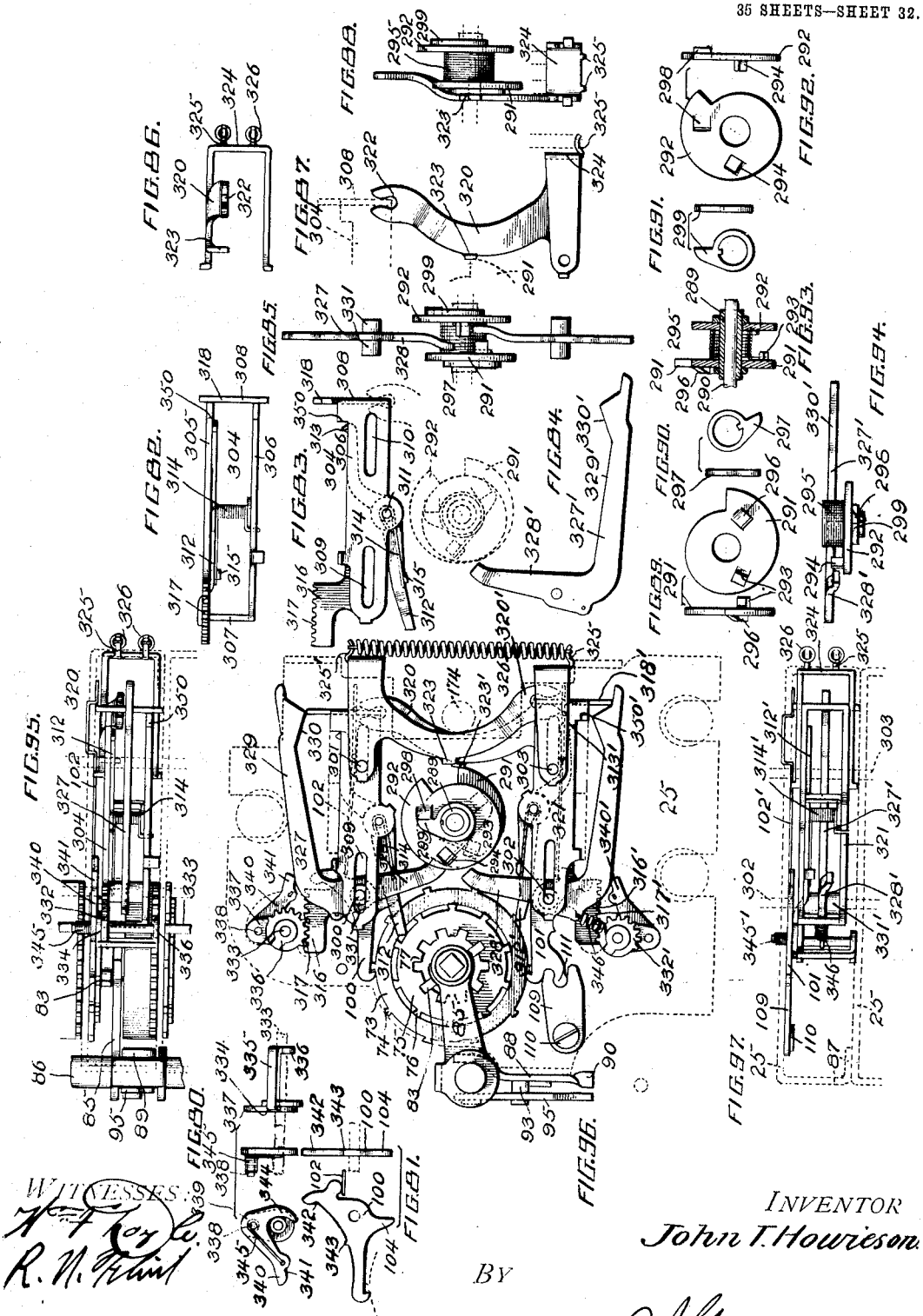
INVENTOR
John T. Howieson
BY
*Attorney*

J. T. HOWIESON.
CALCULATING MACHINE.
APPLICATION FILED JUNE 17, 1909.
946,366.
Patented Jan. 11, 1910.
35 SHEETS—SHEET 33.
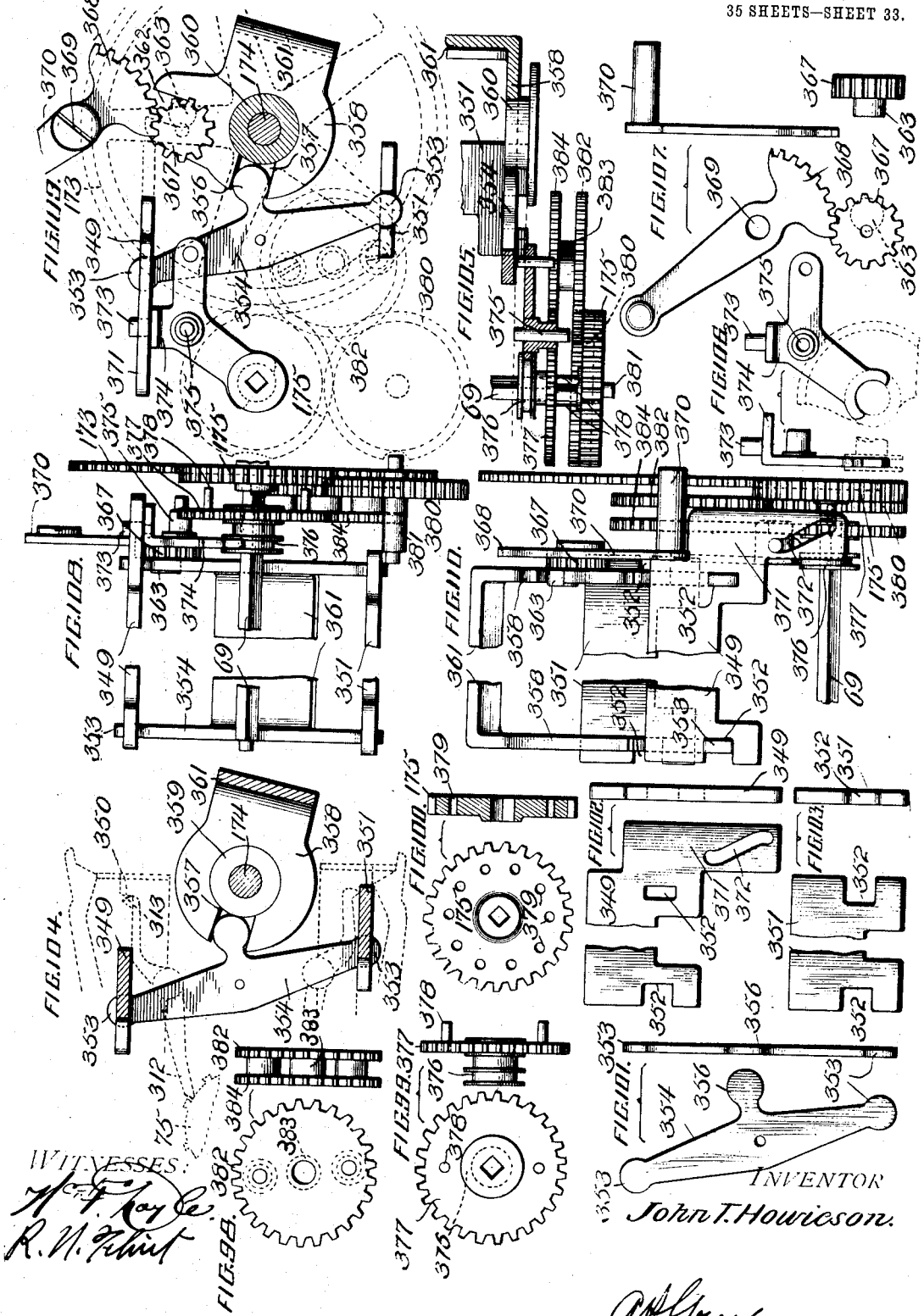
WITNESSES
INVENTOR
John T. Howieson.
Attorney J. T. HOWIESON.
CALCULATING MACHINE.
APPLICATION FILED JUNE 17, 1909.
946,366.
Patented Jan. 11, 1910.
35 SHEETS—SHEET 34.
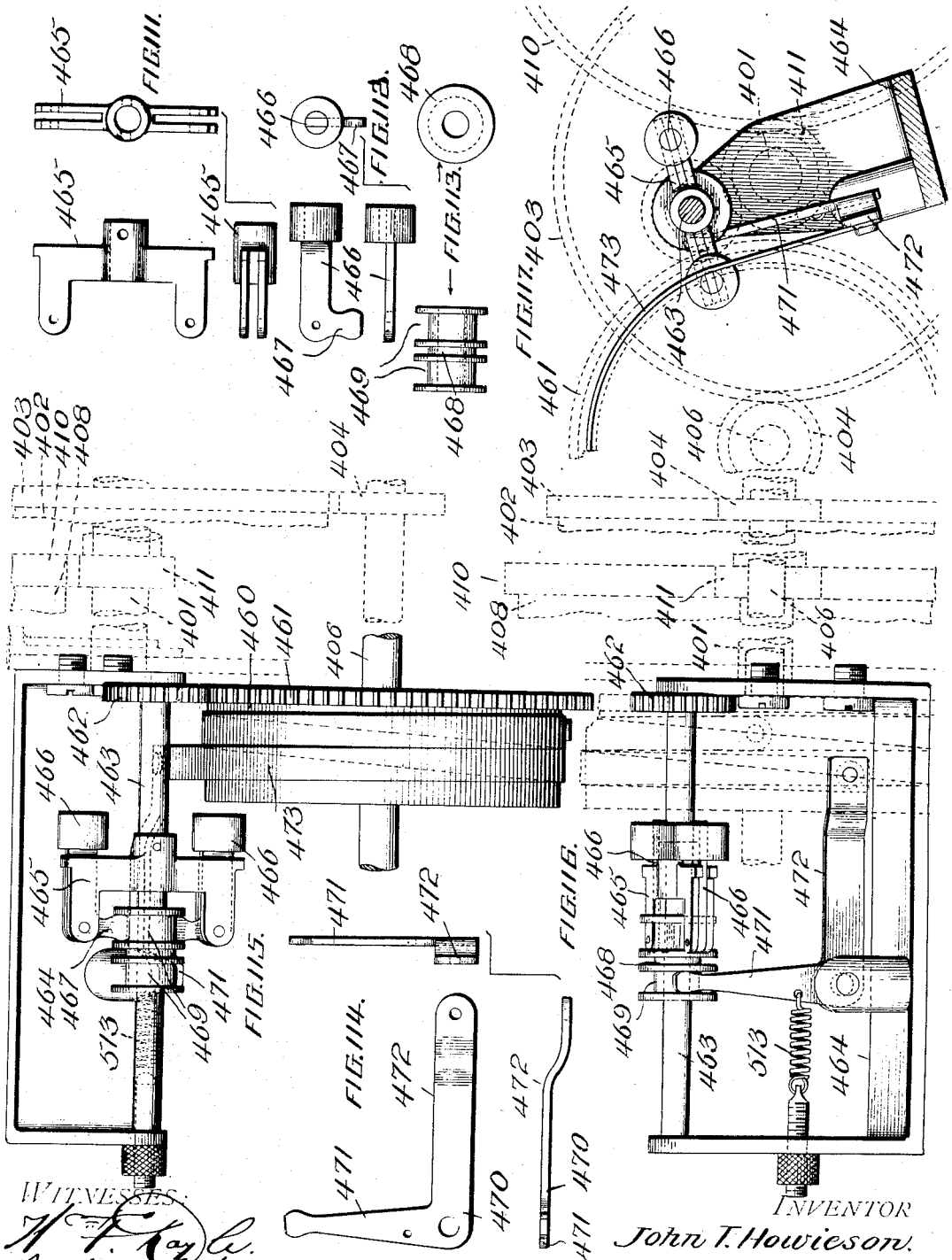
WITNESSES
INVENTOR
John T. Howieson.
BY
Attorney

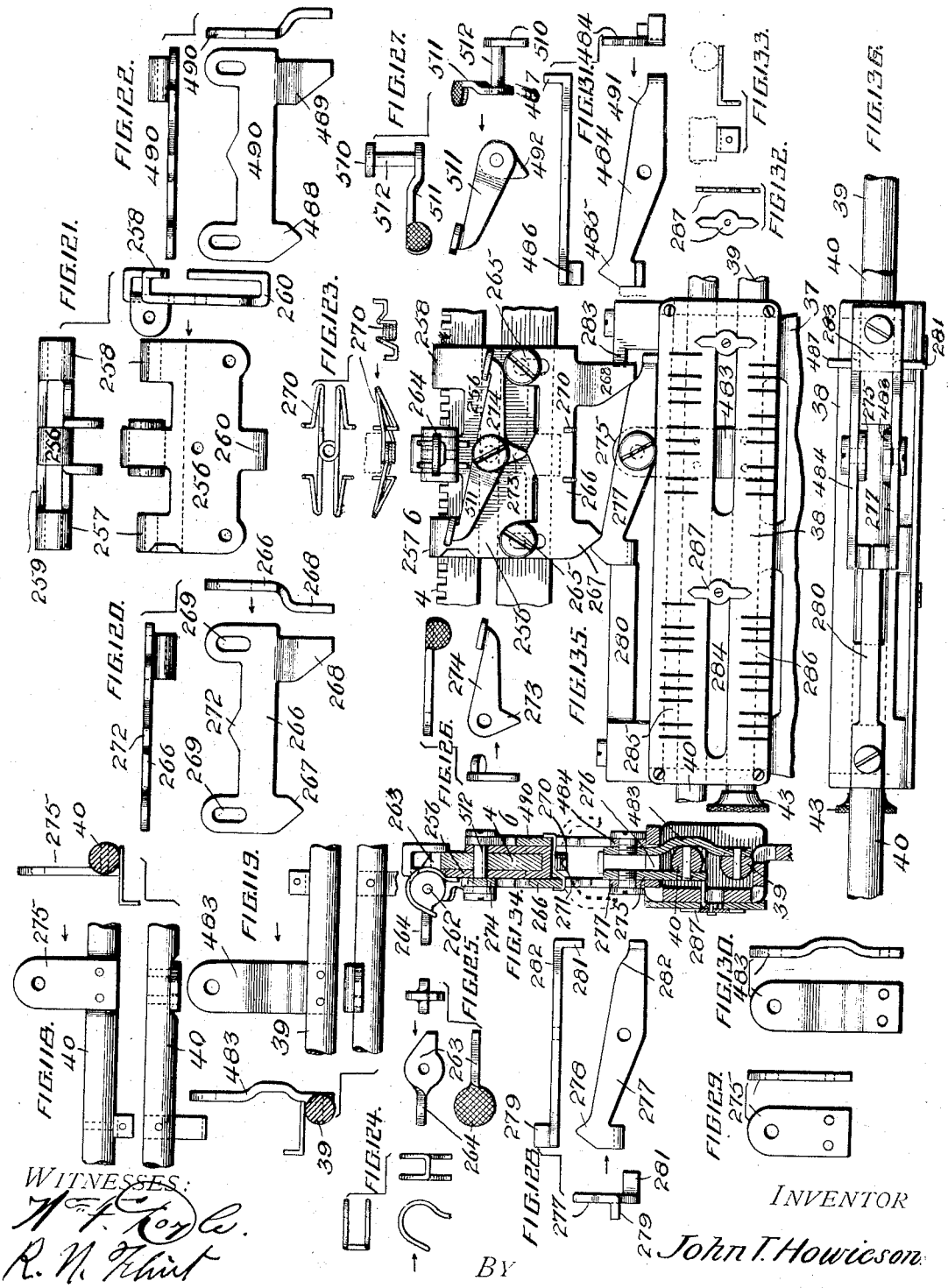

UNITED STATES PATENT OFFICE.

JOHN T. HOWIESON, OF NEW YORK, N. Y.

CALCULATING-MACHINE.

946,366.    Specification of Letters Patent.    Patented Jan. 11, 1910.

Application filed June 17, 1909. Serial No. 502,642.

*To all whom it may concern:*

Be it known that I, JOHN T. HOWIESON, a citizen of the United States, residing at New York, in the county of New York, State of New York, have invented certain new and useful Improvements in Calculating-Machines, of which the following is a description, reference being had to the accompanying drawings, forming a part hereof.

The invention relates to calculating machines and particularly to calculating machines adapted for use in connection with typewriting machines, and has for its object to provide a calculating machine adapted to be readily connected and disconnected with a typewriting machine of ordinary construction so that, when desired, the numbers printed or typewritten by the numeral keys may be added or subtracted on dials or index wheels readily visible to the operator, and in which the numeral keys may be used as desired to print or typewrite without causing the numbers printed by them to be added or subtracted.

The invention has for a further object to so arrange the connections between the numeral keys and the calculating mechanism that no part of the calculating mechanism will be operated by the numeral keys when it is not desired to add or subtract and to further provide that when the calculating mechanism is so connected with the numeral keys as to be operated to add or subtract upon the depression of a numeral key, the numeral key will be required to do the least possible work additional to its usual operation of its type bar.

A further object of the invention is to provide for a machine by which the rotation of the index wheels is effected by means controlled by but actuated independently of the numeral keys and to provide for maintaining such rotating means at constant tension and to start and stop it without shock and to further provide for successive operations of the rotating means to rotate successive index wheels without the necessity of a return movement of any part of such rotating means after one movement and before a second movement.

A further object of the invention is to provide carrying mechanism for rotating an index wheel or wheels of higher denomination upon the completion of the rotation of an index wheel of lower denomination which will be capable of accurate operation at any desired speed and which will operate without strain on the numeral key or on the means for rotating the index wheels.

A further object of the invention is to provide a calculating mechanism in which the rotating means and the index wheels are locked against operation until a numeral key is depressed and in which on the depression of a numeral key to unlock the index wheel and release the power mechanism, the other numeral keys and the parts operated by them are locked against operation until the numeral key depressed has returned to normal position.

A further object is to provide means by which the numeral key depressed is locked against return until its work is completed.

A further object of the invention is to provide means by which the position of the paper carriage of the typewriting machine determines the particular index wheel to be operated while the numeral keys determine the degree of rotation and cause the index wheel to be connected with the rotating means and cause the rotating means to effect its rotation.

A further object of the invention is to provide calculating mechanism wherein index wheels of separate sets of index wheels may be simultaneously operated by a single power mechanism through the depression of a single numeral key.

With these and other objects hereinafter explained in view the invention consists in the construction and combinations of elements hereinafter described and particularly pointed out in the claims.

Referring to the drawings, Figure 1, Sheet 1, is a side elevation showing a typewriting machine in position on the calculating machine. Fig. 2, Sheet 2, is a top plan view of the calculating machine with the typewriting machine removed. Figs. 3ª, 3ᵇ, 3ᶜ, and 3ᵈ are front elevations of the upper left hand, upper right hand, lower left hand and lower right hand portions of the combined typewriting and calculating machine, the front plate of the calculating machine being removed and the front portion of the frame of the typewriting machine and the lower banks of keys being also removed. Figs. 4ª, 4ᵇ, 4ᶜ and 4ᵈ, Sheets 7 to 10, inclusive, are top plan views respectively of the left hand half of the front portion, the right hand half of the front portion, the left hand half of the rear portion and the right hand rear portion of the calculating machine, the four views taken together presenting a complete plan view of the calculating machine. Figs. 5ᵃ and 5ᵇ, Sheets 11 and 12, are vertical sectional views of the forward portion and rear portion of the calculating machine taken on a plane just to the left of the right hand side plate (line $a$—$a$ of Figs. 3ᵈ, 4ᵇ and 4ᵈ.) Figs. 6, 7, 8, 9, and 10, Sheets 13 to 17 inclusive, are vertical sectional views of the forward portion of the calculating machine taken respectively on planes indicated by line $b$—$b$, $c$—$c$, $d$—$d$, $e$—$e$, and $f$—$f$ on Figs. 3ᵈ and 4ᵈ. Figs. 11ᵃ and 11ᵇ, Sheets 18 and 19, are vertical sectional views of the forward and rear portions respectively of the calculating machine taken on the plane indicated by line $g$—$g$ on Figs. 3ᵈ, 4ᵇ, and 4ᵈ, the two views taken together presenting a complete sectional view on this plane. Fig. 12, Sheet 20, is a vertical sectional view of the rear portion of the calculating machine taken on the plane of line $h$—$h$ of Fig. 4ᵇ. Fig. 13, Sheet 21, is a vertical sectional view of the forward portion of the calculating machine taken on the plane indicated by line $i$—$i$ on Figs. 3ᵈ and 4ᵈ. Fig. 14, Sheet 22, is a vertical sectional view of the forward portion of the calculating machine taken on the plane of line $k$—$k$, on Figs. 3ᶜ and 4ᶜ. Figs. 15ᵃ and 15ᵇ, Sheets 23 and 24, are vertical cross-sectional views of the left and right halves of the front portion of the calculating machine taken on the plane indicated by lines $m$—$m$ on Figs. 4ᶜ, 4ᵈ and 13, the two views taken together presenting a complete sectional view on this plane. Fig. 16, Sheet 25, is an elevation partly in section of the mechanism for rotating and shifting the left hand selector including the mechanism operated by the shifting of the selector. Fig. 17, Sheet 26, is a detail top plan view partly in section showing the slide rods and their connections. Fig. 18, Sheet 26, is a detail vertical cross-sectional view showing the slide rods and their connections taken on a plane passing through the two hollow posts. Fig. 19, Sheet 26, is a detail vertical cross-sectional view of the upper part of one of the hollow posts. Fig. 20, Sheet 26, is a fragmentary side elevation showing the tripping device and its connections. Fig. 21, Sheet 11, is a detail sectional view showing the bearing plate carrying the bearing for the right hand end of the shaft for rotating the index wheels. Figs. 22, and 23, Sheet 14, are detail views in plan and elevation respectively of the right hand rack bar. Figs. 24, and 25, Sheet 17, are detail views in elevation and end view respectively of the left hand selector. Figs. 26, 27, and 28, Sheet 17, are detail views of the right hand selector showing it respectively in elevation, end, and cross-sectional view on the plane of line $n$—$n$ of Fig. 26. Figs. 29 and 30, Sheet 18, are detail views in plan and elevation respectively of the slide of the power mechanism. Figs. 31, 32 and 33, Sheet 20, are detail views in elevation, plan and vertical section respectively of the device for preventing overwinding of the winding spring. Figs. 34, 35 and 36, Sheet 20, are detail views in elevation, plan and cross-section respectively, of the winding mechanism for the power mechanism. Figs. 37, 38 and 39, Sheet 27, are detail views showing the plate which supports the locking mechanism for the power mechanism, in plan, side view and front view respectively. Fig. 40, Sheet 27, shows the bell crank lever for operating the sliding clutch members in front and side view respectively. Fig. 41, Sheet 27, shows the lockout lever for the sliding clutch member in front and side view respectively. Fig. 42, Sheet 27, shows the lever operated by the bell crank lever shown in Fig. 41, in front view, plan view and front elevation. Figs. 43, 44 and 45, Sheet 27, are detail views showing the parts shown in Figs. 40, 41 and 42 assembled, the views being respectively a front elevation, plan and side elevation. Fig. 46, Sheet 28, shows the actuating rod in front and side view. Fig. 47, Sheet 28, shows the slotted arms which guide the actuating rods, and the bar which carries them, in plan, front and side view. Fig. 48, Sheet 28, shows the notched plate carried by the numeral keys in front, side and plan view. Fig. 49, Sheet 28, shows the clip secured to the numeral keys in front, side and plan view. Fig. 50, Sheet 28, shows the cam plate operated by the actuating rod, in side and front view. Fig. 51, Sheet 28, shows in side and edge views the cam carried by the cam plate for operating the slide bar which effects the unlocking of the power mechanism. Fig. 52, Sheet 28, shows in side and edge views the tappet cam carried by the cam plate for effecting the shifting of the selector. Fig. 53, Sheet 28, shows in side and edge view the bell crank lever operated by the tappet cam. Fig. 54, Sheet 28, shows in side and edge view the escapement wheel for the cam plate shown in Fig. 50. Fig. 55, Sheet 28, shows in side and edge view the friction spring for the escapement wheel shown in Fig. 54. Fig. 56, Sheet 28, shows in vertical section and end view the interlocking device by which on the operation of a cam plate, the other cam plates are locked against operation. Fig. 57, Sheet 28, is a detail rear elevation of the slide through which the selectors are shifted. Fig. 58, Sheet 28, is a detail side view showing the parts shown in Figs. 50 to 57 inclusive, assembled. Fig. 59, Sheet 30, shows in horizontal section and end view the sleeve carried on the left hand end of the shaft which carries the master wheel. Figs. 60ª, 60ᵇ and 60ᶜ, Sheet 30, show the master wheel without the parts carried by it in end view, longitudinal section and cross-section respectively. Fig. 61, Sheet 30, shows in edge and side view the lever for operating the slide shown in Fig. 63. Fig. 62, Sheet 30, shows in side and edge view the support for the slide shown in Fig. 63. Fig. 63, Sheet 30, shows in side and end view the slide carrying the cam for returning the stop bar to normal position. Fig. 64, Sheet 30, shows in plan, end and side view the parts shown in Figs. 61, 62 and 63, assembled. Fig. 65, Sheet 29, shows in plan and edge view a lever operated by the sleeve shown in Fig. 59. Fig. 66, Sheet 29, shows in plan and edge view a secondary lever connected with the lever shown in Fig. 65. Fig. 67, Sheet 29, shows in plan and edge view the releasing pawl carried by the secondary lever shown in Fig. 66. Fig. 68, Sheet 29, shows in side and edge view one of the stop bars carried by the master wheel. Fig. 69, Sheet 29, shows in side and edge view the swinging pawl carried on the end of the slide bar. Fig. 70, Sheet 29, shows in end, side and plan view the frame in which the swinging pawl shown in Fig. 69 is pivoted. Fig. 71, Sheet 29, shows in side and end view the spring for the swinging pawl. Fig. 72, Sheet 29, shows in side and end view the right hand end of the slide bar. Fig. 73, Sheet 29, shows in plan and edge view the locking dog for locking the swinging lever shown in Fig. 74 in rearward position. Fig. 74, Sheet 30, shows in plan, front view and side view the swinging lever for controlling the locking pawl shown in Fig. 76. Fig. 75, Sheet 29, shows in plan and side view the locking pawl for the power mechanism. Fig. 76, Sheet 29, shows in edge view the arm for locking the bail by which the selectors are shifted. Fig. 77, Sheet 29, shows the locking dog for locking the locking pawl shown in Fig. 75. Fig. 78, Sheet 31, shows in plan view partly in section the devices shown in Figs. 59, 60ª, 60ᵇ, 60ᶜ, and 61 to 79, inclusive, assembled. Fig. 79, Sheet 31, shows in side view the parts shown in Figs. 61 to 66 inclusive and 74 to 77 inclusive. Fig. 80, Sheet 32, shows in side, edge and front view the double armed pawl for tripping the locking lever of the index wheel in carrying. Fig. 81, Sheet 32, shows in side and edge view the upper locking pawl for one of the index wheels. Figs. 82 and 83, Sheet 32, show the upper carrying slide in plan and side view respectively. Fig. 84, Sheet 32, shows the lower checking lever in side view. Fig. 85, Sheet 32, is a front view of the snail cams and checking levers. Fig. 86, Sheet 32, is a plan view of the actuating lever for the upper carrying slide. Fig. 87, Sheet 32, is a side view of the actuating lever shown in Fig. 86. Fig. 88, Sheet 32, shows a front view of the snail cams and actuating levers assembled. Fig. 89, Sheet 32, shows in edge and side view the left hand snail cam. Fig. 90, Sheet 32, shows in edge and side view the arm for engaging the left hand snail cam to rotate it. Fig. 91, Sheet 32, shows in edge and side view the arm for engaging the right hand snail cam for rotating it. Fig. 92, Sheet 32, shows in edge and side view the right hand snail cam. Fig. 93, Sheet 32, shows the snail cams and arms for operating them, assembled. Fig. 94, Sheet 32, is a plan view showing the relative arrangement of the checking lever and snail cam. Figs. 95 and 96, Sheet 32, are plan and side views respectively showing the parts shown in detail in Figs. 80 to 94, inclusive, assembled. Fig. 97, Sheet 32, is a plan view of the lower carrying slide and parts connected with it. Fig. 98, Sheet 33, shows in side and edge view one of the gears of the reversing mechanism between the power mechanism and the index wheels. Fig. 99, Sheet 33, shows in side and edge view the sliding gear of the reversing mechanism. Fig. 100, Sheet 33, shows in side and edge view the driving gear of the reversing mechanism. Fig. 101, Sheet 33, shows in side and edge view the lever for moving the slides for shifting the carrying mechanisms to set them for addition or subtraction as desired. Fig. 102, Sheet 33, shows in plan and end view the upper slide operated by the lever shown in Fig. 101. Fig. 103, Sheet 33, shows in plan and end view the lower slide operated by the lever shown in Fig. 101. Fig. 104, Sheet 33, shows the lever and slides shown in Figs. 101, 102 and 103, assembled. Fig. 105, Sheet 33, is a plan view partly in section of the reversing mechanism. Fig. 106, Sheet 33, shows in side and edge view the slide for shifting the gear shown in Fig. 99. Fig. 107, Sheet 33, shows in side and edge view the hand lever for operating the reversing mechanism. Figs. 108, 109 and 110, Sheet 33, show in front view, side view and plan view respectively, the reversing mechanisms showing the devices shown in Figs. 98 to 107, inclusive, assembled. Fig. 111, Sheet 34, shows in side, edge and plan view the support in which the weighted arms of the governor are pivoted. Fig. 112, Sheet 34, shows in side, edge and end view one of the weighted arms of the governor. Fig. 113, Sheet 34, shows in side and end view the sliding sleeve of the governor. Fig. 114, Sheet 34, shows in side, end and plan view the bell crank lever of the governor. Figs. 115, 116, and 117, Sheet 34, show in plan, front elevation and vertical section the governor, showing the devices shown in detail in Figs. 111 to 114 inclusive, assembled. Fig. 118, Sheet 35, shows in front, side and plan views the upper slide rod and its plate for carrying the pivoted dog. Fig. 119, Sheet 35, shows in front, side and plan views the lower slide rod and its plate for carrying the rear pivoted dog. Fig. 120, Sheet 35, shows in front, end and plan views the cam plate carried on the front of the tripping device. Fig. 121, Sheet 35, shows in front, end, and plan views the supporting plate of the tripping device. Fig. 122, Sheet 35, shows in front, end and plan views the rear cam plate of the tripping device. Fig. 123, Sheet 35, shows in plan, side and end views the spring for holding the cam plates normally raised. Fig. 124, Sheet 35, shows in plan, side and end views the spring for the locking dog for the tripping device. Fig. 125, Sheet 35, shows in side, plan and end views the locking dog for the tripping device. Fig. 126, Sheet 35, shows in side, plan and end views the lever for depressing the front cam plate. Fig. 127, Sheet 35, shows in side, plan and end views the lever for depressing the rear cam plate. Fig. 128, Sheet 35, shows in end, plan and side views the pivoted dog carried by the upper slide rod. Fig. 129, Sheet 35, shows in side and end view the plate carried by the upper slide rod to which the pivoted dog shown in Fig. 128 is pivoted. Fig. 130, Sheet 35, shows in side and end views the plate carried by the lower slide rod to which the rear pivoted dog is pivoted. Fig. 131, Sheet 35, shows in plan, side and end views the pivoted dog carried by the lower slide rod. Fig. 132, Sheet 35, shows in front and edge views the pointer carried by the upper slide rod. Fig. 133, Sheet 35, shows the means for supporting the pointer from the under slide rod. Fig. 134, Sheet 35, is a vertical sectional view of the tripping device and connected devices showing the devices shown in detail in Figs. 118 to 133 inclusive, assembled. Fig. 135, Sheet 35, is a front view of the tripping device and connected devices. Fig. 136, Sheet 35, is a plan view of the slide rods and pivoted dogs carried by them. Fig. 137, Sheet 15, is an enlarged vertical sectional view of the index wheel. Fig. 138, Sheet 1, shows in side and bottom view one of the feet which is secured to the typewriting machine and Fig. 139, Sheet 3, is an elevation of one of the indicator slides.

Referring to the drawings 1 indicates the frame of a typewriting machine here shown as of the usual front strike type though my invention may be readily adapted to typewriting machines of any type having a key board with numeral keys.

2 indicates the numeral keys from 1 to 9 inclusive.

3 indicates the paper carriage of the typewriting machine having the usual movement transverse of the machine and provided with a notched bar 4 extending longitudinally thereof and supported from the carriage by a pair of curved arms 5. This notched bar 4 is arranged as shown in front of and a little below the plane of the top plate of the typewriting machine. On this notched bar 4 is arranged a tripping device 6. (See Figs. 3ª, 16, and 118 to 136 inclusive.) Preferably two or more of these tripping devices are used.

The calculating mechanism is located below the base of the typewriting machine and is carried by a frame comprising the back plate 7, side plates 8, 8 connected at their rear ends to the back plate 7, and connected near their front ends by stationary rods 9, 10 and 11, also connected in rear of rods 9, 10 and 11, by rods 12, 13 and 14, and still further to the rear, by rods 15 and 16. Near the back plate 7 the side plates are further connected by rods 17 and 18.

Carried by the rods 9, 10 and 11 parallel with the side plates 8 and suitably spaced apart by means of grooves in the rods into which they fit (see Figs. 4ᶜ and 4ᵈ) are the interior sustaining plates 19, 20, 21, 22, 23 and 24 of which plates 19 and 20 are near the right hand side of the machine, 21 and 22 are near the middle of the machine and plates 23 and 24 are near the left hand side of the machine.

Between the interior sustaining plates 20 and 21 and also between the plates 22 and 23 are arranged a series of vertical plates 25 suitably spaced apart to sustain between each pair an index wheel and carrying mechanism. (See Figs. 3ᶜ, 3ᵈ, 4ᶜ, 4ᵈ and 16.)

On the rods 12, 13 and 14 are carried a series of vertical plates 121 suitably spaced apart by grooves in the rods into which they fit (see Figs. 4ᶜ, 4ᵈ, 15ª and 15ᵇ) and arranged to support certain slide rods and other mechanism as hereinafter described. On the rods 13, 14 near the right hand side of the machine is carried a base plate 27 (see Figs. 37, 38 and 39) on which is supported a master wheel, brake wheel and other mechanism intermediate the power mechanism and the calculating mechanism, as hereinafter described.

On the rods 15, 16 are carried two intermediate plates 28, 29 parallel with the side plates, which with the side plates serve to support the power mechanism hereinafter described. (See Figs. 4ª and 4ᵇ.)

Carried by the side plates 8 are four brackets 30, for supporting the typewriting machine, (see Figs. 2, 5ª, 5ᵇ, 6 7, 15ª and 15ᵇ) each provided on its upper face with a groove 31 and opening 32 adapted to receive a pin 33 on one of the supporting feet of the typewriting machine. The groove 31 connects with the opening 32 by an incline or bevel 34 and the pins 33 on the typewriter feet are correspondingly beveled so that when the typewriting machine is in its forward position with its numeral keys in position to actuate the calculating mechanism, the pins 33 will rest in the openings 32 and the machine will be held in position against accidental displacement. At the same time by pushing the typewriting machine rearward with sufficient force to cause the pins 33 to ride up the inclines or bevels 34, the pins will rest on the face of the brackets in the grooves 31 and may readily be pushed farther to the rear to disengage it completely from the calculating mechanism.

35 and 36 are two upwardly extending posts at opposite sides of the frame of the calculating machine each carried by one of the brackets 30 (see Figs. 15$^a$ and 15$^b$) and so located that, when the typewriting machine is in position, they will be outside of and in front of the plane of the front uprights or posts of the typewriting machine.

37 is a bar connecting the two parts 35 and 36 and supporting about midway of its length a box or frame 38 through which pass slide rods 39 and 40. (Figs. 3$^a$ and 3$^b$.) Slide rod 39 has at its right hand end a rack 41 and slide rod 40 has at its left hand end a rack 42. The left hand end of slide rod 39 is provided with a push button 43 and the left hand end of slide rod 40 is provided with a push button 44. (See Fig. 18.) The posts 35 and 36 are hollow. In post 35 is journaled a vertical shaft 45 and in post 36 is journaled a vertical shaft 46. (See Figs. 6, 14, 15$^a$, 15$^b$, 16, 17, 18, 19 and 20.) The shaft 45 is provided near its upper end with a pinion 47 which meshes with the rack 41 of the rod 39, and with a pinion 48 near its lower end which meshes with a rack bar 49 parallel with the side of the frame of the calculating machine and carried in suitable bearings on the right hand side plate. The shaft 46 is provided near its upper end with a pinion 50 which meshes with the rack 42 on the slide rod 40 and with a pinion 51 near its lower end which meshes with a rack bar 52 arranged parallel with the side of the frame and supported in suitable bearings carried by the left hand plate 8.

The rack bars 49 and 52 are held normally in retracted position respectively by coiled springs 53 and 54 which are carried respectively by the shafts 45 and 46. (See Figs. 6, 16 and 18.) These springs are each secured at its upper end to a collar 55 secured to its shaft by a pin 551 and secured at its lower end to a collar 552 through which the shaft passes freely and which is held against rotation in the hollow post by a screw 553. (See Fig. 6.) In assembling the parts the collar 55 is secured to the shaft and the spring 53 is put under the desired tension by rotating the collar 552 on the shaft. The screw 553 is then inserted and screwed into the shaft to hold the spring under tension. After the shaft with the spring is placed in its hollow shaft the screw 553 is brought in line with the opening in the hollow shaft in which it is shown in Fig. 6 and unscrewed to disengage it from the shaft and engage it with the opening in the hollow post.

The rack bar 49 is provided near its forward end with teeth 56 meshing with a gear 57 journaled on a short stud 58 which is supported by the right hand side plate 8. (See Figs. 3$^d$, 4$^d$, 6, 22 and 23.) The gear 57 meshes with pinion 59 on the right hand end of a hollow shaft 60 of a selector 61 which is carried on a stationary rod 62 which extends across the front of the machine and is rigidly supported at its ends by the side plates 8, 8, and intermediate its ends by the interior sustaining plate 21. The selector 61 is arranged to rotate on the rod 62 and also to be movable longitudinally thereon. (See Figs. 3$^d$, 24 and 25.) The selector 61 is located between the right hand side plate 8 and the interior sustaining plate 21. Between the plate 21 and the left hand side plate 8 is carried a second selector 63 which is also arranged to rotate on and to be longitudinally movable on the rod 62. The selector 63 is arranged to be rotated through the left hand rack bar 52 the teeth 64 of which mesh with a gear 65 which is carried on a stud 66 supported by the left hand side plate 8 the gear 65 in turn meshing with a pinion 67 on the hollow shaft 68 of the selector 63. (See Figs. 3$^c$, 5$^a$ and 24.)

Above and slightly to the rear of the vertical plane of the rod 62 on which the selectors 61 and 63 are mounted, is a shaft 69 for rotating the index wheels 70 of the right hand group. The shaft 69 has a bearing at its left hand end in the interior sustaining plate 21 and at its right hand end has a bearing in the end of the stub shaft 176 which is carried by a bearing plate 500 secured to the right hand face of the sustaining plate 19, the stub shaft 176 carrying gear 175. (See Figs. 3$^d$ and 21.) The index wheels are each formed from a flat ring having at its periphery a flange 71 on the outer surface of which the numerals are printed or otherwise marked. (See Fig. 16.) Each index wheel is carried by a vertical plate 25 in which it has its bearing. At the left of the vertical plate 25 in which it has its bearing, between the flange 71 and the vertical plate each index wheel is provided with a gear 72 of about the same diameter as the index wheel. (See Figs. 3$^d$ and 137.) On the right of the vertical plate and against its face is a locking ring or disk 73 of about the same diameter as the index wheel provided on its periphery with teeth 74 corresponding in number with the numerals on the flange 71 of the index wheel, and spaced widely apart. (See Figs. 7, 8, 9, and 96.) To the right hand face of the locking ring or disk 73 is secured a second ring or disk 75 which is of less diameter than the index wheel and is provided on its periphery with teeth 76 corresponding in number with the teeth on the disk 73, and provided on its interior with teeth 77 also corresponding in number with the teeth of the disk 73, the ring or disk 75, forming one member of a clutch through which the index wheel is rotated. (See Figs. 7, 16 and 45.) The disk 73 is provided on its left hand face with a hub 78 which fits the bearing formed in the vertical plate 25 and also has on the hub a ring 80 on which the gear 72 is received. (See Fig. 16.) The ring or disk 80 has on its right hand face an annular recess 81 in which the clutch member 75 fits. Screws 82 pass through the body portion of the index wheel, the gear 72, the disk 73 and are tapped into the clutch member 75 thus holding the index wheel and its attached parts rigidly together and also holding the index wheel in its bearings in the vertical plate 25. The central portion of the index wheel and its connected parts is of sufficient diameter to permit the shaft 69 to rotate freely therein.

On the shaft 69 which is preferably square in cross section, between each two fixed plates 25 is mounted a sliding clutch member 83 rotating with the shaft 69 but free to be moved into and out of engagement with the internal teeth 77 of the clutch member 75. (See Figs. 7, 16 and 45.) The clutch member 83 is provided with an annular groove 84 into which extends the forked end of a slide 85 which is carried by the slides freely on a fixed rod 86 which is supported at its ends in the interior sustaining plates 19 and 24 and is supported intermediate its ends in the plate 21. This fixed rod 86 is located directly in front of the shaft 69 and directly above the rod 62 carrying the selectors 61 and 63. Beneath the rod 86 pivoted on the bent portion 87 of the plate 25 is a bell crank lever 86 (see Figs. 3ᶜ, 3ᵈ, 16 and 40 to 45 inclusive) having its upper arm 89 in position to engage the slide 85 to cause it to move, moving the clutch member 83 into or out of engagement with the internal teeth 77 of the clutch member 75. The lower arm of the bell crank lever 88 has a finger 90 which is twisted so as to present a broad bearing surface at right angles to the plane in which the lever swings. The bell crank lever is also provided with an arm 91 which extends laterally from the pivot toward the left of the machine and is provided in its end with a notch 92. Above its pivot the bell crank lever is provided with a pin 93 which extends toward the front of the machine and is provided near its end with an annular groove 94.

Pivoted to the fixed rod 86 is a lockout lever 95, (see Figs. 16, 41, 43, 44 and 45) having a keyhole slot 96 which engages the annular groove 94 of the pin 93, the lower end of the lockout lever extending downward into position to be engaged by a ring 97 on the selector 61.

The selector 61 (see Figs. 3ᵈ, 24 and 25) is provided with a series of radially extending pins 98 spirally arranged, and also has a series of rings 97 each of which is notched at 99. The pins 98 are so located on the selector that when the selector is in normal or inoperative position none of them will be in line with any of the fingers 90 while the rings 97 will each present a solid portion in line with the lower end of one of the lockout levers 95. On the rotation of the selector some one of the pins 98 will be brought in line with the finger 90 of some one of the bell crank levers 88 and at the same time will bring the notch 99 of the ring next to the right of such pin 98 in line with the lower end of the lockout lever 95 controlled by it. The particular one of the pins 98 thus brought into position in line with the finger 90 of a bell crank lever 88 depends upon the length of the arc through which the selector is rotated which in turn depends upon the movement given to the rack bar 49 through the movement of the paper carriage of the typewriting machine as hereinafter described. When the selector is thus positioned it is shifted to the right on the depression of a numeral key of the typewriting machine, through mechanism which will be hereinafter described, and as it moves to the right, the pin 98 pushes the pin 90 to the right swinging the bell crank lever to cause its upper arm 89 to move the slide 85 to the left carrying with it the sliding clutch member 83 and causing this clutch member to engage a tooth 77 of the clutch member 75 thus clutching the index wheel to the shaft 69 so that on the rotation of the shaft 69 the index wheel so clutched will be rotated. By reason of the notch 99 of the ring 97 being in line with the lower end of the lockout lever 95 this lockout lever will be free to permit the slide 85 to move to the left, but all of the other rings 97 will by the shifting of the selector be brought against the lower ends of the lockout levers controlled by them to cause the slides 85 with which they are connected to be moved to the right carrying and holding the clutch members controlled by them out of possible engagement with any of the clutch members 75. It will thus be seen that only one index wheel can be clutched to the operating shaft at a time and accidental clutching of any index wheel other than the one desired or the sticking of the sliding clutch member previously operated in its clutch member 75, is absolutely prevented.

Pivoted to the right hand face of each of the fixed plates 25 are two locking pawls 100 and 101 (see Figs. 7, 9, 45, 81 and 96) arranged respectively above and below the plane of the axis of the index wheels 70 and adapted to engage the teeth 74 on the external periphery of the locking disk or ring 73 and being held in yielding engagement therewith by springs 102 and 103 respectively, these locking pawls being so arranged and having their engaging ends so formed that the upper pawl will permit the index wheel 70 to rotate freely in the direction to bring the numerals on the index wheel from 1 to 9 into view in natural sequence, but will normally lock it against movement in the opposite direction, and the lower locking pawl will permit the index wheel to rotate freely in the direction to bring the numerals into view in reverse direction that is from 9 to 1 but will normally lock it against movement in the opposite direction. In order to permit the index wheel to rotate when it is clutched to the shaft 69, it is necessary to release one or the other of these locking pawls depending upon whether the calculating machine is to be used for adding or subtracting. For this purpose the upper locking pawl 100 is provided forward of its pivot with a depending arm 104 with which engages a laterally bent finger 105 on an arm 106 (see Figs. 8, 42, 44 and 45) which extends upward from a lever 107 which is pivoted on the left hand face of the plate 25, the plate 25 being suitably apertured to permit the finger 105 to extend through it into position to engage the arm 104. The lever 107 is provided near its forward end with a laterally bent finger 108 which extends through a suitable aperture in the plate 25 and engages a short lever 109 which extends rearward from its pivot 110 and has its free end forked to engage a projecting finger 111 on the forward end of the locking pawl 101. The movement of the lever 107 is restricted by a rod 302 on the plate 25 extending through an opening 113 in the lever. The forward end of the lever 107 extends into the notch 92 of the arm 91 of the bell crank lever. When the bell crank lever is swung on its pivot to cause the sliding member 83 to engage the clutch member 75, the arm 91 will depress the forward end of the lever 107 and through the laterally bent fingers 105 and 108, will swing the points of the locking pawls 100 and 101, against the force of their springs 102 and 103, away from engagement with the teeth 74 of the locking ring or disk 73.

It will of course be understood that the mechanism just described for operatively connecting the index wheel 70 with the shaft 69 is provided for each one of the series of index wheels. Carrying mechanism so arranged that a complete rotation of an index wheel of lower denomination will cause the index wheel of the next higher denomination to be rotated one space is, of course, provided as is usual in calculating machines. The construction and arrangement of the particular carrying mechanism here shown will be hereinafter described.

Pivoted on the terminal plate 122 and the guide plate 123 about in line with the shafts 45 and 46 is a bar 114 having extensions 114' and 114² (see Figs. 15ᵃ, 15ᵇ, 16 and 47) secured to it and each pivoted at its outer end to a side plate 8. (See Fig. 14.) The bar 114 carries a series of upwardly extending slotted arms 115 (see Figs. 9, 13, 15ᵃ, 15ᵇ, and 16) one for each of the numeral keys of the typewriting machine. The extensions 114' and 114² are each provided at their outer ends with a forwardly extending arm 116. (See Figs. 5ᵃ, 15ᵃ, 15ᵇ, 16 and 47). The arms 116 each carry a roller 117 in position to engage a cam 119 on the upper edge of each of the rack bars 49 and 52 so that as either of the rack bars is moved forward its cam 119 will engage the roller 117 of one of the arms 116 raising the end of the arm and rocking the frame 114 on its pivots to swing the slotted arms 115 rearward. The cams 119 are of such length that, as the rack bars 49 and 52 complete their forward movement, they will pass from under the rollers and permit the free end of the arm 116 to drop under the influence of the spring 120 and to thus swing the slotted arms forward.

Below the bar 114 are the series of vertical plates 121 parallel with the side plates 8, 8, and supported on the fixed rods 12, 13 and 14 and suitably spaced therein. (See Figs. 4ᶜ, 4ᵈ, 13, 15ᵃ and 15ᵇ.) These vertical plates correspond in number with the numeral keys of the typewriting machine. A terminal plate 122 parallel with the vertical plates 121 is provided at the left of the series and at the right of the series is a guide plate 123 also parallel with the vertical plates 121. Fixed rods 124 and 125 extend through the series of plates 121 and the terminal plate 122 and are rigidly supported by the plates. The terminal plate 122, the guide plate 123 and the right hand one of the plates 121 are preferably fitted in grooves in the rods 12, 13 and 14. Between each two plates and between the left hand plate of the series and the terminal plate 122, on the fixed rod 124 is mounted a cam disk 126 having formed integrally therewith and connected thereto by a laterally bent portion 127, an arm 128 provided with escapement teeth 129 and 130. (See Figs. 13, 15ᵃ, 15ᵇ, 50, 54 and 58.) To the periphery of the cam disk 126 is secured a cam 131 and on the side of the cam disk toward the arm 126 is secured a tappet cam 132. (See Fig. 52.) To the arm 128 is connected an actuating rod 133 which extends upward and is provided at its upper end with a laterally bent arm 134 which is adapted to be engaged by a notched plate 193 carried by a numeral key of the typewriting machine, this bent arm 134 also extending into and being guided by the slot of the slotted arm 115. (See Figs. 3ᶜ, 3ᵈ, 9, 13, 15ᵃ, 15ᵇ, 16 and 58.) When the typewriting machine is in position with its numeral keys in operative position with respect to the actuating rods the depression of a key carries down with it the actuating rod 133 rocking the arm 128 and the cam disk 126. In order to insure the rocking of the cam disk through the arc necessary to effect its intended purpose the vertical plates 121 are each provided on the side next to the cam disk 126 with an escapement wheel 135 (see Figs. 15ᵃ, 15ᵇ, 54 and 58) having teeth 137 and mounted to rotate on a stud 136 and held against rotating too freely by a friction spring 498. (See Figs. 55 and 58.) The teeth 137 are bent laterally from the wheel 135 so as to present broad peripheral faces. The cam disk 126 is provided with cam teeth 129 and 130 adapted to enter between adjacent teeth 137, and so located that as the cam disk swings on its pivot one of these cam teeth will enter between two teeth 137 and the other will be withdrawn from between two teeth 137. When the parts are in normal position the cam tooth 129 is between two teeth 137. As the cam disk begins to swing by reason of the depression of a numeral key acting through the actuating rod 133 the tooth 129 is gradually withdrawn from between the teeth 137 and the tooth 130 is caused to approach the escapement wheel and as soon as the tooth 129 is withdrawn beyond the periphery of the escapement wheel the tooth 130 enters between two teeth 137 and by reason of its cam form acts to rotate the escapement wheel sufficiently to bring the peripheral face of a tooth 137 in the path of movement of the tooth 129. If the movement of the cam disk is reversed by releasing the numeral key the point of the tooth 129 will strike this peripheral face of the tooth 137 and be stopped thus stopping the cam disk against return movement and through the actuating rod 133 holding the numeral key in depressed position. But if the numeral key is depressed to a full stroke the tooth 130 will enter its full depth between two teeth 137 and will rotate the escapement wheel sufficiently to bring an opening between two teeth 137 into the path of the tooth 129 so that the cam disk can then swing back to initial position. A full stroke of the actuating rod will thus be necessary to permit the numeral key to return to normal position. If moved through less than a full stroke it will be held in partly depressed position.

On the fixed rod 125 between each two of the vertical plates 121 and between the left hand plate 121 and the terminal plate 122, is mounted a bell crank lever 138 having on its upwardly extending arm a roller 139 located in the path of the tappet cam 132. (See Figs. 13, 15ᵃ, 15ᵇ, 53 and 58.) The bell crank lever is held in proper position by having on one side a laterally bent extension 140 provided at its end with a bearing 141 on the rod 125 by which the lever is afforded a double bearing on the rod and is also spaced away from the right hand one of the pair of plates 121 between which it is located. A pin 142 extends laterally from the left hand side of the bell crank lever to space it from the left hand one of the two plates.

The horizontally extending arm of the bell crank lever 138 extends forward above a bail 143 which is pivoted at its ends in a fixed portion of the frame. About midway of its ends the bail 143 is connected by a link 144 to an arm 145 secured on a rock shaft 146 arranged parallel with the side pieces of the frame and suitably journaled. (See Figs. 4ᶜ, 4ᵈ, 13, 16 and 58.) This rock shaft 146 is provided at its forward end with a downwardly extending arm 147 which engages a groove 148 in a slide 149 (see Fig. 57) which moves in bearings formed in two interior sustaining plates 21 and 22. The slide 149 is provided near one end with a groove 151 in which is received the edge of a disk 152 carried by the selector 61 near its left hand end. When the cam disk 126 is rocked on its center to cause the tappet cam 132 to act upon the roller 139 to swing the bell crank lever 138 and cause its horizontal arm to press the bail 143 downward, the rock shaft 146 will be caused to move the slide 149 and through the engagement of the disk 152 with the groove 151 in the slide, will cause the selector to be shifted to the right on the fixed rod 62 to effect the clutching of one of the index wheels to the shaft 69 as above described. Previous to this operation it will be understood that the selector will have been rotated through the movement of the rack 49 to bring the proper pin 98 and notch 99 of the ring 97 which is just to the right of this pin 98, in line with the finger 90 of the bell crank lever 88 so that the selector is free to shift without having that ring 97 come in contact with the lower end of the lockout lever 95. On the release of the cam disk 126 the rock shaft 146 and with it the bail 143 will be returned to normal or inoperative position by a spring 153 and this return movement of the rock shaft 146 also returns the selector 61 to normal or inoperative position.

The cam 131 carried on the periphery of the cam disk 126 engages a notch 154 in a slide bar 155 (see Figs. 15ᵃ, 15ᵇ and 78)

through which the motor mechanism is caused to operate the index wheel, and through which also the number of spaces through which the index wheel is to be rotated, is determined. The slide bar 155 is guided at its left hand end by slots 156 in the two vertical plates 121 between which is located the cam disk 126 by which its movement is controlled and at its right hand end is guided by a similar slot 157 in the guide plate 123, passing through openings in the vertical plates between the two referred to and the guide plate. By reason of its engagement with the notch 154 the cam 131 serves to give the slide bar positive movement in both directions. The slide bars 155 correspond in number with the numeral keys there being one slide bar for each vertical cam disk 126, the slide bars differing in length according to the distance from its cam disk to the guide plate 123. The group of slide bars is arranged about the fixed rod 124 as a center (see Figs. 8, 9, 13, 15$^a$ and 15$^b$), the slide bars being arranged at equal distances from the axis of this fixed rod and at equal distances from each other except that between the two slide bars in rear of the central line twice as much space is left as between the others. The slide bars are nine in number and the slots which carry them are spaced one tenth of the circumference apart so that one slot is unoccupied by a slide bar. It should be understood that the position of the cam 131 on the several cam disks 126 differs, being so placed on each of the cam disks as to engage the notch 154 of the proper slide bar 155.

Each of the slide bars 155 carries at its right hand end a pawl 159 (see Figs. 4$^d$, 8, 9, 15$^b$, 68, 69, 70, 71, 72, and 78) pivoted at its upper end on a rod 160 carried in a frame 161 which is secured on the end of the slide bar. A spring 162 on the rod 160 serves to keep the pawl 159 normally swung in position to bring it in line with the end of the slide bar. The movement of the pawl 159 on its pivot is limited by stops 163 and 164 which engage the frame 161. At its lower end the pawl carries a lug 165 which is bent toward the right.

Mounted in uprights 166 and 167 carried by the base plate 27 and preferably formed integrally therewith, is a shaft 168 in line with the fixed rod 124 on which the cam disks 126 rock. (See Figs. 4$^d$, 6, 7, 15$^b$, 78 and 79). On this shaft 168 between the uprights 166 and 167 is secured a sleeve 169. Near its right hand end the sleeve 169 is provided with two gear wheels 170 and 171, gear 170 meshing with a gear 172' on shaft 459 which in turn meshes with a gear 172 which is driven by the power mechanism as hereinafter described, and gear 171 meshing with gear 173 mounted on shaft 174 extending across the machine and having bearings in bearing plates 502 and 503 secured to interior sustaining plates 19 and 24 respectively. Gear 173 in turn meshes with gear 175 which is mounted to rotate freely on a stub shaft 176 carried by a bearing plate 500 secured to interior sustaining plate 19 the stub shaft also serving as an end bearing for shaft 69 with which the gear 175 may be connected through reversing gearing hereinafter described to rotate the shaft, and, through it, the index wheels in the direction desired. The gear 171 is adjustably secured to gear 170 so as to permit of such angular adjustment as may be necessary to insure the proper movement of the index wheels. (See Figs. 5$^a$ and 6.)

Near the gear 170 and also on the sleeve 169 is secured a brake wheel 177 having ten ratchet teeth 178 equally spaced apart on its periphery adapted to be engaged by a locking pawl 179 pivoted in rear of the shaft 168 when the locking pawl is depressed. (See Figs. 4$^d$, 7, 15$^b$ and 79.)

On the shaft 168 to the left of the upright 166 is secured a sleeve 180 on which is carried a master wheel (see Figs. 4$^d$, 8, 9, 15$^b$, 60$^a$, 60$^b$, 60$^c$ and 78) by which, in coöperation with mechanism part of which has already been described, the amount of rotation to be imparted by the power mechanism to the particular index wheel which has been clutched to the shaft 69, is determined. This master wheel comprises two disks 181 and 182 of which the left hand disk 181 is of slightly larger diameter than the other. These disks are suitably spaced apart and are provided near their peripheries with radial guide slots 183 the guide slots of one disk being in line with those of the other, and serving to guide stop bars 184. (See Figs. 68 and 78.) The guide slots 183 of the left hand disk 182 are formed in the disk as slots open at their outer ends and a ring 501 is fitted about the periphery of the disk so as to close the outer ends of the slots. Each of these stop bars is provided on its outer edge between the disks 181 and 182 with a projection or stop 185 and is also notched to form a shoulder 186 to normally engage the ring 501 which closes the outer end of the guide slot 183 of the disk 182, this guide slot being sufficiently long to permit the stop bar to pass through it when pressed inwardly sufficient to disengage the shoulder 186 from the ring 501. On its under edge near the portion which rests in the slot 183 the stop bar 184 is provided with a cam projection 187 which is adapted, when the stop bar is being restored to initial position as hereinafter described, to strike the inner end of the slot 183 and cause the shoulder 186 to be thrown into position to engage the ring 501. To the left of and outside the disk 182 the stop bar 184 is provided with an inclined cam 188 and with an inwardly extending arm 189 having a lateral extension or foot 190 which rests in a slot 191 formed in the sleeve 180. A coiled spring 192 bears at one end against a projection 193 at the left hand end of the sleeve 180 and at the other end against the end of the stop bar 184 tending to press the stop bar outward and toward the right and normally holding the stop bar with its notch 186 in engagement with the outer end of the slot 183 of the disk 181.

The stop bars 184 are ten in number (see Figs. 8 and 9) and are arranged at equal intervals about the periphery of the master wheel. When the master wheel is at rest nine of the stop bars will be respectively in line with the lug 165 on the lower end of the pawl 159 of one of the slide bars 155 so that if one of the slide bars is operated it will cause the lug 165 on the lower end of the pawl to come in contact with the cam 188 of one of the stop bars forcing the stop bar that is toward the center of the master wheel inward and releasing the shoulder 186 from the ring 501 which forms the outer end of the slot 183 and permitting the stop bar to move to the right under the influence of the spring 192 carrying its stop 185 to the right out of line with the stops 185 of the other stop bars.

The movement of the cam disk 126 by which, as above described, the bell crank lever 138 is operated to cause the lateral shifting of the selector 61, and the slide bar 155 is operated to shift one of the stop bars 184, is effected by the depression of one of the numeral keys of the typewriting machine through the engagement of a notched plate 193 carried by it (see Figs. 8, 9, 13, 15ᵃ, 15ᵇ, 16 and 58), with the arm 134 on the upper end of the actuating rod or wire 133 which is connected at its lower end to the arm 128 connected with the cam disk 126, its upper end being guided in the slot of the arm 115, the arm 134 being normally out of engagement with the notched plate 193 and being swung into engagement therewith by the action of the cam 119 of one of the rack bars 49 or 52. The notched plate 193 is adjustably secured to a clip 194 which is secured to the key lever of a numeral key of the typewriting machine. (See Fig. 49.) The clip 194 is conveniently formed from a piece of sheet metal bent to inclose the upright at the forward end of the key lever and is clamped thereon by screws 195. Where the lower case "1" is used as the numeral 1, the clip 196 (see Fig. 8) will be used for this numeral key as, owing to the fact that the "1" is in the second bank of keys, the clip in order to be in line with the clips of the other numeral keys, must be secured to the key lever in rear of its upright. The notched plate 193 has at its lower end a forward extension 197 which, when the typewriting machine is in position with the pins 33 on its feet in the openings 32 of the brackets 30, extends under the bent arms 134 of the actuating rods 133 and serves to support these actuating rods in elevated position at all times whether the slotted arms 115 are in their forward or rear positions. Above the forward extension 197 is formed a deep notch 198 having its upper edge 199 adapted to engage the bent arm 134 when the slotted arms 115 are swung to their rearward position by the action of the cam 119 of one of the rack bars 49 or 52, to carry the actuating rod 133 downward with the numeral key. The notch 198 is of sufficient size to permit of a slight depression of the numeral key without bringing its upper edge 199 into contact with the bent arm 134. When the slotted arms are swung to their forward position the notched plates will be carried down with the numeral keys without having the upper edge 199 come in contact with the bent arm 134.

The locking pawl 179 is carried on a short shaft 200 which has its bearings in the rear portion of the upright 201 which is carried by the base plate 27 and is preferably formed integrally therewith, a portion 202 of the upright being bent to the left and downward at 203. The upright 201 at its upper end embraces stationary rod 12 and has formed thereon a support 216 for the lower end of the shaft 45. The forward end of the locking pawl 179 is formed at its free end with an upper cam 205, and a lower cam 204 and has midway of its length on its under edge a cam 206.

The mechanism by which the locking pawl 179 is raised to permit the brake wheel 177 to rotate and is depressed to engage the brake wheel and stop its rotation and with it the rotation of the index wheels is controlled by the master wheel. This mechanism comprises a rock lever or swinging lever having two parallel arms 207 and 208 connected at their lower ends by a laterally extending portion 209, and mounted to swing on a rod 210 supported by the base piece 27. (See Figs. 4ᵈ, 7, 8, 9, 74, 78 and 79.) The arm 207 of this lever is provided on one side with an arm 211 bent to form with the arm 207 a frame in which is supported a roller 212 which is so arranged that it will be in the path of the projections 185 of the stop bars 184 when they are shifted as above described so that after a stop bar has been shifted and the master wheel is rotated the projection 185 on such stop bar will strike the roller 212 and swing the lever 207, 208 rearward. The arm 208 of the lever is connected at its upper end by a link 213 with a locking dog 214 pivoted at its upper end in a fixed bracket 215 on the upright 201 of the base plate 27, and provided at its free end with a cam face 217 adapted to engage the cam face 205 formed on the upper face of the free end of the locking pawl 179 to force the end of the pawl downward into engagement with the brake wheel 177. (See Figs. 77 and 79.) About midway of its length the arm 208 is provided with a finger 218 bent at a right angle and extending beneath the locking pawl 179 to engage the cam projection 206 on the underside of this pawl so that as the arms 207, 208 are returned to normal position this finger 218 will, by acting against the cam 206, insure the lifting of the end of the pawl out of the path of the teeth of the brake wheel 177. (See Figs. 7, 74 and 79.)

The arm 207 is connected at its upper end by a pin 219 to the upper end of a lever 220 pivoted at 221 to an upright 222 carried by the base plate 27, and having its lower end slotted to fit over a pin 223 on a slide 224 arranged to be movable on the upright 222 (see Figs. 4$^d$, 8, 15$^b$, 61 to 64, 78 and 79), the arrangement being such that as the arm 207 is swung in one direction it will cause the slide 224 to move in the opposite direction. A spring 225 carried at one end of the shaft 200 of the locking pawl 179 and having its other end bearing upward against a finger 226 on the rear of the lever 220 serves to press the slide 224 normally to the rear. (See Figs. 4$^d$ and 78.) The slide 224 carries on its lower edge a laterally bent cam finger 227 which is so located that when the slide is in its forward position this cam finger will lie in the path of the projecting right hand end of any stop bar 184 which has been previously shifted to bring its stop bar 185 in position to engage the roller 212 on the arm 207. (See Figs. 63, 64 and 78.) The cam finger 227 extends laterally sufficient to cause the stop bar 184 to be pushed to the right somewhat beyond its normal position so as to bring the cam projection 187 into contact with the inner end of the slot 183 and thus force the stop bar outward. After the stop bar has passed the cam finger 227 the spring 192 acts to push it to the left into normal position in which position the cam projection 187 is to the right of the left hand disk 182 so as not to interfere with the movement of the stop bar thereafter by the slide rod.

On its rear edge about in line with the roller 212 the arm 207 is provided with a finger 228 projecting to the right and adapted to engage and be locked by a tooth 229 on the end of a locking dog 230 pivoted at 233 to the forwardly bent end 234 of an upright 235 preferably formed integrally with the base plate 27. (See Figs. 4$^d$, 73 and 78.) A spring 236 carried on the pivot 233 tends to swing the locking dog 230 into position to engage the finger 228. The locking dog 230 also has an arm 237 having a down-turned end 238 and a cam face 239, the arm 228 being so located that when the arm 207 is forced rearward as hereinafter described the side of the arm 211 will strike this cam face and thus insure the swinging of the locking dog to bring its tooth 229 into locking engagement with the finger 228 and thus lock the lever 207, 208 in retracted position.

Pivoted at 240 on the horizontally bent end 241 of an upright 242 carried by and preferably formed integral with the base plate 27 in rear of the guide plate 123 is a horizontal lever 243 (see Figs. 4$^d$, 65 and 78) the free end of which extends forward and is forked to fit over a collar 244 on a sleeve 245 (see Figs. 59 and 78) mounted to slide on the end portion of the shaft 168 which is cut away on three sides as shown. This sleeve 245 is provided with ten pairs of radial projections 246 and 247 each pair of projections being in line with and extending outward into a slot 191 of the sleeve 180 and being spaced apart to receive between them the lateral extension or foot 190 of a stop bar 184. (See Figs. 60$^b$, 60$^c$ and 78.) This lateral extension or foot 190 of the stop bar 184 has at its heel a downward projection 248 which is adapted to engage the projection 247 of the sleeve 245 so that as the stop bar 184 is moved to the right the downward projection 248 will engage the projection 247 and move the sleeve 245 to the right, and through the collar 244 will swing the forward end of lever 243 to the right (see Figs. 68 and 78), this movement being aided by spring 231 which bears against lever 243.

To the forwardly bent end 241 of the upright 242 in rear of the pivot 240 of the lever 243 is pivoted a secondary lever 249 having its rear end forked to engage an upwardly projecting lug 250 on the rear end of lever 243. (See Figs. 4$^d$, 66 and 78.) The forward end of the secondary lever 249 has pivoted to it a releasing pawl 251 which extends to the right with its free end normally in line with the down-turned end 238 of the arm 237 of the locking dog 230. The releasing pawl 251 has, forward of its pivot, a stop 252 which is bent downward to be engaged by the edge of the secondary lever 249 and a spring 253 bears against the rear edge of the releasing pawl to hold it with its stop 252 against the edge of the secondary lever. (See Figs. 67 and 78.) When the locking dog 230 is in locking position, that is with its tooth 229 engaging the finger 228 on the arm 207, the down-turned end 238 is in line with the end of the releasing pawl 251, thus holding the forward end of the lever 243 over to the left so that its free end holds the sleeve 245 over to the left with its projections 247 against the projections 248 of the heels of the stop bars 184. When the sleeve 245 moves to the right carrying with it the free end of the lever 243 the end of the releasing pawl 251 strikes the down-turned lug 238 and swings the locking dog 230 to the right releasing the tooth 229 from the finger 228 and permitting the lever 207—208 to swing forward. As soon as the locking dog is thus released the end of the releasing pawl 251 swings to the rear out of line with the down-turned lug 238 against the force of its spring 253 so that the locking dog is free to return to locking position. To insure the movement of the end of the releasing pawl 251 out of the way of the down-turned lug 238 the slide 224 is provided with an arm 254 which extends rearward to the left in rear of the arm 207 and then forward under the releasing pawl 251 and is provided at its end with an upwardly projecting lug 255 adapted to engage the forward edge of the releasing pawl and swing its free end rearward against the force of the spring 253. (See Figs. 64 and 78.)

The spring 225 bearing against the finger 226 tends to swing the upper end of the lever 220 forward and its lower end rearward. The upper end of the lever 220 being connected to the rock lever or swinging lever 207—208 by pins 219 carries the rock lever or swinging lever with it. The lower end of the lever 220 being connected to the slide 224 carries the slide with it in its movement. The spring 225 thus through the lever 220 tends to swing the free end of lever 207—208 forward and to move the slide 224 in a rearward direction. As soon as the lever 207—208 is released by the locking dog 230 its free end will be swung forward by the spring 225 as above described. At the same time the slide 224 will move rearward and through its arm 254 the free end of the releasing pawl 251 will be swung rearward. The parts remain in the positions stated until by the rotation of the master wheel the projection 185 of a stop bar 184 previously set, comes against the roller 212 and acting against the roller causes the lever 207—208 to swing rearwardly until its finger 228 passes to the rear of the tooth 229 of the locking dog 230. This movement of lever 207—208 through lever 220 causes the slide 224 to move forward so that its cam finger 227 is in the path of the projecting end of the stop bar previously set. Further rotation of the master wheel carries the stop 185 past the roller 212 permitting the lever 207—208 to swing forward until its finger 228 is engaged by the tooth 229 and the lever and other parts connected with it are locked in initial position with the cam finger 227 in the path of movement of the projecting end of the stop bar 184 previously set. On the depression of one of the numeral keys, for instance the 9 key, the arms 134 of the wires 133 being in position to be engaged by the upper edges 199 of the notches 198, the cam disk 126 corresponding to the key 9 is rocked bringing the tappet cam 132 against the roller 139 and through the bell crank lever 138 and its connections sliding the selector 61 to the right to clutch one of the index wheels to the shaft 69. Further movement of the cam disk 126 causes the cam 131 to act against the right hand side of the notch 154 on the slide bar 155 pushing the slide bar to the right and through the lug 165 on the pawl 159 acting upon the cam 188 of that one of the stop bars 184 which is opposite the end of the slide bar, releasing the shoulder 186 from the ring 501 which forms the end of slot 183 and permitting the stop bar to move to the right.

In the normal position of the master wheel and the mechanism above described controlled by it, the stop bars 184 are in inoperative position that is with their projections 185 in line and in position to pass freely by the roller 212 of the arm 207, with arm 207 locked in its rearward position by the tooth 229 of the locking dog 230 engaging the finger 228. With the arm 207 in this position the free end of the locking pawl 179 is held down on the brake wheel 177 by the locking dog 214, stopping the mechanism by the engagement of the end of the pawl 179 with a tooth 178 of the brake wheel. The slide 224 is in its forward position with its cam finger 227 in position to be struck by the projecting right hand end of the stop bar 184 which, as above described, has been shifted to the right from its normal or inoperative position into position in which its stop 185 is in the plane of the roller 212 on the arm 207. The shifting of the stop bar 184 is effected by the spring 192 aided by the push of the pawl 159 on the slide bar. As the stop bar shifts to the right the projection 248 on its heel engages the projection 247 on the sleeve 245 drawing the sleeve 245 over to the right carrying its projection 246 under the toes of all of the stop bars 184 except the one acted on by the slide bar and thus locking them against operation until the stop bar 184 acted on is restored to normal position, and drawing the forward end of lever 243 to the right. As the free end of the lever 243 moves to the right the releasing pawl 251 strikes the down-turned end 238 of the locking dog 230 forcing the free end of the dog to the right and disengaging the tooth 229 from the finger 228 permitting the arm 207 to rock to its forward position and permitting the arm 208 to also swing forward releasing the locking dog 214 and through the finger 218 and cam 206 raising the locking pawl 179. At the same time the slide 224 is moved rearward. The locking pawl 179 being thus raised out of the path of the teeth 178 of the brake wheel 177 the power mechanism, acting through the pinion 172, causes the sleeve 169 and the parts carried by it, to rotate until the projection 185 of the stop bar 184 which has been previously shifted by the operation of the key 9, as above described, comes against the roller 212 forcing the arm 207 to rock rearward. As the master wheel rotates the spring 162 permits the pawl 159 to yield as the stop bars which follow the one acted on by it are carried past it. This movement of the arm 207 through the arm 208 and locking dog 214 presses the end of the locking pawl 179 down against the periphery of the brake wheel between two teeth 178. At the same time by the action of the lever 220 the slide 224 is forced forward to bring its cam finger 227 into the path of the end of the stop bar 184 which has been shifted as described. The end of the locking pawl 179 not being in contact with a tooth 178 of the brake wheel a further movement of the sleeve 169 is permitted until a tooth 178 of the brake wheel comes against the end of the locking pawl, stopping the movement of the mechanism. By this further movement the projection 185 of the stop bar 184 is carried past the roller 212 rocking the arm 207 farther to the rear into locking engagement with the tooth 229 of the locking dog 230. At the same time the end of the stop bar 184 coming in contact with the cam finger 227 of the slide 224 is forced to the left and restored to normal position. As the arm 207 is rocked to the limit of its rearward movement the arm 208 swings the locking dog 214 into positive locking engagement with the end of the locking pawl 179 and the mechanism is thus stopped as the tooth of the brake wheel comes against the end of the locking pawl. As the stop bar 184 is restored to normal position the projection 248 on its heel moves to the left permitting the sleeve 245 to move to the left carrying with it the free end of the lever 243 drawing the releasing pawl 251 also to the left so that its end is in position to engage the down-turned end 238 of the arm 237 of the locking dog 230. The mechanism is then in position to be again operated.

The slide bars 155 corresponding to the different numeral keys being arranged in a series about a center as above described a different stop bar 184 will be in position to be operated by each of the slide bars and the movement of rotation of the master wheel will depend upon which stop bar is operated. The stop bars being ten in number, the operation of the 1 key of the typewriter will cause the shifting of that one of the stop bars which is one space or tenth of the circumference from the stop bar last operated to cause the stopping of the mechanism. And the operation of the 9 key will cause the shifting of that one of the stop bars which is nine spaces or nine tenths of the circumference from the stop bar last operated.

It will of course be understood that the rotation of the sleeve 169 as above described causes that one of the index wheels 70 which has been clutched to the shaft 69 to be rotated through the gear 173, and the train of gearing connecting it with the shaft 69, the extent of such rotation of the index wheel being determined by the extent of rotation of the master wheel.

As has been above indicated the selector 61 is rotated to the proper position to clutch the desired one of the index wheels 70 to the shaft 69 through the rack bar 49 the movement of which is controlled by the movement of the paper carriage of the typewriting machine. Referring in detail to the mechanism for controlling this movement of the selector (see Figs. 3ª, 16, 20 and 119 to 136) the tripping device 6, of which there are preferably two or more carried by the notched bar 4, as hereinafter described, comprises a plate 256 having at its upper edge lugs 257, 258 bent over to embrace the rack bar 4 as shown and at its lower edge central lug 260 bent upward to embrace the rack bar and carrying back plate 259. The plate 256 has on its upper edge midway between its ends at 262 a spring pressed dog 263 adapted to engage the teeth of the rack bar and having a thumb piece 264 by which the dog may be raised out of engagement with the teeth of the rack bar to permit the tripping device to be shifted to the position desired. The plate 256 carries two cam plates one on its front face and the other in rear of the notched bar 4 which are adapted to be set to release the slide rods 40 and 39 respectively. As the cam plate which is adapted to be set to release the slide rod 40 which extends to the left and controls the rotation of the left hand selector 63 is, for convenience of construction, arranged on the front of the plate 256, this cam plate and the devices operated by it will be first described it being understood that in general construction and operation the cam plate by which the slide rod 39 is released, and the devices operated by it, is substantially the same as that for releasing slide rod 40.

The cam plate 266 is carried on guide pins 265 of the plate 256 and has on its lower edge downwardly projecting cams 267 and 268, the cam 268 extending below the line of the cam 267 and being bent forward out of the plane of the cam 267. The pins 265 pass through slots 269 in the cam plate so that the cam plate is permitted a limited vertical movement. A spring 270 secured to the lug 260 by a screw 271 serves to hold the cam plate normally in its upward position. Midway of its length the cam plate 266 is provided with an upwardly extending cam 272 adapted to be engaged by an arm 273 on a lever 274 pivoted on the plate 256.

On the slide rod 40 is secured a plate 275 which extends upward through a slot 276 in the top of the box or frame 38. (See Figs. 3ᵃ, 3ᵇ, 16, 18, 19, 20, 135 and 136.) On the upper end of this plate 275 is pivoted a dog 277 having on its forward or left hand end an upwardly projecting cam 278 and also having on this end a rearwardly bent finger 279 adapted to engage a guide bar 280 secured to the top of the box or frame 38 and extending to the right about half the length of this box or frame. At its right hand end the dog 277 is provided with a forwardly bent finger 281 and also has its end cut away to form an incline or cam 282. On the right hand end of this box or frame 38 is a lug 283 projecting to the left in line with the cam 282 of the dog. In normal or inoperative position the dog 277 rests with its right hand end beneath the lug 283 and its left hand end raised with the finger 279 resting against the end of the guide bar 280. The tripping device 6 is so supported on the rack bar 4 that when the cam plate 266 is in elevated position its cams 267 and 268 will pass over the cam 278 of the dog 277 but when the cam plate 266 is depressed by the lever 274 the cam 267 will, as the device reaches the point predetermined by adjusting the tripping device on the rack bar, strike the cam 278 depressing the forward end of the dog and disengaging the finger 279 from the end of the guide bar 280. The same movement throws the finger 281 on the rear end of the dog up into position to engage the rear face of the cam 268 of the tripping device. The spring 54 acting on the vertical shaft 46 causes the slide rod 40 to move to the left and to follow the carriage as it moves step by step toward the left of the typewriting machine. When the dog 277 reaches the end of its movement the finger 279 strikes the post on which the guide bar 280 is supported, the carriage of the typewriting machine being left free to complete its movement toward the left. On the return of the carriage to the right of the typewriting machine the cam 268 strikes the finger 281 and carries the dog 277 back to the initial position until the cam 282 strikes the lug 283 and depresses the right hand end of the dog throwing the finger 281 down below the line of the lower end of the cam 268 and raising the left hand end of the dog so that its finger 279 will be up in position to engage the end of the guide bar 280. The return of the dog 277 to initial position draws the slide rod 39 to the right and, through the gearing operated by the rack 41, draws the rack bar 49 rearward and restores the selector 61 to initial position.

From the above description it will be seen that the carriage of the typewriting machine in its movement to the right has no work to do in reference to the calculating machine, except that of depressing the left hand end of the dog 182.

The front of the box or frame is slotted as shown at 284 and is marked above the slot with a scale 285 and below the slot with a scale 286, and the plate 275 is provided with an indicator 287 which travels over the scales. (See Figs. 3ᵃ, 3ᵇ and 135.)

Referring in detail to the carrying mechanism here shown in connection with the index wheels 70 (see Figs. 8, 9 and 80 to 92), the gear 72 with which each of the index wheels is provided adjacent its bearings in the fixed plate 25, meshes with a gear 288 secured to the right hand end of a sleeve 289 which is mounted to rotate freely on a fixed rod 290 supported in rear of the axis of the shaft 69 by the fixed plate 25, the sleeve being of such length as to fit between and be held from longitudinal movement on the rod 290 by two of the fixed plates 25. On the sleeve are mounted two oppositely arranged snail cams 291 and 292 the snail cams being spaced apart the snail cam 291 being toward the left hand end of the sleeve and the snail cam 292 being toward the right hand end of the sleeve. (See Figs. 85, 88, and 89 to 93.) The snail cam 291 is provided on its left hand face with a tappet finger 293 and the snail cam 292 is provided on its right hand face with a tappet finger 294, and a spring 295 coiled upon the sleeve 289 between the snail cams has its ends secured respectively to the tappet fingers 293 and 294 and tends to rotate the two snail cams in opposite directions. The snail cam 291 has on its right hand face a lug 296 and the sleeve 289 is provided with an arm 297 adapted to engage this lug to rotate the snail cam 291. The snail cam 292 is provided with a lug 298 on its right hand face and the sleeve 289 is provided with an arm 299 adapted to engage this lug to rotate the snail cam 292. The rotation of the snail cam 291 through the arm 297 and the lug 296 carries with it the snail cam 292 through the action of the spring 295 but by reason of the spring the snail cam 292 is yieldingly rotated. Conversely the rotation of the snail cam 292 through the arm 299 and lug 298 rotates also the snail cam 291 through the spring 295.

Supported in the rear portions of the fixed plates 25 respectively above and below the planes of the axes of the shaft 69 and the fixed rod 290 are pairs of fixed rods 300, 301 and 302, 303. The two rods 300, 301 are in the same horizontal plane and the two rods 302, 303 are in the same horizontal plane. On the upper pair of rods 300, 301 is carried a slide 304 formed by bending a strip of sheet metal formed, preferably by punching to the proper shape, and bent to form a rectangle with the long sides 305 and 306 and the ends 307 and 308. (See Figs. 82 and 83.) The sides 305 and 306 of the slide are provided with slots 309 and 310 through which the rods 300 and 301 extend. In the lower edge of the side pieces 305 and 306 is carried a pin 311 on which is pivoted the carrying pawl 312 the forward end of which is adapted to engage the teeth 74 on the periphery of the locking ring 73. The main portion of the carrying pawl 312 lies parallel with and against the right hand face of the side 305 of the slide and in rear of its pivot is bent at right angles to extend across the space between the sides 305, 306 and is then bent forward slightly on the left hand face of the side 306 of the slide and fits over the pivot 311, the carrying pawl thus having a double bearing on the pivot 311 and being held from lateral movement by the sides of the slide. In rear of its pivot the carrying pawl is provided with a tail piece 313 which when the point of the pawl is in engagement with the teeth 76 of the disk or ring 75 extends slightly above the plane of the upper edges of the sides 305 and 306 of the slide. On the pivot 311 between the sides 305 and 306 of the slide is coiled a spring 314 one end of which is secured to the side 306 and the other end of which bears against a finger 315 on the carrying pawl to yieldingly hold its point against the periphery of the disk or ring 76. The left hand side 305 of the slide has at its forward end an extension 316 on which is formed a rack 317 and the rear end 308 of the slide has an upward extension 318 having a guide slot 319 formed therein.

Pivoted on the rod 303 is a lever 320 (see Figs. 87 and 88) the lower portion of which is bent to V shape to embrace a lower slide 321 which is arranged to slide on the rods 302 and 303 and, except that it is arranged to operate to move the disk or ring 76 in the opposite direction from that in which it is moved by the upper slide, is in general construction the same as the slide 304. By thus embracing the slide 321 the lever is given a double bearing on the rod 303 and is held from lateral movement by the slide. The upper or free end of the lever 320 is provided with a recess 322 which embraces the rear end 308 of the slide 304. About midway of its length the lever 320 has at its front edge a laterally bent finger 323 which is located in the path of the snail cam 291. The rear end 324 of the V shaped portion of the lever 320 is provided with one or more hook shaped lugs 325 for the attachment of the carrying springs 326.

Pivoted on the rod 300 is a bell crank checking lever 327 (see Figs. 84, 85 and 96) having its depending arm 328 extending downward into the path of the tappet lug 293 carried by the snail cam 291. The arm 329 of this checking lever 327 extends rearward from its pivot and has near its rear end an incline or wedge 330. The checking lever is carried on the rod 300 between the sides 305 and 306 of the slide 304 being suitably spaced by washers 331 on the rod 300.

The rack 317 formed on the extension 316 of the left hand side 305 of the slide 304 gears into a mutilated gear 332 which is mounted to rock on a rod 333 supported by the plate 25. (See Figs. 80, 92 and 96.) The mutilated gear 332 is secured to a disk 334 carried by the rod 333 and having a laterally bent portion 335 extending to the right and provided at its end with a disk 336 perforated to fit over the rod 333 the bent portion 335 being of such length as to bear against the next plate 25 to the right so as to hold the mutilated gear in position to be engaged by the rack 317. The disk 334 is provided with a lug 337 extending upward and carrying a pivot pin 338 on which is pivoted a double armed pawl 339 the rear arm 340 of which has a cam 341 on its end and extends downward from the pivot pin 338 in rear of rod 333 in position, when swung downward and forward, to strike an upwardly extending arm 342 carried by the locking pawl 100 in rear of its pivot (see Figs. 80, 81 and 96,) to cause the forward end of the locking pawl to be momentarily lifted out of engagement with the teeth 74 of the locking ring 73. The arm 340 being also arranged, as it continues its forward swing, to strike a cam 343 on the upper edge of the locking pawl 100 forward of its pivot to depress the end of the locking pawl, if not already depressed by its spring, into engagement with a tooth 74 of the locking ring 73. The other arm 344 of the double armed pawl 339 extends downward forward of the rod 333 and serves as a stop to limit the swing of the arm 340. A spring 345 coiled on the pivot pin 338 having its end secured to the rear arm 340 serves to hold the double armed pawl with its arm 344 against the rod 333, while permitting the arm 340 to yield sufficiently to pass the cam 343 and the arm 342 in its rearward and upward swing.

The carrying mechanism above described is that for carrying from an index wheel of lower denomination to one of higher denomination in the process of subtraction. The carrying mechanism for carrying in the process of addition is practically the same except that by reason of the fact that its carrying pawl is below the plane of the axis of the index wheels certain changes in details as hereinafter described are necessary. But as the two carrying mechanisms are independent in operation, the operation of the carrying mechanism above described will be here described before describing the carrying mechanism for addition.

In the operation of subtraction the index wheel carried by the right hand one of the plates 25 being rotated in the direction to bring successively lower numerals into view, causes the gear 72 to rotate gear 288 and through the arm 299 engaging the lug 298 on the snail cam 292 rotates this snail cam and through the spring 295 rotates the snail cam 291. As the snail cam 291 is rotated its edge engages the finger 323 on the lever 320 to swing the lever rearward on its pivot and, through the connection of the upper end of this lever with the slide 304 draws the slide rearward, drawing the point of the carrying pawl 312 rearward out of engagement with the tooth 76 of the disk or ring 75 with which it previously engaged, the index wheel being locked against rearward movement by the lower locking pawl 101. When the index wheel has been rotated to bring the 0 into view the snail cam 291 will have been rotated to bring the highest point of the cam against the finger 323 of the lever 320 to cause the slide 304 to be moved to its extreme rearward position and to bring the point of the carrying pawl 312 well to the rear of the tooth 76 of the disk or ring 75 next to the one against which the tooth of the carrying pawl last rested. The rearward movement of the slide, through its rack 317 rotates the mutilated gear 332 to swing the arm 340 to the rear and upward past the cam 343 on the upper edge of the locking pawl 100 and past the end of the arm 342 on the locking pawl, the spring 345 permitting the end of the arm 340 to yield as it passes the cam 343 and arm 342. Further rotation of the index wheel causes the highest point of the snail cam 291 to move past the finger 323 of the lever 320. This leaves the lever 320 free to be swung forward by the action of the carrying spring or springs 326. The forward movement of the slide moves the point of the carrying pawl 312 toward the tooth 76 of the disk or ring 75 which it is to the rear of and also through the rack 317 and mutilated gear 332 swings the end of the arm 340 into contact with the end of the arm 342 of the locking lever 100 and just before the point of the carrying pawl comes into actual engagement with the tooth of the disk or ring 75, this arm 342 acts to raise the point of the locking lever and to hold it raised until the carrying pawl acting against the tooth starts the rotation of the index wheel. The further forward swing of the arm 340 carries it past the arm 342 and into contact with the cam 343 insuring the depression of the end of the locking pawl into position to engage a tooth 74 of the locking ring 73. The continued forward movement of the slide forces the carrying pawl forward sufficiently to engage the tooth 76 of the disk or ring and with it the index wheel with which it is connected through one space.

In rapid operation it might happen that the snail cam 291 if fixed to the sleeve 289 would be rotated past the point at which it permits the full forward movement of the finger 323 of the lever 320 and thus the carrying pawl could not be moved sufficiently to effect the necessary movement of the disk or ring 75. In order that sufficient time shall be afforded for the action of the carrying pawl, the tappet 293 carried by the snail cam 291 is so located that as the highest point of the snail cam 291 passes the finger 323, the tappet comes in contact with and is stopped by the end of the arm 328 of the bell crank stopping lever 327 (see Figs. 9, 85, 94 and 96) thus stopping further rotation of the snail cam until as the slide completes its forward movement, its rear end 318 moves out from under the cam 330 on the end of the rearwardly extending arm 329 of the stopping lever allowing the stopping lever to swing on its pivot so that the tappet 293 may be pushed past the end of its arm 328 by the force of the spring 295 which by the continued movement of the index wheel and the gear 288 has been put under tension. On the release of the snail cam it will be rotated by the spring until its lug 296 is brought against the arm 297 on the sleeve 289 in which position relative to the gear 288 it will remain until its highest point again passes the finger 323 of the lever 320. Should the carrying spring fail to act to cause the slide 304 to complete its forward movement the lower end of the stopping lever will remain against the tappet and will stop the further operation of the gear 288 and the index wheel by which it is driven if the gear is rotated sufficiently to bring the back of the arm 297 around against the back of the lug 296.

The lower carrying slide 321 (see Figs. 9, 96 and 97) is of the same general construction as the upper carrying slide 304 but its extension 316' carrying the rack 317' is below the slide instead of above and the extension 318' on its rear end is also below the slide. The arm 340' operated through the mutilated gear 332' swings upward and forward instead of downward and forward. A spring 346 is provided to hold the arm 328' of the stopping lever 327' in position to be engaged by the tappet 294 carried by the snail cam 292. The carrying springs 326 have one end secured on the hooks 325 of the lever 320 and their other ends secured to the hooks 325' of the lever 320'.

When one of the carrying mechanisms above described is in position to operate it is, of course, necessary to have the other out of operating position and it is desirable to so arrange the mechanisms that they may be readily shifted into and out of position as desired according as the calculating mechanism is to be used for addition or subtraction. To effect the necessary shifting of the carrying mechanisms the plates 25 are provided with slots 347 and 348 of which slot 347 is slightly above the plane of the upper edge of the slide 304, and slot 348 is slightly below the lower edge of slide 321. Through the slots 347 of the group of vertical plates 25 extends a bail 349 (see Figs. 7, 8, 9, 14, 101 to 104 and 108 to 110) which when moved rearward engages shoulders 350 on the rear end of the sides 305 and 306 of the slide 304 and also engages the tail piece 313 of the carrying pawl 312 to press it downward and to thus raise the forward end of the carrying pawl out of position to engage the teeth 76 of the ring or disk 75. Through the slots 348 extends a similar bail 351 which is adapted when moved rearward to engage the shoulders 350' on the rear ends of the sides of the lower slide 321 and to also engage the tail piece 313' of the lower carrying pawl 312' to depress the forward end of this carrying pawl and free it from engagement with the teeth 76 of the disk or ring 75. The bails 349 and 351 are arranged to be simultaneously moved in opposite directions and for this purpose they are each provided near their opposite ends with transverse slots 352 adapted to receive the ends 353 of a lever 354 (see Figs. 101 and 109) which is pivoted to swing on a fixed rod 355 which is located in a plane midway between the planes of the two bails. The levers 354, there being one for each end of the two bails has a rearwardly extending arm 356 which is engaged by a recess 357 in an actuating lever 358 which is pivoted on hollow studs 359 and 360 through which the shaft 174 extends, the stud 359 being carried by interior sustaining plate 21 and the stud 360 being carried by plate 20. The actuating levers 358 are rigidly connected in rear of their pivots by a bar 361 preferably formed integral with the actuating levers. The right hand actuating lever 358 is provided above its pivot with a recess 362 in which is received a pin 363 which is mounted eccentrically on a gear 367 carried by a short shaft 365 supported at one end in a bearing formed in the plate 20 and supported at its other end by a bracket 366 secured to the plate. The short shaft 365 carries to the right of the plate 20, a gear 367 with which meshes a segment 368 pivoted at 369 to the plate 20 and having above its pivot a handle 370 which extends through the top plate of the calculating machine in position to be operated by the hand. (See Figs. 1, 3$^d$, 4$^d$, 5$^a$, 6, 107 and 109.) The segment 368 is of sufficient extent to rotate the short shaft 365 sufficiently to carry the eccentric pin 363 slightly past the horizontal plane of the axis of the short shaft so that when the segment is swung in either direction to the limit of its stroke the actuating lever and the bails are locked against possible movement except through movement of the segment. Any rearward movement of either of the bails 349 or 351 less than what is necessary to cause the forward end of the carrying pawl controlled by it to be swung out of engagement with the teeth of the disk or ring 75 will lock the index wheels against possible movement. As a further means of holding the index wheels locked against possible movement until the segment is swung its full stroke it should be noted that until the slide which is being moved rearward completes its rearward movement its rear end 308 or 308' will be in contact with the inclined end 330 or 330' of the stopping lever 327 or 327' thus holding the end of its arm 328 or 328' in the path of the tappet 293 or 294 as the case may be. The movement of the segment 368 to shift the carrying mechanism effects also the shifting of reversing gearing between the gear 175 and the clutch carrying shaft 69. For this purpose the upper bail 349 (see Figs 4$^d$, 6, 102, 103, 108, 109, and 110) is provided at the right of the plate 20 with an extension 371 having an inclined slot 372 with which is engaged a pin 373 on the upper end of a slide 374 carried on a stub shaft 375 extending to the right from the plate 20. The lower end of the slide 374 is forked to engage a groove 376 in the hub of a gear 377 splined on the right hand end of shaft 69.

The gear 377 (see Figs. 3$^d$, 4$^d$, 99, 100, and 108) is provided on its right hand face with a series of pins 378 which are adapted to enter holes 379 in gear 175 when the gear 377 is shifted to the right and when so shifted the gear 377 will rotate with the gear 175 and will carry with it the shaft 69 and any index wheel which may be at the time clutched to the shaft. Below the shaft of gear 175 is a gear 380 mounted on a shaft 381 supported by plates 19 and 20. This gear 380 is so arranged that it is in mesh for half its thickness only with gear 175 it being sufficiently thick to mesh also with a gear 382 carried on a sleeve 383 which carries also a second gear 384. The sleeve 383 is journaled on a stub shaft 385 supported by plate 20 and is so located that its gear 382 is out of line with gear 175 and its gear 384 is in position to mesh with gear 377 when the latter is shifted to the left.

In the operation of calculating mechanism through the numeral keys of a typewriting machine it sometimes happens that a numeral key is not depressed sufficiently to cause the registering mechanism to be operated, without the failure to actuate the registering mechanism being noticed by the operator with the result that the total shown by the index wheels will not be correct. Errors also sometimes occur from accidentally depressing numeral keys. For the purpose of obviating these difficulties the calculating mechanism of the present invention is so arranged that the numeral keys may be depressed slightly and returned to their usual position by their springs without causing any movement of the calculating mechanism and, at the same time, the mechanism is so arranged that if a numeral key is depressed sufficiently to cause the calculating mechanism to begin to be actuated it not only locks all of the other numeral keys against operation but is itself so locked that it cannot be returned to its raised position until after it has been depressed to the full extent necessary to effect the movement of the index wheel and the selector is also so locked that only the index wheel selected by the movement of the carriage just before the depression of the numeral key will be caused to be rotated when the numeral key is caused to complete its stroke. And while, after a numeral key has been partly depressed and is held so locked, the carriage of the typewriting machine is permitted to continue its movement toward the right, the slide rod which carries the dog 277 will be so locked that it will stop the carriage on its return movement at the precise point at which it was when the numeral key received its initial depression so that the key when depressed fully will print at the same point on the paper at which it would have printed if it had been fully depressed at first.

For the purpose of locking the selector 61 against rotation upon the initial depression of a numeral key until the numeral key has completed its downward stroke, the hollow shaft 60 of the selector is provided near its right hand end with a sleeve carrying a cam tooth 387 adapted to enter between the teeth 388 of a fixed ring 389 which is carried by interior sustaining plate 19. (See Figs. 3ᵈ, 4ᵈ, and 26.) On the initial depression of a numeral key as the tappet cam 132 strikes the roller 139 on the bell crank lever 138 it operates the rock shaft 146 to shift the selector to the right carrying the tooth 387 into the space between two of the teeth 388 locking the selector against rotation. The depression of the numeral key as soon as it begins to swing the operating arm 128 brings the upper escapement tooth 129 against the side of a tooth 137 turning the escapement wheel 135 so that the peripheral face of a tooth 137 is in the path of the point of the lower escapement tooth 130 so that the operating arm 138 is held depressed and with it the numeral key is held depressed and the selector is held in the position to which it had been shifted with its tooth 387 between two of the teeth 388 of the fixed ring 389. This locking of the selector necessarily locks the pinion 59 and the gear 57, rack bar 49 and through the vertical shaft 45 locks the slide rod 39 and holds the plate 275 stationary with the finger 281 on the rear end of the dog 277 in position to be struck by the cam 268 of the cam plate 266 of the tripping device when the carriage of the typewriting machine is moved to the left so that should the carriage be moved to the right by the operation of the spacing bar or any of the keys while a numeral key remains partly depressed, by returning the carriage toward the left until the back of the cam 268 strikes the finger 281 of the dog 277, it will be brought into such position that the further depression of the numeral key to complete its stroke will cause its type bar to print in the proper place and at the same time will cause the proper index wheel to be rotated. As the bell crank lever 138 through which the bail 143 is depressed to rock the rock shaft 146 to shift the selector to the right, is held in operating position by the tappet cam 132 so long as the numeral key remains in depressed position and the key is locked against return to normal position until it has completed its full stroke by the escapement mechanism above described, it will be obvious that the selector will be locked against return until the numeral key completes its full stroke and effects the movement of the slide bar necessary to release the power mechanism. By reason of the fact that the power mechanism acts quickly the index wheel selected will be rotated through the necessary number of spaces before the numeral key can return and before the selector can be returned to its initial position to permit the disengagement of the sliding clutch member 83 from the clutch member 75 and no special means need be provided for insuring the holding of the sliding clutch member in operative position during the rotation of the shaft 69. But as an additional safeguard, the selector may be locked against possible return movement during the rotation of the shaft by means of an arm 504 secured at one end to the locking dog 214 (see Figs. 4ᵈ, 7, 76 and 79) and extending forward so that when the locking dog is swung forward by the forward swing of the lever 207—208 to release the power mechanism the forward end of the arm 504 will extend over the upper edge of an extension 505 on the right hand end of the bail 143 thus locking the bail 143 and through it the selector against possible return movement until in the relocking of the power mechanism the locking dog swings rearward carrying the end of the arm rearward out of the path of movement of the extension of the bail. It will thus be clear that the selector will be positively locked against movement either of rotation or longitudinally of its axis throughout the operation of the power mechanism.

In order to cause the numeral key depressed to lock all of the other numeral keys against depression, the operating arm 128 is provided with a keyhole slot 390 the enlarged portion of which is adapted to fit over a tube 391 which is carried in openings in the vertical plates 121 and is held from longitudinal movement by a flanged ring 393 secured to the terminal plate 122. (See Figs. 13, 50, 56 and 58.) In line with the path of movement of the operating arm 128 the tube 391 is slotted on one side at 394 to receive the shoulder 395 of the narrow portion of the keyhole slot 390. Within the tube 391 is carried a series of movable blocks 396 having rounded ends, (see Fig. 56) the blocks being each slightly longer than the space between two of the slots 394. In operation as an operating arm 128 is swung by the depression of the numeral key to which it is connected, the shoulder 395 enters between the rounded ends of two of the blocks 396 pushing the blocks to the right and left and holding them so pushed apart until the key is returned to its normal elevated position. While the key is in depressed position if any other key is attempted to be depressed the shoulder 395 of the key hole slot of the operating arm controlled by it will strike and be stopped as it starts to enter the slot 394 of the tube 391 by the end of one of the blocks 396 which has been pushed into line with the slot. It is thus impossible to operate a numeral key until the one last operated has completed its stroke and returned to elevated position. Near the right hand end of the tube 391 it is provided with a slot 397 (see Figs. 4$^d$, 15$^b$, 29 and 30) in line with a slide bar 398 which is moved by the power mechanism, as hereinafter described, to carry its shoulder 399 between two of the blocks 396 to effect the locking of all of the numeral keys against operation when the spring of the power mechanism has run beyond the desired limit.

The power mechanism (see Figs. 4$^a$, 4$^b$, 5$^b$, 11$^b$, 12 and 111 to 117) here shown comprises a driving spring secured at one end to a sleeve 400 carried by a shaft 401 and at the other end secured to a drum 402 carried by the shaft 401 and provided with gear 403 which through pinion 404 and gear 172 on shaft 406 drives the gear 170 which drives the sleeve 169. The power mechanism also comprises a winding spring secured at one end to shaft 407 and at the other end to drum 408 carried by sleeve 409 mounted on the shaft and provided with a gear 410 which is in mesh with spring 411 on the sleeve 400 of the driving spring. Near the left hand end of the shaft 407 is a pinion 412 which is in mesh with a rack 413 pivotally connected with a lever 414 pivoted to a bracket 415 and provided with a handle 416 by which it may be swung on its pivot to cause the rack 413 to rotate the pinion 412 and the shaft 407 to wind up the winding spring which in turn through the drum 408 and its gear 410 winds up the driving spring as it runs down below the tension desired for the proper operation of the calculating mechanism. The rack 413 is arranged to reciprocate in ways formed on a plate 507 which is supported on rods 508, 509 which are supported at their ends in the intermediate plates 28 and 29. (See Figs. 4$^c$ and 12.) On a short sleeve 417 on the shaft 407 is a ratchet wheel 418 with which engages a detent pawl 419 pivoted on the side piece of the frame to hold the shaft 407 from rotating backward, (see Fig. 4$^b$.) The pinion 412 with which the rack 413 is in mesh is loose on the shaft 407 and is provided with a spring pawl 420 which engages the teeth of a ratchet 421 fixed on shaft 407 when the pinion 412 is driven in the direction to wind the winding spring and slips over the teeth when the rack is being returned to initial position. (See Figs. 4$^a$, 34, 35 and 36.)

In order to provide for proper operation of the calculating mechanism it is desirable that the rotation of the index wheels shall be effected through a quick acting spring which is maintained at a nearly uniform tension. The driving spring being a comparatively light spring gives the necessary quickness of action and the winding spring serves to keep the driving spring wound to the proper tension. In order to avoid overwinding of the driving spring it is necessary to prevent the possibility of overwinding the winding spring. For this purpose the shaft 407 is provided to the left of the intermediate plate 28 (see Figs. 4$^b$, 12, 31, 32 and 33) with a ring 422 carrying a single tooth 423 adapted to be engaged by a dog 424 pivoted on the left hand face of the plate 28 to lock the shaft against further rotation by the winding lever. This spring dog carries in rear of its pivot a pin 425 which extends through an opening in the plate 28 into position to be engaged by the upper edge of a shoulder 426 on the rear portion of the slide bar 398. A spring 427 serves to raise the end of the dog 424 out of the path of the tooth 423 when the slide 398 is moved to carry its shoulder out from under the pin 425. (See Figs. 4$^b$, 12, 31, 32 and 33.)

The slide 398 is carried on pins 428 extending through slots 429 into the right hand side of plate 28 below the plane of the shaft 407. (See Figs. 4$^b$, 5$^b$, 11$^b$, 29 and 30.) On its under edge the slide is provided with a shoulder 430 with which engages a spring dog 431 pivoted to the plate 28 at 432 and upwardly pressed by spring 433. The spring dog 431 is provided on its lower edge with a laterally bent cam finger 434 which is arranged in the path of a pin 435 carried by an arm 436 pivoted on the left hand face of the drum 408 of the winding spring. The arm 435 swings between stops 437 and 438 on the face of the drum. A spring 439 holds the arm 436 normally against the stop 437. As the drum rotates the pin 435 comes against the cam finger 434 and is pressed back against the force of the spring 439 until it comes against the stop 438 which prevents further yielding. Any further movement of the drum causes the pin 435 to act against the cam finger 434 depressing the spring dog 431 and releasing the slide to permit it to be moved forward by the spring 440 which is secured at one end to the slide near its rear end and at the other end is secured to a pin 441 carried by the plate 28.

Pivoted to the slide 398 at 442 is a stopping dog 443 extending forward and having its forward end forked to embrace the shaft 401 of the driving spring. (See Figs. 4$^b$, 11$^b$, 29 and 30.) The end of the stopping dog between the forked ends has two stopping faces 444 and 445 the upper one of which is slightly in advance of the lower one. The stopping dog is provided on its upper edge with a laterally bent finger 446 which is arranged in the path of the pin 435 on the winding drum 408. As the drum 408 rotates to release the spring dog 431 by bringing the pin 435 against the finger 434, the arm 436 is thrown past the finger 434 by the spring 439 leaving the spring dog free to be thrown upward against the lower edge of the slide by its spring 433. On the release of the slide it moves forward until the upper stopping face 444 comes against the shaft 401. Further rotation of the drum brings the pin 435 against the finger 446 of the stopping dog 443, the arm 436 yielding against the force of its spring 439 until the arm is forced back against stop 438 when the pin forces the finger 446 upward lifting the forward end of the stopping dog. The pin springs past the finger 446 as soon as it has lifted the end of the stopping dog and the slide moves forward until the lower stopping face 445 comes against the shaft 401. The slide is then in its extreme forward position and its shoulder 399 is in the slot 397 of the tube 391 between two of the blocks 396 locking all of the numeral keys against operation. As the slide thus moves forward the shoulder 426 passes out from under the pin 425 of the locking dog 424 and permits the spring 427 to act to lift the forward end of the locking dog out of the path of the tooth 423 on ring 422 so that the shaft 407 may be rotated to wind up the winding spring. The first forward movement of the slide 398 is arranged to give an audible signal to indicate to the operator that the winding spring is nearly run down. This audible signal consists of a bell 447 and a hammer 448. (See Figs. 4$^b$, 5$^b$, and 11$^b$.) The bell 447 is carried on a post 449 carried by the back plate 7. The hammer 448 is carried by a lever 450 pivoted in a post 451 also carried by the back plate 7. A spring 452 connected at its forward end to the pin 441 has its rear end in a transverse slot 453 in the lever 450 to the right of its pivot. The spring is so constructed that when at rest its rear end is about midway of the length of the slot 453. To the left of its pivot the lever 450 has pivoted to it a dog 454 so arranged as to swing freely to the rear but to be held against swinging in a direction forward of its pivot. The end of this dog 454 is arranged in the path of and normally rests against a tooth 455 carried by the slide bar 398. As the slide bar moves forward the tooth 455 is carried forward acting on the dog 454 to swing the hammer 448 rearward until the spring 452 is put under tension and as the slide continues its forward movement the tooth 455 passes the end of the dog 454 leaving the hammer free to be swung quickly forward by the spring to cause it to strike the bell 447. By reason of the slot 453 the hammer is free to rebound from the bell so as to permit of a clear ring. While the sound of the bell warns the operator that the power mechanism is ready to be rewound it will be noted that the machine is not at once locked against operation, the locking taking place only upon the second forward movement of the slide 398. The interval between the sounding of the bell and this locking movement of the slide is sufficient to permit any numbers which are being written, to be completed. Usually the writing of twenty numbers is permitted after the bell is sounded, though the lever 414 may be operated to rewind at any time after the bell sounds.

After the slide bar has moved forward to the limit of its movement the calculating mechanism and the numeral keys are locked against movement as above described. In order to again operate the machine it is necessary to swing the winding lever 414 forward to cause the rack 413 to operate the pinion 412 to rotate the shaft 407. The lever 414 should be swung forward and back until by causing the slide bar 398 to be returned to its rearward position the shoulder 426 comes under the pin 425 of the locking dog 424 lifting its rear end and depressing its forward end into the path of the tooth 423 of the ring 422. After the forward end of the dog 424 is thus depressed the further rotation of the shaft 407 will be stopped as soon as the tooth 423 comes around against the end of the locking dog 424. For effecting this rearward movement of the slide bar 398 the shaft 407 is provided near the right hand side of the intermediate plate 28 with an arm 456 and the slide bar 398 is provided with an upwardly extending arm 457 having a portion 458 extending forward above the plane of the shaft 407 in position to be in the path of the arm 456 when the slide is in its forward position the arrangement being such that when the shaft 407 is rotated to wind up the winding spring, the arm 456 will be brought against the end of the portion 458 of the arm 457 and will push it and with it the slide bar 398 rearward until it is caught and held in rearward position by the spring dog 431 engaging the shoulder 430 on the lower edge of the slide bar. When the slide bar is thus pushed back the arm 456 will pass the end of the portion 458 of the arm 457.

For the purpose of controlling the speed of operation of the device and particularly for the purpose of avoiding shock in the stopping movement of the driving mechanism when the higher numeral keys such as the 7, 8, and 9 keys are depressed, the shaft 406 of the gear 372 is extended to the left of the intermediate plate 28 and is provided to the left of the plate 28 with a friction brake wheel 460 and a gear 461. (See Figs. 4$^b$, 12 and 114 to 117.) The gear 461 is in mesh with a pinion 462 on a shaft 463 journaled in a frame 464 which is carried on the shaft 407 of the driving spring. On the shaft 463 is carried a centrifugal governor the frame 465 of which has pivoted to it weighted levers 466 having arms 467 engaging a sleeve 468 mounted to slide freely on the shaft 463 and provided with an annular groove 469. Pivoted in the lower part of the frame 464 is a bell crank lever 470 having its upwardly extending arm 471 extending into the groove 469 of the lever 468. To the horizontal arm 472 of the bell crank lever 470 is secured the end of a brake band 473 which is wound about the friction brake wheel 460 and has its other end secured to any convenient part of the frame of the machine. A spring 513 attached at one end to the arm 471 holds the arm 472 normally raised. When by the depression of a numeral key the brake wheel 177 is unlocked to permit the previously selected index wheel to be rotated, the shaft 174 will rotate the governor device at a high rate of speed. If the index wheel is to be rotated through only one or two spaces, the driving mechanism will be stopped before it has attained sufficient momentum to cause any noticeable shock, but when the index wheel is to be rotated through a considerable number of spaces, seven, eight or nine, for instance, the driving mechanism would, if uncontrolled attain considerable momentum and its sudden stopping might cause a shock which would tend to injure the mechanism. When the index wheel is rotated through only a few spaces the rotation of the shaft 463 is not sufficient to cause the arms 466 of the governor 465 to fly outward enough to cause any material movement of the sleeve 468 but when the index wheel is rotated through a larger number of spaces the shaft 463 is rotated sufficiently to cause the arms 466 to fly outward against the force of the spring 413 and to shift the sleeve. The shifting of the sleeve acts through the bell crank lever 470 to tighten the brake band 473 on the friction brake wheel 460 thus checking the momentum of the driving mechanism and enabling the operation of the machine to be stopped without shock.

In the foregoing description only one calculating mechanism has been described, with the mechanism for operating it to add or subtract as desired. The machine is however provided with a second set of index wheels located at the front of the calculating machine at the left and adapted to be used either to add or subtract numbers printed by the typewriting machine in a second column separate from the column in which the numbers are to be added or subtracted by the set of index wheels already described, or to separately add the numbers which are added by the set of index wheels already described, as for instance when it is desired to show the total amounts of all bills made out during the day on one set of index wheels, and to show the sum of the items of each bill as written, on the other set, or to add numbers on one set of index wheels and to subtract them on the other set. The second set of index wheels is a duplicate in all respects of the set already described so far as the mounting of the index wheels in the fixed plate 25, the upper end lower locking pawls, carrying mechanism and operating devices therefor and means for shifting either one of the carrying mechanisms into or out of operative position, as may be desired, and it is therefore unnecessary to again describe these features. (See Figs. 3$^c$, 4$^c$, 14 and 16.) The shifting of the selector 63 is effected in the same way and by the same means as the selector 61 is shifted, the selector 63 having on its right hand end near the interior sustaining plate 22 a disk 474 which engages the left hand groove 151 of the slide 149. The hollow shaft 68 of the selector 63 is provided with a tooth 475 near its left hand end, corresponding to the tooth 387 of the right hand selector, adapted to engage the teeth 476 of a fixed ring 477 carried by the sustaining plate 24 and through which the hollow shaft 68 passes.

The shaft 478 which carries the sliding clutch members 83 of the right hand set of index wheels is arranged to be rotated through the shaft 174 which is driven from the power mechanism as above described. The shaft 174 has near its left hand end a gear 479 which meshes with a gear 480 which through reversing gearing similar to that above described in connection with the gear 377 and the clutch carrying shaft 69, drives the clutch carrying shaft 478 in either direction required. The shifting of this reversing gearing for the left hand set of index wheels is effected through a shifting segment 481 corresponding to the shifting segment 368 of the right hand set of index wheels, having a handle 482 for operating it, the movement of the segment 481 also serving to shift the carrying mechanism of the right hand set of index wheels in the same manner and through the same devices as are employed for shifting the carrying mechanisms for the right hand set of index wheels. (See Figs. 3c, 4c, 14 and 16.)

The slide rod 39 is provided with a plate 483 (see Figs. 14, 119, 121, 122, 135 and 136) corresponding to the plate 275 carried by the slide rod 40, extending upward through slot 276 in the top of box or frame 38 in rear of the plate 275 and carrying on its rear face above the top of the box or frame a pivoted dog 484 corresponding in construction with the pivoted dog 277 except that the finger 486 at its left hand end is bent to extend forwardly instead of rearwardly and its finger 487 at its rear end extends forward instead of rearward. This rear pivoted dog 484 has a cam 485 at its left hand end and a cam 491 at its right hand end corresponding to cams 278 and 282 of the forward pivoted dog 277 and for the same purpose. The back plate 259 in rear of the rack bar 4 carries on its rear face a cam plate 490 substantially the same in construction and operation as the cam plate 266 except that the right hand cam 489 is bent rearward out of line with the forward cam 488. The spring 270 which serves to hold cam plate 266 normally raised serves also to hold cam plate 490 normally raised and cam plate 490 is depressed to bring its cams 488 and 489 into action by a lever similar to the lever 274 by which the cam plate 266 is depressed but having its arm 510 in rear of the rack bar 4 while the lever 511 is on the front of the plate 256 the arm 510 and lever 511 being connected by rod 512 which serves also as the pivot for lever 274. By means of the levers 274 and 511 either one or both of the cam plates 266 and 490 may be depressed to release either or both of the pivoted dogs 277 and 484 so as to permit either one or both of the selectors 63 and 61 to be rotated through their respective rack bars, by the springs 53 or 54. The action of the cams 488 and 489 on the pivoted dog 484 when the cam plate 490 is in depressed position is precisely the same as that of the cam 267 and 268 of the cam plate 266 on the pivoted dog 277 and need not be further explained. In Figs. 3a and 3b these tripping devices 6 are indicated on the notched bar 4. In case the machine is to be employed to add two columns of figures separately on the left hand and right hand sets of index wheels, the lever 274 of the left hand tripping device will be pressed down to depress the cam plate 266 so that the dog 277 will be tripped to release the slide rod 40 so that it will move with the carriage when the carriage reaches the predetermined point in its movement at which the numbers of the first column are to be typewritten and the lever 492 of the second or right hand tripping device will be pressed down to depress the cam plate 490 so that it will trip the dog 484 at the proper point to release the slide rod 40 to permit it to move to the left with the carriage. If preferred the left hand tripping device may be set to trip the dog 484 to release rod 40 and the right hand tripping device set to trip the dog 277. If desired, either of the tripping devices may be set to trip both dogs at the same time thus causing both selectors to rotate at the same time so that the numbers typewritten may be added simultaneously as where one set of index wheels is to be used for the totals of separate bills or ledger accounts and the other for the aggregate total of all the bills or ledger accounts or so that one set of index wheels may be used to add the numbers and the other to subtract the numbers from a predetermined total.

It will be noted that the same power mechanism is used for both sets of index wheels whether the two sets are used simultaneously or separately and whether they are used for adding or subtracting or one for adding and the other for subtracting. It will also be noted that the bail 143 when operated shifts the selectors of both sets of index wheels and that when the tripping device is so set as to unlock the dogs of both slide rods to permit both selectors to operate simultaneously, the depression of a numeral key will cause both selectors to be shifted to connect an index wheel of each set with the rotating shaft and will cause both shafts to be rotated simultaneously and through the same number of spaces.

By the arrangement of the pins 98 and the notches 99 in the rings 97 on the selector 61 (and the same is also true of the studs and rings of selector 63) as shown it is made possible to write in the decimal point and the commas used for pointing off the numbers into periods of three figures each, or the commas alone where the decimal point is not desired, without disturbing the selection, as the carriage moves toward the left, of the proper index wheel. For this purpose the selector is provided at certain points with pairs of pins and the notches in rings 97 adjacent these pairs of pins are made wider than the notches in the other rings so that as the selector is brought into position to be shifted to select the proper index wheel and the period and the period key or comma instead of a numeral key is struck to print a period or comma, by which the carriage is released to advance one step and the selector correspondingly rotated one step, the second stud of the pair will be brought into proper position to operate the clutching device of the same index wheel upon the striking of a numeral key and the consequent shifting of the selector, which would have been clutched to the shaft 69 if the numeral key had been previously struck instead of the period or comma key. For the purpose of making clear the arrangement and operation of the pins of the selector attention is directed to Figs. 3$^d$ and 24. As the selector 63 is shown in these views its first movement after the dog 277 has been tripped will be to bring the pin 98$^a$ in line with the finger 90 of the index wheel of the highest denomination to be used which in the machine shown, if dollars and cents are to be written, would be in millions place. On the depression of the proper numeral key the selector is shifted to the right bringing pin 98$^a$ against the finger 90 and causing the millions index wheel to be clutched to the shaft 69 and the master wheel to be unlocked to permit shaft 69 to be rotated to indicate the figure typewritten. After the millions figure, counting from left to right, a comma should be printed. As the numeral key already operated is released the carriage advances one step and the selector rotates one step, bringing pin 98$^b$ in line with the finger 90 and upon the striking of the comma key and its release, the carriage advances one step and the selector rotates one step. This brings pin 98$^c$ in line with the finger 90 of the second index wheel counting from the left, that is the hundred thousand wheel, and upon the depression of a numeral key the figure printed is shown on this index wheel and on releasing the key struck, the carriage moves forward one step and the selector rotates one step bringing pin 98$^d$ in line with the finger 90 of the third or ten thousand index wheel and on the depression of the proper numeral key the selector will be shifted and the index wheel clutched and rotated. On the release of the key and the advance of the carriage the selector is rotated to bring pin 98$^e$ in line with the finger 90 of the fourth or thousand index wheel, and on the depression of the proper numeral key this index wheel is rotated, and on the release of the key and the advance of the carriage, as the next key to be struck is the comma key and not a numeral key, the rotation of the selector brings pin 98$^f$ in line with the finger 90 of the index wheel last operated, that is the thousand wheel. Upon the depression of the comma key and its release the selector is rotated to bring pin 98$^g$ in line with the finger 90 of the hundreds index wheel and as the numeral keys are successively struck to print the figures in the hundreds, tens and units places the pins 98$^h$, 98$^i$ and 98$^j$ are brought successively in line with the fingers 90 through which the several index wheels for the tens, units and first decimal place are clutched to the shaft 69. As the period is to be printed after the unit figure has been printed and registered, the pin 98$^j$ being in line with the finger 90 of the first decimal place wheel, the period key is depressed printing the period and on its release the selector is rotated to bring the pin 98$^k$ in line with the finger 90 of the same first decimal place index wheel so that on the depression of the proper key to print the figure in the first decimal place the first decimal place index wheel will be clutched to the shaft and rotated. It will of course be understood that depression of the comma key or period key, or the depression of the naught or zero key will not cause the shifting of the selector longitudinally of its rod 62 or the release of the power mechanism, this being capable of being effected only by one of the nine numeral keys.

If it is desired to print numbers without the decimal point the selector will operate to permit the printing of the commas for pointing off. In such case the first or left hand index wheel of the nine usually used will be hundred millions wheel and no comma is to be written until after the third or millions wheel has been rotated, and the space key is operated to permit the carriage to advance one step after the dog 277 has been tripped. This permits the selector to rotate one step so as to bring pin 98$^b$ into line with finger 90 of the hundred millions index wheel and as the numeral keys are successively depressed to print successively the figures in the hundred millions, ten millions, and millions places, pins 98$^c$ and 98$^d$ are brought in line with the fingers 90 of the index wheels for the ten millions and the millions wheel respectively and the pin 98$^e$ is brought in line with the finger 90 of the hundred thousand index wheel. The comma being now to be printed the comma key is struck and released the selector being rotated one step bringing pin 98$^f$ in line with the finger 90 of the hundred thousand wheel so that as the proper numeral key is depressed and the selector shifted, the hundred thousand wheel will be clutched to the shaft 69 through the action of the pin 98$^f$. As the numeral keys are successively operated to print successively the figures in the hundred thousand, ten thousand and thousands index wheels, the pins 98$^g$, 98$^h$ and 98$^i$ are brought into line with the fingers 90 of the index wheels of the ten thousands, thousands and hundreds index wheels. On the operation of the comma key to print a comma after the thousands the selector is permitted to rotate to bring pin 98$^j$ in line with the finger 90 of the hundreds index wheel so that on the depression of a numeral key to print the figure in the hundreds place the index wheel will be clutched to the shaft 69 and rotated, and on the release of the key and the operation of the proper key for the printing of the figure in tens place the pins 98$^k$ and 98$^l$ will be brought in line with the fingers 90 of the index wheels for the tens and units.

It will of course be understood that while only nine index wheels are shown in each of the two sets, a larger number may be used if required and it will also be understood that as the selector is rotated the ring 97 adjacent the pin 98 which was last operated will be brought in contact with the lower end of depending lever 95 so that as the selector is again shifted the bell crank lever 88 last operated will be swung to normal position to withdraw the sliding clutch member if it is not already withdrawn by the action of the springs 102 and 103 through the locking pawls 100 and 101 and the lever 107 on the lateral arm 91 of the bell crank lever 88.

A cover plate 493 extends over the top of the calculating machine and a front plate 494 extends down over the front end the latter being provided in the front portion with apertures 495 through which the numerals on the flanges 71 of the index wheels may be seen. The front plate is also provided in the front portion below the apertures 495 with apertures 496 and on its under side with a slide 497 provided with projecting portions 496′ bearing indicating marks to indicate whether or not the numbers to be written are to be pointed off into periods of three figures each without the period between dollars and cents, or are to be so pointed off with the period between dollars and cents also. The right hand side plate 8 is preferably cut away on its lower edge at 499 for the winding lever.

A complete winding of the winding spring is designed to give sufficient power to operate the calculating mechanism for about 400 operations of the numeral keys which will ordinarily be more than sufficient for all that will be likely to be written on a full fools cap page though this will depend somewhat on the extent to which the higher numerals such as 7, 8 and 9 are written as more power is expended in adding or subtracting the higher numbers than the lower ones.

For convenience in assembling and disassembling the calculating mechanism the stationary rods 9, 10, 11, 12, 13, 14, 15, 16, 17, and 18 are detachably secured to the side plates 8 by means of screws 9′, 10′, 11′, 12′, 13′, 14′, 15′, 16′, 17′, and 18′ which pass through the side plates and enter screw threaded holes 9″, 10″, 11″, 12″, 13″, 14″, 15″, 16″, 17″ and 18″ in the ends of the respective rods. The rod 62 on which the selectors are mounted is secured at its ends in the side plates 8 by nuts 62′ so that on unscrewing one of these nuts the rod may be withdrawn endwise. The interior sustaining plates 19, 20, 23 and 24 are cut away at 19′, 20′, 23′, and 24′ respectively so as to permit the selectors 61 and 63 to be withdrawn forward when the rod 62 has been drawn out. By then withdrawing screws 9′, 10′ and 11′ the vertical plates and interior sustaining plates and the parts carried by them may be withdrawn bodily from the machine. By then removing screws 12′, 13′ and 14′ the vertical plates 121 with the terminal plate 122 and the parts carried by them also the base plate 27 and the parts carried by it, may be removed bodily.

The top plate is provided with openings 514 for the slotted arms 115 and with openings 515 directly above the ways 31 in the brackets 30. As the top plate fits snugly upon the brackets 30 the only openings in the top plate through which dust or dirt can enter are the openings 514 which are directly below the numeral key levers when the typewriting machine is in position to operate the calculating mechanism. When it is desired to clean the type of the typewriting machine the machine is pushed back to its rearward position so that the forward ends of the key levers will be above the openings 514 and any lint or dirt brushed from the type will fall on the top plate well to the rear of the openings and will not be likely to get into the calculating mechanism.

It should be noted that the operations effected by the depression of the numeral keys are not in any dependent upon any particular rate of depression it being essential only that the numeral key depressed shall be given a full stroke. So long as the numeral key is fully depressed it may be depressed quickly or slowly as the operator may prefer. When the slotted arms 115 are in their forward position the numeral keys may be operated precisely as the other keys of the machine as they then do nothing more than they would be required to do if the calculating mechanism were not present. When the slotted arms 115 are swung rearward to move the bent ends of the actuating rods 133 into the notches of the notched plates carried by the numeral keys the numeral keys have some additional work to do but the additional work thrown upon them is comparatively slight and is effected through cams which are so arranged as to effect the necessary movements of shifting the selector and releasing the power mechanism gradually and with the expenditure of the least possible additional force in depressing the numeral key.

Throughout the machine, as will be noted nearly all of the working parts except of course the larger gears and shafts are so formed that they can be readily made from sheet metal by punching to shape and subsequently bending to the desired form. All of the operating parts so far as possible such as levers, pawls and operating arms are so arranged that the operating portion is an edge rather than a flat side of the operating part. So far as possible the operating parts are arranged to be readily assembled upon fixed rods between vertical plates which are spaced apart by bent portions formed integrally therewith and for the purpose of any lateral play of the working parts, spacing devices either formed as lugs integrally with the working parts or separately therefrom are provided so that the flat sides of the working parts do not bear, except so far as may be desirable, against the flat sides of other working parts or against the flat sides of the vertical plates.

It will of course be understood that the invention is not limited to details of construction or to the form and proportion of parts as shown and described, as it is obvious that many changes in the form, shape, size and arrangement of parts may be made without departing from the spirit of the invention.

Having thus described my invention and explained the mode of operation thereof, I claim and desire to secure by Letters Patent:—

1. The combination with a wheel to be rotated, means normally disconnected from the wheel for rotating it and a connecting device for connecting the wheel with the rotating means, of a selector adapted to be movable in two directions transverse to each other and provided with means for operating the connecting device, means for moving the selector in one direction to bring its operating means into position to operate the connecting device, and means for moving the selector in a direction transverse to the direction of its first movement to cause its operating means to effect the operation of the connecting means.

2. The combination with a wheel to be rotated, means normally disconnected from the wheel for rotating it and a connecting device for connecting the wheel with the rotating means, of a selector adapted to be movable in two directions transverse to each other and provided with means for operating the connecting device, means for moving the selector in one direction to bring its operating means into position to operate the connecting device, means for moving the selector in a direction transverse to the direction of its first movement to cause its operating means to effect the operation of the connecting means, and means for operating the rotating means through a predetermined movement of rotation.

3. The combination with a wheel to be rotated, means normally disconnected from the wheel for rotating it and a connecting device for connecting the wheel with the rotating means, of a selector adapted to be movable in two directions transverse to each other and provided with means for operating the connecting device, means for moving the selector in one direction to bring its operating means into position to operate the connecting device, means for moving the selector in a direction transverse to the direction of its first movement to cause its operating means to effect the operation of the connecting means, means for operating the rotating means through a predetermined movement of rotation, and means for locking the selector against movement during the operation of the rotating means.

4. The combination with a wheel to be rotated, means normally disconnected from the wheel for rotating it, and a connecting device for connecting the wheel with the rotating means, a selector adapted to be movable in two directions transverse to each other and provided with means for operating the connecting device, means for moving the selector in one direction to bring its operating means into position to operate the connecting device, means for moving the selector in a direction transverse to the direction of its first movement to cause its operating means to effect the operation of the connecting means, and means for locking the selector against movement in the direction of its first movement during its second movement.

5. The combination with a wheel to be rotated, means normally disconnected from the wheel for rotating it, and a connecting device for connecting the wheel with the rotating means, a selector adapted to be movable in two directions transverse to each other and provided with means for operating the connecting device, means for moving the selector in one direction to bring its operating means into position to operate the connecting device, means for moving the selector in a direction transverse to the direction of its first movement to cause its operating means to effect the operation of the connecting means, means for returning the selector to the position in which it was at the beginning of the second movement and means for locking the selector against movement in the direction of the first movement during its second movement and the return movement.

6. The combination with a wheel to be rotated, means normally disconnected from the wheel for rotating it, and a connecting device for connecting the wheel with the rotating means, of a selector adapted to be movable in two directions transverse to each other and provided with means for operating the connecting device, means for moving the selector in one direction to bring its operating means into position to operate the connecting device, means for moving the selector in a direction transverse to the direction of its first movement to cause its operating means to effect the operation of the connecting means, means for operating the rotating means through a predetermined movement of rotation, and means for locking the selector against movement in the direction of its first movement during the operation of the rotating means.

7. The combination with a wheel to be rotated, means normally disconnected from the wheel for rotating it, and a connecting device for connecting the wheel with the rotating means, of a selector adapted to be movable in two directions transverse to each other and provided with means for operating the connecting device, means for moving the selector in one direction to bring its operating means into position to operate the connecting device, means for moving the selector in a direction transverse to the direction of its first movement to cause its operating means to effect the operation of the connecting means, means for operating the rotating means through a predetermined movement of rotation, means for returning the selector to the position in which it was at the beginning of its second movement, and means for locking the selector against such return during the operation of the rotating means.

8. The combination with a wheel to be rotated, means normally disconnected from the wheel for rotating it, and a connecting device for connecting the wheel with the rotating means, of a selector adapted to be movable in two directions transverse to each other and provided with means for operating the connecting device, means for moving the selector in one direction to bring its operating means into position to operate the connecting device, means for moving the selector in a direction transverse to the direction of its first movement to cause its operating means to effect the operation of the connecting means, means for operating the rotating means through a predetermined movement of rotation, means for returning the selector to the position in which it was at the beginning of its second movement, and means for locking the selector against movement in any direction during the operation of the rotating means.

9. The combination with a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means for rotating the selector to bring its operating means into position to operate the connecting device and means for shifting the selector longitudinally to cause its operating means to effect the operation of the connecting device.

10. The combination with a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means for rotating the selector to bring its operating means into position to operate the connecting device, means for shifting the selector longitudinally to cause its operating means to effect the operation of the connecting device, and means for operating the rotating means through a predetermined movement of rotation.

11. The combination with a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means for rotating the selector to bring its operating means into position to operate the connecting device, means for shifting the selector longitudinally to cause its operating means to effect the operation of the connecting device, means for operating the rotating means through a predetermined movement of rotation, and means for locking the selector against rotation during the shifting movement.

12. The combination with a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means for rotating the selector to bring its operating means in position to operate the connecting device, means for shifting the selector longitudinally to cause its operating means to effect the operation of the connecting device, means for operating the rotating means through a predetermined movement of rotation, means for locking the selector against rotation during the shifting movement, means for returning the selector to the position in which it was at the beginning of the shifting movement, and means for locking the selector against rotation during the shifting movement and the return movement.

13. The combination with a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means for rotating the selector to bring its operating device in position to operate the connecting device, means for shifting the selector longitudinally to cause its operating means to effect the operation of the connecting device, means for operating the rotating means through a predetermined movement of rotation, and means for locking the selector against rotation during the operation of the rotating means.

14. The combination with a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means for rotating the selector to bring its operating device in position to operate the connecting device, means for shifting the selector longitudinally to cause its operating means to effect the operation of the connecting device, means for operating the rotating means through a predetermined movement of rotation, means for returning the selector to the position in which it was at the beginning of the shifting movement and means for locking the selector against such return during the operation of the rotating means.

15. The combination with a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means for rotating the selector to bring its operating device in position to operate the connecting device, means for shifting the selector longitudinally to cause its operating means to effect the operation of the connecting device, means for operating the rotating means through a predetermined movement of rotation, means for returning the selector to the position in which it was at the beginning of the shifting movement, means for locking the selector against such return during the operation of the rotating means, and means for locking the selector against rotation during the operation of the rotating means.

16. The combination with a typewriting machine having a numeral key and a reciprocating paper carriage, of a calculating mechanism comprising a wheel to be rotated, means normally disconnected from the wheel for rotating it and a connecting device for connecting the wheel with the rotating means, a selector adapted to be movable in two directions transverse to each other and provided with means for operating the connecting device, means controlled by the movement of the paper carriage for moving the selector in one direction to bring its operating means into position to operate the connecting device, and means operated by the numeral key for moving the selector in a direction transverse to the direction of its first movement to cause its operating means to effect the operation of the connecting means.

17. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector adapted to be movable in two directions transverse to each other and provided with means for operating the connecting device, means controlled by the movement of the paper carriage for moving the selector in one direction to bring its operating means into position to operate the connecting device, means operated by the numeral key for moving the selector in a direction transverse to the direction of its first movement to cause its operating means to effect the operation of the connecting means, and means for operating the rotating means through a predetermined movement of rotation.

18. The combination with a typewriting machine having a numeral key and a reciprocating paper carriage, of a calculating mechanism comprising a wheel to be rotated, means normally disconnected from the wheel for rotating it and a connecting device for connecting the wheel with the rotating means, of a selector adapted to be movable in two directions transverse to each other and provided with means for operating the connecting device, means controlled by the movement of the paper carriage for moving the selector in one direction to bring its operating means into position to operate the connecting device, means operated by the numeral key for moving the selector in a direction transverse to the direction of its first movement to cause its operating means to effect the operation of the connecting means, means for operating the rotating means through a predetermined movement of rotation, and means for locking the selector against movement during the operation of the rotating means.

19. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, a selector adapted to be movable in two directions transverse to each other and provided with means for operating the connecting device, means controlled by the movement of the paper carriage for moving the selector in one direction to bring its operating means into position to operate the connecting device, means operated by the numeral key for moving the selector in a direction transverse to the direction of its first movement to cause its operating means to effect the operation of the connecting means, and means for locking the selector against movement in the direction of its first movement during its second movement.

20. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, a selector adapted to be movable in two directions transverse to each other and provided with means for operating the connecting device, means controlled by the movement of the paper carriage for moving the selector in one direction to bring its operating means into position to operate the connecting device, means operated by the numeral key for moving the selector in a direction transverse to the direction of its first movement to cause its operating means to effect the operation of the connecting means, means for returning the selector to the position in which it was at the beginning of the second movement, and means for locking the selector against movement in the direction of the first movement during its second movement and the return movement.

21. The combination with a typewriting machine having a numeral key and a reciprocating paper carriage, of a calculating mechanism comprising a wheel to be rotated, means normally disconnected from the wheel for rotating it and a connecting device for connecting the wheel with the rotating means, of a selector adapted to be movable in two directions transverse to each other and provided with means for operating the connecting device, means controlled by the movement of the paper carriage for moving the selector in one direction to bring its operating means into position to operate the connecting device, means operated by the numeral key for moving the selector in a direction transverse to the direction of its first movement to cause its operating means to effect the operation of the connecting means, means for operating the rotating means through a predetermined movement of rotation, and means for locking the selector against movement in the direction of its first movement during the operation of the rotating means.

22. The combination with a typewriting machine having a numeral key and a reciprocating paper carriage, of a calculating mechanism comprising a wheel to be rotated, means normally disconnecting it from the wheel for rotating it, and a connecting device for connecting the wheel with the rotating means, of a selector adapted to be movable in two directions transverse to each other and provided with means for operating the connecting device, means controlled by the movement of the paper carriage for moving the selector in one direction to bring its operating means into position to operate the connecting device, means operated by the numeral key for moving the selector in a direction transverse to the direction of its first movement to cause its operating means to effect the operation of the connecting means, means for operating the rotating means through a predetermined movement of rotation, means for returning the selector to the position in which it was at the beginning of its second movement, and means for locking the selector against such return during the operation of the rotating means.

23. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector adapted to be movable in two directions transverse to each other and provided with means for operating the connecting device, means controlled by the movement of the paper carriage for moving the selector in one direction to bring its operating means into position to operate the connecting device, means operated by the numeral key for moving the selector in a direction transverse to the direction of its first movement to cause its operating means to effect the operation of the connecting means, means for operating the rotating means through a predetermined movement of rotation, means for returning the selector to the position in which it was at the beginning of its second movement, and means for locking the selector against movement in any direction during the operation of the rotating means.

24. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector mounted to be capable of rotation and also capable of movement longitudinal of its axis and provided with means for operating the connecting device, means controlled by the movement of the paper carriage for rotating the selector to bring its operating means into position to operate the connecting device and means operated by the numeral key for shifting the selector longitudinally to cause its operating means to effect the operation of the connecting device.

25. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector mounted to be capable of rotation and also capable of movement longitudinal of its axis and provided with means for operating the connecting device, means controlled by the movement of the paper carriage for rotating the selector to bring its operating means into position to operate the connecting device, means operated by the numeral key for shifting the selector longitudinally to cause its operating means to effect the operation of the connecting device, and means for operating the rotating means through a predetermined movement of rotation.

26. The combination with a typewriting machine having a numeral key and a reciprocating paper carriage, of a calculating mechanism comprising a wheel to be rotated, means normally disconnected to the wheel for rotating it, and a connecting device for connecting the wheel with the rotating means, of a selector mounted to be capable of rotation and also capable of movement longitudinal of its axis and provided with means for operating the connecting device, means controlled by the movement of the paper carriage for rotating the selector to bring its operating means into position to operate the connecting device, means operated by the numeral key for shifting the selector longitudinally to cause its operating means to effect the operation of the connecting device, means for operating the rotating means through a predetermined movement of rotation, and means for locking the selector against rotation during the shifting movement.

27. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector mounted to be capable of rotation and also capable of movement longitudinal of its axis and provided with means for operating the connecting device, means controlled by the movement of the paper carriage for rotating the selector to bring its operating means in position to operate the connecting device, means operated by the numeral key for shifting the selector longitudinally to cause its operating means to effect the operation of the connecting device, means for operating the rotating means through a predetermined movement of rotation, means for locking the selector against rotation during the shifting movement, means for returning the selector to the position in which it was at the beginning of the shifting movement, and means for locking the selector against rotation during the shifting movement and the return movement.

28. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means controlled by the movement of the paper carriage for rotating the selector to bring its operating device in position to operate the connecting device, means operated by the numeral key for shifting the selector longitudinally to cause its operating means to effect the operation of the connecting device, means for operating the rotating means through a predetermined movement of rotation, and means for locking the selector against rotation during the operation of the rotating means.

29. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means controlled by the movement of the paper carriage for rotating the selector to bring its operating device in position to operate the connecting device, means operated by the numeral key for shifting the selector longitudinally to cause its operating means to effect the operation of the connecting device, means for operating the rotating means through a predetermined movement of rotation, means for returning the selector to the position in which it was at the beginning of the shifting movement and means for locking the selector against such return during the operation of the rotating means.

30. The combination with a typewriting machine having a numeral key and a reciprocating paper carriage, of a calculating mechanism comprising a wheel to be rotated, means normally disconnected from the wheel for rotating it, and a connecting device for connecting the wheel with the rotating means, of a selector mounted to be capable of rotation and also capable of movement longitudinally of its axis and provided with means for operating the connecting device, means controlled by the movement of the paper carriage for rotating the selector to bring its operating device in position to operate the connecting device, means operated by the numeral key for shifting the selector longitudinally to cause its operating means to effect the operation of the connecting device, means for operating the rotating means through a predetermined movement of rotation, means for returning the selector to the position in which it was at the beginning of the shifting movement, and means for locking the selector against such return during the operation of the rotating means, and means for locking the selector against rotation during the operation of the rotating means.

31. The combination with a series of wheels to be rotated, a shaft for rotating them, and a series of separate clutching devices for operatively connecting the wheels with the shaft, of a selector for operating the clutching devices as desired, means for moving the selector to bring it into position to operate the clutching device of the wheel selected, and means for subsequently shifting the selector to effect the operation of such clutching device.

32. The combination with a series of wheels to be rotated, a shaft for rotating them, and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, and means for rotating the shaft through a predetermined movement of rotation.

33. The combination with a series of wheels to be rotated, a shaft for rotating them, and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, means for rotating the shaft through a predetermined movement of rotation, and means for locking the selector against movement during the rotation of the shaft.

34. The combination with a series of wheels to be rotated, a shaft for rotating them and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, and means carried by the selector for holding out of operative position, when the selector is shifted, the clutching devices other than that of the wheel selected.

35. The combination with a series of wheels to be rotated, a shaft for rotating them and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching devices, means carried by the selector for holding out of operative position, when the selector is shifted, the clutching devices other than that of the wheel selected, and means for rotating the shaft through a predetermined movement of rotation.

36. The combination with a series of wheels to be rotated, a shaft for rotating them and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, means carried by the selector for holding out of operative position, when the selector is shifted, the clutching devices other than that of the wheel selected, means for rotating the shaft through a predetermined movement of rotation, and means for locking the selector against movement during the rotation of the shaft.

37. The combination with a series of wheels to be rotated, a shaft for rotating them, and a series of separate clutching devices for operatively connecting the wheels with the shaft, of a selector for operating the clutching devices as desired, means for rotating the selector to bring it into position to operate the clutching device of the wheel selected, and means for subsequently shifting the selector longitudinally of its axis to effect the operation of such clutching device.

38. The combination with a series of wheels to be rotated, a shaft for rotating them, and a series of separate clutching devices for operatively connecting the wheels with the shaft, of a selector for operating the clutching devices as desired, means for rotating the selector to bring it into position to operate the clutching device of the wheel selected, means for subsequently shifting the selector longitudinally of its axis to effect the operation of such clutching device, and means for rotating the shaft through a predetermined movement of rotation.

39. The combination with a series of wheels to be rotated, a shaft for rotating them, and a series of separate clutching devices for operatively connecting the wheels with the shaft, of a selector for operating the clutching devices as desired, means for rotating the selector to bring it into position to operate the clutching device of the wheel selected, means for subsequently shifting the selector longitudinally of its axis to effect the operation of such clutching device, means for rotating the shaft through a predetermined movement of rotation, and means for locking the selector against movement during the rotation of the shaft.

40. The combination with a series of wheels to be rotated, a shaft for rotating them and a series of separate clutching devices for operatively connecting the wheels with the shaft, of a selector for operating the clutching devices as desired, means for rotating the selector to bring it into position to operate the clutching device of the wheel selected, means for subsequently shifting the selector longitudinally of its axis to effect the operation of such clutching device, and means carried by the selector for holding out of operative position, when the selector is shifted, the clutching devices other than that of the wheel selected.

41. The combination with a series of wheels to be rotated, a shaft for rotating them and a series of separate clutching devices for operatively connecting the wheels with the shaft, of a selector for operating the clutching devices as desired, means for rotating the selector to bring it into position to operate the clutching device of the wheel selected, means for subsequently shifting the selector longitudinally of its axis to effect the operation of such clutching device, means carried by the selector for holding out of operative position, when the selector is shifted, the clutching devices other than that of the wheel selected, and means for rotating the shaft through a predetermined movement of rotation.

42. The combination with a series of wheels to be rotated, a shaft for rotating them and a series of separate clutching devices for operatively connecting the wheels with the shaft, of a selector for operating the clutching devices as desired, means for rotating the selector to bring it into position to operate the clutching device of the wheel selected, means for subsequently shifting the selector longitudinally of its axis to effect the operation of such clutching device, means carried by the selector for holding out of operative position, when the selector is shifted, all of the clutching devices except that of the wheel selected, means for rotating the shaft through a predetermined movement of rotation, and means for locking the selector against movement during the rotation of the shaft.

43. The combination with a series of wheels to be rotated arranged in line a shaft coaxial with the wheels and extending through the series for rotating them, and a series of separate clutching devices for operatively connecting the wheels with the shaft, of a selector for operating the clutching devices as desired, means for moving the selector to bring it into position to operate the clutching device of the wheel selected, and means for subsequently shifting the selector to effect the operation of such clutching device.

44. The combination with a series of wheels to be rotated arranged in line, a shaft coaxial with the wheels and extending through the series for rotating them, and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, and means for rotating the shaft through a predetermined movement of rotation, controlled by the means for shifting the selector.

45. The combination with a series of wheels to be rotated arranged in line, a shaft for rotating them coaxial with the wheels and extending through the series, and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, means for rotating the shaft through a predetermined movement of rotation, and means for locking the selector against movement during the rotation of the shaft.

46. The combination with a series of wheels to be rotated arranged in line, a shaft for rotating them coaxial with the wheels and extending through the series, and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, and means carried by the selector for holding out of operative position, when the selector is shifted, the clutching devices other than that of the wheel selected.

47. The combination with a series of wheels to be rotated arranged in line, a shaft for rotating them coaxial with the wheels and extending through the series and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, means carried by the selector for holding out of operative position, when the selector is shifted, the clutching devices other than that of the wheel selected, and means for rotating the shaft through a predetermined movement of rotation.

48. The combination with a series of wheels to be rotated arranged in line, a shaft for rotating them coaxial with the wheels and extending through the series and a series of separate clutching devices for operatively connecting the wheels with the shaft, of a selector for operating the clutching devices as desired, means for moving the selector to bring it into position to operate the clutching device of the wheel selected, means for subsequently shifting the selector to effect the operation of such clutching device, means carried by the selector for holding out of operative position, when the selector is shifted, the clutching devices other than that of the wheel selected, means for rotating the shaft through a predetermined movement of rotation, and means for locking the selector against movement during the rotation of the shaft.

49. The combination with a wheel to be rotated, a shaft normally disconnected from the wheel for rotating it and a sliding clutch member carried by the shaft for connecting the wheel with the shaft, of a selector adapted to be movable in two directions at right angles to each other and provided with a projection for operating the clutch member, means for moving the selector in one direction to bring its projection into position to operate the sliding clutch member, and means for moving the selector in a direction at right angles to the direction of its first movement to cause its projection to effect the operation of the sliding clutch member.

50. The combination with a wheel to be rotated, a shaft normally disconnected from the wheel for rotating it and a sliding clutch member carried by the shaft for connecting the wheel with the shaft, of a selector adapted to be movable in two directions at right angles to each other and provided with a projection for operating the sliding clutch member, means for moving the selector in one direction to bring its projection into position to operate the sliding clutch member, means for moving the selector in a direction at right angles to the direction of its first movement to cause its projection to effect the operation of the sliding clutch member, and means for rotating the shaft through a predetermined movement of rotation.

51. The combination with a wheel to be rotated, a shaft normally disconnected from the wheel for rotating it and a sliding clutch member carried by the shaft for connecting the wheel with the shaft, of a selector adapted to be movable in two directions at right angles to each other and provided with a projection for operating the sliding clutch member, means for moving the selector in one direction to bring its projection into position to operate the connecting device, means for moving the selector in a direction at right angles to the direction of its first movement to cause its projection to effect the operation of the sliding clutch member, means for rotating the shaft through a predetermined movement of rotation, and means for locking the selector against movement during the rotation of the shaft.

52. The combination with a wheel to be rotated, a shaft normally disconnected from the wheel for rotating it, and a sliding clutch member for connecting the wheel with the shaft, a selector adapted to be movable in two directions at right angles to each other and provided with a projection for operating the sliding clutch member, means for moving the selector in one direction to bring its projection into position to operate the sliding clutch member, means for moving the selector in a direction at right angles to the direction of its first movement to cause its projection to effect the operation of the sliding clutch member, and means for locking the selector against movement in the direction of its first movement during its second movement.

53. The combination with a wheel to be rotated, a shaft normally disconnected from the wheel for rotating it, and a sliding clutch member for connecting the wheel with the shaft, a selector adapted to be movable in two directions at right angles to each other and provided with a projection for operating the sliding clutch member, means for moving the selector in one direction to bring its projection into position to operate the sliding clutch member, means for moving the selector in a direction at right angles to the direction of its first movement to cause its projection to effect the operation of the sliding clutch member; means for returning the selector to the position in which it was at the beginning of the second movement and means for locking the selector against movement in the direction of the first movement during its second movement and the return movement.

54. The combination with a wheel to be rotated, a shaft normally disconnected from the wheel for rotating it, and a sliding clutch member for connecting the wheel with the shaft, of a selector adapted to be movable in two directions at right angles to each other and provided with a projection for operating the sliding clutch member, means for moving the selector in one direction to bring its projection into position to operate the sliding clutch member, means for moving the selector in a direction at right angles to the direction of its first movement to cause its projection to effect the operation of the sliding clutch member, means for rotating the shaft through a predetermined movement of rotation and means for locking the selector against movement in the direction of its first movement during the rotation of the shaft.

55. The combination with a wheel to be rotated, a shaft normally disconnected from the wheel for rotating it, and a sliding clutch member for connecting the wheel with the shaft, of a selector adapted to be movable in two directions at right angles to each other and provided with a projection for operating the connecting device, means for moving the selector in one direction to bring its projection into position to operate the sliding clutch member, means for moving the selector in a direction at right angles to the direction of its first movement to cause its projection to effect the operation of the sliding clutch member, means for rotating the shaft through a predetermined movement of rotation, means for returning the selector to the position in which it was at the beginning of its second movement, and means for locking the selector against such return during the rotation of the shaft.

56. The combination with a wheel to be rotated, a shaft normally disconnected from the wheel for rotating it, and a sliding clutch member for connecting the wheel with the shaft, of a selector adapted to be movable in two directions at right angles to each other and provided with a projection for operating the connecting device, means for moving the selector in one direction to bring its projection into position to operate the sliding clutch member, means for moving the selector in a direction a right angles to the direction of its first movement to cause its projection to effect the operation of the sliding clutch member, means for rotating the shaft through a predetermined movement of rotation, means for returning the selector to the position in which it was at the beginning of its second movement, and means for locking the selector against movement in any direction during the rotation of the shaft.

57. The combination with a wheel to be rotated, a shaft normally disconnected from the wheel for rotating it, and a sliding clutch member for connecting the wheel with the shaft, of a selector mounted to be capable of rotation and also capable of movement longitudinal of its axis and provided with a projection for operating the sliding clutch member, means for rotating the selector to bring its projection into position to operate the sliding clutch member and means for shifting the selector longitudinally to cause its projection to effect the operation of the sliding clutch member.

58. The combination with a wheel to be rotated, a shaft normally disconnected with the wheel for rotating it, and a sliding clutch member for connecting the wheel with the shaft, of a selector mounted to be capable of rotation and also capable of movement longitudinal of its axis and provided with means for operating the sliding clutch member, means for rotating the selector to bring its projection into position to operate the sliding clutch member, means for shifting the selector longitudinally to cause its projection to effect the operation of the sliding clutch member, and means for rotating the shaft through a predetermined movement of rotation.

59. The combination with a wheel to be rotated, a shaft normally disconnected from the wheel for rotating it, and a sliding clutch member for connecting the wheel with the shaft, of a selector mounted to be capable of rotation and also capable of movement longitudinal of its axis and provided with a projection for operating the sliding clutch member, means for rotating the selector to bring its projection in position to operate the sliding clutch member, means for shifting the selector longitudinally to cause its projection to effect the operation of the sliding clutch member, means for rotating the shaft through a predetermined movement of rotation, and means for locking the selector against rotation during the shifting movement.

60. The combination with a wheel to be rotated, a shaft normally disconnected from the wheel for rotating it, and a sliding clutch member for connecting the wheel with the shaft, of a selector mounted to be capable of rotation and also capable of movement longitudinal of its axis and provided with a projection for operating the sliding clutch member, means for rotating the selector to bring its projection in position to operate the sliding clutch member, means for shifting the selector longitudinally to cause its projection to effect the operation of the sliding clutch member, means for rotating the shaft through a predetermined movement of rotation, means for locking the selector against rotation during the shifting movement, means for returning the selector to the position in which it was at the beginning of the shifting movement, and means for locking the selector against rotation during the shifting movement and the return movement.

61. The combination with a wheel to be rotated, a shaft normally disconnected from the wheel for rotating it, and a sliding clutch member for connecting the wheel with the shaft, of a selector mounted to be capable of rotation and also capable of movement longitudinally of its axis and provided with a projection for operating the sliding clutch member, means for rotating the selector to bring its projection in position to operate the sliding clutch member, means for shifting the selector longitudinally to cause its projection to effect the operation of the sliding clutch member, means for rotating the shaft through a predetermined movement of rotation, and means for locking the selector against rotation during the rotation of the shaft.

62. The combination with a wheel to be rotated, a shaft normally disconnected from the wheel for rotating it, and a sliding clutch member for connecting the wheel with the shaft, of a selector mounted to be capable of rotation and also capable of movement longitudinally of its axis and provided with a projection for operating the sliding clutch member, means for rotating the selector to bring its projection in position to operate the sliding clutch member, means for shifting the selector longitudinally to cause its projection to effect the operation of the sliding clutch member, means for rotating the shaft through a predetermined movement of rotation, means for returning the selector to the position in which it was at the beginning of the shifting movement and means for locking the selector against such return during the rotation of the shaft.

63. The combination with a wheel to be rotated, a shaft normally disconnected from the wheel for rotating it, and a sliding clutch member for connecting the wheel with the shaft, of a selector mounted to be capable of rotation and also capable of movement longitudinally of its axis and provided with a projection for operating the sliding clutch member, means for rotating the selector to bring its projection in position to operate the sliding clutch member, means for shifting the selector longitudinally to cause its projection to effect the operation of the sliding clutch member, means for rotating the shaft through a predetermined movement of rotation, means for returning the selector to the position in which it was at the beginning of the shifting movement, means for locking the selector against such return during the rotation of the shaft, and means for locking the selector against rotation during the rotation of the shaft.

64. The combination with a wheel to be rotated, means for normally locking the wheel against rotation, means normally disconnected from the wheel for rotating it and a connecting device for connecting the wheel with the rotating means, a selector adapted to be movable in two directions transverse to each other and provided with means for simultaneously unlocking the wheel and operating the connecting device, means for moving the selector in one direction to bring its operating means into position to unlock the wheel and operate the connecting device, and means for moving the selector in a direction transverse to the direction of its first movement to cause its operating means to effect the unlocking of the wheel and the operation of the connecting means.

65. The combination with a wheel to be rotated, means for normally locking the wheel against rotation, means normally disconnected from the wheel for rotating it and a connecting device for connecting the wheel with the rotating means, of a selector adapted to be movable in two directions transverse to each other and provided with means for simultaneously unlocking the wheel and operating the connecting device, means for moving the selector in one direction to bring its operating means into position to unlock the wheel and operate the connecting device, means for moving the selector in a direction transverse to the direction of its first movement to cause its operating means to effect the unlocking of the wheel and the operation of the connecting means, and means for operating the rotating means through a predetermined movement of rotation.

66. The combination with a wheel to be rotated, means for normally locking the wheel against rotation, means normally disconnected from the wheel for rotating it, and a connecting device for connecting the wheel with the rotating means, of a selector adapted to be movable in two directions transverse to each other and provided with means for simultaneously unlocking the wheel and operating the connecting device, means for moving the selector in one direction to bring its operating means into position, means for moving the selector in a direction transverse to the direction of its first movement to cause its operating means to effect the unlocking of the wheel and the operation of the connecting means, means for operating the rotating means through a predetermined movement of rotation, and means for locking the selector against movement during the operation of the rotating means.

67. The combination with a wheel to be rotated, means for normally locking the wheel against rotation, means normally disconnected with the wheel for rotating it, and a connecting device for connecting the wheel with the rotating means, a selector adapted to be movable in two directions transverse to each other and provided with means for simultaneously unlocking the wheel and operating the connecting device, means for moving the selector in one direction to bring its operating means into position, means for moving the selector in a direction transverse to the direction of its first movement to cause its operating means to effect the unlocking of the wheel and the operation of the connecting means, and means for locking the selector against movement in the direction of its first movement during its second movement.

68. The combination with a wheel to be rotated, means for normally locking the wheel against rotation, means normally disconnected from the wheel for rotating it, and a connecting device for connecting the wheel with the rotating means, a selector adapted to be movable in two directions transverse to each other and provided with means for simultaneously unlocking the wheel and operating the connecting device, means for moving the selector in one direction to bring its operating means into position, means for moving the selector in a direction transverse to the direction of its first movement to cause its operating means to effect the unlocking of the wheel and the operation of the connecting means, means for returning the selector to the position in which it was at the beginning of the second movement and means for locking the selector against movement in the direction of the first movement during its second movement and the return movement.

69. The combination with a wheel to be rotated, means for normally locking the wheel against rotation, means normally disconnected from the wheel for rotating it, and a connecting device for connecting the wheel with the rotating means, of a selector adapted to be movable in two directions transverse to each other and provided with means for simultaneously unlocking the wheel and operating the connecting device, means for moving the selector in one direction to bring its operating means into position, means for moving the selector in a direction transverse to the direction of its first movement to cause its operating means to effect the unlocking of the wheel and the operation of the connecting means, means for operating the rotating means through a predetermined movement of rotation and means for locking the selector against movement in the direction of its first movement during the operation of the rotating means.

70. The combination with a wheel to be rotated, means for normally locking the wheel against rotation, means normally disconnected from the wheel for rotating it, and a connecting device for connecting the wheel with the rotating means, of a selector adapted to be movable in two directions transverse to each other and provided with means for unlocking the wheel and operating the connecting device, means for moving the selector in one direction to bring its operating means into position, means for moving the selector in a direction transverse to the direction of its first movement to cause its operating means to effect the unlocking of the wheel and the operation of the connecting means, means for operating the rotating means through a predetermined movement of rotation, means for returning the selector to the position in which it was at the beginning of its second movement, and means for locking the selector against such return during the operation of the rotating means.

71. The combination with a wheel to be rotated, means for normally locking the wheel against rotation, means normally disconnected from the wheel for rotating it, and a connecting device for connecting the wheel with the rotating means, of a selector adapted to be movable in two directions transverse to each other and provided with means for unlocking the wheel and operating the connecting device, means for moving the selector in one direction to bring its operating means into position, means for moving the selector in a direction transverse to the direction of its first movement to cause its operating means to effect the unlocking of the wheel and the operation of the connecting means, means for operating the rotating means through a predetermined movement of rotation, means for returning the selector to the position in which it was at the beginning of its second movement, and means for locking the selector against movement in any direction during the operation of the rotating means.

72. The combination with a wheel to be rotated, means for normally locking the wheel against rotation, means normally disconnected from the wheel for rotating it, and a connecting device for connecting the wheel with the rotating means, of a selector mounted to be capable of rotation and also capable of movement longitudinal of its axis and provided with means for unlocking the wheel and operating the connecting device, means for rotating the selector to bring its operating means into position, and means for shifting the selector longitudinally to cause its operating means to effect the unlocking of the wheel and the operation of the connecting device.

73. The combination with a wheel to be rotated, means for normally locking the wheel against rotation, means normally disconnected from the wheel for rotating it, and a connecting device for connecting the wheel with the rotating means, of a selector mounted to be capable of rotation and also capable of movement longitudinally of its axis and provided with means for unlocking the wheel and operating the connecting device, means for rotating the selector to bring its operating means into position, means for shifting the selector longitudinally to cause its operating means to effect the unlocking of the wheel and the operation of the connecting device, and means for operating the rotating means through a predetermined movement of rotation.

74. The combination with a wheel to be rotated, means for normally locking the wheel against rotation, means normally disconnected from the wheel for rotating it, and a connecting device for connecting the wheel with the rotating means, of a selector mounted to be capable of rotation and also capable of movement longitudinal of its axis and provided with means for unlocking the wheel and operating the connecting device, means for rotating the selector to bring its operating means into position, means for shifting the selector longitudinally to cause its operating means to effect the unlocking of the wheel and the operation of the connecting device, means for operating the rotating means through a predetermined movement of rotation, and means for locking the selector against rotation during the shifting movement.

75. The combination with a wheel to be rotated, means for normally locking the wheel against rotation, means normally disconnected from the wheel for rotating it, and a connecting device for conducting the wheel with the rotating means, of a selector mounted to be capable of rotation and also capable of movement longitudinal of its axis and provided with means for unlocking the wheel and operating the connecting device, means for rotating the selector to bring its operating means in position, means for shifting the selector longitudinally to cause its operating means to effect the unlocking of the wheel and the operation of the connecting device, means for operating the rotating means through a predetermined movement of rotation, means for locking the selector against rotation during the shifting movement, means for returning the selector to the position in which it was at the beginning of the shifting movement, and means for locking the selector against rotation during the shifting movement and the return movement.

76. The combination with a wheel to be rotated, means for normally locking the wheel against rotation, means normally disconnected from the wheel for rotating it, and a connecting device for connecting the wheel with the rotating means, of a selector mounted to be capable of rotation and also capable of movement longitudinally of its axis and provided with means for unlocking the wheel and operating the connecting device, means for rotating the selector to bring its operating device in position, means for shifting the selector longitudinally to cause its operating means to effect the unlocking of the wheel and the operation of the connecting device, means for operating the rotating means through a predetermined movement of rotation, and means for locking the selector against rotation during the operation of the rotating means.

77. The combination with a wheel to be rotated, means for normally locking the wheel against rotation, means normally disconnected from the wheel for rotating it, and a connecting device for connecting the wheel with the rotating means, of a selector mounted to be capable of rotation and also capable of movement longitudinally of its axis and provided with means for unlocking the wheel and operating the connecting device, means for rotating the selector to bring its operating device in position, means for shifting the selector longitudinally to cause its operating means to effect the unlocking of the wheel and the operation of the connecting device, means for operating the rotating means through a predetermined movement of rotation, means for returning the selector to the position in which it was at the beginning of the shifting movement and means for locking the selector against such return during the operation of the rotating means.

78. The combination with a wheel to be rotated, means for normally locking the wheel against rotation, means normally disconnected from the wheel for rotating it, and a connecting device for connecting the wheel with the rotating means, of a selector mounted to be capable of rotation and also capable of movement longitudinally of its axis and provided with means for unlocking the wheel and operating the connecting device, means for rotating the selector to bring its operating device into position, means for shifting the selector longitudinally to cause its operating means to effect the unlocking of the wheel and the operation of the connecting device, means for operating the rotating means through a predetermined movement of rotation, means for returning the selector to the position in which it was at the beginning of the shifting movement, means for locking the selector against such return during the operation of the rotating means, and means for locking the selector against rotation during the operation of the rotating means.

79. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, and means for moving the selector in a direction transverse to the direction of its first movement to cause the projection to effect the unlocking of the wheel and the operation of the connecting device.

80. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, and means for operating the rotating means through a predetermined movement of rotation.

81. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for operating the rotating means through a predetermined movement of rotation, and means for locking the selector against movement during the operation of the rotating means.

82. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for operating the rotating means through a predetermined movement of rotation, and means for locking the selector against movement in the direction of its first movement during its second movement.

83. The combination with a series of wheels to be rotated, a separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for returning the selector to the position in which it was at the beginning of its second movement, and means for locking the selector against movement in the direction of its first movement during its second movement and the return movement.

84. The combination with a series of wheels to be rotated, a separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction, to bring a projection into position, means for moving the selector in a direction transverse to the direction of its first movement to cause the projection to effect the unlocking of the wheel and the operation of the connecting device, means for operating the rotating means through a predetermined movement of rotation, means for returning the selector to the position in which it was at the beginning of its second movement, and means for locking the selector against such return during the operation of the rotating means.

85. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, and means operated by the second movement of the selector for holding out of operative position the connecting means of the wheels other than the one selected.

86. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for operating the rotating means through a predetermined movement of rotation, and means operated by the second movement of the selector for holding out of operation, during the operation of the rotating means, the connecting means of the wheels other than the one selected.

87. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for operating the rotating means through a predetermined movement of rotation, means operated by the second movement of the selector for holding out of operation, during the operation of the rotating means, the connecting means of the wheels other than the one selected, and means for locking the selector against movement in the direction of its first movement, during the operation of the rotating means.

88. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for operating the rotating means through a predetermined movement of rotation, means operated by the second movement of the selector for holding out of operation, during the operation of the rotating means, the connecting means of the wheels other than the one selected, means for returning the selector to the position in which it was at the beginning of its second movement, and means for locking the selector against movement in the direction of its first movement during its second movement and its return movement.

89. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for operating the rotating means through a predetermined movement of rotation, means operated by the second movement of the selector for holding out of operation, during the operation of the rotating means, the connecting means of the wheels other than the one selected, means for returning the selector to the position in which it was at the beginning of its second movement, and means for locking the selector against the return movement until the operation of the rotating means has taken place.

90. The combination with a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means for moving the selector in one direction to bring a projection into position, means for moving the selector in a direction transverse to the direction of its first movement to cause the projection to effect the unlocking of the wheel and the operation of the connecting device, means for operating the rotating means through a predetermined movement of rotation, means operated by the second movement of the selector for holding out of operation, during the operation of the rotating means, the connecting means of the wheels other than the one selected, means for returning the selector to the position in which it was at the beginning of its second movement, means for holding the selector against movement in the direction of its first movement during its second movement and its return, and means for locking the selector against the return movement until the operation of the rotating means has taken place.

91. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate its connecting means, means for rotating the selector to bring a projection into position, and means for shifting the selector longitudinally of its axis to cause the projection to effect the unlocking of the wheel and the operation of the connecting device.

92. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate its connecting means, means for rotating the selector to bring a projection into position, means for shifting the selector longitudinally of its axis to cause the projection to effect the unlocking of the wheel and the operation of the connecting device, and means for operating the rotating means through a predetermined movement of rotation.

93. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate the connecting means, means for rotating the selector to bring a projection into position, means for shifting the selector longitudinally of its axis to cause the projection to effect the unlocking of the wheel and the operation of the connecting device, and means operated by the shifting of the selector for holding out of operative position the connecting means of the wheels other than the one selected.

94. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate its connecting means, means for rotating the selector to bring a projection into position, means for shifting the selector longitudinally of its axis to cause the projection to effect the unlocking of the wheel and the operation of the connecting device, means for operating the rotating means through a predetermined movement of rotation, and means operated by the shifting of the selector for holding out of operative position the connecting means of the wheels other than the one selected.

95. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate its connecting means, means for rotating the selector to bring a projection into position, means for shifting the selector longitudinally of its axis to cause the projection to effect the unlocking of the wheel and the operation of the connecting device, means for operating the rotating means through a predetermined movement of rotation, and means for locking the selector against rotation during the operation of the rotating means.

96. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate its connecting means, means for rotating the selector to bring a projection into position, means for shifting the selector longitudinally of its axis to cause the projection to effect the unlocking of the wheel and the operation of the connecting device, and means for locking the selector against rotation during its shifting movement.

97. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate its connecting means, means for rotating the selector to bring a projection into position, means for shifting the selector longitudinally of its axis to cause the projection to effect the unlocking of the wheel and the operation of the connecting device, means operated by the shifting of the selector for holding out of operative position the connecting means of the wheels other than the one selected, and means for locking the selector against rotation during the shifting movement.

98. The combination with a series of wheels to be rotated, separate locking means for each wheel normally locking it against rotation, means normally disconnected from the wheels for rotating them, and separate connecting means for each wheel to connect it with the rotating means, of a selector mounted to be capable of rotation and also capable of movement longitudinal of its axis and provided with a series of projections each adapted to unlock one of the wheels and operate its connecting means, means for rotating the selector to bring a projection into position, means for shifting the selector longitudinally of its axis to cause the projection to effect the unlocking of the wheel and the operation of the connecting device, means for operating the rotating means through a predetermined movement of rotation, means operated by the shifting of the selector for holding out of operative position the connecting means of the wheels other than the one selected, and means for locking the selector against rotation during its shifting movement.

99. The combination with a typewriting machine having numeral keys and a reciprocating paper carriage, of a calculating mechanism comprising a series of wheels to be rotated, means normally disconnected from the wheels for rotating them and a separate connecting device for each wheel for connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, and means operated by any one of the numeral keys for moving the selector in a direction transverse to the direction of its first movement to cause its projection to effect the operation of the connecting means of the wheel selected.

100. The combination with a typewriting machine having numeral keys and a reciprocating paper carriage, of a calculating mechanism comprising a series of wheels to be rotated, means normally disconnected from the wheels for rotating them and a separate connecting device for each wheel for connecting it with the rotating means, and a selector adapted to be movable in two directions transverse to each other and provided with a series of projections for operating the connecting devices, means controlled by the movement of the paper carriage for moving the selector in one direction to bring one of its projections into position to operate a connecting device, means operated by any one of the numeral keys for moving the selector in a direction transverse to the direction of its first movement to cause the projection to effect the operation of the connecting means, and means for operating the rotating means through a predetermined movement of rotation.

101. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector adapted to be movable in two directions transverse to each other and provided with a series of projections for operating the connecting devices, means controlled by the movement of the paper carriage for moving the selector in one direction to bring one of its projections in position to operate a connecting device, means operated by the numeral key for moving the selector in a direction transverse to the direction of its first movement to cause the projection to effect the operation of the connecting means, means for operating the rotating means through a predetermined movement of rotation, and means for locking the selector against movement during the operation of the rotating means.

102. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by any one of the numeral keys for moving the selector in a direction transverse to the direction of its first movement to cause its projection to effect the operation of the connecting means of the wheel selected, and means for locking the selector against movement in the direction of its first movement during its second movement.

103. The combination with a typewriting machine having numeral keys and a reciprocating paper carriage, of a calculating mechanism comprising a series of wheels to be rotated, means normally disconnected from the wheels for rotating them and a separate connecting device for each wheel connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, means for returning the selector to the position in which it was at the beginning of its second movement, and means for locking the selector against movement in the direction of its first movement during its second movement and the return movement.

104. The combination with a typewriting machine having numeral keys and a reciprocating paper carriage, of a calculating mechanism comprising a series of wheels to be rotated, means normally disconnected from the wheels for rotating them and a separate connecting device for each wheel for connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, means for operating the rotating means through a predetermined movement of rotation, and means for locking the selector against movement in the direction of its first movement during the operation of the rotating means.

105. The combination with a typewriting machine having numeral keys and a reciprocating paper carriage, of a calculating mechanism comprising a series of wheels to be rotated, means normally disconnected from the wheels for rotating them and a separate connecting device for each wheel connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, means for returning the selector to the position in which it was at the beginning of its second movement, and means for locking the selector against movement in the direction of its first movement during its second movement.

106. The combination with a typewriting machine having numeral keys and a reciprocating paper carriage, of a calculating mechanism comprising a series of wheels to be rotated, means normally disconnected from the wheels for rotating them and a separate connecting device for each wheel connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, means for operating the rotating means through a predetermined movement of rotation, means for returning the selector to the position in which it was at the beginning of its second movement, and means for locking the selector against movement in the direction of its first movement during its second movement.

107. The combination with a typewriting machine having numeral keys and a reciprocating paper carriage, of a calculating mechanism comprising a series of wheels to be rotated, means normally disconnected from the wheels for rotating them and a separate connecting device for each wheel connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, and means operated by the second movement of the selector for holding out of operative position the connecting devices of the wheels other than the one selected.

108. The combination with a typewriting machine having numeral keys and a reciprocating paper carriage, of a calculating mechanism comprising a series of wheels to be rotated, means normally disconnected from the wheels for rotating them and a separate connecting device for each wheel connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, means for operating the rotating means through a predetermined movement of rotation, and means operated by the second movement of the selector for holding out of operative position the connecting devices of the wheels other than the one selected.

109. The combination with a typewriting machine having numeral keys and a reciprocating paper carriage, of a calculating mechanism comprising a series of wheels to be rotated, means normally disconnected from the wheels for rotating them and a separate connecting device for each wheel connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, means for operating the rotating means through a predetermined movement of rotation, means for locking the selector against movement in the direction of its first movement during its second movement, and means operated by the second movement of the selector for holding out of operative position the connecting devices of the wheels other than the one selected.

110. The combination with a typewriting machine having numeral keys and a reciprocating paper carriage, of a calculating mechanism comprising a series of wheels to be rotated, means normally disconnected from the wheels for rotating them and a separate connecting device for each wheel connecting it with the rotating means, a selector adapted to be movable in two directions transverse to each other and provided with a series of projections for operating the connecting devices, means controlled by the movement of the paper carriage for moving the selector in one direction to bring a projection into position to operate a connecting device, means operated by one of the numeral keys for moving the selector in a direction transverse to the direction of its first movement to cause its projection to effect the operation of the connecting means of the wheel selected, means for locking the selector against movement in the direction of its first movement during its second movement, and means operated by the second movement of the selector for holding out of operative position, the connecting devices of the wheels other than the one selected.

111. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation and also capable of movement longitudinal of its axis and provided with a series of projections for operating the connecting devices, means controlled by the movement of the paper carriage for rotating the selector to bring a projection into position to operate the connecting device, means operated by a numeral key for shifting the selector longitudinally to cause the projection to effect the operation of the connecting device of the wheel selected.

112. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation and also capable of movement longitudinal of its axis and provided with a series of projections for operating the connecting device, means controlled by the movement of the paper carriage for rotating the selector to bring a projection into position to operate the connecting device, means operated by a numeral key for shifting the selector longitudinally to cause the projection to effect the operation of the connecting device, and means for operating the rotating means through a predetermined movement of rotation.

113. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation and also capable of movement longitudinal of its axis and provided with a series of projections for operating the connecting device, means controlled by the movement of the paper carriage for rotating the selector to bring a projection into position to operate the connecting device, means operated by a numeral key for shifting the selector longitudinally to cause the projection to effect the operation of the connecting device, means for operating the rotating means through a predetermined movement of rotation, and means for locking the selector against movement during the operation of the rotating means.

114. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation and also capable of movement longitudinal of its axis and provided with a series of projections for operating the connecting devices, means controlled by the movement of the paper carriage for rotating the selector to bring a projection into position to operate the connecting device, means operated by the numeral key for shifting the selector longitudinally to cause the projection to effect the operation of the connecting device, means for operating the rotating means through a predetermined movement of rotation, and means for locking the selector against rotation during its shifting movement.

115. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation and also capable of movement longitudinal of its axis and provided with a series of projections for operating the connecting devices, means controlled by the movement of the paper carriage for rotating the selector to bring a projection into position to operate the connecting device, means operated by the numeral key for shifting the selector longitudinally to cause the projection to effect the operation of the connecting device, means for returning the selector to the position in which it was at the beginning of the shifting movement, and means for locking the selector against rotation during the shifting movement and the return movement.

116. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation, and also capable of movement longitudinal of its axis and provided with a series of projections for operating the connecting devices, means controlled by the movement of the paper carriage for rotating the selector to bring a projection into position to operate the connecting device, means operated by the numeral key for shifting the selector longitudinally to cause the projection to effect the operation of the connecting device, and means operated by the shifting of the selector for holding out of operation the connecting devices other than that of the wheel selected.

117. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation and also capable of movement longitudinal of its axis and provided with a series of projections for operating the connecting devices, means controlled by the movement of the paper carriage for rotating the selector to bring a projection into position to operate the connecting device, means operated by the numeral key for shifting the selector longitudinally to cause the projection to effect the operation of the connecting device, means for operating the rotating means through a predetermined movement of rotation, and means operated by the shifting of the selector for holding out of operation the connecting devices of the wheels other than that of the wheel selected.

118. The combination with a typewriting machine having numeral keys and a reciprocating paper carriage, of a calculating mechanism comprising a series of wheels to be rotated, means normally disconnected from the wheels for rotating them, and a separate connecting device for each wheel for connecting it with the rotating means, of a selector mounted to be capable of rotation and also capable of movement longitudinal of its axis and provided with a series of projections for operating the connecting devices, means controlled by the movement of the paper carriage for rotating the selector to bring a projection into position to operate the connecting device, means operated by the numeral key for shifting the selector longitudinally to cause the projection to effect the operation of the connecting device, means for locking the selector against rotation during the shifting movement, means operated by the shifting of the selector for holding out of operation the connecting devices of the wheels other than the one selected.

119. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, and means operated by a numeral key for moving the selector in a direction transverse to the direction of its first movement to cause the projection to effect the unlocking of the wheel and the operation of the connecting device of the wheel selected.

120. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, means operated by a numeral key for moving the selector in a direction transverse to the direction of its first movement to cause the projection to effect the unlocking of the wheel and the operation of the connecting device of the wheel selected, and means for operating the rotating means through a predetermined movement of rotation.

121. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, means operated by a numeral key for moving the selector in a direction transverse to the direction of its first movement to cause the projection to effect the unlocking of the wheel and the operation of the connecting device of the wheel selected, and means for locking the selector against movement in the direction of its first movement during its second movement.

122. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, means operated by a numeral key for moving the selector in a direction transverse to the direction of its first movement to cause the projection to effect the unlocking of the wheel and the operation of the connecting device of the wheel selected, means for operating the rotating means through a predetermined movement of rotation, and means for locking the selector against movement in the direction of its first movement during the operation of the rotating means.

123. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, means operated by a numeral key for moving the selector in a direction transverse to the direction of its first movement to cause the projection to effect the unlocking of the wheel and the operation of the connecting device of the wheel selected, means for operating the rotating means through a predetermined movement of rotation, means for returning the selector to the position in which it was at the beginning of its second movement, and means for locking the selector against movement in the direction of its first movement during its second movement and the return movement.

124. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, means operated by a numeral key for moving the selector in a direction transverse to the direction of its first movement to cause the projection to effect the unlocking of the wheel and the operation of the connecting device of the wheel selected, and means operated by the second movement of the selector for holding out of operation the connecting devices of the wheels other than the one selected.

125. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, means operated by a numeral key for moving the selector in a direction transverse to the direction of its first movement to cause the projection to effect the unlocking of the wheel and the operation of the connecting device of the wheel selected, means operated by the second movement of the selector for holding out of operation the connecting devices of the wheels other than the one selected, and means for operating the rotating means through a predetermined movement of rotation.

126. The combination with a typewriting machine having numeral keys and a reciprocating paper carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of movement in two directions transverse to each other and provided with a series of projections each adapted to unlock one of the wheels and operate its connecting means, means controlled by the paper carriage for moving the selector in one direction to bring a projection into position, means operated by a numeral key for moving the selector in a direction transverse to the direction of its first movement to cause the projection to effect the unlocking of the wheel and the operation of the connecting device of the wheel selected, means operated by the second movement of the selector for holding out of operation the connecting devices of the wheels other than the one selected, means for operating the rotating means through a predetermined movement of rotation, and means for locking the selector against movement during the operation of the rotating means.

127. The combination with a typewriting machine having numeral keys and a reciprocating paper carriage, of a calculating mechanism comprising a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means controlled by the movement of the paper carriage for moving the selector in one direction to bring a projection into position, means operated by any one of the numeral keys for moving the selector in a direction transverse to the direction of its first movement to cause the projection to effect the unlocking of the wheel selected and the operation of its connecting device, means for operating the rotating means through a predetermined movement of rotation, means operated by the second movement of the selector for holding out of operation, during the operation of the rotating means, the connecting means of the wheels other than the one selected, and means for locking the selector against movement in the direction of its first movement, during the operation of the rotating means.

128. The combination with a typewriting machine having numeral keys and a reciprocating paper carriage, of a calculating mechanism comprising a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means controlled by the movement of the paper carriage for moving the selector in one direction to bring a projection into position, means operated by any one of the numeral keys for moving the selector in a direction transverse to the direction of its first movement to cause the projection to effect the unlocking of the wheel selected and the operation of its connecting device, means for operating the rotating means through a predetermined movement of rotation, means operated by the second movement of the selector for holding out of operation, during the operation of the rotating means, the connecting means of the wheels other than the one selected, means for returning the selector to the position in which it was at the beginning of its second movement, and means for locking the selector against movement in the direction of its first movement during its second movement and its return movement.

129. The combination with a typewriting machine having numeral keys and a reciprocating paper carriage, of a calculating mechanism comprising a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means controlled by the movement of the paper carriage for moving the selector in one direction to bring a projection into position, means operated by any one of the numeral keys for moving the selector in a direction transverse to the direction of its first movement to cause the projection to effect the unlocking of the wheel selected and the operation of its connecting device, means for operating the rotating means through a predetermined movement of rotation means operated by the second movement of the selector for holding out of operation, during the operation of the rotating means, the connecting means of the wheels other than the one selected, means for returning the selector to the position in which it was at the beginning of its second movement, and means for locking the selector against the return movement until the operation of the rotating means has taken place.

130. The combination with a typewriting machine having numeral keys and a reciprocating paper carriage, of a calculating mechanism comprising a series of wheels to be rotated, separate locking means for each wheel normally locking it against rotation, means normally disconnected from the wheels for rotating them, and separate connecting means for each wheel to connect it with the rotating means, of a selector adapted to be movable in two directions transverse to each other and provided with a series of projections each adapted to unlock one of the wheels and operate its connecting means, means controlled by the movement of the paper carriage for moving the selector in one direction to bring a projection into position, means operated by any one of the numeral keys for moving the selector in a direction transverse to the direction of its first movement to cause the projection to effect the unlocking of the wheel selected and the operation of its connecting device, means for operating the rotating means through a predetermined movement of rotation, means operated by the second movement of the selector for holding out of operation, during the operation of the rotating means, the connecting means of the wheels other than the one selected, means for returning the selector to the position in which it was at the beginning of its second movement, means for locking the selector against movement in the direction of its first movement during its second movement and its return, and means for locking the selector against the return movement until the operation of the rotating means has taken place.

131. The combination with a typewriting machine having numeral keys and a reciprocating carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of rotation and also capable of movement longitudinal of its axis and provided with a series of projections each adapted to unlock one of the wheels and operate its connecting means, means controlled by the paper carriage for rotating the selector to bring a projection into position, and means operated by a numeral key for shifting the selector longitudinally of its axis to cause the projection to effect the unlocking of the wheel and the operation of the connecting device.

132. The combination with a typewriting machine having numeral keys and a reciprocating carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of rotation and also capable of movement longitudinal of its axis and provided with a series of projections each adapted to unlock one of the wheels and operate its connecting means, means controlled by the paper carriage for rotating the selector to bring a projection into position, means operated by a numeral key for shifting the selector longitudinally of its axis to cause the projection to effect the unlocking of the wheel and the operation of the connecting device, and means for operating the rotating means through a predetermined movement of rotation.

133. The combination with a typewriting machine having numeral keys and a reciprocating carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of rotation and also capable of movement longitudinal of its axis and provided with a series of projections each adapted to unlock one of the wheels and operate its connecting means, means controlled by the paper carriage for rotating the selector to bring a projection into position, means operated by a numeral key for shifting the selector longitudinally of its axis to cause the projection to effect the unlocking of the wheel and the operation of the connecting device, and means for locking the selector against rotation during its shifting movement.

134. The combination with a typewriting machine having numeral keys and a reciprocating carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of rotation and also capable of movement longitudinal of its axis and provided with a series of projections each adapted to unlock one of the wheels and operate its connecting means, means controlled by the paper carriage for rotating the selector to bring a projection into position, means operated by a numeral key for shifting the selector longitudinally of its axis to cause the projection to effect the unlocking of the wheel and the operation of the connecting device, means for operating the rotating means through a predetermined movement of rotation, and means for locking the selector against rotation during the operation of the rotating means.

135. The combination with a typewriting machine having numeral keys and a reciprocating carriage, of calculating mechanism comprising a series of wheels to be rotated, separate locking means for each wheel normally locking it against rotation, means normally disconnected from the wheels for rotating them,. and separate connecting means for each wheel to connect it with the rotating means, and a selector mounted to be capable of rotation and also capable of movement longitudinal of its axis and provided with a series of projections each adapted to unlock one of the wheels and operate its connecting means, means controlled by the paper carriage for rotating the selector to bring a projection into position, means operated by a numeral key for shifting the selector longitudinally of its axis to cause the projection to effect the unlocking of the wheel and the operation of the connecting device, and means operated by the shifting of the selector for holding out of operation the connecting devices of the wheels other than the one selected.

136. The combination with a typewriting machine having numeral keys and a reciprocating carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of rotation and also capable of movement longitudinal of its axis and provided with a series of projections each adapted to unlock one of the wheels and operate its connecting means, means controlled by the paper carriage for rotating the selector to bring a projection into position, means operated by a numeral key for shifting the selector longitudinally of its axis to cause the projection to effect the unlocking of the wheel and the operation of the connecting device, means operated by the shifting of the selector for holding out of operation the connecting devices of the wheels other than the one selected, and means for operating the rotating means through a predetermined movement of rotation.

137. The combination with a typewriting machine having numeral keys and a reciprocating carriage, of calculating mechanism comprising a series of wheels to be rotated, separate locking means for each wheel normally locking it against rotation, means normally disconnected from the wheels for rotating them, and separate connecting means for each wheel to connect it with the rotating means, and a selector mounted to be capable of rotation and also capable of movement longitudinal of its axis and provided with a series of projections each adapted to unlock one of the wheels and operate its connecting means, means controlled by the paper carriage for rotating the selector to bring a projection into position, means operated by a numeral key for shifting the selector longitudinally of its axis to cause the projection to effect the unlocking of the wheel and the operation of the connecting device, means operated by the shifting of the selector for holding out of operation the connecting devices of the wheels other than the one selected, means for operating the rotating means through a predetermined movement of rotation, and means for locking the selector against movement during the operation of the rotating means.

138. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, and means also operated by the key for unlocking the power mechanism to permit it to rotate the wheel.

139. The combination with a wheel to be rotated, means normally disconnected from the wheel for rotating it, a connecting device for connecting the wheel with the rotating means, power mechanism, normally locked, for operating the rotating means, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, means also operated by the key for unlocking the power mechanism to permit it to rotate the wheel, and means for locking the selector against movement until the power mechanism has been unlocked.

140. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, and means for locking the key against return to normal position until it has effected the movement of the selector and the unlocking of the power mechanism.

141. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for locking the key against return to normal position until it has effected the movement of the selector and the unlocking of the power mechanism, and means for locking the selector against movement in the direction of its first movement until the key has returned to normal position.

142. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for locking the selector against movement in the direction of its first movement during its second movement, and means for locking the key, and with it the selector, against return until it has effected the unlocking of the power mechanism.

143. The combination with a wheel to be rotated, means normally disconnected from the wheel for rotating it, a connecting device for connecting the wheel with the rotating means, power mechanism normally locked for operating the rotating means, reversing mechanism between the power mechanism and the rotating means, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, and means also operated by the key for unlocking the power mechanism to permit it to rotate the wheel.

144. The combination with a wheel to be rotated, means normally disconnected from the wheel for rotating it, a connecting device for connecting the wheel with the rotating means, power mechanism normally locked for operating the rotating means, reversing mechanism between the power mechanism and the rotating means, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, means also operated by the key for unlocking the power mechanism to permit it to rotate the wheel, and means for locking the selector against movement until the power mechanism has been unlocked.

145. The combination with a wheel to be rotated, means normally disconnected from the wheel for rotating it, a connecting device for connecting the wheel with the rotating means, power mechanism normally locked for operating the rotating means, reversing mechanism between the power mechanism and the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, and means for locking the key against return to normal position until it has effected the movement of the selector and the unlocking of the power mechanism.

146. The combination with a wheel to be rotated, means normally disconnected from the wheel for rotating it, a connecting device for connecting the wheel with the rotating means, power mechanism normally locked for operating the rotating means, reversing mechanism between the power mechanism and the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for locking the key against return to normal position until it has effected the movement of the selector and the unlocking of the power mechanism, and means for locking the selector against movement until the key has returned to normal position.

147. The combination with a wheel to be rotated, means normally disconnected from the wheel for rotating it, a connecting device for connecting the wheel with the rotating means, power mechanism normally locked for operating the rotating means, reversing mechanism between the power mechanism and the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for locking the selector against movement in the direction of its first movement during its second movement, and means for locking the key, and with it the selector, against return until it has effected the unlocking of the power mechanism.

148. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, means also operated by the key for unlocking the power mechanism to permit it to rotate the wheel, and means for relocking the power mechanism on the completion of a predetermined movement of rotation.

149. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, means also operated by the key for unlocking the power mechanism to permit it to rotate the wheel, means for relocking the power mechanism on the completion of a predetermined movement of rotation, and means for locking the selector against movement during the operation of the power mechanism.

150. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for relocking the power mechanism on the completion of a predetermined movement of rotation, and means for locking the key against return to normal position until it has effected the movement of the selector and the unlocking of the bar mechanism.

151. The combination with a wheel to be rotated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for relocking the power mechanism on the completion of a predetermined movement of rotation, means for locking the key against return to normal position until it has effected the movement of the selector and the unlocking of the power mechanism, and means for locking the selector against movement in the direction of its first movement until the key has returned to normal position.

152. The combination with a wheel to be otated, means normally disconnected from the wheel for rotating it, a connecting device for connecting the wheel with the rotating means, power mechanism normally locked for operating the rotating means, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for relocking the power mechanism on the completion of a predetermined movement of rotation, means for locking the selector against movement in the direction of its first movement during its second movement, and means for locking the key, and with the selector, against return until it has effected the unlocking of the power mechanism.

153. The combination with a wheel to be rotated, means normally disconnected from the wheel for rotating it, a connecting device for connecting the wheel with the rotating means, power mechanism normally locked for operating the rotating means, comprising a driving spring and means for maintaining it under constant tension, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, means also operated by the key for unlocking the power mechanism to permit it to rotate the wheel, and means operated by the means for maintaining constant tension on the driving spring, on the completion of a predetermined movement thereof, for locking the key against operation.

154. The combination with a wheel to be rotated, means normally disconnected from the wheel for rotating it, a connecting device for connecting the wheel with the rotating means, power mechanism normally locked for operating the rotating means, comprising a driving spring and means for maintaining it under constant tension, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, means also operated by the key for unlocking the power mechanism to permit it to rotate the wheel, and means for locking the selector against movement until the power mechanism has been unlocked.

155. The combination with a wheel to be rotated, means normally disconnected from the wheel for rotating it, a connecting device for connecting the wheel with the rotating means, power mechanism normally locked for operating the rotating means, comprising a driving spring and means for maintaining it under constant tension, a selector provided with a projection adapted to operate the connecting device, means for moving the selector to bring its projection into position to operate the connecting device, a key, means operated by the key for moving the selector to cause its positioned projection to operate the connecting device to connect the wheel with the rotating means, means also operated by the key for unlocking the power mechanism to permit it to rotate the wheel, means for locking the selector against movement until the power mechanism has been unlocked.

156. The combination with a wheel to be rotated, means normally disconnected from the wheel for rotating it, a connecting device for connecting the wheel with the rotating means, power mechanism normally locked for operating the rotating means comprising a driving spring and means for maintaining it under constant tension, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, and means for locking the key against return to normal position until it has effected the movement of the selector and the unlocking of the power mechanism.

157. The combination with a wheel to be rotated, means normally disconnected from the wheel for rotating it, a connecting device for connecting the wheel with the rotating means, power mechanism normally locked for operating the rotating means comprising a driving spring and means for maintaining it under constant tension, a selector provided with a projection adapted to operate the connecting device, means for moving the selector to bring its projection into position to operate the connecting device, a key, means operated by depression of the key for moving the selector to cause its positioned projection to operate the connecting device to connect the wheel with the rotating means, means also operated by depression of the key for unlocking the power mechanism to permit it to rotate the wheel, means for locking the key against return to normal position until it has effected the movement of the selector and the unlocking of the power mechanism, and means operated by the means for maintaining constant tension on the driving spring, on the completion of a predetermined movement thereof for locking the key against operation.

158. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, and means for subsequently moving the selector to effect the clutching to the shaft of the index wheel selected.

159. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, means for subsequently moving the selector to effect the clutching to the shaft of the index wheel selected, and means for rotating the shaft through a predetermined movement of rotation.

160. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, means for subsequently moving the selector to effect the clutching to the shaft of the index wheel selected, and means for locking the selector against movement in the direction of its first movement during its second movement.

161. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, means for subsequently moving the selector to effect the clutching to the shaft of the index wheel selected, means for rotating the shaft through a predetermined movement of rotation, and means for locking the selector against movement during the rotation of the shaft.

162. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, and means operated by the keys for subsequently moving the selector to effect the clutching to the shaft of the index wheel selected.

163. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, and means for rotating the shaft through a predetermined movement of rotation.

164. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys and means operated by the keys for subsequently moving the selector to effect the clutching to the shaft of the index wheel selected, and means for locking the selector against movement in the direction of its first movement during its second movement.

165. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means for rotating the shaft through a predetermined movement of rotation, and means for locking the selector against movement during the rotation of the shaft.

166. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, and means operated by the depression of a key for locking the other keys of the series against operation until the key depressed has returned to normal position.

167. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, and means by which on the initial depression of a key it is locked against return until it has completed its full movement of depression.

168. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means by which the depression of a key locks the other keys of the series against depression, and means operated by the initial depression of a key to lock it against return until it has completed its full movement of depression.

169. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means normally locked for rotating the shaft through a predetermined movement of rotation, and means operated by the keys for unlocking the rotating means.

170. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means normally locked for rotating the shaft through a predetermined movement of rotation, means operated by the keys for unlocking the rotating means, and means operated by the initial movement of the key for locking it against return until it has effected the unlocking of the rotating means.

171. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means normally locked, for rotating the shaft through a predetermined movement of rotation, and means operated by the initial depression of a key for locking the other keys of the series against depression.

172. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means normally locked, for rotating the shaft through a predetermined movement of rotation, means operated by the initial depression of a key for locking the other keys of the series against depression, and means also operated by the initial depression of a key for locking it against return until it has effected the unlocking of the rotating means.

173. The combination with a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, and means operated by the numeral keys for subsequently moving the selector to effect the clutching to the shaft of the index wheel selected.

174. The combination with a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, and means for locking the selector against movement in the direction of its first movement during its second movement.

175. The combination with a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, and means also operated by the numeral keys for rotating the shaft through a predetermined movement of rotation.

176. The combination with a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, means also operated by the numeral keys for rotating the shaft through a predetermined movement of rotation, and means operated by the initial depression of a numeral key for locking the other numeral keys against depression.

177. The combination with a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, means also operated by the numeral keys for rotating the shaft through a predetermined movement of rotation, and means also operated by the initial depression of a key for locking it against return until it has effected the unlocking of the rotating means.

178. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, means for subsequently moving the selector to effect the clutching to the shaft of the index wheel selected, and means operated by the second movement of the selector for locking out of operation the clutching devices of the wheels other than the one selected.

179. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, means for subsequently moving the selector to effect the clutching to the shaft of the index wheel selected, means for rotating the shaft through a predetermined movement of rotation, and means operated by the second movement of the selector for locking out of operation the clutching devices of the wheels other than the one selected, during the rotation of the shaft.

180. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, means for subsequently moving the selector to effect the clutching to the shaft of the index wheel selected, means for locking the selector against movement in the direction of its first movement during its second movement, and means operated by the second movement of the selector for locking out of operation the clutching devices of the wheels other than the one selected.

181. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, means for subsequently moving the selector to effect the clutching to the shaft of the index wheel selected, means for rotating the shaft through a predetermined movement of rotation, means for locking the selector against movement in the direction of its first movement during its second movement, and means operated by the second movement of the selector for locking out of operation the clutching devices of the wheels other than the one selected.

182. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, and means operated by the second movement of the selector for locking out of operation the clutching devices of the wheels other than the one selected.

183. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means operated by the second movement of the selector for locking out of operation the clutching devices of the wheels other than the one selected, and means operated by the initial depression of a key for locking it against return until it has effected the second movement of the selector.

184. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means for rotating the shaft through a predetermined movement of rotation, and means operated by the second movement of the selector for locking out of operation the clutching devices of the wheels other than the one selected, during the rotation of the shaft.

185. In a calculating machine comprising a series of index wheels, a shaft for rotating the index wheels, separate clutching devices for operatively connecting the respective index wheels with the shaft, a selector, means carried by the selector for operating any one of the separate clutching devices, means for first moving the selector to bring it into position to operate the clutching device desired, a series of keys, means operated by the keys for subsequently moving the selector to effect the clutching to the shaft of the index wheel selected, means for rotating the shaft through a predetermined movement of rotation, means operated by the second movement of the selector for locking out of operation the clutching devices of the wheels other than the one selected during the rotation of the shaft, and means operated by the initial depression of a key for locking it against return until it has effected the second movement of the selector.

186. The combination of a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, and means operated by the second movement of the selector for locking out of operation the clutching devices of the wheels other than the one selected.

187. The combination of a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, means operated by the second movement of the selector for locking out of operation the clutching devices of the wheels other than the one selected, and means operated by the initial depression of a key for locking it against return until it has effected the second movement of the selector.

188. The combination of a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, means for rotating the shaft through a predetermined movement of rotation, and means operated by the second movement of the selector for locking out of operation the clutching devices of the wheels other than the one selected.

189. The combination of a typewriting machine having a paper carriage and a series of numeral keys of a calculating machine comprising a series of index wheels, a shaft for rotating the index wheels, separate clutching devices for operatively connecting the respective index wheels with the shaft, a selector, means carried by the selector for operating any one of the separate clutching devices, means controlled by the movement of the paper carriage for first moving the selector to bring it into position to operate the clutching device desired, means operated by the numeral keys for subsequently moving the selector to effect the clutching to the shaft of the index wheel selected, means for rotating the shaft through a predetermined movement of rotation, means operated by the second movement of the selector for locking out of operation the clutching devices of the wheels other than the one selected, and means operated by the initial depression of a key for locking it against return until it has effected the second movement of the selector.

190. In a combined typewriting and calculating machine, the combination with the numeral keys of the typewriting machine, of calculating mechanism and power mechanism, normally locked, for operating it, means controlled by the numeral keys of the typewriting machine for releasing the power mechanism comprising a series of cam disks each operatively connected with a numeral key and so mounted as to be rotated by the depression of said numeral key, means controlled by the cam disks for releasing the power mechanism, and means operated by the initial movement of a cam disk for locking the other cam disks against operation until the cam disk operated returns to initial position.

191. In a combined typewriting and calculating machine, the combination with the numeral keys of the typewriting machine of calculating mechanism and power mechanism normally locked for operating it, means controlled by the numeral keys of the typewriting machine for releasing the power mechanism comprising a series of cam disks each operatively connected with a numeral key and so mounted as to be rotated by the depression of said numeral key, means controlled by the cam disks for releasing the power mechanism, an escapement wheel, and means carried by a cam disk for so moving the escapement wheel on the initial movement of the cam disk as to prevent the cam disk from returning to normal position until it has been rotated sufficiently to effect the release of the power mechanism.

192. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, and means also operating on the initial depression of the numeral key operated to prevent its return to normal position until it has been depressed sufficiently to effect the release of the power mechanism.

193. In a combined typewriting and calculating machine, the combination with the numeral keys of the typewriting machine, of calculating mechanism and power mechanism, normally locked, for operating it, means controlled by the numeral keys of the typewriting machine for releasing the power mechanism comprising a series of cam disks each operatively connected with a numeral key and so mounted as to be rotated by the depression of said numeral key, means controlled by the cam disks for releasing the power mechanism, and means operated by the initial movement of a cam disk for locking the other cam disks against operation until the cam disk operated returns to initial position, and means for stopping the operation of the power mechanism on the completion of a predetermined movement.

194. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means for stopping the operation of the power mechanism on the completion of a predetermined movement, and means for checking the momentum of the power mechanism in advance of the operation of the stopping means.

195. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means also operating on the initial depression of the numeral key operated to prevent its return to normal position until it has been depressed sufficiently to effect the release of the power mechanism, and means for stopping the operation of the power mechanism on the completion of a predetermined movement.

196. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means also operating on the initial depression of the numeral key operated to prevent its return to normal position until it has been depressed sufficiently to effect the release of the power mechanism, means for stopping the operation of the power mechanism on the completion of a predetermined movement, and means for checking the momentum of the power mechanism in advance of the operation of the stopping means.

197. In a combined typewriting and calculating machine, the combination with the numeral keys of the typewriting machine, of calculating mechanism and power mechanism, normally locked, for operating it, means controlled by the numeral keys of the typewriting machine for releasing the power mechanism comprising a series of cam disks each operatively connected with a numeral key and so mounted as to be rotated by the depression of said numeral key, means controlled by the cam disks for releasing the power mechanism, an escapement wheel, means carried by a cam disk for so moving the escapement wheel on the initial movement of the cam disk as to prevent the cam disk from returning to normal position until it has been rotated sufficiently to effect the release of the power mechanism, and means for stopping the operation of the power mechanism on the completion of a predetermined movement.

198. In a combined typewriting and calculating machine, the combination with the numeral keys of the typewriting machine of calculating mechanism and power mechanism normally locked for operating it, means controlled by the numeral keys of the typewriting machine for releasing the power mechanism, means operating on the initial depression of a numeral key to prevent its return to normal position until it has been depressed sufficiently to effect the release of the power mechanism, means for stopping the operation of the power mechanism on the completion of a predetermined movement, and means for checking the momentum of the power mechanism in advance of the operation of the stopping means.

199. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means for maintaining the power mechanism under constant tension, and means for stopping the power mechanism 200. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means for maintaining the power mechanism under constant tension, means for stopping the power mechanism on the completion of a predetermined movement, and means for checking the momentum of the power mechanism in advance of the operation of the stopping means.

201. In a combined typewrtiing and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means for maintaining the power mechanism under constant tension, means for stopping the power mechanism on the completion of a predetermined movement of the calculating mechanism, and means operated by the power mechanism on the completion of a predetermined movement for locking the numeral keys against depression.

202. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral. key operated is in depressed position, means for maintaining the power mechanism under constant tension, means for stopping the power mechanism on the completion of a predetermined movement of the calculating mechanism, means for checking the momentum of the power mechanism in advance of the operation of the stopping means, and means operated by the power mechanism on the completion of a predetermined movement for locking the numeral keys against operation.

203. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means also operating on the initial depression of the numeral key operated to prevent its return to normal position until it has been depressed sufficiently to effect the release of the power mechanism, means for maintaining the power mechanism under constant tension, and means for stopping the power mechanism on the completion of a predetermined movement.

204. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means also operating on the initial depression of the numeral key operated to prevent its return to normal position until it has been depressed sufficiently to effect the release of the power mechanism, means for maintaining the power mechanism under constant tension, means for stopping the power mechanism on the completion of a predetermined movement, and means for checking the momentum of the power mechanism in advance of the operation of the stopping means.

205. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means also operating on the initial depression of the numeral key operated to prevent its return to normal position until it has been depressed sufficiently to effect the release of the power mechanism, means for maintaining the power mechanism under constant tension, means for stopping the power mechanism on the completion of a predetermined movement of the calculating mechanism, and means operated by the power mechanism on the completion of a predetermined movement for locking the numeral keys against depression.

206. In a combined typewriting and calculating machine, the combination with the numeral keys of the typewriting machine, of calculating mechanism and power mechanism, normally locked, for operating it, means controlled by the numeral keys of the typewriting machine for releasing the power mechanism, means operated by the initial depression of a numeral key for locking the other numeral keys against operation while the numeral key operated is in depressed position, means also operating on the initial depression of the numeral key operated to prevent its return to normal position until it has been depressed sufficiently to effect the release of the power mechanism, means for maintaining the power mechanism under constant tension, means for stopping the power mechanism on the completion of a predetermined movement of the calculating mechanism, means for checking the momentum of the power mechanism, in advance of the operation of the stopping means, and means operated by the power mechanism on the completion of a predetermined movement for locking the numeral keys against operation.

207. The combination with a wheel to be rotated provided with a toothed locking disk and a clutch member, of a shaft for rotating the wheel and means for rotating the shaft, a sliding clutch member carried by the shaft and adapted to engage the clutch member carried by the wheel, a locking pawl normally engaging a tooth of the locking disk, a bell crank lever, means adapted to be operated by the bell crank lever for disengaging the locking pawl from the locking disk, means also adapted to be operated by the bell crank lever for moving the sliding clutch member into engagement with the clutch member carried by the wheel, and means for swinging the bell crank lever in one direction to cause it to unlock the wheel and connect it with the shaft.

208. The combination with a wheel to be rotated provided with a toothed locking disk and a clutch member, of a shaft for rotating the wheel and means for rotating the shaft, a sliding clutch member carried by the shaft and adapted to engage the clutch member carried by the wheel, a pair of locking pawls normally engaging teeth of the locking disk, a bell crank lever, means adapted to be operated by the bell crank lever for disengaging the locking pawls from the locking disk, means also adapted to be operated by the bell crank lever for moving the sliding clutch member into engagement with the clutch member carried by the wheel, and means for swinging the bell crank lever in one direction to cause it to unlock the wheel and connect it with the shaft.

209. The combination with a wheel to be rotated provided with a toothed locking disk and a clutch member, of a shaft for rotating the wheel and means normally locked for rotating the shaft, a sliding clutch member carried by the shaft and adapted to engage the clutch member carried by the wheel, a locking pawl normally engaging a tooth of the locking disk, a bell crank lever, means adapted to be operated by the bell crank lever for disengaging the locking pawl from the locking disk, means also adapted to be operated by the bell crank lever for moving the sliding clutch member into engagement with the clutch member carried by the wheel, means for swinging the bell crank lever in one direction to cause it to unlock the wheel and connect it with the shaft, and means for unlocking the means for rotating the shaft.

210. The combination with a wheel to be rotated provided with a toothed locking disk and a clutch member, of a shaft for rotating the wheel and means normally locked for rotating the shaft, a sliding clutch member carried by the shaft and adapted to engage the clutch member carried by the wheel, a locking pawl normally engaging a tooth of the locking disk, a bell crank lever, means adapted to be operated by the bell crank lever for disengaging the locking pawl from the locking disk, means also adapted to be operated by the bell crank lever for moving the sliding clutch member into engagement with the clutch member carried by the wheel, means for swinging the bell crank lever in one direction to cause it to unlock the wheel and connect it with the shaft, means for unlocking the means for rotating the shaft, and means for relocking the rotating means on the completion of a predetermined movement of rotation of the shaft.

211. The combination with a series of wheels to be rotated, each provided with a toothed locking disk and a clutch member, of a shaft for rotating the wheels and means for rotating the shaft, a series of sliding clutch members carried by the shaft each adapted to engage a clutch member carried by a wheel, a series of locking pawls each normally engaging a tooth of a locking disk, a series of bell crank levers, means adapted to be operated by each of the bell crank levers for disengaging a locking pawl from a locking disk of a wheel, means also adapted to be operated by the bell crank levers for moving the sliding clutch member into engagement with the clutch member carried by the wheel unlocked, and means for swinging the bell crank lever in one direction to cause it to unlock the wheel and connect it with the shaft.

212. The combination with a wheel to be rotated provided with a toothed locking disk and a clutch member, of a shaft for rotating the wheel and means for rotating the shaft, a sliding clutch member carried by the shaft and adapted to engage the clutch member carried by the wheel, a locking pawl normally engaging a tooth of the locking disk, a bell crank lever, means adapted to be operated by the bell crank lever for disengaging the locking pawl from the locking disk, means also adapted to be operated by the bell crank lever for moving the sliding clutch member, into engagement with the clutch member carried by the wheel, a key and means operated by it for swinging the bell crank lever in one direction to cause it to unlock the wheel and connect it with the shaft, and means operated by the initial depression of the key for locking it against return until it has effected the swinging of the bell crank lever.

213. The combination with a series of wheels to be rotated each provided with a toothed locking disk and a clutch member, of a shaft for rotating the wheels and means for rotating the shaft, a series of sliding clutch members carried by the shaft each adapted to engage the clutch member carried by a wheel, a series of locking pawls each normally engaging a tooth of a locking disk, a series of bell crank levers, means adapted to be operated by a bell crank lever for disengaging a locking pawl from a locking disk, means also adapted to be operated by the bell crank levers for moving the sliding clutch member into engagement with the clutch member carried by the wheel unlocked, a series of keys and means operated by the keys for swinging a bell crank lever in one direction to cause it to unlock a wheel and connect it with the shaft, and means operated by the depression of a key for locking the other keys of the series against operation.

214. The combination with a series of wheels to be rotated each provided with a toothed locking disk and a clutch member, of a shaft for rotating the wheels and means for rotating the shaft, a series of sliding clutch members carried by the shaft each adapted to engage the clutch member carried by a wheel, a series of locking pawls each normally engaging a tooth of a locking disk, a series of bell crank levers, means adapted to be operated by a bell crank lever for disengaging a locking pawl from a locking disk, means also adapted to be operated by the bell crank levers, for moving the sliding clutch member into engagement with the clutch member carried by the wheel unlocked, a series of keys and means operated by the keys for swinging a bell crank lever in one direction to cause it to unlock a wheel and connect it with the shaft, means operated by the depression of a key for locking the other keys of the series against operation, and means operated by the initial depression of a key for locking it against return until it has effected the swinging of the bell crank lever.

215. The combination with a series of wheels to be rotated each provided with a toothed locking disk and a clutch member, of a shaft for rotating the wheels and means for rotating the shaft, a series of sliding clutch members carried by the shaft each adapted to engage a clutch member carried by a wheel, a series of pairs of locking pawls each pair normally engaging teeth of a locking disk, a series of bell crank levers, means adapted to be operated by each of the bell crank levers for disengaging a pair of locking pawls from a locking disk, means also adapted to be operated by each of the bell crank levers for moving a sliding clutch member into engagement with the clutch member carried by the wheel unlocked, and means for swinging a bell crank lever in one direction to cause it to unlock a wheel and connect it with the shaft.

216. The combination with a series of wheels to be rotated each provided with a toothed locking disk and a clutch member, of a shaft for rotating the wheels and means normally locked for rotating the shaft, a series of sliding clutch members carried by the shaft each adapted to engage a clutch member carried by a wheel, a series of pairs of locking pawls each pair normally engaging teeth of a locking disk, a series of bell crank levers, means adapted to be operated by each of the bell crank levers for disengaging a pair of locking pawls from a locking disk, means also adapted to be operated by each of the bell crank levers for moving a sliding clutch member into engagement with the clutch member carried by a wheel, a series of keys, means operated by the keys for swinging the bell crank lever in one direction to cause it to unlock the wheel and connect it with the shaft, and means operated by the keys for unlocking the means for rotating the shaft.

217. The combination with a series of wheels to be rotated each provided with a toothed locking disk and a clutch member, of a shaft for rotating the wheels and means normally locked for rotating the shaft, a series of sliding clutch members carried by the shaft each adapted to engage a clutch member carried by a wheel, a series of pairs of locking pawls each pair normally engaging teeth of a locking disk, a series of bell crank levers, means adapted to be operated by each of the bell crank levers for disengaging a pair of locking pawls from a locking disk, means also adapted to be operated by each of the bell crank levers for moving a sliding clutch member into engagement with the clutch member carried by a wheel, a series of keys, means operated by the keys for swinging the bell crank lever in one direction to cause it to unlock the wheel and connect it with the shaft, means operated by the keys for unlocking the means for rotating the shaft, and means for relocking the rotating means on the completion of a predetermined movement of rotation of the shaft.

218. The combination with a series of wheels to be rotated each provided with a toothed locking disk and a clutch member, of a shaft for rotating the wheels and means for rotating the shaft, a sliding clutch member for each wheel carried by the shaft and adapted to engage the clutch member of a wheel, a locking pawl for each wheel normally engaging the teeth of its locking disk, a series of bell crank levers, means adapted to be operated by the bell crank levers for disengaging the locking pawl from the locking disk of a wheel, means also adapted to be operated by the bell crank lever for moving the sliding clutch member into and out of engagement with the clutch member of such wheel, means for swinging one of the bell crank levers in one direction to cause it to unlock a wheel and connect it with the shaft, and means for simultaneously swinging all of the other bell crank levers in the opposite direction to cause them to hold the sliding clutch members controlled by them out of possible engagement with the clutch members of the wheels other than the one connected with the shaft.

219. The combination of a series of wheels to be rotated each provided with a toothed locking disk and a clutch member. of a shaft for rotating the wheels and means normally locked for rotating the shaft, a sliding clutch member for each wheel carried by the shaft and adapted to engage the clutch member of a wheel, a locking pawl for each wheel normally engaging the teeth of its locking disk, a series of bell crank levers, means adapted to be operated by the bell crank levers for disengaging the locking pawl from the locking disk of a wheel, means also adapted to be operated by the bell crank lever for moving the sliding clutch member into and out of engagement with the clutch member of such wheel, means for swinging one of the bell crank levers in one direction to cause it to unlock a wheel and connect it with the shaft, means for simultaneously swinging all of the other bell crank levers in the opposite direction to cause them to hold the sliding clutch members controlled by them out of possible engagement with the clutch members of the wheels other than the one connected with the shaft, and means for unlocking the means for rotating the shaft.

220. The combination of a series of wheels to be rotated each provided with a toothed locking disk and a clutch member, of a shaft for rotating the wheels and means normally locked for rotating the shaft, a sliding clutch member for each wheel carried by the shaft and adapted to engage the clutch member of a wheel, a locking pawl for each wheel normally engaging the teeth of its locking disk, a series of bell crank levers, means adapted to be operated by the bell crank levers for disengaging the locking pawl from the locking disk of a wheel, means also adapted to be operated by the bell crank lever for moving the sliding clutch member into and out of engagement with the clutch member of such wheel, means for swinging one of the bell crank levers in one direction to cause it to unlock a wheel and connect it with the shaft, means for simultaneously swinging all of the other bell crank levers in the opposite direction to cause them to hold the sliding clutch members controlled by them out of possible engagement with the clutch members of the wheels other than the one connected with the shaft, means for unlocking the means for rotating the shaft, and means for relocking the rotating means on the completion of a predetermined movement of rotation of the shaft.

221. The combination of a series of wheels to be rotated each provided with a toothed locking disk and a clutch member, of a shaft for rotating the wheels and means for rotating the shaft, a sliding clutch member for each wheel carried by the shaft and adapted to engage the clutch member of a wheel, a locking pawl for each wheel normally engaging the teeth of its locking disk, a series of bell crank levers, means adapted to be operated by the bell crank levers for disengaging the locking pawl from the locking disk of a wheel, means also adapted to be operated by each of the bell crank levers for moving the sliding clutch member into and out of engagement with the clutch member of a wheel, a series of keys, means operated by the keys for swinging one of the bell crank levers in one direction to cause it to unlock a wheel and connect it with the shaft and simultaneously swinging all of the other bell crank levers in the opposite direction to cause them to hold the sliding clutch members controlled by them out of possible engagement with the clutch members of the wheels other than the one connected with the shaft, and means operated by the depression of a key for locking the other keys of the series against operation.

222. The combination of a series of wheels to be rotated each provided with a toothed locking disk and a clutch member, of a shaft for rotating the wheels and means for rotating the shaft, a sliding clutch member for each wheel carried by the shaft and adapted to engage the clutch member of a wheel, a locking pawl for each wheel normally engaging the teeth of its locking disk, a series of bell crank levers, means adapted to be operated by the bell crank levers for disengaging the locking pawl from the locking disk of a wheel, means also adapted to be operated by each of the bell crank levers for moving the sliding clutch member into and out of engagement with the clutch member of a wheel, a series of keys, means operated by the keys for swinging one of the bell crank levers in one direction to cause it to unlock a wheel and connect it with the shaft and simultaneously swinging all of the other bell crank levers in the opposite direction to cause them to hold the sliding clutch members controlled by them out of possible engagement with the clutch members of the wheels other than the one connected with the shaft, means operated by the depression of a key for locking the other keys of the series against operation, and means operated by the initial depression of a key for locking it against return until it has effected the swinging of the bell crank lever.

223. The combination of a series of wheels to be rotated each provided with a toothed locking disk and a clutch member, of a shaft for rotating the wheels and means for rotating the shaft, a sliding clutch member for each wheel carried by the shaft and adapted to engage the clutch member of a wheel, a pair of oppositely acting locking pawls for each wheel normally engaging the teeth of its locking disk, a series of bell crank levers, means adapted to be operated by the bell crank levers for disengaging the locking pawls from the locking disk of a wheel, means also adapted to be operated by each of the bell crank levers for moving the sliding clutch member into and out of engagement with the clutch member of such wheel, means for swinging one of the bell crank levers in one direction to cause it to unlock a wheel and connect it with the shaft, and means for simultaneously swinging all of the other bell crank levers in the opposite direction to cause them to hold the sliding clutch members controlled by them out of possible engagement with the clutch members of the wheels other than the one connected with the shaft.

224. The combination of a series of wheels to be rotated each provided with a toothed locking disk and a clutch member, of a shaft for rotating the wheels and means for rotating the shaft, a sliding clutch member for each wheel carried by the shaft and adapted to engage the clutch member of a wheel, a pair of oppositely acting locking pawls for each wheel normally engaging the teeth of its locking disk, a series of bell crank levers, means adapted to be operated by the bell crank levers for disengaging the locking pawls from the locking disk of a wheel, means also adapted to be operated by each of the bell crank levers for moving the sliding clutch member into and out of engagement with the clutch member of such wheel, means for swinging one of the bell crank levers in one direction to cause it to unlock a wheel and connect it with the shaft, means for simultaneously swinging all of the other bell crank levers in the opposite direction to cause them to hold the sliding clutch members controlled by them out of possible engagement with the clutch members of the wheels other than the one connected with the shaft, and means for unlocking the means for rotating the shaft.

225. The combination of a series of wheels to be rotated each provided with a toothed locking disk and a clutch member, of a shaft for rotating the wheels and means for rotating the shaft, a sliding clutch member for each wheel carried by the shaft and adapted to engage the clutch member of a wheel, a pair of oppositely acting locking pawls for each wheel normally engaging the teeth of its locking disk, a series of bell crank levers, means adapted to be operated by the bell crank levers for disengaging the locking pawls from the locking disk of a wheel, means also adapted to be operated by each of the bell crank levers for moving the sliding clutch member into and out of engagement with the clutch member of such wheel, means for swinging one of the bell crank levers in one direction to cause it to unlock a wheel and connect it with the shaft, means for simultaneously swinging all of the other bell crank levers in the opposite direction to cause them to hold the sliding clutch members controlled by them out of possible engagement with the clutch members of the wheels other than the one connected with the shaft, means for unlocking the means for rotating the shaft, and means for relocking the rotating means on the completion of a predetermined movement of rotation.

226. The combination of a series of index wheels to be rotated arranged in line and of different denominations each provided with a toothed locking disk and a clutch member, of a shaft for rotating the wheels and means for rotating the shaft, a sliding clutch member for each wheel carried by the shaft and adapted to engage the clutch member of a wheel, a locking pawl for each wheel normally engaging the teeth of its locking disk, a series of bell crank levers, means adapted to be operated by the bell crank levers for disengaging the locking pawl from the locking disk of a wheel, means also adapted to be operated by each of the bell crank levers for moving the sliding clutch member into and out of engagement with the clutch member of a wheel, means for swinging one of the bell crank levers in one direction to cause it to unlock a wheel and connect it with the shaft means for simultaneously swinging all of the other bell crank levers in the opposite direction to cause them to hold the sliding clutch members controlled by them out of possible engagement with the clutch members of the wheels other than the one connected with the shaft, and means by which on the completion of the rotation of an index wheel of lower denomination the index wheel of next higher denomination is rotated independently of the shaft.

227. The combination of a series of index wheels to be rotated arranged in line and of different denominations each provided with a toothed locking disk and a clutch member, of a shaft for rotating the wheels and means for rotating the shaft, a sliding clutch member for each wheel carried by the shaft and adapted to engage the clutch member of a wheel, a locking pawl for each wheel normally engaging the teeth of its locking disk, a series of bell crank levers, means adapted to be operated by the bell crank levers for disengaging the locking pawl of a wheel from its locking disk, means also adapted to be operated by each of the bell crank levers for moving the sliding clutch member into and out of engagement with the clutch member of a wheel, means for swinging one of the bell crank levers in one direction to cause it to unlock a wheel and connect it with the shaft, means for simultaneously swinging all of the other bell crank levers in the opposite direction to cause them to hold the sliding clutch members controlled by them out of possible engagement with the clutch members of the wheels other than the one connected with the shaft, and means by which on the completion of the rotation of an index wheel of lower denomination the locking pawl of the index wheel of next higher denomination is disengaged from its locking disk and such index wheel of higher denomination is caused to rotate independently of the shaft.

228. In a calculating machine, a group of index wheels, means normally disconnected from the index wheels for rotating them, separate connecting devices for connecting each of the index wheels to the rotating means, a selector provided with a series of pins for operating the connecting devices, the pins being so arranged that only one of the pins at a time can be brought in position to operate a connecting device, means for moving the selector to bring a pin into position to operate a connecting device, and means for shifting the selector to cause the pin to operate the connecting device.

229. In a calculating machine, a group of index wheels, means normally disconnected from the index wheels for rotating them, separate connecting devices for connecting each of the index wheels to the rotating means, a rotary selector provided with pins adapted to operate the connecting devices, the pins being so arranged that only one of the pins at a time can be brought in position to operate a connecting device, means for rotating the selector to bring a pin into position to operate a connecting device, and means for shifting the selector longitudinally of its axis to cause the pin to operate the connecting device.

230. In a calculating machine, a group of index wheels, arranged in line, means normally disconnected from the index wheels for rotating them, separate connecting devices for connecting each of the index wheels to the rotating means, also arranged in line, a rotary selector having its axis parallel with the line of the connecting devices provided on its periphery with a spirally arranged series of pins each adapted to operate one of the connecting devices, means for rotating the selector to successively bring the pins into position to operate the connecting devices of the several index wheels, and means for shifting the selector longitudinally of its axis to operate the connecting device.

231. In a calculating machine, a group of index wheels, means normally disconnected from the index wheels for rotating them, separate connecting devices for connecting each of the index wheels to the rotating means, a selector provided with a series of pins for operating the connecting devices, the pins being so arranged that only one of them at a time can be brought in position to operate a connecting device, means for moving the selector to bring a pin into position to operate a connecting device, means for shifting the selector to cause the pin to operate the connecting device, and means for operating the rotating means to rotate the index wheel so connected through a predetermined movement of rotation.

232. In a calculating machine, a group of index wheels, means normally disconnected from the index wheels for rotating them, separate connecting devices for connecting each of the index wheels to the rotating means, a rotary selector provided with pins adapted to operate the connecting devices, the pins being so arranged that only one of them at a time can be brought in position to operate a connecting device, means for rotating the selector to bring a pin into position to operate a connecting device, means for shifting the selector longitudinally of its axis to cause the pin to operate the connecting device, and means for operating the rotating means to rotate the index wheel so connected through a predetermined movement of rotation.

233. In a calculating machine a group of index wheels arranged in line, means normally disconnected from the index wheels for rotating them, separate connecting devices for connecting each of the index wheels to the rotating means, also arranged in line, a rotary selector having its axis parallel with the line of the connecting devices provided on its periphery with a spirally arranged series of pins each adapted to operate one of the connecting devices, means for rotating the selector to successively bring the pins into position to operate the connecting devices of the several index wheels, means for shifting the selector longitudinally of its axis to operate the connecting device, and means for operating the rotating means to rotate the index wheel so connected through a predetermined movement of rotation.

234. In a calculating machine for use in connection with a typewriting machine having numeral keys and a paper carriage, a group of index wheels, means normally disconnected from the index wheels for rotating them, separate connecting devices for connecting each of the index wheels to the rotating means, a selector provided with means for operating the connecting devices, means controlled by the carriage of the typewriting machine for moving the selector to bring the means for operating the connecting device in position to operate, key operated means for shifting the selector to cause the connecting device to be operated, power mechanism normally locked for actuating the means for rotating the index wheels, controlling means for the power mechanism, and means operated by the key for setting the controlling mechanism to permit a predetermined movement of rotation and for releasing the power mechanism.

235. In a calculating machine for use in connection with a typewriting machine having numeral keys and a paper carriage, a group of index wheels, means normally disconnected from the index wheels for rotating them, separate connecting devices for connecting each of the index wheels to the rotating means, a selector provided with means for operating the connecting devices, means controlled by the carriage of the typewriting machine for moving the selector to bring the means for operating the connecting device in position to operate, key operated means for shifting the selector to cause the connecting device to be operated, power mechanism normally locked for actuating the means for rotating the index wheels, controlling means for the power mechanism, means operated by the key for setting the controlling mechanism to permit a predetermined movement of rotation and for releasing the power mechanism, and locking mechanism operated by the controlling mechanism to lock the power mechanism on the completion of the predetermined movement of rotation.

236. In a calculating machine for use in connection with a typewriting machine having numeral keys and a paper carriage, a group of index wheels, means normally disconnected from the index wheels for rotating them, separate connecting devices for connecting each of the index wheels to the rotating means, a rotary selector provided with pins adapted to operate the connecting devices, the pins being so arranged that only one of them at a time can be brought in position to operate a connecting device, means controlled by the carriage of the typewriting machine but independently actuated for rotating the selector to bring a pin into position to operate a connecting device, and means operated by a numeral key for shifting the selector longitudinally of its axis to cause the pin to operate the connecting device.

237. In a calculating machine for use in connection with a typewriting machine having numeral keys and a paper carriage, a group of index wheels arranged in line, means normally disconnected from the index wheels for rotating them, separate connecting devices for connecting each of the index wheels to the rotating means, also arranged in line, a rotary selector having its axis parallel with the line of the connecting devices provided on its periphery with a spirally arranged series of pins each adapted to operate one of the connecting devices, means controlled by the carriage of the typewriting machine but independently actuated for rotating the selector to successively bring the pins into position to operate the connecting devices of the several index wheels, and means operated by a numeral key for shifting the selector longitudinally of its axis to operate the connecting device.

238. In a calculating machine for use in connection with a typewriting machine having numeral keys and a paper carriage, a group of index wheels arranged in line, means normally disconnected from the index wheels for rotating them, separate connecting devices for connecting each of the index wheels to the rotating means, also arranged in line, a rotary selector having its axis parallel with the line of the connecting devices provided on its periphery with a spirally arranged series of pins each adapted to operate one of the connecting devices, means controlled by the carriage of the typewriting machine but independently actuated for rotating the selector to successively bring the pins into position to operate the connecting devices of the several index wheels, means operated by a numeral key for shifting the selector longitudinally of its axis to operate the connecting device, and means for operating the rotating means to rotate the index wheel so connected through a predetermined movement of rotation.

239. In a calculating machine for use in connection with a typewriting machine having numeral keys and a paper carriage, an index wheel provided with a clutch member, a shaft concentric with the index wheel provided with a sliding clutch member, a slide for moving the sliding member into engagement with the clutch member of the index wheel, a lever for moving the slide, a selector provided with a pin for operating the slide, means controlled by the carriage of the typewriting machine for moving the selector to bring its pin in line with the lever and means operated by a numeral key of the typewriting machine for moving the selector to cause the sliding clutch member to engage the clutch member carried by the index wheel, and means for rotating the shaft through a predetermined movement of rotation.

240. In a calculating machine for use in connection with a typewriting machine having numeral keys and a paper carriage, a group of index wheels arranged in line each provided with a clutch member, a shaft extending through the group of index wheels concentric therewith carrying a group of sliding clutch members one for each index wheel, separate means for each of the sliding clutch members for moving it into engagement with a clutch member of an index wheel, said means including a lever, a selector provided with a series of pins adapted to be brought into contact with said levers, means controlled by the carriage of the typewriting machine for moving the selector to bring one of its pins into line with one of the levers, and means operated by a numeral key for shifting the selector to cause said lever to move the sliding clutch member into engagement with the clutch member of the index wheel.

241. In a calculating machine for use in connection with a typewriting machine having numeral keys and a paper carriage, a series of index wheels, a shaft extending through the centers of the index wheels but normally disconnected therefrom, means controlled by the carriage of the typewriting machine for selecting the index wheel to be rotated, means operated by a key for connecting the index wheel selected with the shaft, means normally locked for rotating the shaft, and means also operated by the key for unlocking the rotating means to permit the rotation of the shaft and index wheel selected.

242. In a calculating machine for use in connection with a typewriting machine having numeral keys and a paper carriage, a series of index wheels, a shaft extending through the centers of the index wheels but normally disconnected therefrom, means controlled by the carriage of the typewriting machine for selecting the index wheel to be rotated, means operated by a key for connecting the index wheel selected with the shaft, means normally locked for rotating the shaft, and means operated by the key for determining the rotation to be given to the shaft and for unlocking the rotating means to permit the rotation of the shaft and index wheel selected.

243. In a calculating machine, a series of fixed plates each provided with a bearing, a series of centrally apertured index wheels each carried in a bearing in one of the fixed plates and each having a clutch member, a shaft of less diameter than the aperture in said index wheels extending centrally through the series of index wheels and mounted in bearings independent of the fixed plates, a series of clutch members carried by the shaft and each independently slidable on the shaft to engage the clutch member of one of the index wheels, means for moving the clutch members on the shaft, and means for rotating the shaft.

244. In a calculating machine for use in connection with a typewriting machine having a reciprocating paper carriage, a series of index wheels, means for rotating any one of the index wheels, means for selecting the index wheel to be rotated, means controlled by the carriage of the typewriting machine for positioning the selecting means, and independently controlled means for operating the selecting means to connect the index wheel selected with the means for rotating it.

245. In a calculating machine for use in connection with a typewriting machine having a reciprocating paper carriage, the combination of index wheels, a shaft concentric with the index wheels normally disconnected from them, separate means for clutching each of said index wheels to the shaft, a selecting device provided with means for operating the clutching means, means controlled by the typewriter carriage for positioning the selecting means, means for moving the selecting means to effect the clutching of the index wheel selected and means for rotating the shaft a predetermined portion of a rotation.

246. In a calculating machine for use in connection with a typewriting machine having a reciprocating paper carriage, a group of index wheels, a rotary shaft for rotating the index wheels normally disconnected therefrom, connecting devices for connecting the index wheels with the rotary shaft, a selector for operating the connecting devices in succession, means for holding the selector locked against movement, and means carried by the carriage of the typewriting machine for releasing the locking means.

247. In a calculating machine for use in connection with a typewriting machine having a reciprocating paper carriage and numeral keys, a group of index wheels, a rotary shaft for rotating the index wheels normally disconnected therefrom, connecting devices for connecting the index wheels with the rotary shaft, means for operating the connecting devices by the movement of a numeral key comprising a member normally disconnected from the key, means controlled by the carriage of the typewriting machine for shifting such member into position to be operated by the key.

248. An index wheel, a shaft for rotating the index wheel, power mechanism for rotating the shaft, stopping mechanism for the power mechanism normally holding the power mechanism locked against operation, a master wheel in gear with the power mechanism, and a stop bar carried by the master wheel and laterally movable therein provided with means for effecting the release of the power mechanism and also provided with means adapted upon the rotation of the master wheel to cause the stopping mechanism to stop and lock the power mechanism.

249. The combination with a typewriting machine having numeral keys of calculating mechanism comprising an index wheel, a shaft for rotating the index wheel, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, and means operated by a numeral key for moving the stop bar to release the power mechanism.

250. An index wheel, a shaft normally disconnected from the index wheel for rotating it, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, and means for connecting the index wheel with the shaft and for moving the stop bar to release the power mechanism.

251. An index wheel, a shaft for rotating the index wheel, power mechanism for rotating the shaft, stopping mechanism for the power mechanism normally holding the power mechanism locked against operation, a master wheel in gear with the power mechanism, a series of stop bars carried by the master wheel and laterally movable therein each provided with means for effecting the release of the power mechanism and also provided with means adapted upon the rotation of the master wheel to cause the stopping mechanism to stop and lock the power mechanism.

252. An index wheel, a shaft for rotating the index wheel, power mechanism for rotating the shaft, stopping mechanism for the power mechanism normally holding the power mechanism locked against operation, a master wheel in gear with the power mechanism, a series of stop bars carried by the master wheel and laterally movable therein each provided with means for effecting the release of the power mechanism and also provided with means adapted upon the rotation of the master wheel to cause the stopping mechanism to stop and lock the power mechanism, and means operated by the movement of a stop bar for locking the other stop bars against movement.

253. An index wheel, a shaft normally disconnected from the index wheel for rotating it, power mechanism for rotating the shaft, stopping mechanism for the power mechanism normally holding the power mechanism locked against operation, a master wheel in gear with the power mechanism, a series of stop bars carried by the master wheel and laterally movable therein each provided with means for effecting the release of the power mechanism and also provided with means adapted upon the rotation of the master wheel to cause the stopping mechanism to stop and lock the power mechanism, and means for connecting the index wheel with the shaft and for moving a stop bar to release the power mechanism.

254. A series of index wheels, a shaft normally disconnected from the index wheels for rotating them, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, means for selecting an index wheel to be rotated, means for connecting the index wheel selected with the shaft, and means for moving the stop bar to release the power mechanism.

255. A series of index wheels, a shaft normally disconnected from the index wheels for rotating them, power mechanism for rotating the shaft, stopping mechanism for the power mechanism normally holding the power mechanism locked against operation, a master wheel in gear with the power mechanism, a series of stop bars carried by the master wheel and laterally movable therein provided with means for effecting the release of the power mechanism and also provided with means adapted upon the rotation of the master wheel to cause the stopping mechanism to stop and lock the power mechanism, means for selecting an index wheel to be rotated, means for connecting the index wheel selected with the shaft, and means for moving the stop bar to release the power mechanism.

256. The combination with a typewriting machine having numeral keys and a reciprocating paper carriage, of calculating mechanism comprising a series of index wheels, a shaft normally disconnected from the index wheels for rotating them, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, means controlled by the paper carriage for selecting the index wheel to be rotated, means operated by a numeral key for connecting the index wheel selected with the shaft, and means also operated by the numeral key for moving the stop bar to release the power mechanism.

257. The combination with a typewriting machine having numeral keys and a reciprocating paper carriage, of calculating mechanism comprising a series of index wheels, a shaft normally disconnected from the index wheels for rotating them, power mechanism for rotating the shaft, stopping mechanism for the power mechanism normally holding the power mechanism locked against operation, a master wheel in gear with the power mechanism, a series of stop bars carried by the master wheel and laterally movable therein each provided with means for effecting the release of the power mechanism and also provided with means adapted upon the rotation of the master wheel to cause the stopping mechanism to stop and lock the power mechanism, means controlled by the paper carriage for selecting the index wheel to be rotated, means operated by a numeral key for connecting the index wheel selected with the shaft, and means also operated by the numeral key for moving a stop bar to release the power mechanism.

258. An index wheel, a shaft normally disconnected from the index wheel for rotating it, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, means for connecting the index wheel with the shaft, means for moving the stop bar to release the power mechanism, and means for locking the connecting means against disengagement during the operation of the power mechanism.

259. A series of index wheels, a shaft normally disconnected from the index wheels for rotating them, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, means for selecting an index wheel to be rotated, means for connecting the index wheel selected with the shaft, means for moving the stop bar to release the power mechanism, and means for locking the connecting means against disengagement during the operation of the power mechanism.

260. The combination with a typewriting machine having numeral keys and a reciprocating paper carriage, of calculating mechanism comprising a series of index wheels, a shaft normally disconnected from the index wheels for rotating them, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, means controlled by the paper carriage for selecting an index wheel to be rotated, means operated by a numeral key for connecting the index wheel selected with the shaft, means also operated by the numeral key for moving the stop bar to release the power mechanism, and means for locking the connecting means against disengagement during the operation of the power mechanism.

261. In a calculating machine comprising index wheels, a shaft for rotating the index wheels and power mechanism in gear with the shaft, a master wheel for controlling the movement of the power mechanism provided with a series of stop bars, stopping mechanism adapted to be operated by any one of said stop bars, means adapted to be operated by any one of the stop bars for releasing the power mechanism, and means for operating any one of said stop bars to operate the releasing means and to position it for operating the stopping mechanism upon the completion of a predetermined movement of the power mechanism.

262. In a calculating machine comprising index wheels, a shaft normally disconnected from the index wheels for rotating them, and power mechanism in gear with the shaft, a master wheel for controlling the movement of the power mechanism provided with a series of stop bars, stopping mechanism adapted to be operated by any one of said stop bars, means adapted to be operated by any one of the stop bars for releasing the power mechanism, means for connecting one of the index wheels with the shaft, and means for operating any one of said stop bars to operate the releasing means and to position it for operating the stopping mechanism upon the completion of a predetermined movement of the power mechanism.

263. In a calculating machine comprising index wheels, a shaft normally disconnected from the index wheels for rotating them, and power mechanism in gear with the shaft, a master wheel for controlling the movement of the power mechanism provided with a series of stop bars, stopping mechanism adapted to be operated by any one of said stop bars, means adapted to be operated by any one of the stop bars for releasing the power mechanism, means for connecting one of the index wheels with the shaft, means for operating any one of said stop bars to operate the releasing means and to position it for operating the stopping mechanism upon the completion of a predetermined movement of the power mechanism, and means for locking the connecting means against disengagement during the operation of the power mechanism.

264. An index wheel, a shaft for rotating the index wheel, power mechanism for rotating the shaft, stopping mechanism for the power mechanism normally holding the power mechanism locked against operation, a master wheel in gear with the power mechanism, a stop bar carried by the master wheel and laterally movable therein provided with means for effecting the release of the power mechanism and also provided with means adapted upon the rotation of the master wheel to cause the stopping mechanism to stop and lock the power mechanism, and means for checking the momentum of the power mechanism in advance of the operation of the stopping mechanism.

265. In a calculating machine comprising index wheels, a shaft for rotating the index wheels and power mechanism in gear with the shaft, a master wheel for controlling the movement of the power mechanism provided with a series of stop bars, stopping mechanism adapted to be operated by any one of said stop bars, means adapted to be operated by any one of the stop bars for releasing the power mechanism, means for operating any one of said stop bars to operate the releasing means and to position it for operating the stopping mechanism upon the completion of a predetermined movement of the power mechanism, and means for checking the momentum of the power mechanism in advance of the operation of the stopping mechanism.

266. In a calculating machine comprising an index wheel, a shaft for rotating it and power mechanism in gear with the shaft, a master wheel driven by the power mechanism, stopping mechanism for the power mechanism comprising a lever arm, laterally movable stop bars carried by the master wheel each provided with a projection extending radially outward, means for holding the stop bars with their projections normally out of position to operate said lever arm, and means for releasing any one of the stop bars and shifting it laterally to bring its projection into position to operate the lever arm and cause the stopping mechanism to be operated.

267. In a calculating machine comprising an index wheel, a shaft for rotating it and power mechanism in gear with the shaft, a master wheel driven by the power mechanism, stopping mechanism for the power mechanism comprising a lever arm, laterally movable stop bars carried by the master wheel each provided with a projection extending radially outward, means for holding the stop bars with their projections normally out of position to operate said lever arm, means for releasing any one of the stop bars and shifting it laterally to bring its projection into position to operate the lever arm and cause the stopping mechanism to be operated, and means for returning the stop bar to normal position.

268. In a calculating machine comprising an index wheel, a shaft for rotating it and power mechanism in gear with the shaft, a master wheel driven by the power mechanism, stopping mechanism for the power mechanism comprising a lever arm, laterally movable stop bars carried by the master wheel each provided with a projection extending radially outward, means for holding the stop bars with their projections normally out of position to operate said lever arm, means for releasing any one of the stop bars and shifting it laterally to bring its projection into position to operate the lever arm and cause the stopping mechanism to be operated, and means positioned by the stopping mechanism for returning the stop bar to normal position.

269. In a calculating machine comprising an index wheel, a shaft for rotating it and power mechanism in gear with the shaft, a master wheel driven by the power mechanism, stopping mechanism for the power mechanism comprising a lever arm, a laterally movable stop bar carried by the master wheel provided with a projection extending radially outward, means for holding the stop bar with its projection normally out of position to operate said lever arm, and means for releasing the stop bar and shifting it laterally to bring its projection into position to operate the lever arm and cause the stopping mechanism to be operated.

270. In a calculating machine comprising an index wheel, a shaft for rotating it and power mechanism in gear with the shaft, a master wheel driven by the power mechanism, stopping mechanism for the power mechanism comprising a lever arm, a laterally movable stop bar carried by the master wheel provided with a projection extending radially outward, means for holding the stop bar with its projection normally out of position to operate said lever arm, means for releasing the stop bar and shifting it laterally to bring its projection into position to operate the lever arm and cause the stopping mechanism to be operated, and means for returning the stop bar to normal position.

271. In a calculating machine comprising an index wheel, a shaft for rotating it and power mechanism in gear with the shaft, a master wheel driven by the power mechanism, stopping mechanism for the power mechanism comprising a lever arm, a laterally movable stop bar carried by the master wheel provided with a projection extending radially outward, means for holding the stop bar with its projection normally out of position to operate said lever arm, means for releasing the stop bar and shifting it laterally to bring its projection into position to operate the lever arm and cause the stopping mechanism to be operated, and means positioned by the stopping mechanism for returning the stop bar to normal position.

272. In a calculating machine comprising an index wheel, a shaft for rotating it and power mechanism in gear with the shaft, a master wheel driven by the power mechanism, stopping mechanism for the power mechanism normally holding the power mechanism locked against operating and comprising a lever arm, laterally movable stop bars carried by the master wheel each provided with a projection extending radially outward, means for holding the stop bars with their projections normally out of position to operate said lever arm, means for releasing any one of the stop bars and shifting it laterally to bring its projection into position to operate the lever arm and cause the stopping mechanism to be operated, and means operated by the shifting of a stop bar for releasing the power mechanism.

273. In a calculating machine comprising an index wheel, a shaft for rotating it and power mechanism in gear with the shaft, a master wheel driven by the power mechanism, stopping mechanism for the power mechanism normally holding the power mechanism locked against operation and comprising a lever arm, laterally movable stop bars carried by the master wheel each provided with a projection extending radially outward, means for holding the stop bars with their projections normally out of position to operate said lever arm, means for releasing any one of the stop bars and shifting it laterally to bring its projection into position to operate the lever arm and cause the stopping mechanism to be operated, means operated by the shifting of a stop bar for locking the other stop bars against operation, and means operated by the shifting of a stop bar for releasing the power mechanism.

274. In a calculating machine comprising index wheels, a shaft for rotating them and power mechanism in gear with the shaft, a master wheel provided with a radial slot, stopping mechanism for the power mechanism comprising a lever arm, a laterally movable stop bar carried in the slot of the master wheel provided with a projection extending radially outward and having on its outer edge a shoulder adapted to engage the outer end of said slot to hold the stop bar with its projection normally out of position to operate said lever arm, and means for moving the stop bar inward to disengage its shoulder from the end of the slot and shifting it laterally to bring its projection into position to operate the lever arm and cause the stopping mechanism to be operated.

275. In a calculating machine comprising index wheels, a shaft for rotating them and power mechanism in gear with the shaft, a master wheel provided with a radial slot, stopping mechanism for the power mechanism comprising a lever arm, a laterally movable stop bar carried in the slot of the master wheel provided with a projection extending radially outward and having on its outer edge a shoulder adapted to engage the outer end of said slot to hold the stop bar with its projection normally out of position to operate said lever arm, means for moving the stop bar inward to disengage its shoulder from the end of the slot and shifting it laterally to bring its projection into position to operate the lever arm and cause the stopping mechanism to be operated, and means for returning the stop bar to normal position.

276. In a calculating machine comprising index wheels, a shaft for rotating them and power mechanism in gear with the shaft, a master wheel provided with a radial slot, stopping mechanism for the power mechanism comprising a lever arm, a laterally movable stop bar carried in the slot of the master wheel provided with a projection extending radially outward and having on its outer edge a shoulder adapted to engage the outer end of said slot to hold the stop bar with its projections normally out of position to operate said lever arm, means for moving the stop bar inward to disengage its shoulder from the end of the slot and shifting it laterally to bring its projection into position to operate the lever arm and cause the stopping mechanism to be operated, and means positioned by the stopping mechanism for returning the stop bar to normal position.

277. In a calculating machine comprising index wheels, a shaft for rotating them and power mechanism in gear with the shaft, a master wheel provided with a radial slot, stopping mechanism for the power mechanism comprising a lever arm, a laterally movable stop bar carried in the slot of the master wheel provided with a projection extending radially outward and having on its outer edge a shoulder adapted to engage the outer end of said slot to hold the stop bar with its projection normally out of position to operate said lever arm, yielding means for holding the shoulder of the stop bar in engagement with the end of the slot, and means for moving the stop bar inward to disengage its shoulder from the end of the slot and shifting it laterally to bring its projection into position to operate the lever arm and cause the stopping mechanism to be operated.

278. In a calculating machine comprising index wheels, a shaft for rotating them and power mechanism in gear with the shaft, a master wheel provided with a radial slot, stopping mechanism for the power mechanism comprising a lever arm, a laterally movable stop bar carried in the slot of the master wheel provided with a projection extending radially outward and having on its outer edge a shoulder adapted to engage the outer end of said slot to hold the stop bar with its projection normally out of position to operate said lever arm, yielding means for holding the shoulder of the stop bar in engagement with the end of the slot, means for moving the stop bar inward to disengage its shoulder from the end of the slot and shifting it laterally to bring its projection into position to operate the lever arm and cause the stopping mechanism to be operated, and means for returning the stop bar shifted to normal position.

279. In a calculating machine comprising index wheels, a shaft for rotating them and power mechanism in gear with the shaft, a master wheel provided with radial slots, stopping mechanism for the power mechanism comprising a lever arm, laterally movable stop bars carried in the slots of the master wheel each provided with a projection extending radially outward and each having on its outer edge a shoulder adapted to engage the outer end of a slot for holding the stop bars with their projections normally out of position to operate said lever arm, and means for moving inward any one of the stop bars to disengage its shoulder from the end of the slot and shifting it laterally to bring its projection into position to operate the lever arm and cause the stopping mechanism to be operated.

280. In a calculating machine comprising index wheels, a shaft for rotating them and power mechanism in gear with the shaft, a master wheel provided with radial slots, stopping mechanism for the power mechanism comprising a lever arm, laterally movable stop bars carried in the slots of the master wheel each provided with a projection extending radially outward and each having on its outer edge a shoulder adapted to engage the outer end of a slot for holding the stop bars with their projections normally out of position to operate said lever arm, means for moving inward any one of the stop bars to disengage its shoulder from the end of the slot and shifting it laterally to bring its projection into position to operate the lever arm and cause the stopping mechanism to be operated, and means operated by the shifting of a stop bar for locking the other stop bars against operation.

281. In a calculating machine comprising index wheels, a shaft for rotating them and power mechanism in gear with the shaft, a master wheel provided with radial slots, stopping mechanism for the power mechanism comprising a lever arm, laterally movable stop bars carried in the slots of the master wheel each provided with a projection extending radially outward and each having on its outer edge a shoulder adapted to engage the outer end of a slot for holding the stop bars with their projections normally out of position to operate said lever arm, means for moving inward any one of the stop bars to disengage its shoulder from the end of the slot and shifting it laterally to bring its projection into position to operate the lever arm and cause the stopping mechanism to be operated, means operated by the shifting of a stop bar for locking the other stop bars against operation, and means for returning the stop bar shifted, to normal position.

282. An index wheel, a shaft for rotating the index wheel, power mechanism for rotating the shaft, stopping mechanism for the power mechanism comprising a lever arm normally locked to hold the power mechanism locked against operation, a master wheel in gear with the power mechanism, a stop bar carried by the master wheel and laterally movable therein provided with means for effecting the release of the lever arm to release the power mechanism and also provided with means adapted upon the rotation of the master wheel to cause the stopping mechanism to stop and lock the power mechanism.

283. An index wheel, a shaft for rotating the index wheel, power mechanism for rotating the shaft, stopping mechanism for the power mechanism comprising a lever arm normally locked to hold the power mechanism locked against operation, a master wheel in gear with the power mechanism, a series of stop bars carried by the master wheel and each laterally movable therein each provided with means for effecting the release of the lever arm to release the power mechanism and also provided with means adapted upon the rotation of the master wheel to cause the stopping mechanism to stop and lock the power mechanism.

284. In a calculating machine comprising index wheels, a shaft for rotating them and power mechanism in gear with the shaft, a master wheel, stopping mechanism for the power mechanism comprising a lever arm normally locked, means for releasing the lever arm, laterally movable stop bars carried by the master wheel each provided with a projection extending radially outward and each provided with means for effecting the release of the lever arm, means for holding the stop bars with their projections normally out of position to operate said lever arm, means for releasing any one of the stop bars and shifting it laterally to effect the release of the lever arm and to bring its projection into position to operate the lever arm and cause the stopping mechanism to be operated, and means adapted to be operated by each stop bar for locking the other stop bars against operation.

285. In a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a laterally movable stop bar carried by the master wheel provided with a projection extending radially outward, means for holding the stop bar with its projection normally out of position to operate said lever arm, means for releasing the stop bar and shifting it laterally to bring its projection into position to operate the lever arm, and means operated by the stop bar for releasing the power mechanism to rotate the shaft for the index wheels and to rotate the master wheel to cause the projection of the stop bar to operate the lever arm and cause the stopping mechanism to operate.

286. In a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a laterally movable stop bar carried by the master wheel provided with a projection extending radially outward, means for holding the stop bar with its projection normally out of position to operate said lever arm, means for releasing the stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, and means for returning the stop bar to normal position.

287. In a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a series of laterally movable stop bars carried by the master wheel each provided with a projection extending radially outward, means for holding the stop bars with their projections normally out of position to operate said lever arm, means for releasing a stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, and means operated by the stop bar for locking the other stop bars against operation.

288. In a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a series of laterally movable stop bars carried by the master wheel each provided with a projection extending radially outward, means for holding the stop bars with their projections normally out of position to operate said lever arm, means for releasing a stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, means operated by the stop bar for locking the other stop bars against operation, and means for returning the stop bar to normal position.

289. An index wheel, a shaft for rotating the index wheel, power mechanism for rotating the shaft, a master wheel in gear with the power mechanism, stopping mechanism for the power mechanism normally holding the power mechanism locked against operation said stopping mechanism comprising a lever arm, a stop bar carried by the master wheel and laterally movable therein having a portion thereof normally extending laterally from the master wheel and also provided with a radially extending projection normally out of line with the lever arm of the stopping mechanism, a slide bar adapted, when operated, to strike the laterally projecting portion of the stop bar and move it laterally to bring its radial projection in line with said lever arm, and means operated by the movement of the stop bar for releasing the stopping mechanism to permit the master wheel to be rotated to bring the radial projection of the stop bar against the lever arm to effect the stopping of the power mechanism.

290. An index wheel, a shaft for rotating the index wheel, power mechanism for rotating the shaft, a master wheel in gear with the power mechanism, stopping mechanism for the power mechanism normally holding the power mechanism locked against operation said stopping mechanism comprising a lever arm, a series of stop bars carried by the master wheel and laterally movable therein each having a portion thereof normally extending laterally from the master wheel and also provided with a radially extending projection normally out of line with the lever arm of the stopping mechanism, a slide bar adapted, when operated, to strike the laterally projecting portion of one of the stop bars and move it laterally to bring its radial projection in line with said lever arm, and means operated by the movement of the stop bar for releasing the stopping mechanism to permit the master wheel to be rotated to bring the radial projection of the stop bar against the lever arm to effect the stopping of the power mechanism.

291. An index wheel, a shaft for rotating the index wheel, power mechanism for rotating the shaft, a master wheel in gear with the power mechanism, stopping mechanism for the power mechanism normally holding the power mechanism locked against operation said stopping mechanism comprising a lever arm, a series of stop bars carried by the master wheel and laterally movable therein each having a portion thereof normally extending laterally from the master wheel and also provided with a radially extending projection normally out of line with the lever arm of the stopping mechanism, a series of stop bars each adapted, when operated, to strike the laterally projecting portion of a stop bar and move it laterally to bring its radial projection in line with said lever arm, and means operated by the movement of the stop bar for releasing the stopping mechanism to permit the master wheel to be rotated to bring the radial projection of the stop bar against the lever arm to effect the stopping of the power mechanism.

292. An index wheel, a shaft normally disconnected from the index wheel for rotating it, power mechanism for rotating the shaft, a master wheel in gear with the power mechanism, stopping mechanism for the power mechanism normally holding the power mechanism locked against operation said stopping mechanism comprising a lever arm, a stop bar carried by the master wheel and laterally movable therein having a portion thereof normally extending laterally from the master wheel and also provided with a radially extending projection normally out of line with the lever arm of the stopping mechanism, a slide bar adapted, when operated, to strike the laterally projecting portion of the stop bar and move it laterally to bring the radial projection in line with said lever arm, means operated by the movement of the stop bar for releasing the stopping mechanism to permit the master wheel to be rotated to bring the radial projection of the stop bar against the lever arm to effect the stopping of the power mechanism, and means for connecting the index wheel with the shaft in advance of the release of the power mechanism.

293. An index wheel, a shaft normally disconnected from the index wheel for rotating it, power mechanism for rotating the shaft, a master wheel in gear with the power mechanism, stopping mechanism for the power mechanism normally holding the power mechanism locked against operation said stopping mechanism comprising a lever arm, a series of stop bars carried by the master wheel and laterally movable therein each having a portion thereof normally extending laterally from the master wheel and also provided with a radially extending projection normally out of line with the lever arm of the stopping mechanism, a slide bar adapted, when operated, to strike the laterally projecting portion of the stop bar and move it laterally to bring its radial projection in line with said lever arm, means operated by the movement of the stop bar for releasing the stopping mechanism to permit the master wheel to be rotated to bring the radial projection of the stop bar against the lever arm to effect the stopping of the power mechanism, and means for connecting the index wheel with the shaft in advance of the release of the power mechanism.

294. An index wheel, a shaft for rotating the index wheel, power mechanism for rotating the shaft, a master wheel in gear with the power mechanism, stopping mechanism for the power mechanism normally holding the power mechanism locked against operation said stopping mechanism comprising a lever arm, a stop bar carried by the master wheel and laterally movable therein having a portion thereof normally extending laterally from the master wheel and also provided with a radially extending projection normally out of line with the lever arm of the stopping mechanism, a series of slide bars movable in a fixed bearing each adapted, when operated, to strike the laterally projecting portion of the stop bar and move it laterally to bring its radial projection in line with said lever arm, means operated by the movement of the stop bar for releasing the stopping mechanism to permit the master wheel to be rotated to bring the radial projection of the stop bar against the lever arm to so effect the stopping of the power mechanism that the stop bar will be in line with a slide bar.

295. An index wheel, a shaft for rotating the index wheel, power mechanism for rotating the shaft, a master wheel in gear with the power mechanism, stopping mechanism for the power mechanism normally holding the power mechanism locked against operation said stopping mechanism comprising a lever arm, a series of stop bars carried by the master wheel and laterally movable therein each having a portion thereof normally extending laterally from the master wheel and also provided with a radially extending projection normally out of line with the lever arm of the stopping mechanism, a series of slide bars movable in fixed bearings in line with a stop bar when the master wheel is in normal position and adapted, when operated, to strike the laterally projecting portion of the stop bar and move it laterally to bring its radial projection in line with said lever arm, means operated by the movement of the stop bar for releasing the stopping mechanism to permit the master wheel to be rotated to bring the radial projection of the stop bar against the lever arm to so effect the stopping of the power mechanism that the stop bars will be in line with the slide rods.

296. An index wheel, a shaft for rotating the index wheel, power mechanism for rotating the shaft, a master wheel in gear with the power mechanism, stopping mechanism for the power mechanism normally holding the power mechanism locked against operation said stopping mechanism comprising a lever arm, a series of stop bars carried by the master wheel and laterally movable therein each having a portion thereof normally extending laterally from the master wheel and also provided with a radially extending projection normally out of line with the lever arm of the stopping mechanism, a series of slide bars movable in fixed bearings in line with the stop bars when the master wheel is in normal position and adapted, when operated, to strike the laterally projecting portion of a stop bar and move it laterally to bring its radial projection in line with said lever arm, means operated by the movement of the stop bar for releasing the stopping mechanism to permit the master wheel to be rotated to bring the radial projection of the stop bar against the lever arm to effect the stopping of the power mechanism, and means for returning the stop bar operated, to normal position.

297. The combination with a typewriting machine having numeral keys of a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a laterally movable stop bar carried by the master wheel provided with a projection extending radially outward, means for holding the stop bar with its projection normally out of position to operate said lever arm, means operated by a numeral key for releasing the stop bar and shifting it laterally to bring its projection into position to operate the lever arm, and means operated by the stop bar for releasing the power mechanism to rotate the shaft for the index wheels and to rotate the master wheel to cause the projection of the stop bar to operate the lever arm and cause the stopping mechanism to operate.

298. The combination with a typewriting machine having numeral keys of a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a series of laterally movable stop bars carried by the master wheel each provided with a projection extending radially outward, means for holding the stop bars with their projections normally out of position to operate said lever arm, means operated by the numeral keys for releasing a stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, and means operated by the stop bar shifted for locking the other stop bars against operation.

299. The combination with a typewriting machine having numeral keys of a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a series of laterally movable stop bars carried by the master wheel each provided with a projection extending radially outward, means for holding the stop bars with their projections normally out of position to operate said lever arm, means operated by the numeral keys for releasing a stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, and means operated by the numeral key on the initial movement for locking the other numeral keys against operation.

300. The combination with a typewriting machine having numeral keys of a calculating machine comprising index wheels, a shaft for rotating them, and power mechanism in gear with the shaft, a master wheel in gear with the power mechanism, stopping mechanism for the power mechanism normally holding the power mechanism locked against operation and comprising a lever arm, a series of laterally movable stop bars carried by the master wheel each provided with a projection extending radially outward, means for holding the stop bars with their projections normally out of position to operate said lever arm, means operated by the numeral keys for releasing a stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, and means for returning the stop bar to normal position independently of the numeral key.

301. The combination with a typewriting machine having numeral keys of a calculating machine comprising an index wheel, a shaft normally disconnected from the index wheel for rotating it, and power mechanism in gear with the shaft, a master wheel in gear with the power mechanism, stopping mechanism for the power mechanism normally holding the power mechanism locked against operation and comprising a lever arm, a laterally movable stop bar carried by the master wheel provided with a projection extending radially outward, means for holding the stop bar with its projection normally out of position to operate said lever arm, means operated by the numeral keys for releasing the stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, and means operated by the numeral keys for connecting the index wheel with the shaft.

302. The combination with a typewriting machine having numeral keys of a calculating machine comprising an index wheel, a shaft normally disconnected from the index wheel for rotating it, and power mechanism in gear with the shaft, a master wheel in gear with the power mechanism, stopping mechanism for the power mechanism normally holding the power mechanism locked against operation and comprising a lever arm, a series of laterally movable stop bars carried by the master wheel each provided with a projection extending radially outward, means for holding the stop bar with its projection normally out of position to operate said lever arm, means operated by the numeral keys for releasing a stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, and means operated by the numeral keys for connecting the index wheel with the shaft.

303. The combination with a typewriting machine having numeral keys of a calculating machine comprising index wheels, a shaft normally disconnected from the index wheels for rotating them, and power mechanism in gear with the shaft, a master wheel in gear with the power mechanism, stopping mechanism for the power mechanism normally holding the power mechanism locked against operation and comprising a lever arm, a laterally movable stop bar carried by the master wheel provided with a projection extending radially outward, means for holding the stop bar with its projection normally out of position to operate said lever arm, means operated by the numeral keys for releasing the stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, means for selecting the index wheel to be rotated, and means operated by the numeral key for connecting the index wheel selected with the shaft.

304. The combination with a typewriting machine having numeral keys and a paper carriage of a calculating machine comprising index wheels, a shaft normally disconnected from the index wheels for rotating them, and power mechanism in gear with the shaft, a master wheel in gear with the power mechanism, stopping mechanism for the power mechanism normally holding the power mechanism locked against operation and comprising a lever arm, a laterally movable stop bar carried by the master wheel provided with a projection extending radially outward, means for holding the stop bar with its projection normally out of position to operate said lever arm, means operated by the numeral keys for releasing the stop bar and shifting it laterally to bring its projection into position to operate the lever arm, means operated by the stop bar for releasing the power mechanism to rotate the shaft for the index wheels and to rotate the master wheel to cause the projection of the stop bar to operate the lever arm and cause the stopping mechanism to operate, means controlled by the paper carriage for selecting the index wheel to be rotated, and means operated by the numeral key for connecting the index wheel selected with the shaft.

305. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, and a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar.

306. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar movable in fixed bearings provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, and means for returning the stop bar to normal position independently of the return of the slide bar.

307. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar movable in fixed bearings provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means for returning the stop bar to normal position independently of the return of the slide bar, and means for returning the slide bar to normal position.

308. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, and a series of slide bars each provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, the slide bars being so arranged that when the master wheel is in normal position they will each be in line with a stop bar.

309. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a series of slide bars each provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, the slide bars being so arranged that when the master wheel is in normal position they will each be in line with a stop bar, and independent means for moving each slide bar.

310. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a series of slide bars each provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, the slide bars being so arranged that when the master wheel is in normal position they will each be in line with a stop bar, separate keys for moving each slide bar, and means operated by the initial movement of a key for locking the keys for the other slide bars against operation.

311. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means for positively moving the slide bar in both directions, and means independent of the movement of the slide bar for returning the stop bar to normal position.

312. The combination with a wheel to be rotated and power mechanism normally disconnected from the wheel for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, a key for moving the slide bar, and means operated by the key for connecting the wheel to be rotated with the power mechanism.

313. The combination with a wheel to be rotated and power mechanism normally disconnected from the wheel for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, a key for moving the slide bar, means operated by the key for connecting the wheel to be rotated with the power mechanism, and means for returning the stop bar to normal position independently of the movement of the key.

314. The combination with a wheel to be rotated and power mechanism for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, and means operated by the movement of the stop bar for locking the other stop bars against movement.

315. The combination with a wheel to be rotated and power mechanism for rotating it, of stopping mechanism for the power mechanism normally holding the power mechanism normally locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means operated by the movement of the stop bar for locking the other stop bars against movement, and means for returning the stop bar to normal position independently of the movement of the slide.

316. The combination with a series of wheels to be rotated and power mechanism normally disconnected from the wheels for rotating them, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means for selecting the wheel to be rotated, and means for connecting the wheel selected with the power mechanism.

317. The combination with a series of wheels to be rotated and power mechanism normally disconnected from the wheels for rotating them, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means for selecting the wheel to be rotated, means for connecting the wheel selected with the power mechanism, and means for locking the connecting means against disengagement during the operation of the power mechanism.

318. The combination with a series of wheels to be rotated and power mechanism normally disconnected from the wheels for rotating them, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means for selecting the wheel to be rotated, means for connecting the wheel selected with the power mechanism, and means operated by the stopping mechanism for locking the connecting means against disengagement during the operation of the power mechanism.

319. The combination with a wheel to be rotated and power mechanism normally disconnected from the wheel for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means for connecting the wheel with the power mechanism, and means for locking the connecting means against disengagement during the operation of the power mechanism.

320. The combination with a wheel to be rotated and power mechanism normally disconnected from the wheel for rotating it, of stopping mechanism for the power mechanism normally holding the power mechanism locked against operation, a master wheel provided with means adapted to be set to unlock the power mechanism to permit it to rotate the master wheel and to cause the stopping mechanism to operate to stop and again lock the power mechanism on the completion of a predetermined movement of rotation, said means comprising a series of stop bars carried by the master wheel and laterally movable therein each having a portion extending laterally from the master wheel, a slide bar provided on its end with a swinging pawl adapted to engage the lateral projection of a stop bar to move the stop bar laterally to effect the release of the power mechanism, the swinging pawl being adapted to yield to permit the lateral projections of the stop bars, other than the one operated, to pass it as the master wheel is rotated whereby the operation of the power mechanism may take place in advance of the withdrawal of the slide bar, means for connecting the wheel with the power mechanism, and means operated by the stopping mechanism for locking the connecting means against disengagement during the operation of the power mechanism.

321. The combination with a typewriting machine having numeral keys and a reciprocating paper carriage, of calculating mechanism comprising a series of index wheels each provided with means for holding it normally locked, power mechanism, normally locked, and means adapted to be operated by the power mechanism for rotating the index wheels normally disconnected therefrom, means controlled by the movement of the paper carriage for selecting the index wheel to be rotated, means adapted to be operated by the depression of any one of the numeral keys for unlocking the selected index wheel and connecting it with the means for rotating the index wheels, means also operated by the numeral key depressed for unlocking the power mechanism to permit it to rotate the index wheel selected through a predetermined movement of rotation, means operated by the numeral key depressed for preventing its return to elevated position until it has completed its movement of depression, means operated by the numeral key depressed for locking the other numeral keys against depression until the key depressed returns to elevated position, means operated by the numeral key depressed for holding out of operation the means for connecting the index wheels other than the one selected with the rotating means until the key depressed returns to elevated position, and means for locking the selecting means against movement until the index wheel has been rotated.

322. The combination with a typewriting machine having numeral keys and a reciprocating paper carriage, of calculating mechanism comprising a series of index wheels each provided with means for holding it normally locked, power mechanism, normally locked, and means adapted to be operated by the power mechanism for rotating the index wheels normally disconnected therefrom, means controlled by the movement of the paper carriage for selecting the index wheel to be rotated, means adapted to be operated by the depression of any one of the numeral keys for unlocking the selected index wheel and connecting it with the means for rotating the index wheels, means also operated by the numeral key depressed for unlocking the power mechanism to permit it to rotate the index wheel selected through a predetermined movement of rotation, means operated by the numeral key depressed for preventing its return to elevated position until it has completed its movement of depression, means operated by the numeral key depressed for locking the other numeral keys against depression until the key depressed returns to elevated position, means operated by the numeral key depressed for holding out of operation the means for connecting the index wheels other than the one selected with the rotating means until the key depressed returns to elevated position, means for relocking the power mechanism on the completion of its predetermined movement, and means for locking the selecting means against movement during the movement of the power mechanism.

323. The combination with a typewriting machine having numeral keys and a reciprocating paper carriage, of calculating mechanism comprising a series of index wheels each provided with means for holding it normally locked, power mechanism, means for holding the power mechanism normally locked, and means adapted to be operated by the power mechanism for rotating the index wheels normally disconnected therefrom, means controlled by the movement of the paper carriage for selecting the index wheel to be rotated, means adapted to be operated by the depression of any one of the numeral keys for unlocking the selected index wheel and connecting it with the means for rotating the index wheels, means also operated by the numeral key depressed for unlocking the power mechanism to permit it to rotate the index wheel selected through a predetermined movement of rotation, means operated by the numeral key depressed for preventing its return to elevated position until it has completed its movement of depression, means operated by the numeral key depressed for locking the other numeral keys against depression until the key depressed returns to elevated position, means operated by the numeral key depressed for holding out of operation the means for connecting the index wheels other than the one selected with the rotating means until the key depressed returns to elevated position, means for causing the means for locking the power mechanism to relock it on the completion of its predetermined movement, and means operated by the locking means for locking the selector against movement during the movement of the power mechanism.

324. The combination with a typewriting machine having numeral keys and a reciprocating paper carriage, of calculating mechanism comprising a series of index wheels each provided with means for holding it normally locked, power mechanism, normally locked, and means adapted to be operated by the power mechanism for rotating the index wheels normally disconnected therefrom, a selector capable of movement in two directions transverse to each other, means controlled by the movement of the paper carriage for moving the selector in one direction to select the index wheel to be rotated, means operated by the depression of any one of the numeral keys for moving the selector in a direction transverse to its first movement to cause it to unlock the selected index wheel and connect it with the means for rotating the index wheels, means also operated by the numeral key depressed for unlocking the power mechanism to permit it to rotate the index wheel selected through a predetermined movement of rotation, means operated by the numeral key depressed for preventing its return to elevated position until it has completed its movement of depression, means operated by the numeral key depressed for locking the other numeral keys against depression until the key depressed returns to elevated position, means operated by the second movement of the selector for holding out of operation the means for connecting the index wheels other than the one selected with the rotating means until the key depressed returns to elevated position, means for locking the selecting means against movement in the direction of its first movement until the key returns to elevated position, and means for locking the selector against return from its second movement during the operation of the power mechanism.

325. The combination with a typewriting machine having numeral keys and a reciprocating paper carriage, of calculating mechanism comprising a series of index wheels each provided with means for holding it normally locked, power mechanism, normally locked, and means adapted to be operated by the power mechanism for rotating the index wheels normally disconnected therefrom, a selector mounted to rotate and to be capable of shifting longitudinally of its axis, means controlled by the movement of the paper carriage for rotating the selector to select the index wheel to be rotated, means operated by the depression of any one of the numeral keys for shifting the selector to unlock the selected index wheel and connect it with the means for rotating the index wheels, means also operated by the numeral key depressed for unlocking the power mechanism to permit it to rotate the index wheel selected through a predetermined movement of rotation, means operated by the numeral key depressed for preventing its return to elevated position until it has completed its movement of depression, means operated by the numeral key depressed for locking the other numeral keys against depression until the key depressed returns to elevated position, means operated by the shifting of the selector for holding out of operation the means for connecting the index wheels other than the one selected with the rotating means until the key depressed returns to elevated position, means for locking the selector against rotation during its shifting movement and return movement, and means for locking the selector against return from its shifting movement during the operation of the power mechanism.

326. The combination with a typewriting machine having numeral keys and a reciprocating paper carriage, of calculating mechanism comprising a series of index wheels each provided with means for holding it normally locked, power mechanism, means for holding the power mechanism normally locked, and means adapted to be operated by the power mechanism for rotating the index wheels normally disconnected therefrom, a selector mounted to be capable of movement in two directions transverse to each other, means controlled by the movement of the paper carriage for moving the selector in one direction to select the index wheel to be rotated, means adapted to be operated by the depression of any one of the numeral keys for moving the selector in a direction transverse to the direction of its first movement to unlock the selected index wheel and connect it with the means for rotating the index wheels, means also operated by the numeral key depressed for unlocking the power mechanism to permit it to rotate the index wheel selected through a predetermined movement of rotation, means operated by the numeral key depressed for preventing its return to elevated position until it has completed its movement of depression, means operated by the numeral key depressed for locking the other numeral keys against depression until the key depressed returns to elevated position, means operated by the numeral key depressed for holding out of operation the means for connecting the index wheels other than the one selected with the rotating means until the key depressed returns to elevated position, means for locking the selector against movement in the direction of its first movement during its second movement, and means for locking the selector against return from its second movement during the operation of the power mechanism.

327. The combination with a typewriting machine having numeral keys and a reciprocating paper carriage, of calculating mechanism comprising a series of index wheels each provided with means for holding it normally locked, power mechanism, means for holding the power mechanism normally locked, and means adapted to be operated by the power mechanism for rotating the index wheels normally disconnected therefrom, a selector mounted to rotate and to be capable of shifting longitudinally of its axis, means controlled by the movement of the paper carriage for rotating the selector to select the index wheel to be rotated, means operated by the depression of any one of the numeral keys for shifting the selector to unlock the selected index wheel and connect it with the means for rotating the index wheels, means also operated by the numeral key depressed for unlocking the power mechanism to permit it to rotate the index wheel selected through a predetermined movement of rotation, means operated by the numeral key depressed for preventing its return to elevated position until it has completed its movement of depression, means operated by the numeral key depressed for locking the other numeral keys against depression until the key depressed returns to elevated position, means operated by the numeral key depressed for holding out of operation the means for connecting the index wheels other than the one selected with the rotating means until the key depressed returns to elevated position, means for operating the locking means to relock the power mechanism on the completion of its predetermined movement, means for locking the selector against rotation during its shifting movement and the return movement, and means operated by the locking means for locking the selector against return movement during the operation of the power mechanism.

328. The combination of a wheel to be rotated, a shaft for rotating it and power mechanism in gear with the shaft of stopping mechanism for the power mechanism comprising a brake wheel provided with teeth, a locking pawl adapted to engage the teeth of the brake wheel, a master wheel rotating with the brake wheel, a lever arm connected with the locking pawl and arranged to swing toward and away from the master wheel, means for locking the lever arm in its rearward position, a stop bar carried by the master wheel provided with a projection normally out of line with the lever arm and provided with means for effecting the release of the lever arm, means for moving the stop bar to release the lever arm to permit it to swing forward to move the locking pawl out of engagement with the brake wheel and to bring its projection into line with the lever arm, whereby on the rotation of the master wheel the projection on the stop bar will cause the lever arm to swing away from the master wheel to move the locking pawl into position to engage a tooth of the brake wheel.

329. The combination of a wheel to be rotated, a shaft for rotating it and power mechanism in gear with the shaft of stopping mechanism for the power mechanism comprising a brake wheel provided with teeth, a locking pawl adapted to engage the teeth of the brake wheel, a master wheel rotating with the brake wheel, a lever arm connected with the locking pawl and arranged to swing toward and away from the master wheel, means for locking the lever arm in its rearward position, a stop bar carried by the master wheel provided with a projection normally out of line with the lever arm and provided with means for effecting the release of the lever arm, means for moving the stop bar to release the lever arm to permit it to swing forward to move the locking pawl out of engagement with the brake wheel and to bring its projection into line with the lever arm, whereby on the rotation of the master wheel the projection on the stop bar will cause the lever arm to swing away from the master wheel to move the locking pawl into position to engage a tooth of the brake wheel, and a cam for returning the stop bar to normal position.

330. The combination of a wheel to be rotated, a shaft for rotating it and power mechanism in gear with the shaft, of stopping mechanism for the power mechanism comprising a brake wheel provided with teeth, a locking pawl adapted to engage the teeth of the brake wheel, a master wheel rotating with the brake wheel, a lever arm connected with the locking pawl and arranged to swing toward and away from the master wheel, means for locking the lever arm in its rearward position, a stop bar carried by the master wheel provided with a projection normally out of line with the lever arm and provided with means for effecting the release of the lever arm, means for moving the stop bar to release the lever arm to permit it to swing forward to move the locking pawl out of engagement with the brake wheel and to bring its projection into line with the lever arm, whereby on the rotation of the master wheel the projection on the stop bar will cause the lever arm to swing away from the master wheel to move the locking pawl into position to engage a tooth of the brake wheel, and a cam for returning the stop bar to normal position and means for moving it into the path of the stop bar.

331. The combination of a wheel to be rotated, a shaft for rotating it and power mechanism in gear with the shaft, of stopping mechanism for the power mechanism comprising a brake wheel provided with teeth, a locking pawl adapted to engage the teeth of the brake wheel, a master wheel rotating with the brake wheel, a lever arm connected with the locking pawl and arranged to swing toward and away from the master wheel, means for locking the lever arm in its rearward position, a stop bar carried by the master wheel provided with a projection normally out of line with the lever arm and provided with means for effecting the release of the lever arm, means for moving the stop bar to release the lever arm to permit it to swing forward to move the locking pawl out of engagement with the brake wheel and to bring its projection into line with the lever arm, whereby on the rotation of the master wheel the projection on the stop bar will cause the lever arm to swing away from the master wheel to move the locking pawl into position to engage a tooth of the brake wheel, a cam for returning the stop bar to normal position and means operated by the lever arm for moving it into the path of the stop bar.

332. The combination of a wheel to be rotated, a shaft for rotating it and power mechanism in gear with the shaft, of stopping mechanism for the power mechanism comprising a brake wheel provided with teeth, a locking pawl adapted to engage the teeth of the brake wheel, a master wheel rotating with the brake wheel, a lever arm connected with the locking pawl and arranged to swing toward and away from the master wheel, means for locking the lever arm in its rearward position, a series of stop bars carried by the master wheel each provided with a projection normally out of line with the lever arm and also provided with means for effecting the release of the lever arm, means for moving a stop bar to release the lever arm to permit it to swing forward to move the locking pawl out of engagement with the brake wheel and to bring its projection into line with the lever arm, whereby on the rotation of the master wheel the projection on the stop bar will cause the lever arm to swing away from the master wheel to move the locking pawl into position to engage a tooth of the brake wheel and a cam for returning the stop bar to normal position.

333. The combination of a wheel to be rotated, a shaft for rotating it and power mechanism in gear with the shaft, of stopping mechanism for the power mechanism comprising a brake wheel provided with teeth, a locking pawl adapted to engage the teeth of the brake wheel, a master wheel rotating with the brake wheel, a lever arm connected with the locking pawl and arranged to swing toward and away from the master wheel, means for locking the lever arm in its rearward position, a series of stop bars carried by the master wheel each provided with a projection normally out of line with the lever arm and also provided with means for effecting the release of the lever arm, means for moving a stop bar to release the lever arm to permit it to swing forward to move the locking pawl out of engagement with the brake wheel and to bring its projection into line with the lever arm whereby on the rotation of the master wheel the projection on the stop bar will cause the lever arm to swing away from the master wheel to move the locking pawl into position to engage a tooth of the brake wheel, and means operated by the stop bar so moved for locking the other stop bars against operation.

334. The combination of a wheel to be rotated, a shaft for rotating it and power mechanism in gear with the shaft, of stopping mechanism for the power mechanism comprising a brake wheel provided with teeth, a locking pawl adapted to engage the teeth of the brake wheel, a master wheel rotating with the brake wheel, a lever arm connected with the locking pawl and arranged to swing toward and away from the master wheel, means for locking the lever arm in its rearward position, a series of stop bars carried by the master wheel each provided with a projection normally out of line with the lever arm and also provided with means for effecting the release of the lever arm, means for moving a stop bar to release the lever arm to permit it to swing forward to move the locking pawl out of engagement with the brake wheel and to bring its projection into line with the lever arm, whereby on the rotation of the master wheel the projection on the stop bar will cause the lever arm to swing away from the master wheel to move the locking pawl into position to engage a tooth of the brake wheel, means operated by the stop bar so moved for locking the other stop bars against operation, and a cam for returning the stop bar to normal position.

335. The combination of a wheel to be rotated, a shaft for rotating it and power mechanism in gear with the shaft, of stopping mechanism for the power mechanism comprising a brake wheel provided with teeth, a locking pawl adapted to engage the teeth of the brake wheel, a locking dog for holding the locking pawl against the brake wheel, a master wheel rotating with the brake wheel, a lever arm connected with the locking pawl and locking dog and arranged to swing toward and away from the master wheel, means for locking the lever arm in its rearward position, a stop bar carried by the master wheel provided with a projection normally out of line with the lever arm and provided with means for effecting the release of the lever arm, and means for moving the stop bar to release the lever arm to permit it to swing forward to release the locking dog and move the locking pawl out of engagement with the brake wheel, and to bring its projection into line with the lever arm, whereby on the rotation of the master wheel the projection on the stop bar will cause the lever arm to swing away from the master wheel to move the locking pawl into engagement with the brake wheel and to cause the locking dog to hold the locking pawl against the wheel.

336. The combination with a series of wheels to be rotated, normally locked, power mechanism for rotating the wheels also normally locked, a selector mounted to be capable of movement in two directions transverse to each other and normally free to be so moved, a series of projections and a series of flanges carried by the selector, a shaft intermediate the power mechanism and the wheels, separate connecting devices for connecting each wheel with the shaft, normally out of operative position, but each normally free to be moved into position to connect a wheel with the shaft, separate means in connection with each connecting device for moving it into operative position and for unlocking the wheel, adapted to be operated by a projection on the selector, means for holding the connecting means out of operative position adapted to be operated by the flanges on the selector, means for moving the selector in one direction to bring one of its projections into position to move a connecting device into operative position, a key normally free to be depressed, means operated by the key for moving the selector in a direction transverse to its first movement to cause it to unlock a wheel, to move its connecting device into operative position, and to operate the means for holding out of operative position the connecting devices of all of the wheels other than the one selected, and means also operated by the key for unlocking the power mechanism.

337. The combination with a series of wheels to be rotated, normally locked, power mechanism for rotating the wheels also normally locked, a selector mounted to be capable of movement in two directions transverse to each other and normally free to be so moved, a series of projections and a series of flanges carried by the selector, a shaft intermediate the power mechanism and the wheels, separate connecting devices for connecting each wheel with the shaft, normally out of operative position, but each normally free to be moved into position to connect a wheel with the shaft, separate means in connection with each connecting device for moving it into operative position and for unlocking the wheel, adapted to be operated by a projection on the selector, means for holding the connecting means out of operative position adapted to be operated by the flanges on the selector, means for moving the selector in one direction to bring one of its projections in position to move a connecting device into operative position, key normally free to be depressed, means operated by the depression of a key for moving the selector in a direction transverse to its first movement to unlock a wheel to move its connecting device into operative position, and to operate the means for holding out of operative position the connecting devices of all of the wheels other than the one selected, means operated by the key for unlocking the power mechanism, and means for locking the key depressed, and with it the selector and the parts operated by it, against return until the power mechanism has been unlocked.

338. The combination with a series of wheels to be rotated, normally locked, power mechanism for rotating the wheels also normally locked, a selector mounted to be capable of rotation and of shifting longitudinally of its axis and normally free to be rotated and shifted, a series of projections and a series of rings carried by the selector, a stationary locking ring and a locking tooth carried by the selector, a shaft intermediate the power mechanism and the wheels, separate connecting devices for connecting each wheel with the shaft, normally out of operative position, but each normally free to be moved into position to connect a wheel with the shaft, separate means in connection with each connecting device for moving it into operative position and for unlocking the wheel, adapted to be operated by a projection on the selector, means for holding the connecting means out of operative position, adapted to be operated by the rings on the selector, means for rotating the selector to bring one of its projections in position to move a connecting device into operative position, a series of keys each normally free to be depressed, means by which on the depression of a key all of the other keys are locked against depression and the selector is shifted, and the power mechanism is unlocked, the shifting of the selector operating to unlock a wheel, to move its connecting device into operative position, to operate the means for holding out of operative position the connecting devices of all of the wheels other than the one selected and to cause its locking tooth to engage the stationary locking ring to lock it against rotation, and means for locking the key depressed, and with it the selector and the parts operated by it, against return until the power mechanism has been unlocked.

339. The combination with a series of wheels to be rotated, normally locked, power mechanism for rotating the wheels also normally locked, a selector mounted to be capable of rotation and of shifting longitudinally of its axis and normally free to be rotated and shifted, a series of projections and a series of rings carried by the selector, a stationary locking ring and a locking tooth carried by the selector, a shaft intermediate the power mechanism and the wheels, separate connecting devices for connecting each wheel with the shaft, normally out of operative position, but each normally free to be moved into position to connect a wheel with the shaft, separate means in connection with each connecting device for moving it into operative position and for unlocking the wheel, adapted to be operated by a projection on the selector, means for holding the connecting means out of operative position, adapted to be operated by the rings on the selector, means for rotating the selector to bring one of its projections in position to move a connecting device into operative position, a series of keys each normally free to be depressed, means by which on the depression of a key all of the other keys are locked against depression and the selector is shifted, and the power mechanism is unlocked, the shifting of the selector operating to unlock a wheel, to move its connecting device into operative position, to operate the means for holding out of operative position the connecting devices of all of the wheels other than the one selected and to cause its locking tooth to engage the stationary locking ring to lock it against rotation, means for locking the key depressed, and with it the selector and the parts operated by it, against return until the power mechanism has been unlocked, and means for locking the selector against return during the operation of the power mechanism.

340. The combination with a typewriting machine having numeral keys and a reciprocating paper carriage, of a calculating machine comprising calculating mechanism and actuating rods therefor, means carried by the numeral keys for operating the actuating rods, normally disconnected therefrom, and means controlled by the movement of the paper carriage but independently actuated for causing the actuating rods to be engaged by the operating means carried by the numeral keys.

341. The combination with a typewriting machine having numeral keys and a reciprocating paper carriage, of a calculating machine comprising calculating mechanism and actuating rods therefor, means carried by the numeral keys for operating the actuating rods, normally disconnected therefrom, and means controlled by the movement of the paper carriage but independently actuated for swinging the actuating rods into and out of engagement with the operating means carried by the numeral keys.

342. The combination with a typewriting machine having numeral keys and a reciprocating paper carriage, of a calculating machine comprising calculating mechanism and actuating rods therefor, swinging guide arms for the actuating rods, means carried by the numeral keys for operating the actuating rods, normally disconnected therefrom, and means controlled by the paper carriage for swinging the guide arms to cause the actuating rods to be engaged by the operating means carried by the numeral keys.

343. The combination with a typewriting machine having numeral keys and a reciprocating paper carriage and having its numeral keys provided with notched plates, of a calculating machine comprising calculating mechanism and actuating rods therefor adapted to be engaged by the notched plates, but normally disconnected therefrom, and means controlled by the movement of the paper carriage but independently actuated for causing the actuating rods to be engaged by the notched plates.

344. The combination with a typewriting machine having numeral keys and a reciprocating paper carriage and having its numeral keys provided with notched plates, of a calculating machine adapted to serve as a support for the typewriting machine and comprising calculating mechanism and actuating rods therefor adapted to be engaged by the notched plates, but normally disconnected therefrom, ways on the calculating mechanism for permitting the typewriting machine to be moved into and out of position to permit the notched plates to engage the actuating rods, and means controlled by the paper carriage for causing the actuating rods to be engaged by the notched plates.

345. The combination with a typewriting machine having numeral keys and a reciprocating paper carriage, of a calculating machine adapted to serve as a support for the typewriting machine and to permit of forward and rearward movement of the typewriting machine and comprising calculating mechanism and actuating rods therefor having bent arms at their upper ends, plates carried by the numeral keys having forward extensions at their lower ends adapted to extend beneath the bent arms of the actuating rods when the typewriting machine is in forward position and also having notches adapted to engage said bent arms, and means for moving the actuating rods into and out of engagement with said notches.

346. The combination with a typewriting machine having numeral keys and a reciprocating paper carriage, of a calculating machine adapted to serve as a support for the typewriting machine and to permit of forward and rearward movement of the typewriting machine and comprising calculating mechanism and actuating rods therefor having bent arms at their upper ends, plates carried by the numeral keys having forward extensions at their lower ends adapted to extend beneath the bent arms of the actuating rods when the typewriting machine is in forward position and also having notches adapted to engage said bent arms, and means controlled by the movement of the paper carriage for moving said bent arms into and out of engagement with the notches.

347. The combination with a typewriting machine having numeral keys and a reciprocating paper carriage, of a calculating machine comprising calculating mechanism and actuating rods therefor, means carried by the numeral keys for operating the actuating rods, normally disconnected therefrom, means controlled by the paper carriage for causing the actuating rods to be engaged by the operating means carried by the numeral keys, a cam plate connected with each actuating rod to be actuated thereby, and means for locking the cam plate against return until it has completed its full movement.

348. The combination with a typewriting machine having numeral keys and a reciprocating paper carriage, of a calculating machine comprising calculating mechanism and actuating rods therefor, means carried by the numeral keys for operating the actuating rods, normally disconnected therefrom, means controlled by the paper carriage for causing the actuating rods to be engaged by the operating means carried by the numeral keys, a cam plate connected with each actuating rod to be actuated thereby; means for locking the cam plate against return until it has completed its full movement, and means operated by the movement of the cam plate for locking all the other cam plates against operation.

349. The combination with a typewriting machine having supporting feet and numeral keys provided with notched plates extending downwardly therefrom and having forward extensions at their lower ends, of a calculating machine having ways formed in its upper face adapted to receive the feet of the typewriting machine, actuating rods and means operated by the actuating rods for controlling the calculating mechanism, the actuating rods being adapted to be engaged by the notched plates carried by the numeral keys, the construction being such that the typewriting machine may be moved forward or rearward to cause the forward extensions of the notched plates to engage or be disengaged from the actuating rods and be guided in such movement by the engagement of the feet with the ways.

350. The combination with a typewriting machine having supporting feet and having numeral keys provided with notched plates extending downwardly therefrom and having forward extensions at their lower ends, of a calculating machine having ways formed in its upper face adapted to receive the feet of the typewriting machine, actuating rods and means operated by the actuating rods for controlling the calculating mechanism the actuating rods being adapted to be engaged by the notched plates carried by the numeral keys, means for guiding the actuating rods and maintaining them normally in position to be engaged by the notched plates, the construction being such that the typewriting machine may be moved forward or rearward to cause the forward extensions of the notched plates to engage or be disengaged from the actuating rods and be guided in such movement by the engagement of the feet with the ways, and means for moving the actuating rods into and out of engagement with the notches of the notched plates.

351. The combination with a typewriting machine having supporting feet, numeral keys and a reciprocating paper carriage and having its numeral keys provided with notched plates extending downwardly therefrom and having forward extensions at their lower ends, of a calculating machine having ways formed in its upper face adapted to receive the feet of the typewriting machine, actuating rods and means operated by the actuating rods for controlling the calculating mechanism, the actuating rods being adapted to be engaged by the notched plates carried by the numeral keys, means for guiding the actuating rods and maintaining them normally in position to be engaged by the notched plates, the construction being such that the typewriting machine may be moved forward or rearward to cause the forward extensions of the notched plates to engage or be disengaged from the actuating rods and be guided in such movement by the engagement of the feet with the ways, and means controlled by the movement of the paper carriage for moving the actuating rods into and out of engagement with the notches of the notched plates.

352. The combination with a typewriting machine having supporting feet, numeral keys and a reciprocating paper carriage and having its numeral keys provided with notched plates extending downwardly therefrom and having forward extensions at their lower ends, of a calculating machine having ways formed in its upper face adapted to receive the feet of the typewriting machine, actuating rods having bent portions adapted to be engaged by the notched plates carried by the numeral keys, means for guiding the actuating rods and maintaining them normally in position to be engaged by the notched plates, and means for controlling the operation of the calculating mechanism operated by the actuating rods, the construction being such that the typewriting machine may be moved forward or rearward to cause the forward extensions of the notched plates to engage or be disengaged from the actuating rods and be guided in such movement by the engagement of the feet with the ways.

353. The combination with a typewriting machine having supporting feet, numeral keys and a reciprocating paper carriage and having its numeral keys provided with notched plates extending downwardly therefrom and having forward extensions at their lower ends, of a calculating machine having ways formed in its upper face adapted to receive the feet of the typewriting machine, actuating rods having bent portions adapted to be engaged by the notched plates carried by the numeral keys, means for guiding the actuating rods and maintaining them normally in position to be engaged by the notched plates and means for controlling the operation of the calculating mechanism operated by the actuating rods, the construction being such that the typewriting machine may be moved forward or rearward to cause the forward extensions of the notched plates to engage or be disengaged from the actuating rods and be guided in such movement by the engagement of the feet with the ways, and means controlled by the movement of the paper carriage for moving the actuating rods into and out of engagement with the notches of the notched plates.

354. The combination with a typewriting machine having numeral keys, of calculating mechanism comprising two series of index wheels, a shaft for each series of index wheels normally disconnected from the index wheels for rotating them, means for connecting the index wheels with the shafts, a selecting device for each series of index wheels, means for moving both selectors simultaneously to select an index wheel of each series, means operated by a numeral key for simultaneously moving both selecting means to connect both of the index wheels selected with the shaft, and means for rotating the shafts.

355. The combination with a typewriting machine having numeral keys, of calculating mechanism comprising two series of index wheels, a shaft for each series of index wheels normally disconnected from the index wheels for rotating them, means for connecting the index wheels with the shaft, a selecting device for each series of index wheels, means for moving both selectors simultaneously to select an index wheel of each series, means operated by a numeral key for simultaneously moving both selecting means to connect both of the index wheels selected with the shaft, means for rotating the shafts, and reversing mechanism between each shaft and the means for rotating them.

356. The combination with a typewriting machine having numeral keys and a paper carriage, of calculating mechanism comprising two series of index wheels, a shaft for each series of index wheels normally disconnected from the index wheels for rotating them, means for connecting the index wheels with the shaft, a selecting device for each series of index wheels, means controlled by the paper carriage for moving both selectors simultaneously to select an index wheel of each series, means operated by a numeral key for simultaneously moving both selecting means to connect both of the index wheels with the shaft, and means for rotating the shafts.

357. The combination with a typewriting machine having numeral keys and a paper carriage, of calculating mechanism comprising two series of index wheels, a shaft for each series of index wheels normally disconnected from the index wheels for rotating them, means for connecting the index wheels with the shaft, a selecting device for each series of index wheels, means controlled by the paper carriage for moving both selectors simultaneously to select an index wheel of each series, means operated by a numeral key for simultaneously moving both selecting means to connect both of the index wheels selected with the shaft, means for rotating the shafts, and reversing mechanism between each shaft and the means for rotating them.

358. The combination with a typewriting machine having numeral keys, of calculating mechanism comprising two series of index wheels, a shaft for each series of index wheels normally disconnected from the index wheels for rotating them, means for connecting the index wheels with the shaft, a selecting device for each series of index wheels, means for moving both selectors simultaneously to select an index wheel of each series, means operated by a numeral key for simultaneously moving both selecting means to connect both of the index wheels selected with the shaft, power mechanism normally locked for rotating the shafts, and means operated by the numeral key for releasing the power mechanism.

359. The combination with a typewriting machine having numeral keys, of calculating mechanism comprising two series of index wheels, a shaft for each series of index wheels normally disconnected from the index wheels for rotating them, means for connecting the index wheels with the shaft, a selecting device for each series of index wheels, means for moving both selectors simultaneously to select an index wheel of each series, means operated by a numeral key for simultaneously moving both selecting means to connect both of the index wheels selected with the shaft, means for rotating the shafts, and means controlled by the numeral keys for determining the movement of rotation to be given to the shafts.

360. The combination with a typewriting machine having numeral keys and a paper carriage, of calculating mechanism comprising two series of index wheels, a shaft normally disconnected from the index wheels for rotating them, means for connecting the index wheels with the shaft, a selecting device for each series of index wheels, means controlled by the paper carriage for moving both selectors simultaneously to select an index wheel of each series, means operated by a numeral key for simultaneously moving both selecting means to connect both of the index wheels selected with the shaft, power mechanism normally locked for rotating the shafts, and means operated by the numeral key for releasing the power mechanism.

361. The combination with a typewriting machine having numeral keys and a paper carriage, of calculating mechanism comprising two series of index wheels, a shaft normally disconnected from the index wheels for rotating them, means for connecting the index wheels with the shaft, a selecting device for each series of index wheels, means controlled by the paper carriage for moving both selectors simultaneously to select an index wheel of each series, means operated by a numeral key for simultaneously moving both selecting means to connect both of the index wheels selected with the shaft, power mechanism normally locked for rotating the shafts, means operated by the numeral key for releasing the power mechanism, and means for stopping the rotation of the shafts on the completion of a predetermined movement of rotation.

362. The combination with a typewriting machine having numeral keys and a paper carriage, of calculating mechanism comprising two series of index wheels, a shaft normally disconnected from the index wheels for rotating them, means for connecting the index wheels with the shaft, a selecting device for each series of index wheels, means controlled by the paper carriage for moving both selectors simultaneously to select an index wheel of each series, means operated by a numeral key for simultaneously moving both selecting means to connect both of the index wheels selected with the shaft, means for rotating the shaft, and means controlled by the numeral keys for determining the movement of rotation to be given to the shaft.

363. In a calculating machine, the combination of a series of index wheels of different denominations, a shaft for rotating the index wheels normally disconnected from them, means for connecting each index wheel with the shaft, means for rotating the shaft, carrying mechanism for rotating an index wheel of higher denomination through one space on the completion of the rotation of the index wheel of next lower denomination, snail cam operated by the index wheel of lower denomination for gradually setting said carrying mechanism in position to operate and for releasing it on the completion of a rotation, and means independent of the rotating means for operating the carrying mechanism upon its release.

364. In a calculating machine, the combination of a series of index wheels of different denominations, a shaft for rotating the index wheels normally disconnected from them, means for connecting each index wheel with the shaft, means for rotating the shaft, carrying mechanism for rotating an index wheel of higher denomination through one space on the completion of the rotation of the index wheel of next lower denomiation, means operated by the index wheel of lower denomination for setting said carrying mechanism in position to operate and for releasing it on the completion of a rotation, means independent of the rotating means for operating the carrying mechanism upon its release, and means for locking the setting means upon the release of the carrying mechanism against further operation until the carrying mechanism has effected the rotation of the index wheel of next higher denomination.

365. In a calculating machine, the combination of a series of index wheels of different denominations, a shaft for rotating the index wheels normally disconnected from them, means for connecting each index wheel with the shaft, means for rotating the shaft, separate means for holding each index wheel normally locked against rotation, carrying mechanism for unlocking an index wheel of higher denomination and rotating it through one space on the completion of the rotation of the index wheel of next lower denomination, means operated by the index wheel of lower denomination for setting the carrying mechanism in position to operate and for releasing it on the completion of a rotation, and means independent from the rotating means for operating the carrying mechanism on its release.

366. In a calculating machine, the combination of a series of index wheels of different denominations, a shaft for rotating the index wheels normally disconnected from them, means for connecting each index wheel with the shaft, means for rotating the shaft, separate means for holding each index wheel normally locked against rotation, carrying mechanism for unlocking an index wheel of higher denomination and rotating it through one space on the completion of the rotation of the index wheel of next lower denomination, means operated by the index wheel of lower denomination for setting the carrying mechanism in position to operate and for releasing it on the completion of a rotation, means independent from the rotating means for operating the carrying mechanism on its release, and means for locking the setting means upon the release of the carrying mechanism against further operation until the carrying mechanism has unlocked the index wheel of higher denomination and effected its rotation.

367. In a calculating machine, the combination of a series of index wheels of different denominations, a shaft for rotating the index wheels normally disconnected from them, means for connecting each index wheel with the shaft, means for rotating the shaft, carrying mechanism for rotating an index wheel of higher denomination through one space on the completion of the rotation of the index wheel of next lower denomination, comprising a slide provided with a carrying pawl, means operated by the index wheel of lower denomination for moving the slide rearward to set it for operation and to release it on the completion of a rotation of the index wheel of lower denomination, and a spring for moving the slide forward upon its release.

368. In a calculating machine, the combination of a series of index wheels of different denominations, a shaft for rotating the index wheels normally disconnected from them, means for rotating the shaft, carrying mechanism for rotating an index wheel of higher denomination through one space on the completion of the rotation of the index wheel of next lower denomination, comprising a slide provided with a carrying pawl, means operated by the index wheel of lower denomination for moving the slide rearward to set it for operation and to release it on the completion of a rotation of the index wheel of lower denomination, a spring for moving the slide upon its release, and means for locking the setting means upon the release of the slide against further operation until the slide has completed its forward movement.

369. In a calculating machine, the combination of a series of index wheels of different denominations, a shaft for rotating the index wheels normally disconnected from them, means for connecting each wheel with the shaft, means for rotating the shaft, separate means for holding each index wheel normally locked against rotation, carrying mechanism for unlocking an index wheel of higher denomination and rotating it through one space on the completion of the rotation of the index wheel of next lower denomination, said carrying mechanism comprising a reciprocating member provided with a carrying pawl, a cam operated by the index wheel of lower denomination adapted to move the reciprocating member rearward, and to release it on the completion of a rotation of the index wheel of lower denomination, and a spring for forcing the reciprocating member forward on its release.

370. In a calculating machine, the combination of a series of index wheels of different denominations, a shaft for rotating the index wheels normally disconnected from them, means for connecting each wheel with the shaft, means for rotating the shaft, separate means for holding each index wheel normally locked against rotation, carrying mechanism for unlocking an index wheel of higher denomination and rotating it through one space on the completion of the rotation of the index wheel of next lower denomination, said carrying mechanism comprising a reciprocating member provided with a carrying pawl, a cam operated by the index wheel of lower denomination adapted to move the reciprocating member rearward, and to release it on the completion of a rotation of the index wheel of lower denomination, a spring for forcing the reciprocating member forward on its release, and means for locking the cam upon the release of the reciprocating member against further movement until the reciprocating member has completed its forward movement.

371. In a calculating machine the combination of a series of index wheels of different denominations, a shaft for rotating the index wheels normally disconnected from them, means for connecting each of the index wheels with the shaft, means for rotating the shaft, means for holding each index wheel normally locked against rotation comprising a toothed locking disk and a locking pawl engaging its teeth, means for unlocking an index wheel of lower denomination and holding it unlocked while it is connected with the shaft, carrying means for rotating an index wheel of higher denomination through one space on the completion of a rotation of the index wheel of next lower denomination, comprising a reciprocating member provided with a carrying pawl, a spring for operating the reciprocating member to throw it forward, a cam operated by the index wheel of lower denomination for moving the reciprocating member rearward to put the spring under tension, and for releasing it on the completion of a rotation of the index wheel of lower denomination, a yielding connection between the index wheel of lower denomination and the cam, and means operated by the forward movement of the slide for releasing the locking pawl from engagement with the locking disk of the index wheel of higher denomination.

372. In a calculating machine the combination of a series of index wheels of different denominations, a shaft for rotating the index wheels normally disconnected from them, means for connecting each of the index wheels with the shaft, means for rotating the shaft, means for holding each index wheel normally locked against rotation comprising a toothed locking disk and a locking pawl engaging its teeth, means for unlocking an index wheel of lower denomination and holding it unlocked while it is connected with the shaft, carrying means for rotating an index wheel of higher denomination through one space on the completion of a rotation of the index wheel of next lower denomination, comprising a reciprocating member provided with a carrying pawl, a spring for operating the reciprocating member to throw it forward, a cam operated by the index wheel of lower denomination for moving the reciprocating member rearward to put the spring under tension, and for releasing it on the completion of a rotation of the index wheel of lower denomination, a yielding connection between the index wheel of lower denomination and the cam, means for locking the cam in position to release the pivoted arm to permit the reciprocating member to be thrown forward and holding it locked until the reciprocating member has completed its forward movement, and means operated by the forward movement of the reciprocating member for releasing the locking pawl from engagement with the locking disk of the index wheel of higher denomination.

373. In a calculating machine the combination of a series of index wheels of different denominations, a shaft for rotating the index wheels normally disconnected from them, means for connecting each of the index wheels with the shaft, means for rotating the shaft, means for holding each index wheel normally locked against rotation comprising a toothed locking disk and a locking pawl engaging its teeth, a second toothed disk carried by the index wheel, carrying means for rotating an index wheel of one denomination through one space on the completion of a rotation of the index wheel of next lower denomination, comprising a reciprocating slide provided with a carrying pawl, adapted to engage the second toothed disk of the index wheel of higher denomination, pivoted arm for operating the slide, a spring for operating the pivoted arm to throw the slide forward, a cam operated by the index wheel of lower denomination for moving the pivoted arm rearward to put the spring under tension, and for releasing the arm on the completion of a rotation of the index wheel of lower denomination, a yielding connection between the index wheel of lower denomination and the cam, means for locking the cam in position to release the pivoted arm to permit the slide to be thrown forward and holding it locked until the slide has completed its forward movement, and means operated by the forward movement of the slide for releasing the locking pawl from engagement with the locking disk of the index wheel of higher denomination.

374. In a calculating machine the combination of a series of index wheels of different denominations, a shaft for rotating the index wheels normally disconnected from them, means for connecting each of the index wheels with the shaft, means for rotating the shaft, means for holding each index wheel normally locked against rotation comprising a toothed locking disk and a locking pawl engaging its tooth, carrying means for rotating an index wheel of one denomination through one space on the completion of a rotation of an index wheel of next lower denomination, comprising a reciprocating slide provided with a carrying pawl, a pivoted arm for operating the slide, a spring for operating the pivoted arm to throw the slide forward, a cam operated by the index wheel of lower denomination for moving the pivoted arm rearward to put the spring under tension, and for releasing the arm on the completion of a rotation of the index wheel of lower denomination, a yielding connection between the index wheel of lower denomination and the cam, means for locking the cam in position to release the pivoted arm to permit the slide to be thrown forward and for holding it locked until the slide completes its forward movement, and means operated by the forward movement of the slide for releasing the locking pawl from engagement with a tooth of the locking disk of the index wheel of higher denomination in advance of the rotation of the index wheel of higher denomination and for positively moving the locking pawl into position to engage the next tooth of such locking disk.

375. In a calculating mechanism the combination of a series of index wheels of different denominations, a shaft normally disconnected from the index wheels for rotating them, means for connecting the index wheels with the shaft, means for rotating the shaft, two sets of carrying mechanism for rotating an index wheel of higher denomination through one space upon the completion of the rotation of the index wheel of next lower denomination, one set of carrying mechanism being adapted to rotate the index wheel of higher denomination in one direction and the other to rotate it in the opposite direction, and means for shifting one set of carrying mechanism into position to operate and simultaneously shifting the other mechanism out of position to operate.

376. In a calculating mechanism the combination of a series of index wheels of different denominations, a shaft normally disconnected from the index wheels for rotating them, means for connecting the index wheels with the shaft, means for rotating the shaft, reversing mechanism between the shaft and the rotating means, two sets of carrying mechanism for rotating an index wheel of higher denomination through one space upon the completion of the rotation of the index wheel of next lower denomination, one set of carrying mechanism being adapted to rotate the index wheel of higher denomination in one direction and the other to rotate it in the opposite direction, means for shifting one set of carrying mechanism into position to operate and simultaneously shifting the other carrying mechanism out of position to operate and means for simultaneously operating the reversing mechanism and shifting mechanism.

377. In a calculating mechanism the combination of a series of index wheels of different denominations, a shaft normally disconnected from the index wheels for rotating them, means for connecting the index wheels with the shaft, means for rotating the shaft, two sets of carrying mechanism for rotating an index wheel of higher denomination through one space upon the completion of the rotation of the index wheel of next lower denomination, one set of carrying mechanism being adapted to rotate the index wheel of higher denomination in one direction and the other to rotate it in the opposite direction, means independent of the shaft for operating the carrying mechanisms, and means for shifting one set of carrying mechanism into position to operate and simultaneously shifting the other carrying mechanism out of position to operate.

378. In a calculating mechanism the combination of a series of index wheels of different denominations, a shaft normally disconnected from the index wheels for rotating them, means for connecting the index wheels with the shaft, means for rotating the shaft, two sets of carrying mechanism for rotating an index wheel of higher denomination through one space upon the completion of the rotation of the index wheel of next lower denomination, each comprising a slide, means operated by the shaft for moving the slide in one direction to set it and to release it and means independent of the shaft for moving the slide in the other direction to effect the rotation of the index wheel of higher denomination, one set of carrying mechanism being adapted to rotate the index wheel of higher denomination in one direction and the other to rotate it in the opposite direction, and means for shifting one set of carrying mechanism into position to operate and simultaneously shifting the other carrying mechanism out of position to operate.

379. In a calculating mechanism the combination of a series of index wheels of different denominations each provided with a toothed locking disk and a second toothed disk, a shaft normally disconnected from the index wheels for rotating them, a pair of locking pawls engaging the teeth of the locking disk at opposite points of the periphery of the disk, each adapted to permit the index wheel to rotate in one direction but to normally lock it against rotation in the other direction, means for connecting each index wheel with the shaft adapted to also disengage the locking pawls of the index wheel to be rotated from the locking disk, two sets of carrying mechanisms for rotating an index wheel of higher denomination through one space on the completion of the rotation of an index wheel of next lower denomination, one set of carrying mechanism for rotating the index wheel of higher denomination in one direction and the other for rotating it in the opposite direction, each set of carrying mechanism comprising a carrying pawl adapted to engage the second disk of the index wheel of higher denomination to rotate it and means for disengaging one of the locking pawls from the locking disk of each index wheel in advance of the action of the carrying pawl.

380. In a calculating mechanism the combination of a series of index wheels of different denominations each provided with a toothed locking disk and a second toothed disk, a shaft normally disconnected from the index wheels for rotating them, a pair of locking pawls engaging the teeth of the locking disk at opposite points of the periphery of the disk, each adapted to permit the index wheel to rotate in one direction but to normally lock it against rotation in the other direction, means for connecting each index wheel with the shaft adapted to also disengage the locking pawls of the index wheel to be rotated from the locking disk, two sets of carrying mechanisms for rotating the index wheel of higher denomination through one space on the completion of the rotation of an index wheel of next lower denomination, one set of carrying mechanism for rotating the index wheel of higher denomination in one direction and the other for rotating it in the opposite direction, each set of carrying mechanism comprising a carrying pawl adapted to engage the second disk of the index wheel of higher denomination to rotate it and means for disengaging one of the locking pawls from the locking disk of each index wheel in advance of the action of the carrying pawl and for causing it to reëngage the next tooth of the locking disk.

381. In a calculating machine the combination of a series of index wheels of different denominations each provided with a toothed locking disk and a second toothed disk, means for rotating each of the index wheels separately, a locking pawl normally engaging a tooth of the locking disk, carrying mechanism for rotating an index wheel of higher denomination through one space upon the completion of the rotation of an index wheel of lower denomination, comprising a reciprocating member provided with a carrying pawl adapted to engage a tooth of the second toothed disk, and means operated by the index wheel of lower denomination for moving the reciprocating member rearward to move the carrying pawl to a position in rear of a tooth of said second disk, means independent of the index wheels for moving the reciprocating member forward to cause the carrying pawl to engage such tooth of said second disk and act upon it to rotate the index wheel of higher denomination, and means operated by the forward movement of the reciprocating member for disengaging the locking pawl from the locking disk in advance of the engagement of the carrying pawl with the teeth of said second disk.

382. In a calculating machine the combination of a series of index wheels of different denominations each provided with a toothed locking disk and a second toothed disk, means for rotating each of the index wheels separately, a pivoted locking pawl normally engaging a tooth of the locking disk and having an arm in rear of its pivot, carrying mechanism for rotating an index wheel of higher denomination through one space upon the completion of the rotation of an index wheel of lower denomination, comprising a reciprocating member provided with a carrying pawl adapted to engage a tooth of the second toothed disk, and means operated by the index wheel of lower denomination for moving the reciprocating member rearward to move the carrying pawl to a position in rear of a tooth of said second disk, means independent of the index wheels for moving the reciprocating member forward to cause the carrying pawl to engage such tooth of said second disk and act upon it to rotate the index wheel of higher denomination, and means operated by the forward movement of the reciprocating member for disengaging the locking pawl from the locking disk in advance of the engagement of the carrying pawl with the tooth of said second disk, comprising an arm adapted to strike the arm of the locking pawl.

383. In a calculating machine the combination of a series of index wheels of different denominations each provided with a toothed locking disk and a second toothed disk, means for rotating each of the index wheels separately, a pivoted locking pawl normally engaging a tooth of the locking disk and having an arm in rear of its pivot, carrying mechanism for rotating an index wheel of higher denomination through one space upon the completion of the rotation of an index wheel of lower denomination, comprising a reciprocating member provided with a carrying pawl adapted to engage a tooth of the second toothed disk, and means operated by the index wheel of lower denomination for moving the reciprocating member rearward to move the carrying pawl to a position in rear of a tooth of said second disk, means independent of the index wheels for moving the reciprocating member forward to cause the carrying pawl to engage such tooth of said second disk and act upon it to rotate the index wheel of higher denomination, and means operated by the forward movement of the reciprocating member for disengaging the locking pawl from the locking disk in advance of the engagement of the carrying pawl with the tooth of said second disk comprising a swinging arm adapted when swung in one direction to strike the arm of the locking pawl and disengage the pawl from the locking disk and to subsequently strike the locking pawl forward of its pivot to force it again into contact with the locking disk.

384. In a calculating machine the combination of a series of index wheels of different denominations each provided with a toothed locking disk and a second toothed disk, means for rotating each of the index wheels separately, a pivoted locking pawl normally engaging a tooth of the locking disk and having an arm in rear of its pivot, carrying mechanism for rotating an index wheel of higher denomination through one space upon the completion of the rotation of an index wheel of lower denomination comprising a reciprocating member provided with a carrying pawl adapted to engage a tooth of the second toothed disk, and means operated by the index wheel of lower denomination for moving the reciprocating member rearward to move the carrying pawl to a position in rear of a tooth of said second disk, means independent of the index wheels for moving the reciprocating member forward to cause the carrying pawl to engage such tooth of said second disk and act upon it to rotate the index wheel of higher denomination, and means operated by the forward movement of the reciprocating member for disengaging the locking pawl index wheel of lower denomination, comprising a reciprocating member provided with a carrying pawl adapted to engage a tooth of the second toothed disk, and means operated by the index wheel of lower denomination for moving the reciprocating member rearward to move the carrying pawl to a position in rear of a tooth of said second disk, means independent of the index wheels for moving the reciprocating member forward to cause the carrying pawl to engage such tooth of said second disk and act upon it to rotate the index wheel of higher denomination, and means operated by the forward movement of the reciprocating member for disengaging the locking pawl from the locking disk in advance of the engagement of the carrying pawl with the tooth of said second disk comprising an arm adapted to strike the arm of the locking pawl.

385. In a calculating machine the combination of a series of index wheels of different denominations each provided with a toothed locking disk and a second toothed disk, means for rotating each of the index wheels separately, a pivoted locking pawl normally engaging a tooth of the locking disk, and having an arm in rear of its pivot, carrying mechanism for rotating an index wheel of higher denomination through one space upon the completion of the rotation of an index wheel of lower denomination, comprising a reciprocating member provided with a carrying pawl adapted to engage a tooth of the second toothed disk, and means operated by the index wheel of lower denomination for moving the reciprocating member rearward to move the carrying pawl to a position in rear of a tooth of said second disk, means independent of the index wheels for moving the reciprocating member forward from the locking disk in advance of the engagement of the carrying pawl with the teeth of said second disk, comprising a swinging arm adapted when swung in one direction to strike the arm of the locking pawl and disengage the pawl from the locking disk and to subsequently strike the pawl forward of its pivot to force it again into contact with the locking disk, the arm being arranged to yield on its return movement so as to pass the arm of the locking pawl without operating it.

386. In a calculating machine, the combination with a wheel to be rotated, power mechanism for rotating the wheel, locking means for holding the power mechanism normally locked and a swinging lever controlling the locking means, of a master wheel in gear with the power mechanism for operating the swinging lever to cause the locking means to lock the power mechanism, means for locking the swinging lever in position to hold the locking means in locking position and means carried by the master wheel for releasing the swinging lever to permit it to swing in a direction to release the locking means, and means also carried by the master wheel for returning the swinging lever to locking position.

387. In a calculating machine, the combination with a wheel to be rotated, power mechanism for rotating the wheel, locking means for holding the power mechanism normally locked and a swinging lever controlling the locking means, of a master wheel in gear with the power mechanism for operating the swinging lever to cause the locking means to lock the power mechanism, means for locking the swinging lever in position to hold the locking means in locking position and means carried by the master wheel for releasing the swinging lever to permit it to swing in a direction to release the locking means, means also carried by the master wheel for returning the swinging lever to locking position, and means for checking the momentum of the power mechanism in advance of the relocking.

388. In a calculating machine, the combination with a wheel to be rotated, power mechanism for rotating the wheel, locking means for holding the power mechanism normally locked and a swinging lever controlling the locking means, of a master wheel in gear with the power mechanism for operating the swinging lever to cause the locking means to lock the power mechanism, means for locking the swinging lever in position to hold the locking means in locking position, a stop bar carried by the master wheel provided with means for releasing the swinging lever to permit it to swing in a direction to release the locking means, and also provided with means for returning the swinging lever to locking position.

389. In a calculating machine, the combination with a wheel to be rotated, power mechanism for rotating the wheel, locking means for holding the power mechanism normally locked and a swinging lever controlling the locking means, of a master wheel in gear with the power mechanism for operating the swinging lever to cause the locking means to lock the power mechanism, means for locking the swinging lever in position to hold the locking means in locking position and a series of stop bars carried by the master wheel each provided with means for releasing the swinging lever to permit it to swing in a direction to release the locking means, and each also provided with means for returning the swinging lever to locking position.

390. In a calculating machine, the combination with a wheel to be rotated, power mechanism for rotating the wheel, a brake wheel in gear with the power mechanism provided with teeth widely spaced apart, a locking pawl adapted to engage a tooth of the brake wheel, a swinging lever provided with means for raising the locking pawl out of the path of the teeth of the brake wheel, means for depressing the pawl and for locking it in position to engage a tooth of the brake wheel arranged to be operated by the swinging lever, means for locking the swinging lever in position to lock the locking pawl in position to engage a tooth of the brake wheel, means for releasing the swinging lever, means for swinging it in one direction to release and lift the locking lever and means for swinging the swinging lever in the opposite direction to cause the locking pawl to be depressed and locked in position to engage a tooth of the brake wheel.

391. In a calculating machine, the combination with a wheel to be rotated, power mechanism for rotating the wheel, a brake wheel in gear with the power mechanism provided with teeth widely spaced apart, a locking pawl having a cam at its end adapted to engage a tooth of the brake wheel, a swinging lever provided with means for raising the locking pawl out of the path of the teeth of the brake wheel, means engaging the cam on the end of the pawl to depress it and to lock it in position to engage a tooth of the brake wheel arranged to be operated by the swinging lever, means for locking the swinging lever in position to lock the locking pawl in position to engage a tooth of the brake wheel, means for releasing the swinging lever, means for swinging it in one direction to release and lift the locking lever and means for swinging the swinging lever in the opposite direction to cause the locking pawl to be depressed and locked in position to engage a tooth of the brake pawl.

392. In a calculating machine, the combination with a wheel to be rotated, power mechanism for rotating the wheel, a brake wheel in gear with the power mechanism provided with teeth widely spaced apart, a locking pawl adapted to engage a tooth of the brake wheel, a swinging lever provided with means for raising the locking pawl out of the path of the teeth of the brake wheel, a locking dog for depressing the pawl and for locking it in position to engage a tooth of the brake wheel arranged to be operated by the swinging lever, means for locking the swinging lever in position to cause the locking dog to lock the locking pawl in position to engage a tooth of the brake wheel, means for releasing the swinging lever, means for swinging it in one direction to release and lift the locking lever and means for swinging the swinging lever in the opposite direction to cause the locking dog to depress the locking pawl and lock it in position to engage a tooth of the brake wheel.

393. In a calculating machine for use in connection with a typewriting machine having numeral keys, a group of index wheels, a rotary shaft for rotating the index wheels normally disconnected from them, connecting devices for connecting the index wheels with the rotary shaft, means for operating the connecting devices, power mechanism for operating the rotary shaft, locking means for locking the power mechanism against movement, means actuated by a numeral key for releasing the power mechanism and means operated by the power mechanism for relocking it on the completion of a predetermined movement of rotation.

394. In a calculating machine for use in connection with a typewriting machine having numeral keys, a group of index wheels, a rotary shaft for rotating the index wheels normally disconnected from them, connecting devices for connecting the index wheels with the rotary shaft, means for operating the connecting devices, power mechanism for operating the rotary shaft, locking means for locking the power mechanism against movement, means actuated by a numeral key for releasing the power mechanism and means operated by the power mechanism for relocking it on the completion of a predetermined movement of rotation, the power mechanism comprising a rotary drum and means released by the rotary drum on the completion of its rotation for locking the numeral keys against operation before the power mechanism is run down.

395. In a calculating machine for use in connection with a typewriting machine having numeral keys, a group of index wheels, a rotary shaft for rotating the index wheels normally disconnected from them, connecting devices for connecting the index wheels with the rotary shaft, means for operating the connecting devices, power mechanism for operating the rotary shaft, locking means for locking the power mechanism against movement, means actuated by a numeral key for releasing the power mechanism and means operated by the power mechanism for relocking it on the completion of a predetermined movement of rotation, the power mechanism comprising a rotary drum and means released by the rotary drum on the completion of its rotation for locking the numeral keys against operation before the power mechanism is run down, said means also operating to lock the numeral keys against operation.

396. In a calculating machine, a series of numeral keys, index wheels, a shaft for rotating the index wheels normally disconnected therefrom, means for normally locking the index wheels against rotation in either direction, power mechanism for rotating the shaft, means for normally locking the shaft, and means operated by a numeral key for connecting an index wheel with the shaft and releasing the index wheel and means also operated by the numeral key for releasing the shaft, means operated by the movement of the shaft for relocking the shaft upon a predetermined movement of rotation and means operated upon the release of the key for permitting the index wheels to be again locked.

397. In a combined typewriting and calculating machine, numeral keys, a paper carriage, index wheels, power mechanism for operating the index wheels normally locked against movement, means for releasing the power mechanism to permit a predetermined movement of rotation of the index wheels, means for automatically relocking the power mechanism on the completion of the predetermined movement of rotation of the index wheels, means adapted to be operated by the numeral keys for releasing the power mechanism normally disconnected from the numeral keys, a lock holding the releasing means normally disconnected from the numeral keys, and means carried by the carriage of the typewriting machine for releasing said lock.

398. In a combined typewriting and calculating machine, numeral keys, a paper carriage, index wheels, power mechanism normally locked for operating the index wheels, means for releasing the power mechanism arranged to be operated by a numeral key when connected therewith, locking means holding the releasing means normally disconnected from the numeral keys, and means carried by the carriage of the typewriting machine for releasing the locking means to permit the releasing means to be operatively connected with the numeral keys.

399. In a calculating machine comprising index wheels, a shaft for rotating the index wheels and power mechanism in gear with the shaft, a master wheel for controlling the movement of the power mechanism provided with a series of stop bars, stopping mechanism adapted to be operated by any one of said stop bars, means adapted to be operated by any one of the stop bars for releasing the power mechanism, and means for operating any one of said stop bars to operate the releasing means and to position it for operating the stopping mechanism upon the completion of a predetermined movement of the power mechanism.

400. In a calculating machine comprising index wheels, a shaft for rotating the index wheels and power mechanism in gear with the shaft, a master wheel, laterally movable stop bars carried thereby provided with projections, stopping mechanism comprising a lever arm, means for moving any one of the stop bars to bring its projection into position to strike said lever arm to cause the stopping mechanism to be operated, and means operated by the lever arm for restoring the moved stop bar to normal position.

401. In a calculating machine comprising index wheels, a shaft for rotating the index wheels and power mechanism in gear with the shaft, a master wheel, laterally movable stop bars carried thereby provided with projections, stopping mechanism comprising a lever arm, means for moving any one of the stop bars to bring its projection into position to strike said lever arm to cause the stopping mechanism to be operated, means operated by the lever arm for restoring the moved stop bar to normal position, and means for locking the lever arm.

402. In a calculating machine comprising index wheels, a shaft for rotating the index wheels and power mechanism in gear with the shaft, a master wheel, laterally movable stop bars carried thereby provided with projections, stopping mechanism comprising a lever arm, means for moving any one of the stop bars to bring its projection into position to strike said lever arm to cause the stopping mechanism to be operated, means operated by the lever arm for restoring the moved stop bar to normal position, means for locking the lever arm, and means operated by the movement of the stop bar to unlock the lever arm.

403. In a calculating machine comprising index wheels, a shaft for rotating the index wheels and power mechanism in gear with the shaft, a master wheel, laterally movable stop bars carried thereby provided with projections, stopping mechanism comprising a brake wheel rotated by the power mechanism provided with a series of widely separated teeth, a locking pawl adapted to engage said teeth, and a lever arm arranged to be struck by the projection of the moved stop bar and means connected with the lever arm for operating the locking pawl by the initial movement of the lever arm to first depress the locking pawl into contact with the periphery of the brake wheel, and by the further movement of the lever arm to lock the locking pawl in position to engage a tooth of the brake wheel.

404. An index wheel, a shaft for rotating the index wheel, power mechanism in gear with the shaft for rotating it, a brake wheel in gear with the power mechanism, a locking pawl coöperating with the brake wheel to stop the power mechanism, a master wheel arranged to turn with the brake wheel and means carried by the master wheel arranged, when positioned, to first cause the locking pawl to be lifted to release the brake wheel, and on the rotation of the master wheel, to cause the locking pawl to be depressed against the periphery of the brake wheel and on the further rotation of the master wheel, to cause the locking pawl to be locked against the brake wheel.

405. In a calculating machine for use in connection with a typewriting machine having numeral keys and a paper carriage comprising index wheels, a shaft for rotating the index wheels normally disconnected therefrom, and power mechanism for operating the shaft, means for selecting the index wheel to be rotated controlled by the carriage of the typewriting machine and arranged to be operated by a numeral key to effect the connection of the index wheel selected with the rotary shaft, a lock for the selecting means arranged to be released by the carriage, locking means normally locking the index wheels against rotation in either direction arranged to be released by the depression of a numeral key, and a lock for the power mechanism arranged to be released by the depression of a numeral key, the numeral keys being normally disconnected from the lock releasing means operated by them and arranged to be connected therewith only upon the release by the carriage, of the lock for the releasing means.

406. In a calculating machine, a series of index wheels, a shaft for rotating them, power mechanism for operating the shaft, reversing gears between the power mechanism and the shaft, carrying mechanism adapted to rotate an index wheel of higher denomination in one direction for adding, carrying mechanism adapted to rotate a wheel of higher denomination in the opposite direction for subtracting, means operated by an index wheel of lower denomination for setting the carrying mechanisms in position to operate and for releasing them means independent of the index wheels for actuating the carrying mechanisms when released, and means for operating the reversing gears and throwing either one of the carrying mechanisms into position to be operated and simultaneously throwing the other carrying mechanism out of position to be operated.

407. In a calculating machine for use in connection with a typewriting machine, a series of index wheels, a shaft for rotating the index wheels, power mechanism for operating the shaft, reversing gears between the power mechanism and the shaft, carrying mechanism adapted to rotate an index wheel of a higher denomination in one direction for adding, carrying mechanism adapted to rotate a wheel of higher denomination in the opposite direction for subtracting, means operated by an index wheel of lower denomination for operating the carrying mechanisms, and means for operating the reversing gears and throwing either one of the carrying mechanisms into position to be operated and simultaneously throwing the other carrying mechanism out of position to be operated, said means comprising a swinging frame, and means for locking the numeral keys against operation arranged to be operated by the swinging frame.

408. In a calculating mechanism comprising a series of index wheels of different denominations, means normally disconnected from the index wheels for rotating them, and separate connecting devices for connecting the several index wheels with the rotating means, and a selector mounted to be movable in two directions transverse to each other and provided with a series of pins for operating the connecting devices, means for moving the selector in one direction to bring its pins successively into position to operate the connecting devices of the successive index wheels, and means for moving the selector in a direction transverse to its first movement to cause the connecting device of the index wheel selected, to be operated, the several pins of the selector being spaced apart equal distances in the direction of the first movement of the selector and spaced apart equal distances in the transverse direction except that at predetermined points two successive pins are in the same plane transverse to the direction of the second movement of the selector in order to permit of leaving space at proper intervals for inserting commas for pointing off and the decimal point without affecting the selection of the index wheels in proper sequence.

409. A calculating mechanism comprising a series of index wheels of different denominations, means normally disconnected from the index wheels for rotating them and separate connecting devices for connecting the several index wheels with the rotating means, and a selector mounted to rotate and to be movable longitudinally and provided with a series of pins for operating the connecting devices, means for rotating the selector to bring its pins successively into position to operate the connecting devices of the successive index wheels, and means for moving the selector longitudinally of its axis to cause the connecting device of the index wheel selected, to be operated, the several pins of the selector being spaced apart equal distances on the periphery of the selector and spaced apart equal distances longitudinally of the selector except that at predetermined points two successive pins are in the same plane transverse to the axis of the selector in order to permit of leaving space at proper intervals for inserting commas for pointing off and the decimal point without affecting the selection of the index wheels in proper sequence.

410. A calculating mechanism comprising a series of nine index wheels of different denominations, means normally disconnected from the index wheels for rotating them and separate connecting devices for connecting the several index wheels with the rotating means, and a selector mounted to be movable in two directions transverse to each other and provided with a series of pins for operating the connecting devices, means for moving the selector in one direction to bring its pins successively into position to operate the connecting devices of the successive index wheels, and means for moving the selector in a direction transverse to its first movement to cause the connecting device of the index wheel selected, to be operated, the several pins of the selector being spaced apart equal distances in the direction of the first movement of the selector and spaced apart equal distances in the transverse direction except that the third and fourth pins from the right hand end are in the same plane transverse to the direction of the second movement of the selector, the seventh and eighth are in the same plane transverse to the direction of the second movement and the eleventh and twelfth are in the same plane transverse to the direction of the second movement, in order to permit of leaving spaces at proper intervals for inserting commas for pointing off and the decimal point without affecting the selection of the index wheels in proper sequence.

411. A calculating mechanism comprising a series of nine index wheels of different denominations, means normally disconnected from the index wheels for rotating them and separate connecting devices for connecting the several index wheels with the rotating means, and a selector mounted to rotate and to be movable longitudinally and provided with a series of pins for operating the connecting devices, means for rotating the selector to bring its pins successively into position to operate the connecting devices of the successive index wheels, and means for moving the selector longitudinally of its axis to cause the connecting device of the index wheel selected, to be operated, the several pins of the selector being spaced apart equal distances on the periphery of the selector and spaced apart equal distances longitudinally of the selector except that the third and fourth pins from the right hand end are in the same plane transverse to the axis of the selector, the seventh and eighth are in the same plane transverse to the axis and the eleventh and twelfth are in the same plane transverse of the axis, in order to permit of printing in commas for pointing off and the decimal point, without affecting the selection of the index wheels in proper sequence.

412. The combination with a typewriting machine having type keys and a paper carriage, of calculating mechanism comprising a series of index wheels of different denominations, means normally disconnected from the index wheels for rotating them and separate connecting devices for connecting the several index wheels with the rotating means, and a selector mounted to be movable in two directions transverse to each other and provided with a series of pins for operating the connecting devices, means for moving the selector in one direction to bring its pins successively into position to operate the connecting devices of the successive index wheels, and means for moving the selector in a direction transverse to its first movement to cause the connecting device of the index wheel selected, to be operated, the several pins of the selector being spaced apart equal distances in the direction of the first movement of the selector and spaced apart equal distances in the transverse direction except that at predetermined points two successive pins are in the same plane transverse to the direction of the second movement of the selector, in order to permit of printing in commas for pointing off and the decimal point without affecting the selection of the index wheels in proper sequence.

413. The combination with a typewriting machine having type keys and a paper carriage, of calculating mechanism comprising a series of index wheels of different denominations, means normally disconnected from the index wheels for rotating them, and separate connecting devices for connecting the several index wheels with the rotating means, and a selector mounted to rotate and to be movable longitudinally and provided with a series of pins for operating the connecting devices, means for rotating the selector to bring its pins successively into position to operate the connecting devices of the successive index wheels, and means for moving the selector longitudinally of its axis to cause the connecting device of the index wheel selected, to be operated, the several pins of the selector being spaced apart equal distances on the periphery of the selector and spaced apart equal distances longitudinally of the selector except that at predetermined points two successive pins are in the same plane transverse to the axis of the selector, in order to permit of printing in commas for pointing off and the decimal point without affecting the selection of the index wheels in proper order.

414. The combination with a typewriting machine having type keys and a paper carriage, of calculating mechanism comprising a series of index wheels of different denominations, means normally disconnected from the index wheels for rotating them and separate connecting devices for connecting the several index wheels with the rotating means, and a selector mounted to be movable in two directions transverse to each other and provided with a series of pins for operating the connecting devices, means controlled by the paper carriage for moving the selector in one direction to bring its pins successively into position to operate the connecting devices of the successive index wheels, and means operated by the numeral keys for moving the selector in a direction transverse to its first movement to cause the connecting device of the index wheel selected, to be operated, the several pins of the selector being spaced apart equal distances in the direction of the first movement of the selector and spaced apart equal distances in the transverse direction except that at predetermined points two successive pins are in the same plane transverse to the direction of the second movement of the selector, in order to permit of printing in commas for pointing off and the decimal point, without affecting the selection of the index wheels in proper sequence.

415. The combination with a typewriting machine having type keys and a paper carriage, of calculating mechanism comprising a series of index wheels of different denominations, means normally disconnected from the index wheels for rotating them and separate connecting devices for connecting the several index wheels with the rotating means, and a selector mounted to rotate and to be movable longitudinally and provided with a series of pins for operating the connecting devices, means controlled by the paper carriage for rotating the selector to bring its pins successively into position to operate the connecting devices of the successive index wheels, and means operated by the numeral keys for moving the selector longitudinally of its axis to cause the connecting device of the index wheel selected, to be operated, the several pins of the selector being spaced apart equal distances on the periphery of the selector and spaced apart equal distances longitudinally of the selector except that at predetermined points two successive pins are in the same plane transverse to the axis of the selector, in order to permit of printing in commas for pointing off and the decimal point without affecting the selection of the index wheels in proper sequence.

416. The combination with a typewriting machine having type keys and a paper carriage, of calculating mechanism comprising a series of nine index wheels of different denominations, means normally disconnected from the index wheels for rotating them and separate connecting devices for connecting the several index wheels with the rotating means, and a selector mounted to be movable in two directions transverse to each other and provided with a series of pins for operating the connecting devices, means controlled by the paper carriage for moving the selector in one direction to bring its pins successively into position to operate the connecting devices of the successive index wheels, and means operated by the numeral keys for moving the selector in a direction transverse to its first movement to cause the connecting device of the index wheel selected, to be operated, the several pins of the selector being spaced apart equal distances in the direction of the first movement of the selector and spaced apart equal distances in the transverse direction except that the third and fourth pins from the right hand end are in the same plane transverse to the direction of the second movement of the selector, the seventh and eighth are in the same plane transverse to the direction of the second movement and the eleventh and twelfth are in the same plane transverse to the direction of the second movement, in order to permit of printing in commas for pointing off and the decimal point without affecting the selection of the index wheels in proper sequence.

417. The combination with a typewriting machine having type keys and a paper carriage, of calculating mechanism comprising a series of nine index wheels of different denominations, means normally disconnected from the index wheels for rotating them and separate connecting devices for connecting the several index wheels with the rotating means, and a selector mounted to rotate and to be movable longitudinally and provided with a series of pins for operating the connecting devices, means controlled by the paper carriage for rotating the selector to bring its pins successively into position to operate the connecting devices of the successive index wheels, and means operated by the numeral keys for moving the selector longitudinally of its axis to cause the connecting device of the index wheel selected, to be operated, the several pins of the selector being spaced apart equal distances on the periphery of the selector and spaced apart equal distances longitudinally of the selector except that the third and fourth pins from the right hand end are in the same plane transverse to the axis of the selector, the seventh and eighth are in the same plane transverse to the axis of the selector and the eleventh and twelfth are in the same plane transverse to the axis of the selector, in order to permit of printing in commas for pointing off and the decimal point without affecting the selection of the index wheels in proper sequence.

418. The combination with a typewriting machine having a reciprocating paper carriage and numeral keys, of a calculating machine and actuating means therefor normally disconnected from the numeral keys, and means for connecting the actuating means with the numeral keys comprising a slide rod, a lock for the slide rod and means carried by the paper carriage for releasing the slide rod.

419. The combination with a typewriting machine having a reciprocating paper carriage and numeral keys, of a calculating machine and actuating means therefor normally disconnected from the numeral keys, and means for connecting the actuating means with the numeral keys comprising a slide rod, a spring for moving it, a lock for the slide rod and means carried by the paper carriage for releasing the slide rod.

420. The combination with a typewriting machine having a reciprocating paper carriage and numeral keys, of a calculating machine and actuating means therefor normally disconnected from the numeral keys, and means for connecting the actuating means with the numeral keys comprising a slide rod, a pivoted dog carried by the slide rod, a fixed stop with which the pivoted dog engages to hold the slide rod locked, and means carried by the paper carriage for releasing the pivoted dog.

421. The combination with a typewriting machine having a reciprocating paper carriage and numeral keys, of a calculating machine and actuating means therefor normally disconnected from the numeral keys, and means for connecting the actuating means with the numeral keys comprising a slide rod, a spring for moving the slide rod, a pivoted dog carried by the slide rod, a fixed stop with which the pivoted dog engages to hold the slide rod locked, and means carried by the paper carriage for releasing the pivoted dog.

422. The combination with a typewriting machine having a reciprocating paper carriage and numeral keys, of a calculating machine, and actuating means therefor normally disconnected from the numeral keys, a swinging guide for said actuating means, and means for swinging said guide to connect the actuating means with the numeral keys comprising a slide rod, a bar provided with a cam, a lock for the slide rod and means carried by the paper carriage for releasing the slide rod.

423. The combination with a typewriting machine having a reciprocating paper carriage and numeral keys, of a calculating machine and actuating means therefor normally disconnected from the numeral keys, a swinging guide for said actuating means and means for swinging said guide to connect the actuating means with the numeral keys comprising a slide rod, a spring for moving it, a lock for the slide rod and means carried by the paper carriage for releasing the slide rod.

424. The combination with a typewriting machine having a reciprocating paper carriage and numeral keys, of a calculating machine and actuating means therefor normally disconnected from the numeral keys, a swinging guide for said actuating means and means for swinging said guide to connect the actuating means with the numeral keys comprising a slide rod, a pivoted dog carried by the slide rod, a fixed stop with which the pivoted dog engages to hold the slide rod locked, and means carried by the paper carriage for releasing the pivoted dog.

425. The combination with a typewriting machine having a reciprocating paper carriage and numeral keys, of a calculating machine and actuating means therefor normally disconnected from the numeral keys, a guide for said actuating means carried by a swinging frame and means for swinging said frame to connect the actuating means with the numeral keys comprising an arm carried by said swinging frame, a bar provided with a cam adapted to engage said arm, a slide rod connected with said bar, means for moving said slide rod, means for locking said slide rod against movement, and means carried by the paper carriage for releasing said locking means.

426. The combination with a typewriting machine having a reciprocating paper carriage and numeral keys, of a calculating machine and actuating means therefor normally disconnected from the numeral keys, and means for connecting the actuating means with the numeral keys comprising a pair of slide rods, a lock for each of the slide rods and means carried by the paper carriage for releasing the slide rod comprising a pair of cam plates each adapted to act upon the lock of one of the slide rods, and means for shifting the several cam plates into and out of position to act upon a lock.

427. The combination with a typewriting machine having a reciprocating paper carriage and numeral keys, of calculating mechanism, means for operating a part of the calculating mechanism adapted to be controlled by the movement of the paper carriage comprising a slide rod, means for locking the slide rod against movement and means carried by the paper carriage for releasing the slide rod comprising a cam plate and means for shifting it into or out of position to operate the locking means.

428. The combination with a typewriting machine having a reciprocating paper carriage and numeral keys, of calculating mechanism, means for operating a part of the calculating mechanism adapted to be controlled by the movement of the paper carriage comprising a slide rod, a spring for moving the slide rod, means for locking the slide rod against movement and means carried by the paper carriage for releasing the slide rod comprising a cam plate and means for shifting it into or out of position to operate the locking means.

429. The combination with a typewriting machine having a reciprocating paper carriage and numeral keys, of calculating mechanism, means for operating a part of the calculating mechanism adapted to be controlled by the movement of the paper carriage comprising a slide rod, a pivoted dog carried by the slide rod for locking the slide rod against movement and means carried by the paper carriage for releasing the pivoted dog comprising a cam plate and means for shifting it into or out of position to operate the pivoted dog.

430. The combination with a typewriting machine having a reciprocating paper carriage and numeral keys, of calculating mechansim, means for operating a part of the calculating mechanism adapted to be controlled by the movement of the paper carriage comprising a slide rod, a spring for moving the slide rod, a pivoted dog, means carried by the slide rod for locking the slide rod against movement and means carried by the paper carriage for releasing the slide rod comprising a cam plate and means for shifting it into or out of position to operate the pivoted dog.

431. The combination with a typewriting machine having a reciprocating paper carriage and numeral keys, of calculating mechanism, means for operating a part of the calculating mechanism adapted to be controlled by the movement of the paper carriage comprising a slide rod, a pivoted dog carried by the slide rod, a fixed stop adapted to be engaged by the pivoted dog to lock the slide rod against movement, and means carried by the paper carriage for releasing the slide rod comprising a cam plate and means for shifting it into or out of position to operate the locking dog, said locking dog having a cam at its forward end and a laterally projecting finger at its rear end, and said cam plate having at its forward end a cam adapted to engage the cam on the forward end of the locking dog to depress it out of engagement with the fixed stop.

432. The combination with a typewriting machine having a reciprocating paper carriage and numeral keys, of calculating mechanism, means for operating a part of the calculating mechanism adapted to be controlled by the movement of the paper carriage comprising a slide rod, a pivoted dog carried by the slide rod, having a lateral finger and a cam at its forward end, a fixed guide bar adapted to be engaged by the lateral finger on the forward end of the locking dog to lock the slide against movement, means carried by the paper carriage adapted to engage the cam on the forward end of the locking dog to depress its finger below the end of the guide bar, and means for moving the slide rod.

433. The combination with a typewriting machine having a reciprocating paper carriage and numeral keys, of calculating mechanism, means for operating a part of the calculating mechanism adapted to be controlled by the movement of the paper carriage comprising a slide rod, a pivoted dog carried by the slide rod having a lateral finger and a cam at its forward end and having a lateral finger at its rear end, a fixed guide bar adapted to be engaged by the finger on the forward end of the pivoted dog to lock the slide against movement, means carried by the paper carriage for releasing the locking dog comprising a cam plate having a cam adapted to engage the cam on the forward end of the locking dog to depress the forward finger below the end of the guide bar, and also having a projection adapted to be engaged by the finger on the rear end of the locking dog when its forward end is depressed, and means for moving the slide rod.

434. The combination with a typewriting machine having a reciprocating paper carriage and numeral keys, of calculating mechansim, means for operating a part of the calculating mechanism adapted to be controlled by the movement of the paper carriage comprising a slide rod, a pivoted dog carried by the slide rod having a cam and a lateral finger at its forward end and also having a cam and a lateral finger at its rear end, a fixed guide bar extending in a direction opposite to the direction of movement of the paper carriage during the printing operation and adapted to be engaged by the finger on the forward end of the locking dog, a fixed stop opposite the guide bar adapted to engage the cam on the rear end of the locking dog, and means carried by the paper carriage for releasing the locking dog and controlling the movement of the slide bar comprising a cam plate provided with means for engaging the cam on the forward end of the locking dog to depress its forward finger below the end of the guide rod, and also provided with means adapted to be engaged by the finger on the rear end of the locking dog, and means for moving the slide rod.

435. In a calculating machine, the combination of a wheel to be rotated, power mechanism normally locked for rotating the wheel and an operating key for releasing the power mechanism, said power mechanism comprising a driving spring and a winding spring for maintaining the driving spring under constant tension, means for winding up the winding spring, means for limiting the extent to which the winding spring may be wound up, and means controlled by the winding spring for locking the operating key against operation before the winding spring has run down.

436. In a calculating machine, the combination of a wheel to be rotated, power mechanism normally locked for rotating the wheel and an operating key for releasing the power mechanism, means for relocking the power mechanism on the completion of a predetermined movement, said power mechanism comprising a driving spring and a winding spring for maintaining the driving spring under constant tension, means for winding up the winding spring, means for limiting the extent to which the winding spring may be wound up, and means controlled by the winding spring for locking the operating key against operation before the winding spring has run down.

437. In a calculating machine, the combination of a wheel to be rotated, power mechanism normally locked for rotating the wheel and an operating key for releasing the power mechanism, means for relocking the power mechanism on the completion of a predetermined movement, said power mechanism comprising a driving spring and a winding spring for maintaining the driving spring under constant tension, means for winding up the winding spring, means for limiting the extent to which the winding spring may be wound up, and means controlled by the winding spring for locking the operating key against operation before the winding spring has run down, and means for checking the movement of the power mechanism in advance of the operation of the relocking means.

438. In a calculating machine the combination of a wheel to be rotated, power mechanism normally locked for rotating the wheel and an operating key for releasing the power mechanism, said power mechanism comprising a driving spring, a winding spring for maintaining the driving spring under constant tension and means for rewinding the winding spring, key locking means for locking the operating key against operation, and means controlled by the winding spring for operating the key locking means on a predetermined movement of the winding spring.

439. In a calculating machine the combination of a wheel to be rotated, power mechanism normally locked for rotating the wheel and an operating key for releasing the power mechanism, said power mechanism comprising a driving spring, a winding spring for maintaining the driving spring under constant tension and means for rewinding the winding spring, key locking means for locking the operating key against operation, a slide provided with means for operating said key locking means, means for locking the slide and means operated by the winding spring for releasing the slide on a predetermined movement of the winding spring to cause the operating key to be locked against operation.

440. In a calculating machine the combination of a wheel to be rotated, power mechanism normally locked for rotating the wheel and an operating key for releasing the power mechanism, said power mechanism comprising a driving spring, a winding spring for maintaining the driving spring under constant tension and means for rewinding the winding spring, key locking means for locking the operating key against operation, a slide provided with means for operating said key locking means, a signal device and means carried by the slide for operating it, means for locking the slide and means operated by the winding spring for releasing the slide on a predetermined movement of the winding spring to cause the signal device to be operated.

441. In a calculating machine the combination of a wheel to be rotated, power mechanism normally locked for rotating the wheel and an operating key for releasing the power mechanism, said power mechanism comprising a driving spring, a winding spring for maintaining the driving spring under constant tension and means for rewinding the winding spring, key locking means for locking the operating key against operation, a slide provided with means for operating said key locking means, a signal device and means carried by the slide for operating it, means for locking the slide and means operated by the winding spring for releasing the slide on a predetermined movement of the winding spring to cause the signal device to be operated, means for stopping further movement of the slide before it operates the key locking means, and means operated by the further movement of the winding spring for releasing the stopping means to permit the slide to effect the operation of the key locking means.

This specification signed and witnessed this 16th day of June A. D. 1909.

JOHN T. HOWIESON.

In the presence of—
AL. H. GRAHAM,
C. H. ADAMS.